(12) United States Patent
Imamura et al.

(10) Patent No.: US 11,370,360 B2
(45) Date of Patent: Jun. 28, 2022

(54) DISPLAY SYSTEM

(71) Applicant: Panasonic Intellectual Property Management Co., Ltd., Osaka (JP)

(72) Inventors: Norihiro Imamura, Osaka (JP); Kenji Nagatomi, Osaka (JP); Michihiro Yamagata, Osaka (JP); Shoji So, Osaka (JP); Keiichi Matsuzaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/125,578

(22) Filed: Dec. 17, 2020

(65) Prior Publication Data

US 2021/0197725 A1    Jul. 1, 2021

(30) Foreign Application Priority Data

Dec. 25, 2019  (JP) .............................. JP2019-234945
Dec. 27, 2019  (JP) .............................. JP2019-238333
(Continued)

(51) Int. Cl.
*B60R 1/08*        (2006.01)
*B60R 1/12*        (2006.01)

(52) U.S. Cl.
CPC .................. *B60R 1/08* (2013.01); *B60R 1/12* (2013.01); *B60R 2001/1215* (2013.01);
(Continued)

(58) Field of Classification Search
CPC ..... B60R 1/08; B60R 1/12; B60R 2001/1215; B60R 2001/1253; B60R 2300/605;
(Continued)

(56) References Cited

U.S. PATENT DOCUMENTS 10,017,114 B2    7/2018  Bongwald
2009/0135493 A1*  5/2009  Takayanagi ............... B60R 1/12
                                              359/630
(Continued)

FOREIGN PATENT DOCUMENTS

JP    2002-316580    10/2002
JP    2009-120080     6/2009
(Continued)

*Primary Examiner* — Sath V Perungavoor
*Assistant Examiner* — Tyler B Edwards
(74) *Attorney, Agent, or Firm* — Greenblum & Bernstein, P.L.C.

(57) ABSTRACT

A tangent line, described next, is, in top view, parallel to a straight line extending in a width direction of the display surface in a range in which the attitude can be changed. The tangent line is present on a plane orthogonal to the up-down direction of the automobile, and contacts a center of the final reflective surface. In top view, of an angle formed by a straight line connecting a center of the final reflective surface with a center of the display surface and the tangent line of the final reflective surface, a supplementary angle which is supplementary to an angle that is on a rear side of the automobile and that is on a side where the observer is present is an acute angle of less than 90 degrees.

20 Claims, 70 Drawing Sheets

(30) Foreign Application Priority Data

Dec. 27, 2019 (JP) .............................. JP2019-238653
Jun. 30, 2020 (JP) .............................. JP2020-113109

(52) U.S. Cl.
CPC . *B60R 2001/1253* (2013.01); *B60R 2300/605* (2013.01); *B60R 2300/8046* (2013.01)

(58) Field of Classification Search
CPC ........ B60R 2300/8046; B60R 2300/20; B60R 2300/70; B60R 1/00; B60R 2300/205; B60K 35/00; B60K 2370/334; G02B 27/0179; G02B 2027/0183
See application file for complete search history.

(56) References Cited

U.S. PATENT DOCUMENTS

| | | | |
|---|---|---|---|
| 2009/0284598 A1 | 11/2009 | Busch et al. | |
| 2018/0345867 A1 | 12/2018 | Imamura et al. | |
| 2019/0188878 A1 | 6/2019 | Matsuura | |
| 2020/0377021 A1* | 12/2020 | So | G02B 27/142 |

FOREIGN PATENT DOCUMENTS

| | | |
|---|---|---|
| JP | 5235876 | 7/2013 |
| JP | 2017-210229 | 11/2017 |
| JP | 2018-203245 | 12/2018 |
| JP | 2019-105906 | 6/2019 |
| WO | 2008/002989 | 1/2008 |

\* cited by examiner

FIG. 21
(a1)
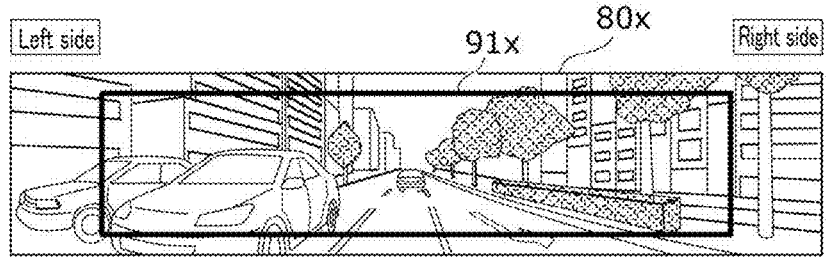
(a2)
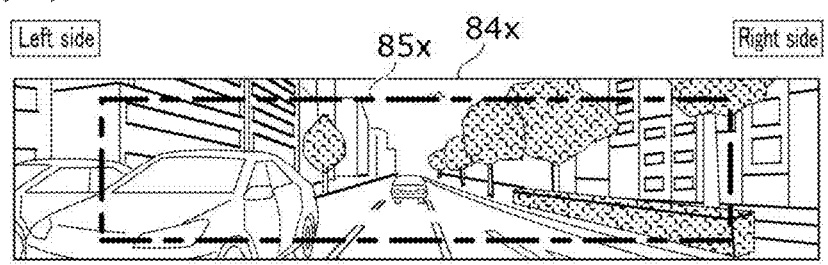
(b1)
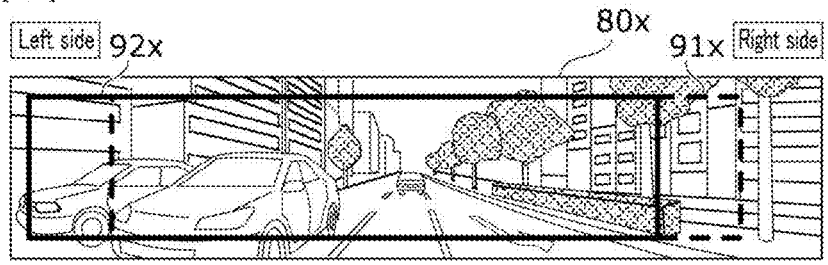
(b2)
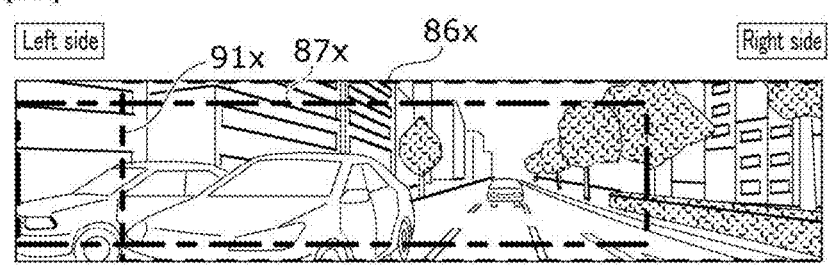

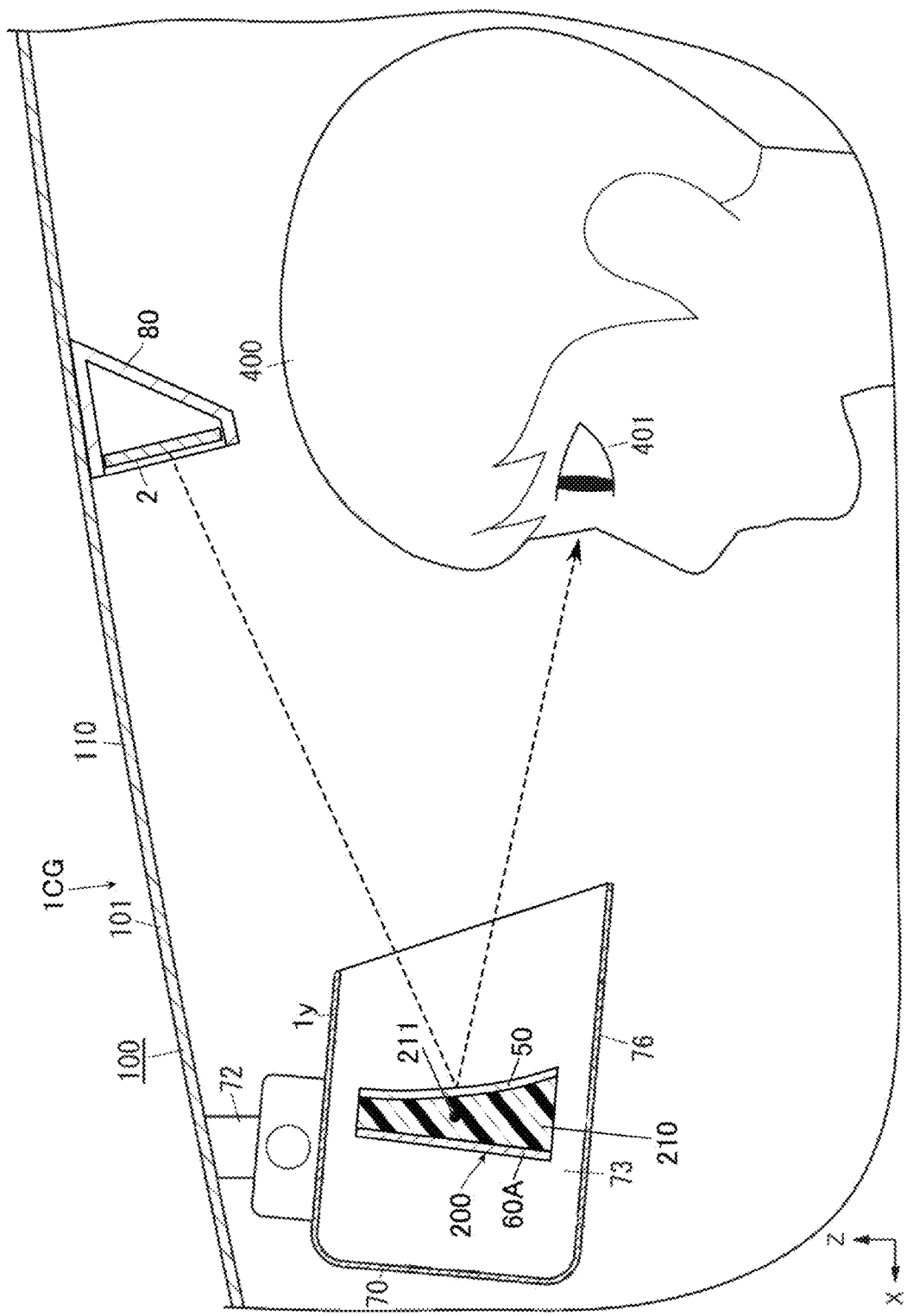

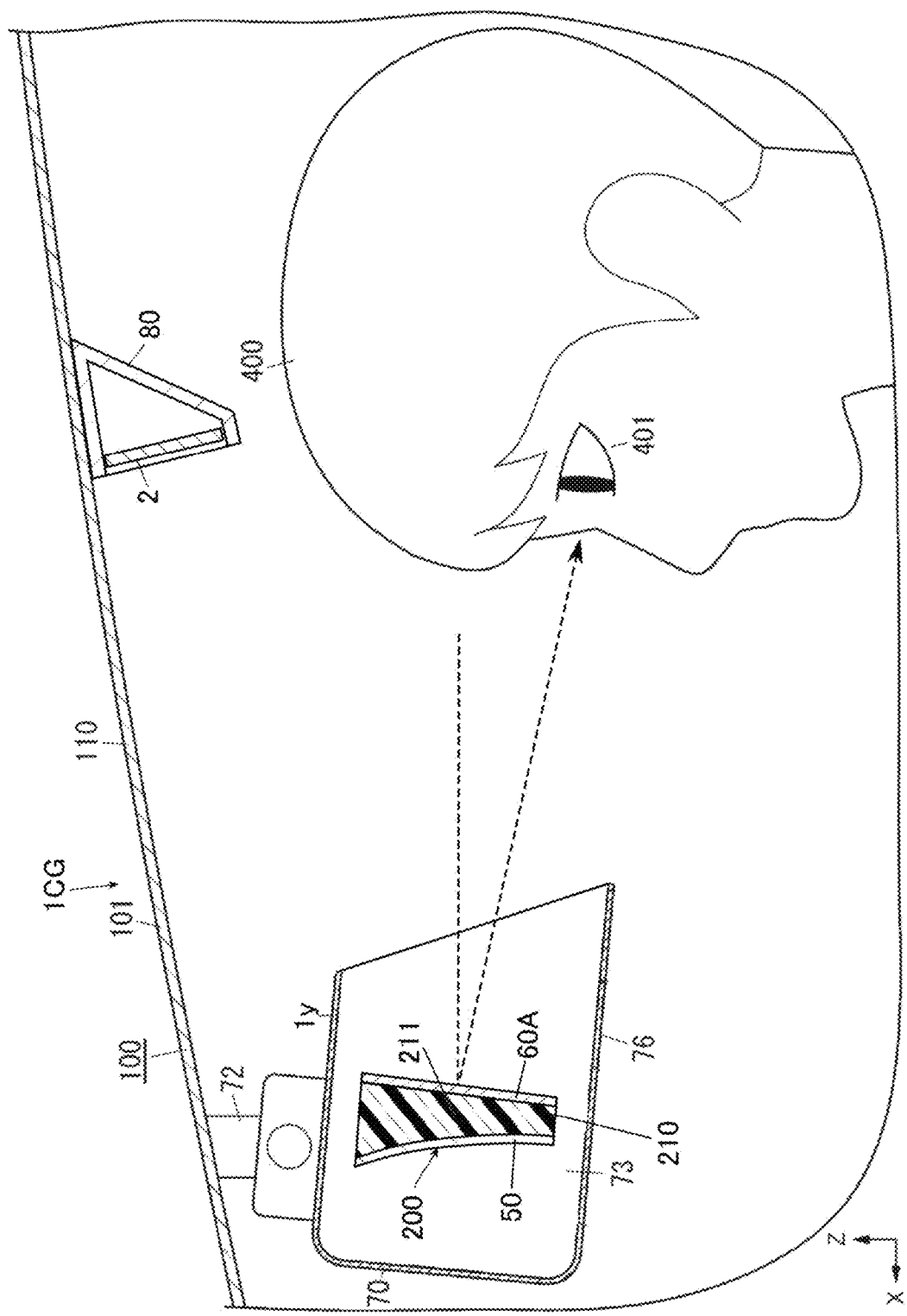

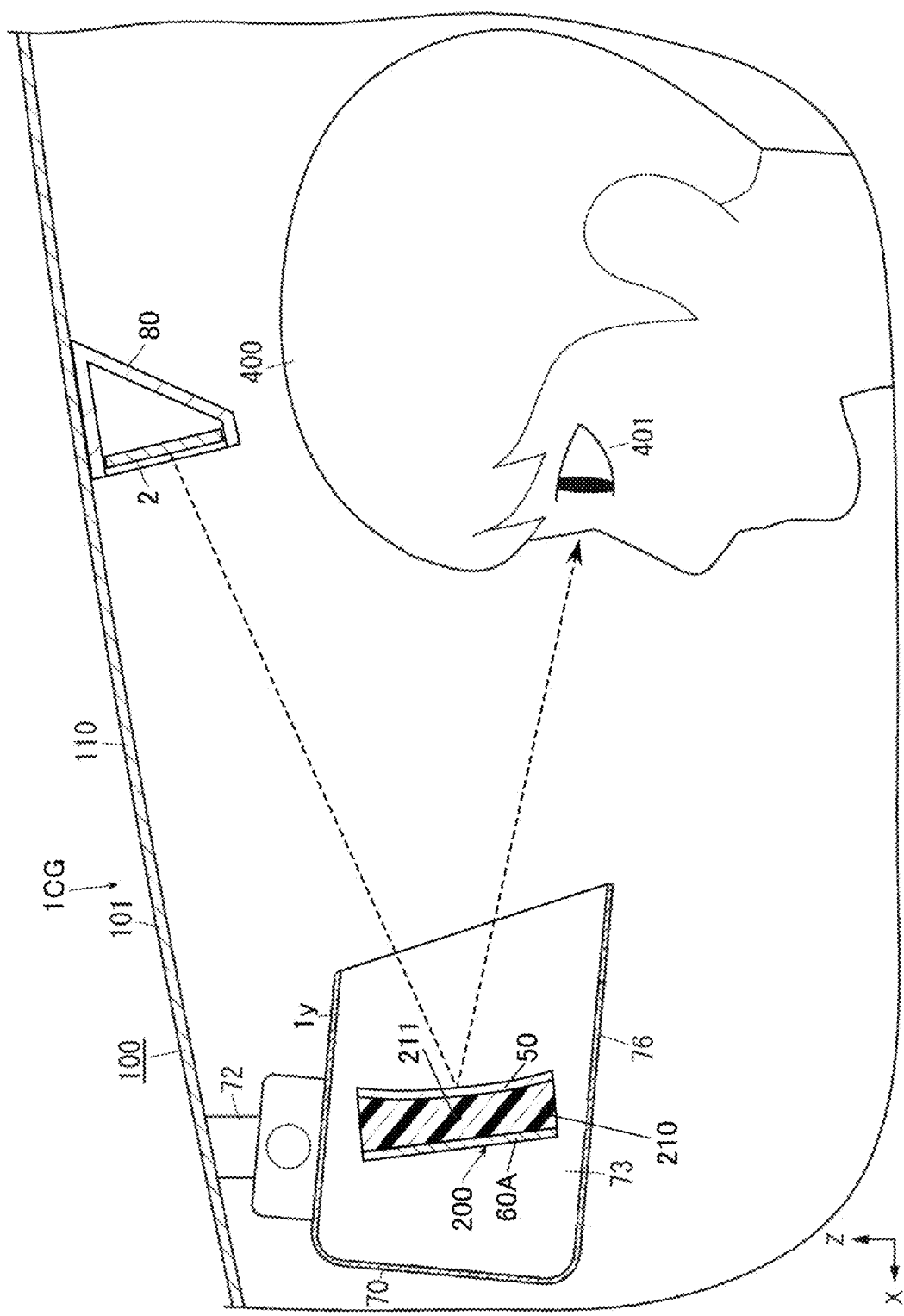

DISPLAY SYSTEM

CROSS REFERENCE TO RELATED APPLICATIONS

The present application is based on and claims priority of Japanese Patent Application No. 2019-234945 filed on Dec. 25, 2019, Japanese Patent Application No. 2019-238333 filed on Dec. 27, 2019, Japanese Patent Application No. 2019-238653 filed on Dec. 27, 2019, and Japanese Patent Application No. 2020-113109 filed on Jun. 30, 2020.

FIELD

The present disclosure relates generally to display systems, and relates particularly to display systems installed in automobiles.

BACKGROUND

A vehicular vision system (display system) disclosed in PTL 1 includes a projector, a screen, and a rear camera. The projector is installed within a vehicle cabin. The screen is installed near the windshield of the vehicle. A rear image captured by the rear camera is projected onto the screen by the projector.

CITATION LIST

Patent Literature

PTL 1: U.S. Pat. No. 10,017,114

SUMMARY

The vehicular vision system disclosed in PTL 1 can be improved upon.

The present disclosure provides a display system capable of improving upon the above related art.

A display system according to one aspect of the present disclosure is a display system installed in an automobile, and includes: an emitter including a display having a display surface that displays a picture of an area behind the automobile, the emitter emitting the picture as light; and a concave mirror having a final reflective surface that is concave and having an attitude that is freely changeable. The light emitted from the emitter is directly or indirectly incident on the final reflective surface, and the final reflective surface reflects the light which is incident toward an eye of an observer. A tangent line extending along a plane orthogonal to an up-down direction of the automobile and contacting a center of the final reflective surface is, in top view, parallel to a straight line extending in a width direction of the display surface within a range in which the attitude is changeable. In top view, of an angle formed by a straight line connecting the center of the final reflective surface with a center of the display surface and the tangent line of the final reflective surface, a supplementary angle which is supplementary to an angle that is on a rear side with respect to the automobile and that is on a side where the observer is present is an acute angle of less than 90 degrees.

Note that some of the specific aspects may be realized using a system, a method, an integrated circuit, a computer program, or a computer-readable recording medium such as a CD-ROM, or may be implemented using any desired combination of systems, devices, methods, integrated circuits, computer programs, and recording media.

The present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 21 is a diagram illustrating a difference in image processing performed by the controller between before and after the face position moves.

FIG. 79 is a general explanatory diagram illustrating a state in which a final reflective member of a holding structure in the display systems according to Embodiments 1 to 9 is facing an observer.

FIG. 80 is a general explanatory diagram illustrating a state in which a mirror member of a holding structure in the display systems according to Embodiments 1 to 9 is facing an observer.

FIG. 81 is a general explanatory diagram illustrating a configuration in which a holding structure different from that illustrated in FIG. 79 and FIG. 80 is used in the display systems according to Embodiments 1 to 9.

DESCRIPTION OF EMBODIMENTS

Figure 1:
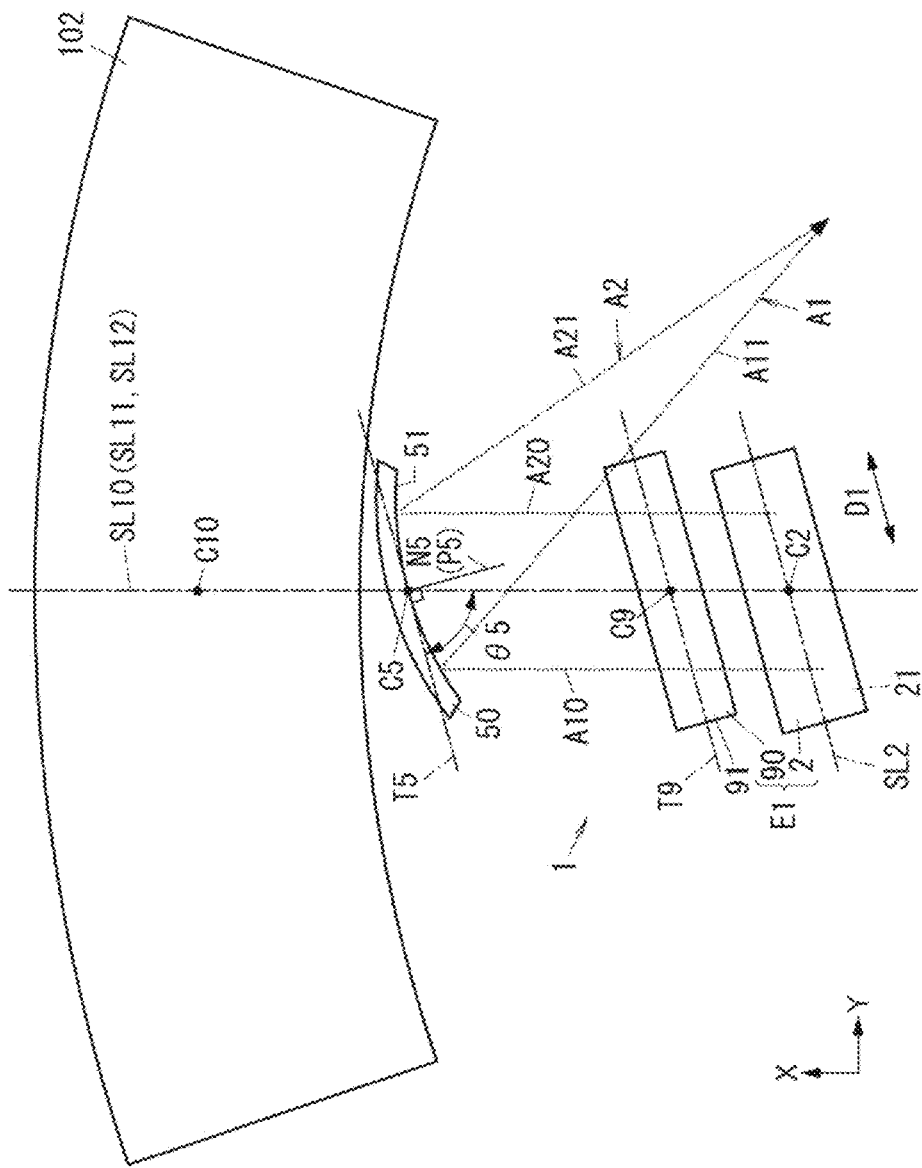
FIG. 1 is a schematic diagram illustrating primary elements of a display system according to one embodiment from above.

In the vehicular vision system (display system) disclosed in PTL 1, distortion may arise in the image (picture) projected onto the screen due to a positional relationship between optical systems including the projector and screen and the like.

In view of this, a display system according to one aspect of the present disclosure is a display system installed in an automobile, and includes: an emitter including a display having a display surface that displays a picture of an area behind the automobile, the emitter emitting the picture as light; and a concave mirror having a final reflective surface that is concave and having an attitude that is freely changeable. The light emitted from the emitter is directly or indirectly incident on the final reflective surface, and the final reflective surface reflects the light which is incident toward an eye of an observer. A tangent line extending along a plane orthogonal to an up-down direction of the automobile and contacting a center of the final reflective surface is, in top view, parallel to a straight line extending in a width direction of the display surface within a range in which the attitude is changeable. In top view, of an angle formed by a straight line connecting the center of the final reflective surface with a center of the display surface and the tangent line of the final reflective surface, a supplementary angle which is supplementary to an angle that is on a rear side with respect to the automobile and that is on a side where the observer is present is an acute angle of less than 90 degrees.

Additionally, the automobile includes a windshield; and in top view, the concave mirror is disposed rearward from at least part of the windshield, and a straight line connecting the center of the final reflective surface with a center of the windshield is parallel to a straight line extending in a front-rear direction of the automobile.

Additionally, in top view, the straight line connecting the center of the final reflective surface with the center of the display surface is parallel to the straight line extending in the front-rear direction.

Additionally, in top view, a straight line extending in the front-rear direction of the automobile and passing through the center of the display surface is closer to the observer than a straight line extending in the front-rear direction of the automobile and passing through the center of the final reflective surface.

Additionally, the emitter includes an intermediate reflective member having an intermediate reflective surface on which the light emitted from the display surface is directly or indirectly incident, the intermediate reflective surface reflecting the light which is incident toward the final reflective surface, and a tangent line extending along a plane orthogonal to the up-down direction and contacting a center of the intermediate reflective surface is, in top view, parallel to the straight line extending in the width direction of the display surface.

Additionally, an orientation of the intermediate reflective member and an orientation of the display are changeable relative to the final reflective surface while maintaining a state in which the tangent line of the intermediate reflective surface and the straight line extending in the width direction of the display surface are parallel.

Additionally, the display system includes: an angle sensor that detects an orientation of the final reflective surface; and a drive circuit that, in accordance with a detection result of the angle sensor, changes an orientation of the emitter to an orientation in which, in top view, the tangent line of the final reflective surface is parallel to the straight line extending in the width direction of the display surface.

Additionally, the display system includes an angle sensor that detects an orientation of the final reflective surface, and the display distorts the picture displayed on the display surface in accordance with a detection result of the angle sensor.

Additionally, a shape of the final reflective surface is a plane-symmetrical shape that takes, as a plane of symmetry, a plane that is parallel to the up-down direction and that includes a normal line passing through the center of the final reflective surface.

Additionally, a display system displays a picture of an area behind an automobile within a cabin of the automobile, the display system including: a concave mirror, an attitude of the concave mirror being freely changeable; a display, disposed further rearward than the concave mirror, that projects the picture toward the concave mirror; an imaging unit that captures an image of a region in which the picture is projected; and a controller that performs display control for causing the picture of the area behind to be displayed in the display in accordance with the image captured by the imaging unit. The imaging unit is disposed in an attitude in which an optical axis of the imaging unit is parallel to at least part of an optical path of the picture projected by the display.

Through this, the imaging unit captures an image of a region in which the picture is projected, and thus an image can be captured of the face of a person who is, in the cabin, viewing the picture projected from the display and reflected by the concave mirror. In particular, the imaging unit is disposed in an attitude such that an optical axis thereof is parallel to part of the optical path of the picture projected by the display. Thus when the person inside the cabin changes the attitude of the concave mirror in accordance with the position of their eyes so that the picture is visible, the person's face is included in the image capturing range of the imaging unit. Accordingly, the person's face can be captured without changing the angle of view of the imaging unit to an angular range broader than a predetermined angular range, and the position of the person's face can therefore be specified accurately. Display control based on the position of the person's face can therefore be performed accurately.

Additionally, the imaging unit may be disposed further rearward than the concave mirror, and may capture an image of a region including the concave mirror.

Accordingly, the imaging unit can capture an image of the person's face via the concave mirror.

Additionally, the display system may further include an optical filter that transmits one, and reflects the other, of visible light and infrared light; the display may project a picture including visible light onto the concave mirror, the picture having been transmitted or reflected by the optical filter; and the imaging unit may be an infrared camera that captures the infrared light reflected or transmitted by the optical filter.

Accordingly, the imaging unit captures infrared light having a wavelength different from the picture projected by the display, and thus an image of the person's face can be captured effectively.

Additionally, an optical axis of a projection optical system including the display and the optical filter may substantially coincide with an optical axis of an optical imaging system including the imaging unit and the optical filter.

Accordingly, by adjusting the optical axis of the projection optical system to the position of the person's eye by changing the attitude of the concave mirror, the optical axis of the optical imaging system can be adjusted to the position of the person's eye as well.

Additionally, the concave mirror may reflect only a partial region of the picture projected by the display.

Accordingly, the display system is configured so that the position where reflected picture is caused to be seen by a person changes in response to movement of the viewpoint of the person looking at the concave mirror. Accordingly, the display system can provide the person viewing the displayed image with a sense that the image is three-dimensional.

Additionally, the controller may: cause the display to display a partial picture of a partial region of the picture of the area behind; specify a position of a face of a person in a cabin of the automobile based on an image captured by the imaging unit; and when the position of the face which has been specified has moved in a first direction orthogonal to a front-rear direction of the automobile, cause the display to display a partial picture, of the picture of the area behind, that is a partial region shifted in a second direction from the partial picture displayed in the display before the position of the face moved, the second direction being a direction opposite from the first direction.

Accordingly, the controller can accurately perform display control based on the position, in a direction orthogonal to the front-rear direction of the automobile, of the person's face.

Additionally, the controller may: cause the display to display a partial picture of a partial region of the picture of the area behind; and cause the display to display a warning upon determining that the position of the face which has been specified is outside a predetermined eye box.

Accordingly, when the position of the person's face is outside the eye box, the controller can display a warning in the display.

Additionally, the controller may: cause the display to display a partial picture of a partial region of the picture of the area behind; specify a gaze direction of a person in the cabin of the automobile based on an image captured by the imaging unit; and when a target of the gaze direction which has been specified has moved in a first direction orthogonal to a front-rear direction of the automobile, cause the display to display a partial picture, of the picture of the area behind, that is a partial region shifted in a second direction from the partial picture displayed in the display before the gaze direction moved, the second direction being a direction opposite from the first direction.

Accordingly, the controller can accurately perform display control based on the position, in a direction orthogonal to the front-rear direction of the automobile, of the target of the person's gaze.

Additionally, the controller may: cause the display to display a partial picture of a partial region of the picture of the area behind; specify a position of a face of a person in the cabin of the automobile based on an image captured by the imaging unit; and cause the display to display the partial picture at a larger size as the position of the face which has been specified moves further toward the front of the automobile.

Accordingly, controller can accurately perform display control based on the position, in the front-rear direction, of the person's face.

Additionally, the concave mirror may be disposed on a windshield of the automobile, and the display may be disposed on a ceiling of the cabin of the automobile.

Accordingly, the display can be disposed on the ceiling, where the display is less likely to act as an obstruction in the cabin. Furthermore, the configuration is such that the concave mirror and the display are distanced from each other, and thus the sizes of the constituent elements disposed on windshield can be made more compact than in a configuration in which the concave mirror and the display are disposed together.

Additionally, the imaging unit may be disposed on the ceiling of the cabin of the automobile, and the display system may further include a first housing that houses the display and the imaging unit.

Accordingly, the display and the imaging unit can be disposed on the ceiling, where the display and the imaging unit are less likely to act as obstructions in the cabin. Furthermore, the configuration is such that the concave mirror and the imaging unit are distanced from each other, and thus the sizes of the constituent elements disposed on windshield can be made more compact than in a configuration in which the concave mirror and the imaging unit are disposed together.

Additionally, the imaging unit may be disposed on the ceiling of the cabin of the automobile, and the display system may further include: a first housing that houses the display and the imaging unit; and an infrared light source that is disposed in the first housing and that emits infrared light toward the concave mirror.

Infrared light for capturing the person's face using the imaging unit can therefore be emitted toward the person's face. This makes it possible for the imaging unit to effectively capture a person's face not only during the day, but also at night.

Additionally, the display system may further include an optical filter, disposed between the display and the concave mirror, that reflects near-infrared light and transmits visible light; and the optical filter may be disposed in the first housing so as to oppose the infrared light source, the infrared light source being disposed close to the ceiling.

In this manner, the infrared light source, which emits a large amount of heat, can be disposed on the ceiling. This makes it easier for heat produced by the infrared light source to be dissipated by the ceiling, which has a high thermal capacity. In other words, in the display system, the ceiling can be used like a heat sink to dissipate the heat produced by the infrared light source. Accordingly, by keeping the first housing from reaching high temperatures, degradation of the display disposed in the first housing can be suppressed.

Additionally, the display system may further include: a double-sided reflective optical member including the concave mirror and a flat mirror, the concave mirror being formed having a concave mirror surface serving as the final reflective surface, and the flat mirror being formed having a flat mirror surface and disposed overlapping the concave mirror; and a second housing that holds the double-sided reflective optical member in a rotatable state. An attitude of the double-sided reflective optical member is switched between a first state and a second state by rotating the double-sided reflective optical member. In the first state, image light emitted from the display surface is directly or indirectly incident on the concave mirror surface, and the image light incident on the concave mirror surface is reflected toward the eye of the observer. In the second state, light from outside the display system is incident on the flat mirror surface, and the flat mirror surface reflects the light incident on the flat mirror surface toward the eye of the observer. The double-sided reflective optical member is provided in the second housing so that an angle between a normal direction of a center of the concave mirror surface and a horizontal direction in the first state is different from an angle between a normal direction of the flat mirror surface and the horizontal direction in the second state.

Additionally, the double-sided reflective optical member further includes a support body, the support body having one surface and another surface that is a surface on the side opposite from the one surface, the concave mirror being fixed to the one surface and the flat mirror being fixed to the other surface so that the flat mirror surface is tilted relative to a plane orthogonal to the normal direction of the center of the concave mirror surface.

Additionally, the display system includes: an anti-glare mirror disposed in the second housing closer to a side of the second housing on which light is incident than the double-sided reflective optical member, the anti-glare mirror being light-transmissive; and an adjuster that adjusts an angle of the anti-glare mirror relative to a vertical direction of the automobile.

Additionally, the display system includes: a photosensor; a drive circuit that switches the double-sided reflective optical member to the first state and to the second state; and a controller that controls the drive circuit. When a light amount of the light detected by the photosensor is less than a prescribed light amount, the controller causes the drive circuit to put the double-sided reflective optical member in the first state.

Additionally, the display system includes: a sensor that detects a nearby object; a drive circuit that switches the double-sided reflective optical member to the first state and to the second state; and a controller that controls the drive circuit. When the sensor detects an object within a detection area from the sensor, the controller causes the drive circuit to put the double-sided reflective optical member in the second state.

Additionally, the display system further includes: an anti-glare mirror disposed in the second housing closer to a side of the second housing on which light is incident than the double-sided reflective optical member, the anti-glare mirror being light-transmissive; an adjuster that adjusts an angle of the anti-glare mirror relative to a vertical direction of the automobile; and a controller that, when a switching from the second state to the first state, stops an anti-glare function of the anti-glare mirror before the switch.

Additionally, the display system further includes: a light-blocking member held by the second housing in one of a blocking state in which light incident on the concave mirror or light reflected by the concave mirror is at least partially blocked, and an inactive state in which the blocking state is inactive. In the blocking state, the light-blocking member reflects outside light incident on the second housing toward the eye of the observer, and the second housing includes a holding structure that holds the light-blocking member in either one of the blocking state and the inactive state.

Additionally, a mirror member having one surface that is a reflective surface and having a plate shape is provided in the second housing as the light-blocking member. A state of the mirror member is switched to one of a third state and a fourth state by a sliding action and a rotation action of the mirror member. The third state is the inactive state, in which the mirror member is disposed in a first position outside an optical path of light incident on the eye of the observer from the concave mirror. The fourth state is the blocking state, in which the mirror member is disposed in a second position between the concave mirror and the observer in a state in which the reflective surface is facing the observer, and a reflected image in which light from outside the second housing is reflected by the reflective surface is displayed to the eye of the observer. The display system further includes an actuator that moves the mirror member between the first position and the second position. The actuator includes a motor, and a control circuit that controls the motor drives the motor to move the mirror member from the first position to the second position upon an abnormality signal indicating an abnormality in the display performed by the display being input.

Additionally, the display system is installed in an automobile, and the actuator moves the mirror member to the second position in a stopped state in which the automobile has stopped a function related to travel.

Additionally, a mirror member having one surface that is a reflective surface and having a plate shape is provided in the second housing as the light-blocking member. The holding structure further holds the concave mirror. The holding structure holds the concave mirror and the mirror member in a state in which the concave mirror and the mirror member are capable of rotating relative to the second housing with a reflective surface of the mirror member and a reflective surface of the concave mirror facing mutually-opposite directions, and a normal line at a center point of the reflective surface of the mirror member and a normal line at a center point of the reflective surface of the concave mirror are nonparallel.

Additionally, the holding structure includes a rotating body held so as to be rotatable relative to the second housing. The concave mirror and the mirror member are held by the rotating body. In the inactive state, the rotating body rotates to a first rotation position in which the reflective surface of the concave mirror opposes the observer, and in the blocking state, the rotating body rotates to a second rotation position in which the reflective surface of the mirror member opposes the observer.

Additionally, the rotating body holds the mirror member and the concave mirror in a state in which a normal line at a center point of the reflective surface of the mirror member and a normal line at a center point of the reflective surface of the concave mirror are nonparallel.

Additionally, a mirror member having one surface that is a reflective surface and having a plate shape is provided in the second housing as the light-blocking member. The holding structure includes a rotating body held so as to be rotatable relative to the second housing. The rotating body holds the mirror member and the concave mirror in a state in which the reflective surface of the mirror member and the reflective surface of the concave mirror face mutually-opposite directions, and in which a normal line at a center point of the reflective surface of the mirror member and a normal line at a center point of the reflective surface of the concave mirror are parallel. In the inactive state, the rotating body rotates to a first rotation position in which the reflective surface of the concave mirror opposes the observer, and in the blocking state, the rotating body rotates to a second rotation position in which the reflective surface of the mirror member opposes the observer, and an angle that the rotating body rotates between the first rotation position and the second rotation position is a predetermined angle other than 180 degrees.

Additionally, the rotating body further holds at least one other mirror member, and a normal line at a center point of a reflective surface of the other mirror member is nonparallel with respect to each of the normal line at the center point of the reflective surface of the concave mirror and the normal line at the center point of the reflective surface of the mirror member.

Additionally, the rotating body is a quadrangular prism in which a shape of a cross-section intersecting with an axial direction of an axis of rotation is quadrilateral, and two of the concave mirrors and two of the mirror members are disposed in an alternating manner on four side surfaces of the rotating body that are parallel to the axial direction of the axis of rotation.

Additionally, the mirror member is a flat mirror, and an anti-glare mirror is disposed on a side of the mirror member on which light is incident, the anti-glare mirror being light-transmissive. The mirror member and the anti-glare mirror are held by the rotating body so that when seen from the axial direction of the axis of rotation of the rotating body, the normal line at the center point of the reflective surface of the mirror member and a normal line at a center point of a reflective surface of the anti-glare mirror are nonparallel.

Additionally, the display system further includes an actuator that moves the rotating body between the first rotation position and the second rotation position.

Additionally, the display system further includes a drive circuit that switches the state of the light-blocking member from the inactive state to the blocking state in accordance with an output of a detection sensor that detects a state in a predetermined detection area.

Additionally, an optical path of the light reflected by the concave mirror passes through the detection area. The detection sensor includes an object sensor that detects whether or not an object is present in the detection area. When the object sensor detects that the object is present in the detection area, the drive circuit switches the state of the light-blocking member from the inactive state to the blocking state.

Additionally, the object sensor is held by the second housing.

Additionally, the object sensor detects that the object is present when the object is moving in the detection area.

Additionally, the light-blocking member is an optical mirror having a reflective surface that reflects light in a reflection direction of the light reflected by the concave mirror when the light-blocking member is in the blocking state.

Additionally, the detection sensor includes a light sensor-light sensor that detects a light amount of at least part of light incident from a side on which the detection area is located.

Additionally, the display system further includes a lens that focuses light onto the light sensor.

Additionally, the light sensor is disposed within the second housing and along a lower surface or an upper surface of the second housing.

Additionally, the display system further includes a box-shaped part disposed adjacent to the second housing and having an opening in one end on a side on which the detection area is located, and the light sensor is housed within the box-shaped part.

Additionally, the light sensor is disposed on a surface of the light-blocking member.

Additionally, the light-blocking member is disposed in an optical path of the light reflected by the concave mirror, and a light transmittance of the light-blocking member changes in accordance with the output of the detection sensor.

Additionally, the drive circuit changes an orientation of the second housing in accordance with the output of the detection sensor.

Additionally, the display system further includes an imaging unit that captures an image of a region in which the picture is projected. The imaging unit is disposed on a side on which the display is located, and is configured to be capable of changing focus, and the focus is changed based on the switching of the attitude of the double-sided reflective optical member between the first state and the second state.

A display system according to one aspect of the present disclosure will be described in detail hereinafter with reference to the drawings.

Note that the following embodiments describe specific examples of the present disclosure. The numerical values, shapes, materials, constituent elements, arrangements and connection states of constituent elements, steps, orders of steps, and the like in the following embodiments are merely examples, and are not intended to limit the present invention. Additionally, of the constituent elements in the following embodiments, constituent elements not denoted in the independent claims will be described as optional constituent elements. Additionally, in all of the embodiments, individual details can be combined.

A display system according to one aspect of the present disclosure will be described in detail hereinafter with reference to the drawings.

Embodiment 1

(1) Overview

Hereinafter, display system 1 according to embodiments will be described with reference to the drawings. However, the following embodiment is merely one of various embodiments of the present disclosure. As long as the object of the present disclosure can be achieved, various changes can be made on the following embodiment in accordance with the design or the like. Additionally, the drawings described in the following embodiment are schematic drawings, and the size and thickness ratios of the constituent elements in the drawings do not necessarily reflect actual dimensional ratios.

In the present disclosure, a ceiling 101 side, as seen from a floor of automobile 100 in which display system 1 is installed, is defined as "up", and a floor side as seen from ceiling 101 of automobile 100 is defined as "down". A forward direction and a reverse direction of automobile 100 are defined as "front" and "rear", respectively. The left and right, from the perspective of observer 400 facing to the "front", are defined as "left" and "right", respectively. However, these directions are merely examples, and are not intended to limit the direction of display system 1 during use.

In the following descriptions, an X axis direction in FIG. 1 and the like is a front-rear direction, a Y axis direction in FIG. 1 and the like is a left-right direction, and a Z axis direction in FIG. 2 and the like is an up-down direction. Furthermore, a positive orientation in the X axis direction is a forward orientation, a positive orientation in the Y axis direction is a rightward orientation, and a positive orientation in the Z axis direction is an upward orientation. The arrows indicating the respective directions in the drawings are provided for descriptive purposes only, and do not indicate actual directions.

Figure 2:
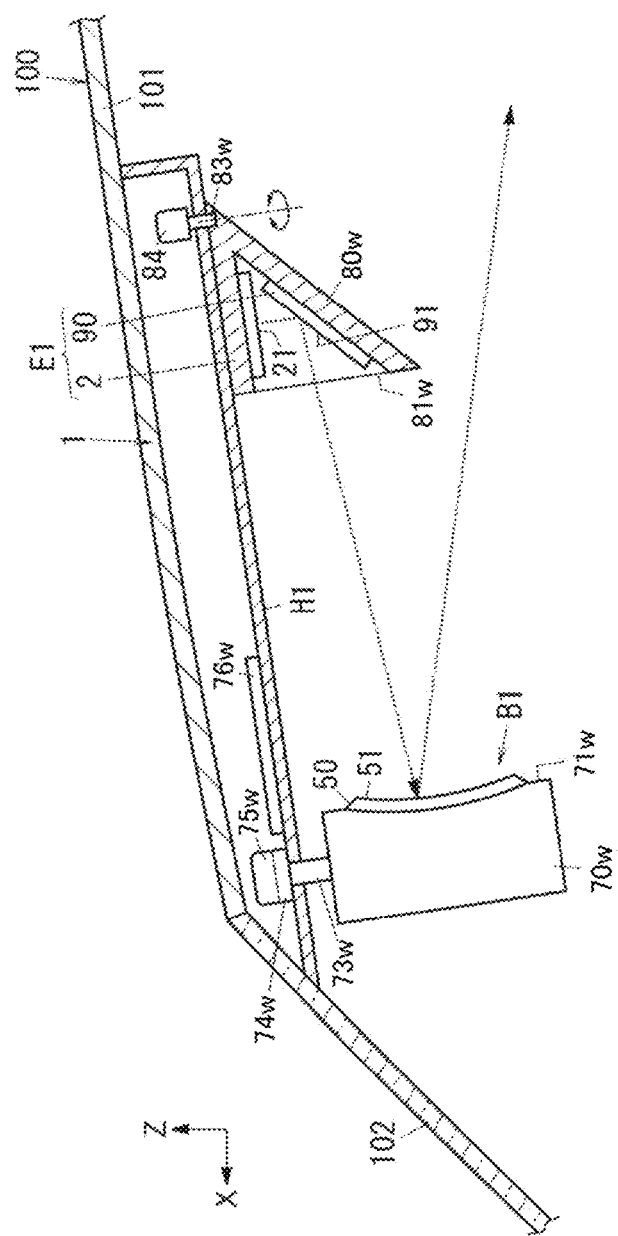
FIG. 2 is a cross-sectional side view of primary elements of an automobile including the aforementioned display system.
Figure 3:
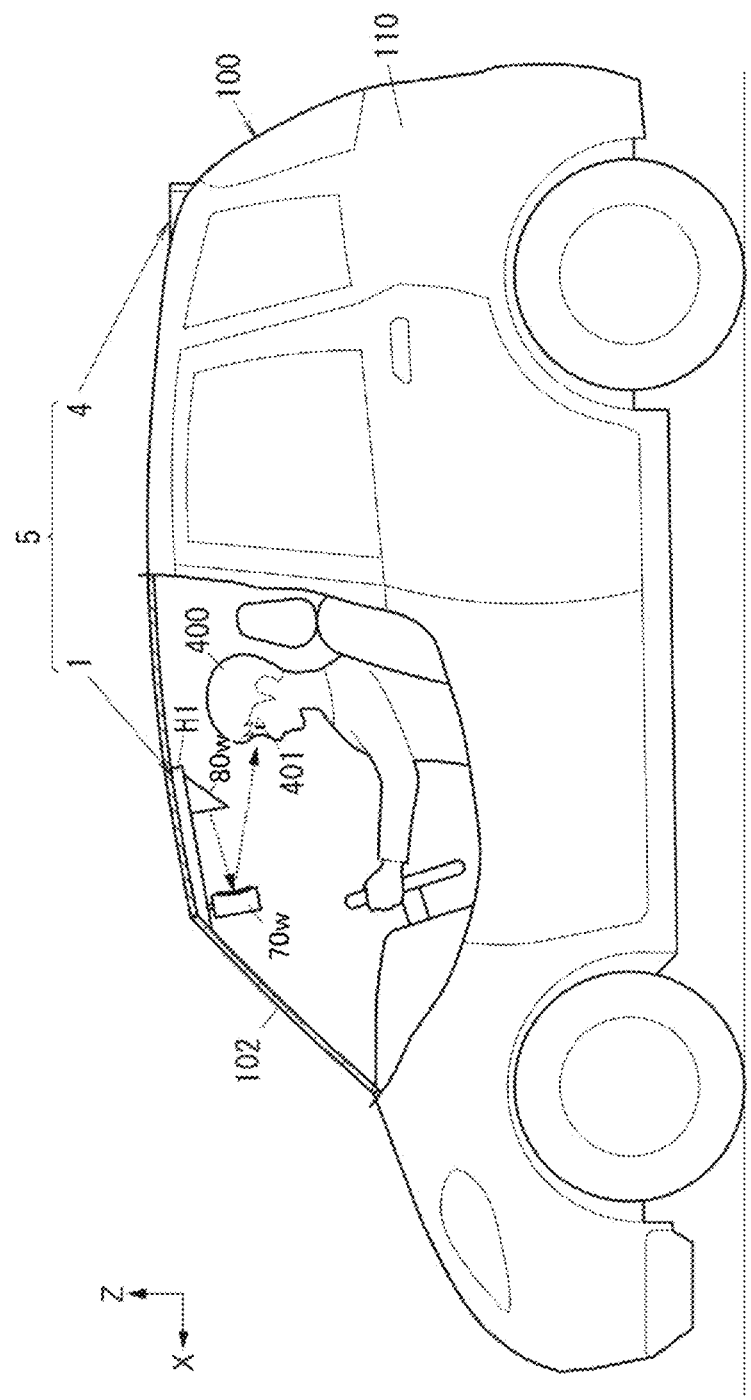
FIG. 3 is a cross-sectional side view of the automobile including the aforementioned display system.

As illustrated in FIG. 1 and FIG. 2, display system 1 according to the present embodiment is installed in automobile 100. Display system 1 includes emitter E1 and final reflective member 50. Emitter E1 includes display device 2. Display device 2 includes display surface 21, which displays a picture of an area behind automobile 100. Emitter E1 emits the picture of display surface 21 as light. Final reflective member 50 has final reflective surface 51, which is a concave surface, and the attitude of which can be changed freely. Light emitted from emitter E1 is directly or indirectly incident on final reflective surface 51. Final reflective surface 51 reflects the incident light toward eye 401 (see FIG. 3) of observer 400 (see FIG. 3). Tangent line T5, which will be described next, is, in top view, parallel to straight line SL2 extending in a width direction (first direction D1) of display surface 21 in a range in which the attitude can be changed. Here, "parallel" means parallel within a range in which the attitude of final reflective member 50 can be adjusted, and does not mean absolutely parallel. As such, anything within the range in which adjustment is possible falls under the category of "parallel". Tangent line T5 is present on a plane orthogonal to the up-down direction, and contacts center C5 of final reflective surface 51. Of an angle formed by straight line SL12, which will be described next, and tangent line T5 of final reflective surface 51, a supplementary angle which is supplementary to an angle that is on a rear side of automobile 100 and on a side where observer 400 is located is acute angle θ5 of less than 90 degrees. Straight line SL12 connects center C5 of final reflective surface 51 with center C2 of display surface 21.

According to the present embodiment, error in the optical path lengths from respective positions on display surface 21 to final reflective surface 51, caused by differences in positions on display surface 21 in the width direction, is reduced, as compared to a case where in top view, tangent line T5 of final reflective surface 51 is not parallel to straight line SL2 extending in the width direction of display surface 21. Reducing the error in the optical path lengths reduces distortion in the picture which can be seen by observer 400. In other words, a difference between left and right magnification rates in the picture which can be seen by observer 400 is reduced.

In the present disclosure, two straight lines being "parallel" refers to the following. "Parallel" can mean substantially parallel as well as perfectly parallel. Specifically, "parallel" refers to a situation where an angle (an acute angle) formed by two straight lines (e.g., straight line SL2 and tangent line T5) is at least 0 degrees and no greater than 10 degrees. More preferably, "parallel" refers to the angle (the acute angle) formed by the two straight lines being at least 0 degrees and no greater than 5 degrees.

In the present disclosure, the light emitted from emitter E1 being "indirectly incident" on final reflective surface 51 refers to a situation in which the light emitted from emitter E1 is incident on final reflective surface 51 after being reflected or refracted by at least one optical component such as a mirror, a lens, a prism, or the like.

FIG. 1 is a diagram illustrating primary elements of display system 1 from above. In FIG. 1, for illustrative purposes, display device 2 and intermediate reflective member 90, which will be described later, are disposed in different positions in top view. However, display device 2 is actually disposed in a position overlapping with intermediate reflective member 90 in top view.

(2) Configuration

Electronic mirror system 5 (see FIG. 3) is constituted by display system 1 and imaging unit 4 (see FIG. 3) according to the present embodiment. In other words, electronic mirror system 5 includes display system 1 and imaging unit 4. Electronic mirror system 5 is installed in moving body main body 110 (see FIG. 3) of automobile 100, which serves as a moving body. In other words, moving body (automobile 100) includes electronic mirror system 5, as well as moving body main body 110, in which electronic mirror system 5 is installed. Automobile 100 also includes windshield 102.

Display device 2 includes, for example, a light source apparatus and a liquid crystal panel (LCD; Liquid Crystal Display). The liquid crystal panel is disposed opposite the light source apparatus. The light source apparatus is used as a backlight of the liquid crystal panel. The light source apparatus is a so-called surface light source. The light source apparatus is a sidelight-type light source apparatus using solid-state light-emitting elements such as light-emitting diodes or laser diodes. Light from the light source apparatus passes through the liquid crystal panel and is output from display surface 21 of display device 2, and a picture (image) is formed by the light output from display surface 21. Display device 2 displays a picture captured by imaging unit 4 on display surface 21. Display device 2 may be an example of a display.

A shape of display surface 21 is a planar shape. More specifically, the shape of display surface 21 is rectangular. A normal line vector of display surface 21 is oriented facing downward. A dimension of display surface 21 in the left-right direction is greater than a dimension of display surface 21 in the front-rear direction.

Display system 1 includes emitter E1. Emitter E1 includes at least display device 2. Emitter E1 emits the picture of display surface 21 as light.

In the present embodiment, emitter E1 further includes intermediate reflective member 90. Intermediate reflective member 90 has intermediate reflective surface 91. Light emitted from display surface 21 is directly or indirectly incident on intermediate reflective surface 91. Intermediate reflective surface 91 reflects the incident light toward final reflective surface 51.

Display system 1 also includes reflecting optical system B1. Reflecting optical system B1 includes at least one reflective member. Reflecting optical system B1 includes at least final reflective member 50 as a reflective member. Reflecting optical system B1 causes the light output from display surface 21 of display device 2 to enter eye 401 (an eye box) of observer 400 after being reflected at least once by the at least one reflective member. Accordingly, display system 1 functions as an electronic inner mirror of automobile 100. Final reflective member 50 is a reflective member that, of the at least one reflective members in reflecting optical system B1, reflects light last, and causes the light to enter eye 401 of observer 400. Observer 400 is, for example, a driver driving automobile 100.

In the present embodiment, reflecting optical system B1 further includes the aforementioned intermediate reflective member 90 as a reflective member. In other words, intermediate reflective member 90 is part of the configuration of reflecting optical system B1, and is also part of the configuration of emitter E1. Light emitted from display surface 21 of display device 2 is incident on final reflective member 50 after being reflected by intermediate reflective member 90. In FIG. 1 and FIG. 2, an optical path from display surface 21 to eye 401 of observer 400 via intermediate reflective member 90 and final reflective member 50 is indicated by a dotted line. The dotted line is provided only for illustrative purposes, and is not an actual entity.

Final reflective member 50 is a concave mirror. In other words, final reflective surface 51 has a concave shape. Final reflective surface 51 is a rear surface of final reflective member 50. Final reflective surface 51 is a surface, of final reflective member 50, that is depressed to the opposite side as the side on which final reflective surface 51 is provided (i.e., a front side). Final reflective surface 51 is formed by, for example, depositing a reflective metal film such as aluminum on a surface of glass serving as a main body part of final reflective member 50. When final reflective surface 51 is viewed from a direction opposite to the direction of a normal line vector passing through center C5 of final reflective surface 51, final reflective surface 51 is rectangular in shape (see FIG. 4). A dimension of final reflective surface 51 in the left-right direction is greater than a dimension of final reflective surface 51 in the up-down direction.

The shape of final reflective surface 51 is plane-symmetrical, with plane P5 serving as a plane of symmetry. Plane P5 (the plane of symmetry) is a plane that includes normal line N5 passing through center C5 of final reflective surface 51 and that is parallel to the up-down direction. In other words, as illustrated in FIG. 1, when viewed from above, final reflective surface 51 has a plane-symmetrical shape taking normal line N5 as an axis of symmetry. As a result, final reflective surface 51 has a horizontally-symmetrical shape, which is less likely to compromise the design.

Intermediate reflective member 90 is, for example, a flat mirror. In other words, intermediate reflective surface 91 has a planar shape. More specifically, the shape of intermediate reflective surface 91 is rectangular.

Automobile 100 includes overhead console H1. Overhead console H1 is attached to ceiling 101.

As illustrated in FIG. 2, display system 1 further includes first support member 70w, first shaft member 73w, and shaft bearing 74w. First support member 70w supports final reflective member 50. First support member 70w is, for example, a molded component made of synthetic resin. First support member 70w is a parallelepiped. First support member 70w has first surface 71w. Final reflective member 50 is disposed on first surface 71w. A normal line vector passing through center C5 of final reflective surface 51 is oriented facing downward.

Figure 4:
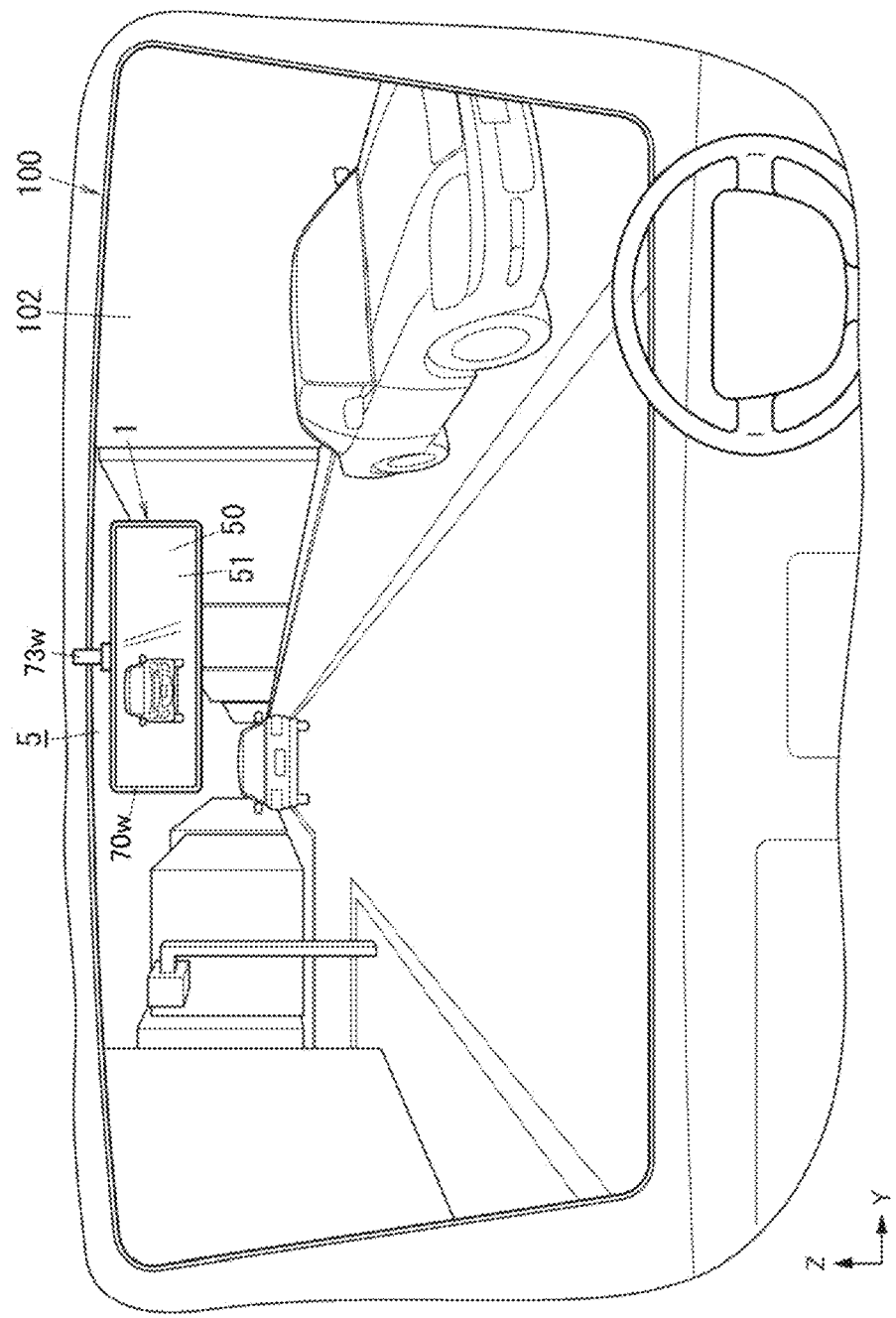
FIG. 4 is an explanatory diagram illustrating a usage state of the aforementioned display system.

First support member 70w is attached to an attachment position of an inner mirror in automobile 100. Specifically, as illustrated in FIG. 1 and FIG. 4, first support member 70w (final reflective member 50) is disposed behind windshield 102. Additionally, as illustrated in FIG. 2, first support member 70w is disposed near ceiling 101 of automobile 100. In other words, first support member 70w is attached to first shaft member 73w, which projects downward from ceiling 101 (overhead console H1).

Shaft bearing 74w is attached to overhead console H1. First shaft member 73w is attached to shaft bearing 74w so as to be capable of rotating with respect to shaft bearing 74w. First support member 70w and final reflective member 50 rotate along with first shaft member 73w. Shaft bearing 74w includes, for example, a ball joint as a configuration for enabling first shaft member 73w to rotate. A direction of a rotational axis of first shaft member 73w is parallel to the up-down direction. By applying a rotational force to first shaft member 70w, an operator such as the driver can rotate first shaft member 73w, first support member 70w, and final reflective member 50.

Display system 1 further includes second support member 80w, second shaft member 83w, and drive circuit 84. Second support member 80w supports intermediate reflective member 90 and display device 2. Second support member 80w is, for example, a molded component made of synthetic resin. The shape of second support member 80w is a hollow triangular prism shape. An axial direction of second support member 80w is parallel to the left-right direction. Second support member 80w has front surface 81w, which is one side surface thereof. Front surface 81w has an opening. Preferably, the opening is covered by a translucent cover.

Of the inner space of second support member 80w, intermediate reflective member 90 is supported behind the opening formed in front surface 81w. Additionally, of the inner space of second support member 80w, display device 2 is supported above intermediate reflective member 90. Display device 2 is disposed so that display surface 21 opposes intermediate reflective surface 91. Display surface 21 is nonparallel with respect to intermediate reflective surface 91. To be more specific, a normal line vector of display surface 21 is oriented facing downward, and a normal line vector of intermediate reflective surface 91 is oriented in a direction including an upward-facing component and a forward-facing component. Light emitted from display surface 21 is reflected by intermediate reflective surface 91 and reaches final reflective surface 51 after passing to the opening.

As illustrated in FIG. 2, second support member 80w and intermediate reflective member 90 are disposed behind final reflective member 50. Second support member 80w is disposed near ceiling 101. Second support member 80w is attached to overhead console H1. To be more specific, second support member 80w is attached to overhead console H1 via second shaft member 83w.

Drive circuit 84 includes, for example, an actuator. Drive circuit 84 is housed within overhead console H1. Second shaft member 83w is connected to drive circuit 84. Second shaft member 83w is driven by drive circuit 84, and rotates with second support member 80w. A direction of a rotational axis of second shaft member 83w is parallel to the up-down direction. In FIG. 2, a rotational axis of drive circuit 84 is located further to the rear than display surface 21, but may instead be located immediately above display surface 21.

Display system 1 further includes angle sensor 75w and controller 76w. Angle sensor 75w and controller 76w are housed within overhead console H1.

Angle sensor 75w includes, for example, a photoelectric rotary encoder or a magnetic rotary encoder. Angle sensor 75w detects an orientation of final reflective surface 51. To be more specific, angle sensor 75w detects an angle of rotation of first shaft member 73w relative to shaft bearing 74w as the orientation of final reflective surface 51. The orientation of final reflective surface 51 is, for example, defined by acute angle θ5 formed by straight line SL11 (see FIG. 1) extending in the front-rear direction (see FIG. 1) and tangent line T5 of final reflective surface 51 (see FIG. 1).

Controller 76w includes, for example, a substrate and electrical circuitry formed on the substrate. Functions of controller 76w are implemented by, for example, a microcontroller which executes programs, or a plurality of discrete components. Controller 76w controls drive circuit 84 according to a detection result of angle sensor 75w. This will be described later.

Controller 76w also controls a display state of the picture by display device 2. Controller 76w communicates (through wired or wireless communication) with imaging unit 4 (see FIG. 3) via an in-vehicle network of automobile 100, for example. Controller 76w is input with picture data of a captured picture of the area behind automobile 100 from imaging unit 4. Controller 76w causes display device 2 to display picture based on the captured picture input from imaging unit 4.

Here, the picture based on the captured picture may be the captured picture itself, a picture obtained by processing the captured picture, or a CG (Computer Graphics) image created based on the captured picture. For example, the picture captured by imaging unit 4 becomes darker at night, and thus brightness correction may be performed on the picture captured by imaging unit 4. Based on the picture captured by imaging unit 4, a CG picture, a marker, or the like indicating an obstacle or the like appearing in the picture may be created, and a picture in which the CG picture, the marker, or the like is superimposed on the picture captured by imaging unit 4 may be displayed in display surface 21 of display device 2. Also, a picture in which a marker indicating driving assistance information (e.g., vehicle speed information, navigation information, pedestrian information, forward vehicle information, lane departure information, vehicle condition information, or the like) is superimposed on the picture captured by imaging unit 4 may be displayed in display device 2.

Imaging unit 4 is, for example, a CMOS (Complementary Metal Oxide Semiconductor) image sensor. Imaging unit 4 is not limited to a CMOS image sensor, and may instead be an image sensor such as a CCD (Charge Coupled Device) image sensor.

Imaging unit 4 is disposed in a center of the left-right direction in a rear part of automobile 100, for example. Imaging unit 4 captures a range visible with a conventional inner mirror (room mirror), and electronic mirror system 5 is used as a rearview mirror, like a conventional inner mirror. Because imaging unit 4 is attached in the rear of automobile 100, rear seats, pillars, and the like do not appear in the picture captured by imaging unit 4. In addition to capturing the area behind automobile 100, imaging unit 4 may also capture an image of a rear-side of automobile 100. Imaging unit 4 may capture a range visible with a conventional door mirror and fender mirror, and electronic mirror system 5 may be used as a rearview mirror in place of the conventional door mirror and fender mirror. Imaging unit 4 is attached at the rear of moving body main body 110 and at an upper position of moving body main body 110, but the attachment position of imaging unit 4 is merely an example, and it is sufficient for imaging unit 4 to be mounted at a position where the desired range can be captured.

(3) Arrangement

FIG. 1 is a diagram illustrating primary elements of display system 1 from above. In top view, tangent line T5, described below, is parallel to straight line SL2, also described below. Tangent line T5 is present on a plane orthogonal to the up-down direction, and contacts center C5 of final reflective surface 51. Straight line SL2 is a straight line extending in the width direction of display surface 21 in the range in which the attitude can be changed.

Here, the width direction of display surface 21 corresponds to a width direction of the picture displayed in display surface 21. In other words, the width direction can be defined based on the width direction of the picture displayed in display surface 21. The width direction of the picture displayed in display surface 21 corresponds to a left-right direction of a picture (a virtual image) which observer 400 will ultimately see. For example, assume that a positional relationship in the left-right direction (the Y axis direction of FIG. 1) of the image that observer 400 can ultimately see (called an "observed picture" hereinafter) corresponds to a positional relationship in first direction D1 (see FIG. 1) of the picture displayed in display surface 21. In this case, first direction D1 is the width direction of the picture displayed in display surface 21. Here, as one example, first direction D1 is a longitudinal direction of display surface 21.

In top view, tangent line T5 is parallel to straight line SL2, and thus compared to a case where these lines are not parallel, error in the optical path lengths from respective positions on display surface 21 to final reflective surface 51, caused by differences in positions on display surface 21 in the width direction (optical path differences), is reduced. For example, FIG. 1 illustrates, as optical paths between display surface 21 and final reflective surface 51, optical path A10 having a starting point further to the left side of center C2 of display surface 21 and optical path A20 having a starting point further to the right side of center C2 of display surface 21. Between display surface 21 and final reflective surface 51, an optical path difference between optical path A10 and optical path A20 is relatively small. FIG. 1 also illustrates optical path A11, which continues from optical path A10, and optical path A21, which continues from optical path A20, as optical paths between final reflective surface 51 and eye 401 of observer 400 (the driver). Optical path A1 is an optical path constituted by optical path A10 and optical path A11. Optical path A2 is an optical path constituted by optical path A20 and optical path A21.

If there is an optical path difference between optical path A1 and optical path A2, there will be a magnification difference between the left and right sides of the observed picture. Accordingly, distortions in the observed picture are caused by the magnification difference between the left and right sides of the observed picture. In the present embodiment, at least the optical path difference between optical path A10 and optical path A20 is reduced, and thus distortion in the observed picture can be reduced. Note that the influence of the optical path difference between optical path A11 and optical path A21 on the observed picture is small compared to the influence of the optical path difference between optical path A10 and optical path A20 on the observed picture, and is therefore ignored here.

Additionally, in top view, tangent line T9, described below, is parallel to straight line SL2, also described below. Tangent line T9 is present on a plane orthogonal to the up-down direction, and contacts center C9 of intermediate reflective surface 91.

Accordingly, compared to a case where tangent line T9 is not parallel to straight line SL2, error in the optical path lengths from respective positions on display surface 21 to intermediate reflective surface 91, caused by differences in positions on display surface 21 in the width direction, is reduced. Error in the optical path lengths from respective positions on intermediate reflective surface 91 to final reflective surface 51, caused by differences in positions on intermediate reflective surface 91 in the width direction, is reduced as well.

Additionally, in top view, tangent line T9 is parallel to tangent line T5.

Figure 5:
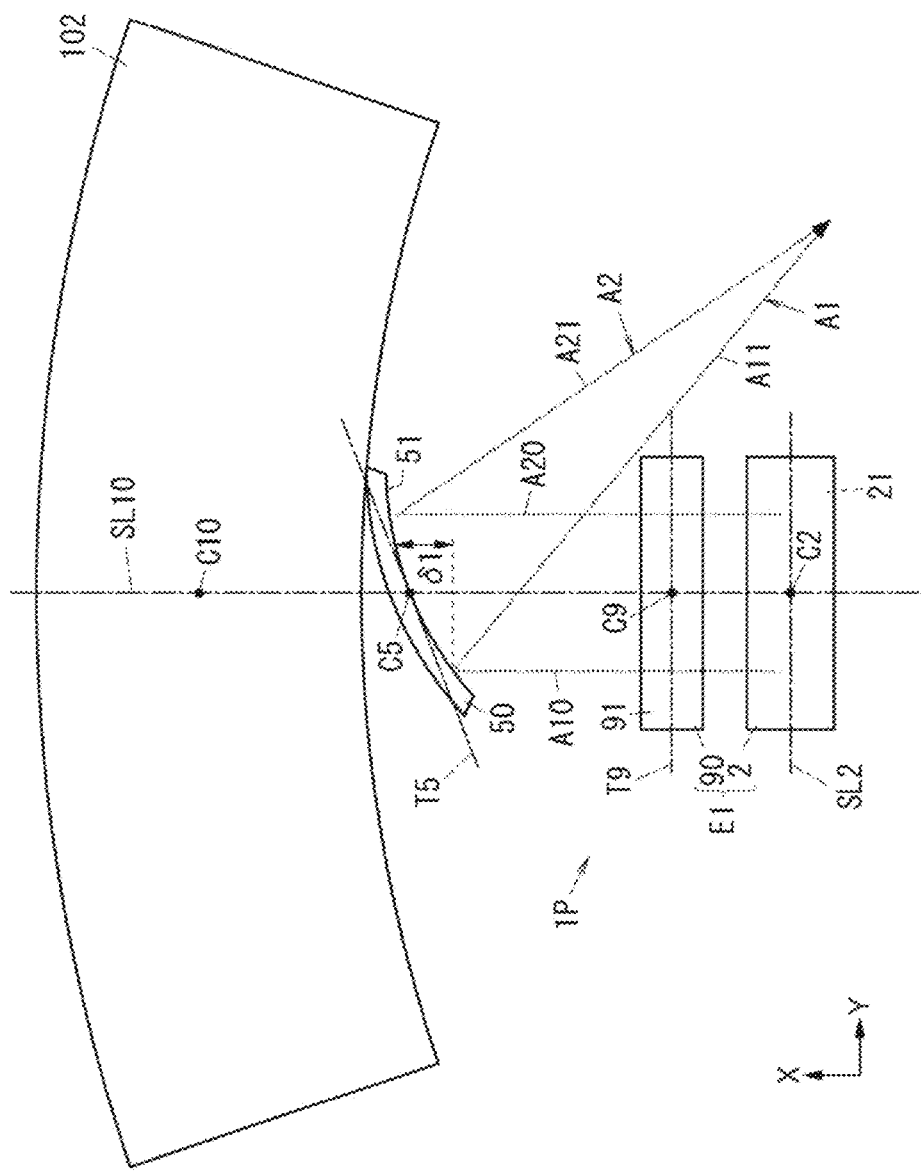
FIG. 5 is a schematic diagram illustrating primary elements of a display system according to a comparative example from above.

Here, FIG. 5 illustrates display system 1P according to a comparative example. In display system 1P, tangent line T5 of final reflective surface 51 is not parallel to straight line SL2 extending in the width direction of display surface 21. Additionally, in display system 1P, tangent line T5 of final reflective surface 51 is not parallel to tangent line T9 of intermediate reflective surface 91. Straight line SL2 and tangent line T9 are parallel to each other. In display system 1P, optical path difference δ1 between optical path A10, extending from the starting point further on the left side than center C2 of display surface 21 to final reflective surface 51, and optical path A20, extending from the starting point further on the right side than center C2 of display surface 21 to final reflective surface 51, is greater than in the present embodiment. In the present embodiment, if final reflective surface 51 is considered a plane, optical path difference δ1 is zero. By employing the configuration of display system 1 of the present embodiment, the optical path difference can be reduced, and distortion in the observed picture can be reduced, as compared to display system 1P of the comparative example.

Additionally, in the present embodiment, display device 2 is disposed within a range of a focal length of final reflective member 50. Therefore, the observed picture is a larger virtual image than the picture displayed in display surface 21.

Additionally, in top view, final reflective member 50 is disposed at least partially behind windshield 102. In top view, straight line SL10 connecting center C5 of final reflective surface 51 and center C10 of windshield 102 is parallel to straight line SL11 extending in the front-rear direction of automobile 100. In FIG. 1, straight line SL10 coincides with straight line SL11.

Additionally, in top view, straight line SL12 connecting center C5 of final reflective surface 51 and center C2 of display surface 21 is parallel to straight line SL11 extending in the front-rear direction. In top view, straight line SL12 intersects with tangent line T5 of final reflective surface 51 at acute angle θ5 of less than 90 degrees. In other words, of the angle formed by straight line SL12 and tangent line T5, acute angle θ5 is a supplementary angle supplementary to an angle that is on a rear side of automobile 100 and on a side where observer 400 is located. In FIG. 1, straight line SL12 coincides with straight line SL11. Additionally, in the present embodiment, acute angle θ5 is greater than 45 degrees, as illustrated in FIG. 1.

As described above, first support member 70w rotates relative to shaft bearing 74w. Preferably, the range over which first support member 70w can rotate relative to shaft bearing 74w is limited. For example, a maximum angle of rotation when first support member 70w rotates may be 5 degrees, 10 degrees, or 15 degrees.

Additionally, the range within which first support member 70w can rotate relative to shaft bearing 74w is preferably a range within which tangent line T5 of final reflective surface 51 and straight line SL2 extending in the width direction of display surface 21 remain parallel. Additionally, the range within which first support member 70w can rotate relative to shaft bearing 74w is preferably a range within which tangent line T5 of final reflective surface 51 and tangent line T9 of intermediate reflective surface 91 remain parallel.

Additionally, the range within which first support member 70w can rotate relative to shaft bearing 74w is preferably, in top view, a range within which straight line SL10 connecting center C5 of final reflective surface 51 with center C10 of windshield 102 and straight line SL11 extending in the front-rear direction remain parallel. Additionally, the range within which first support member 70w can rotate relative to shaft bearing 74w is preferably, in top view, a range within which straight line SL12 connecting center C5 of final reflective surface 51 with center C2 of display surface 21 and straight line SL11 extending in the front-rear direction remain parallel.

As described above, second shaft member 83w is driven by drive circuit 84, and rotates with second support member 80w. In other words, second support member 80w rotates relative to overhead console H1. This allows intermediate reflective member 90 and display device 2 to change orientation with respect to final reflective surface 51 while tangent line T9 of intermediate reflective surface 91 and straight line SL2 extending in the width direction of display surface 21 remain parallel. In other words, when second support member 80w rotates relative to overhead console H1, intermediate reflective surface 91 and display surface 21 rotate relative to each other by the same angle of rotation, and thus tangent line T9 and straight line SL2 remain parallel with each other.

(4) Operations

Drive circuit 84 rotates second support member 80w under the control of controller 76w. Controller 76w determines control details for drive circuit 84 in accordance with a detection result of angle sensor 75w, which detects the orientation of final reflective surface 51. In other words, drive circuit 84 rotates second support member 80w in accordance with the detection result from angle sensor 75w. The orientations of display device 2 and intermediate reflective member 90 change in response to second support member 80w being rotated.

Drive circuit 84 changes an orientation of emitter E1 (display device 2 and intermediate reflective member 90) in accordance with the detection result of angle sensor 75w to an orientation in which, in top view, tangent line T5 of final reflective surface 51 is parallel with straight line SL2 extending in the width direction of display surface 21. For example, drive circuit 84 changes the orientation of emitter E1 when the power of automobile 100 is turned on, and when an operator such as the driver changes the orientation of final reflective member 50. In the present disclosure, "changes the orientation of emitter E1" refers to the orientation of emitter E1 as a whole being changed by moving all the elements of emitter E1 as a whole. As such, when the orientation of emitter E1 is changed, straight line SL2 extending in the width direction of display surface 21 remains parallel to tangent line T9 of intermediate reflective surface 91.

[Variation 1]

Display system 1 according to Variation 1 will be described next. Configurations that are the same as those of the embodiment will be given the same reference signs, and will not be described.

Display device 2 causes the picture displayed in display surface 21 to distort in accordance with a detection result of angle sensor 75w. Accordingly, display device 2 can reduce distortion caused by a magnification difference between the left and right sides of the observed picture.

For example, assume a situation in which, in FIG. 1, final reflective member 50 rotates clockwise about center C5 within a range in which tangent line T5 is parallel to straight line SL2, i.e., within a range in which an angle (an acute angle) formed by tangent line T5 and straight line SL2 is at least 0 degrees and no more than 10 degrees. In this case, albeit only slightly, optical path A10 extending from the starting point further on the left side than center C2 of display surface 21 to final reflective surface 51 becomes longer, and optical path A20 extending from the starting point further on the right side than center C2 of display surface 21 to final reflective surface 51 becomes shorter. Additionally, display device 2 is disposed within a range of the focal length of final reflective member 50. Accordingly, seen from observer 400, a region of the observed picture that is further on the left side than center C2 will appear slightly larger, and a region of the observed picture that is further on the right side than center C2 will appear slightly smaller. In other words, distortions in the observed picture are caused by the magnification difference between the left and right sides of the observed picture. Accordingly, display device 2 makes the picture displayed in display surface 21 larger as the picture progresses to the right side. Thus although the picture displayed in display surface 21 will distort, the distortion will be reduced in the observed picture. In other words, the magnification difference between the left and right sides of the observed picture is corrected.

Note that in the present variation, drive circuit 84 may perform control for changing the orientation of emitter E1 in accordance with the detection result of angle sensor 75w if the angle (acute angle) formed by tangent line T5 and straight line SL2 is greater than 10 degrees, and not perform the stated control if the stated angle is not greater than 10 degrees. In other words, drive circuit 84 may be configured to perform the control for changing the orientation of emitter E1 in accordance with the detection result of angle sensor 75w when the relationship between tangent line T5 and straight line SL2 is not a parallel relationship. Controller 76w, which controls drive circuit 84, may determine whether or not the relationship between tangent line T5 and straight line SL2 is not a parallel relationship based on the detection result of angle sensor 75w, for example, and then control drive circuit 84 based on a result of the determination.

[Variation 2]

Display system 1A according to Variation 2 will be described next with reference to FIG. 6. Configurations that are the same as those of the embodiment will be given the same reference signs, and will not be described.

In display system 1A according to the present variation, emitter E2 includes display device 2 but does not include intermediate reflective member 90. In other words, light emitted from display surface 21 of display device 2 reaches final reflective surface 51 directly, without traversing intermediate reflective member 90. Display device 2 is disposed in an orientation in which final reflective surface 51 is located on a normal line of display surface 21.

Compared to the embodiment, the present variation can simplify the configuration of display system 1A.

[Variation 3]

Figure 7:
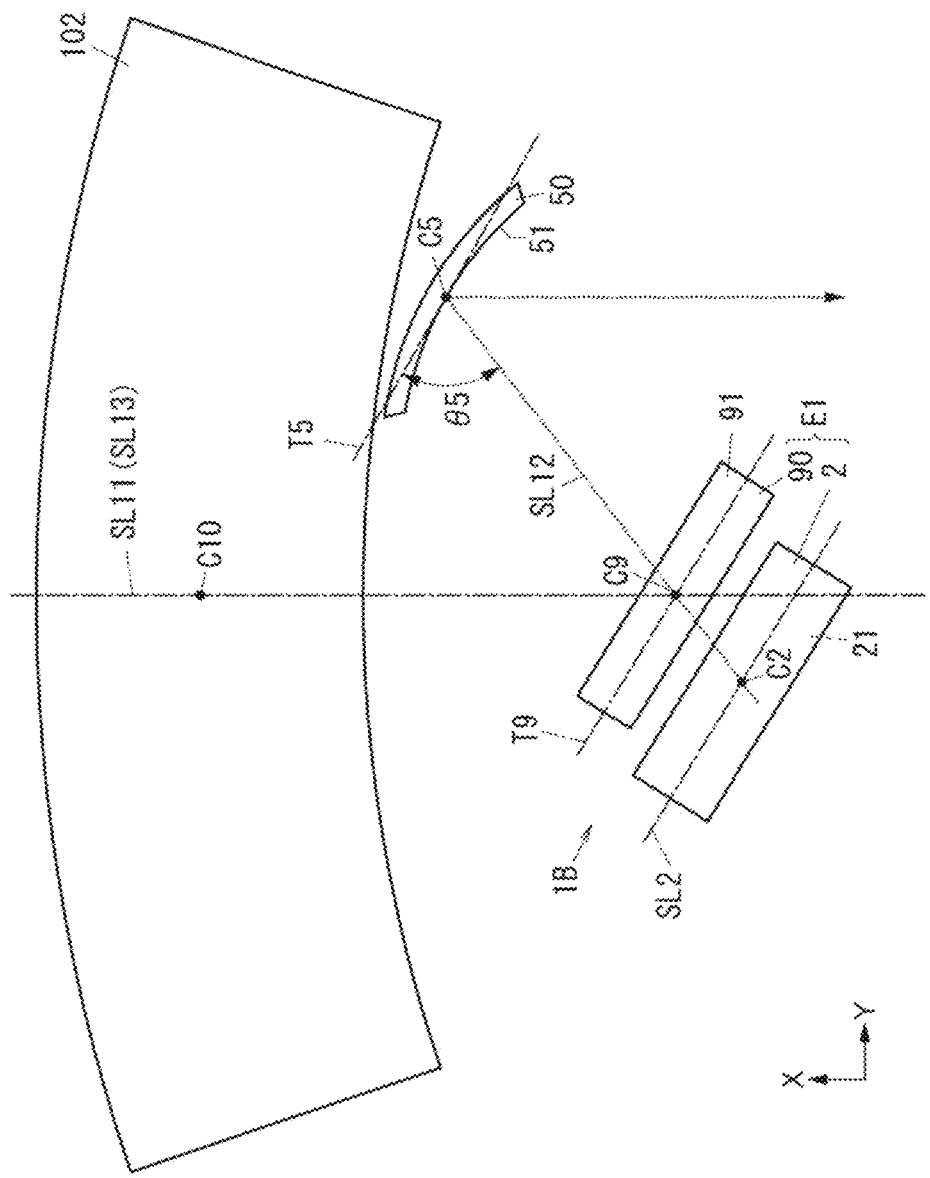
FIG. 7 is a schematic diagram illustrating primary elements of a display system according to Variation 3 from above.

Display system 1B according to Variation 3 will be described next with reference to FIG. 7. Configurations that are the same as those of the embodiment will be given the same reference signs, and will not be described. FIG. 7 is a diagram illustrating primary elements of display system 1B from above. In FIG. 7, for illustrative purposes, display device 2 and intermediate reflective member 90, which will be described later, are disposed in different positions in top view. However, display device 2 is actually disposed in a position overlapping with intermediate reflective member 90 in top view.

In the present variation, in top view, final reflective member 50 is disposed directly in front of a driver's seat. Final reflective member 50 is disposed in an orientation which reflects light to the rear (the negative side of the X axis).

Additionally, in top view, center C5 of final reflective surface 51, center C9 of intermediate reflective surface 91, and center C2 of display surface 21 are located on the same straight line. Tangent line T5 of final reflective surface 51, tangent line T9 of intermediate reflective surface 91, and straight line SL2 extending in the width direction of display surface 21 are parallel to each other.

Additionally, in top view, straight line SL12, which connects center C5 of final reflective surface 51 with center C2 of display surface 21, intersects with tangent line T5 of final reflective surface 51 at acute angle θ5 of less than 90 degrees. Note that in FIG. 7, straight line SL12 overlaps with the dotted line indicating the optical path.

In the present variation, of a space behind windshield 102, a space near a center in the left-right direction can be left open.

Note that in top view, a straight line connecting center C10 of windshield 102 with center C2 of display surface 21 may be parallel to straight line SL13 connecting center C10 of windshield 102 with the center of intermediate reflective surface 91.

Note that in the present variation, when intermediate reflective member 90 is omitted as in Variation 2, it is preferable that, in top view, a straight line connecting center C10 of windshield 102 with center C2 of display surface 21 be parallel to straight line SL11 extending in the front-rear direction. In other words, it is preferable that center C2 be located at the position of center C9 in FIG. 7.

[Variation 4]

Figure 8:
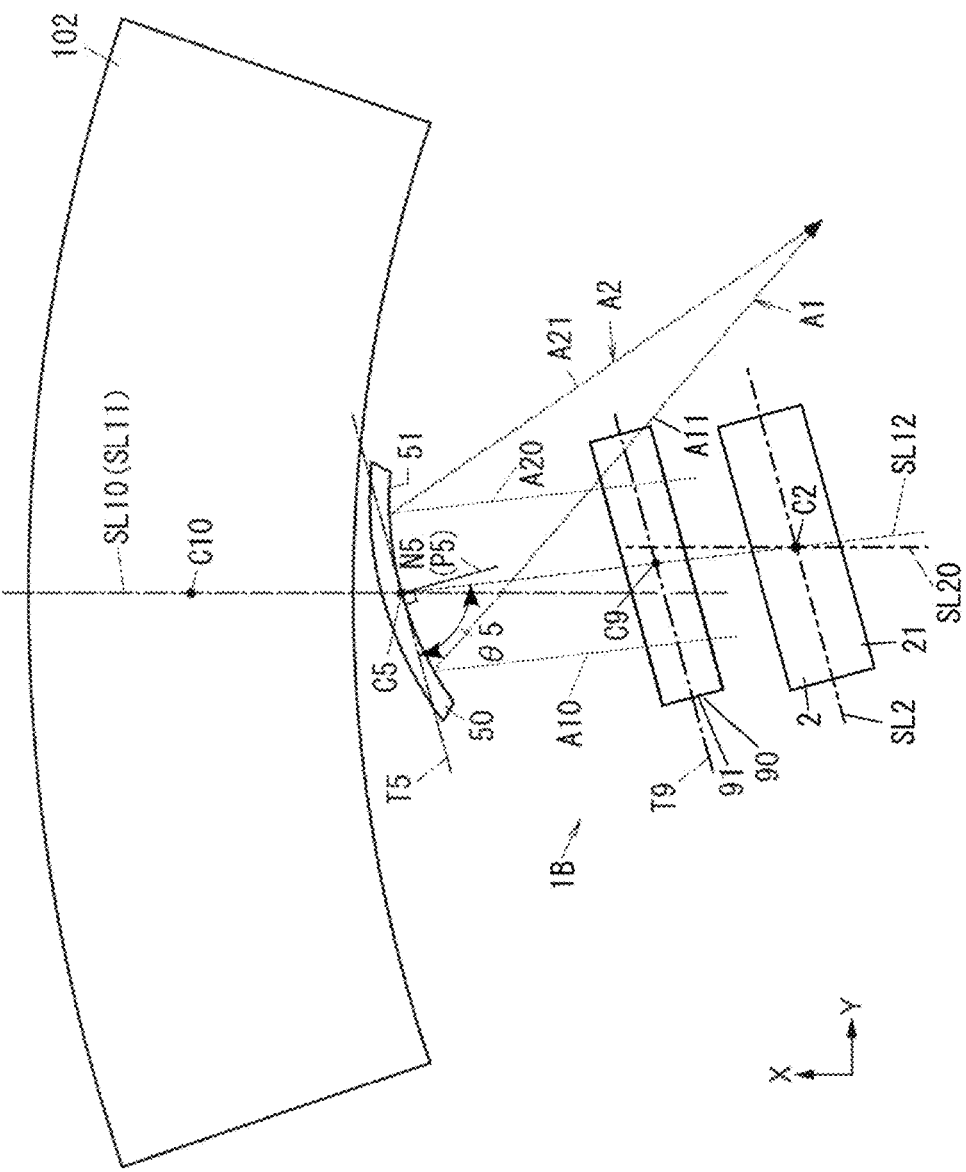
FIG. 8 is a schematic diagram illustrating primary elements of a display system according to Variation 4 from above.

Display system 1B according to Variation 4 will be described next with reference to FIG. 8. Configurations that are the same as those of the embodiment will be given the same reference signs, and will not be described. FIG. 8 is a diagram illustrating primary elements of display system 1B from above.

In the present variation, in top view, straight line SL20 passing through center C2 of display surface 21 and extending in the front-rear direction of automobile 100 is closer to the observer than straight line SL10 passing through center C5 of final reflective surface 51 and extending in the front-rear direction of automobile 100. In other words, in top view, display surface 21 of display device 2 is disposed closer to the observer relative to straight line SL10, and opposing final reflective surface 51. For example, display surface 21 is disposed so that a normal line of center C5 of final reflective surface 51 coincides, or substantially coincides, with a straight line orthogonal to straight line SL2 of display surface 21. In the present variation, display surface 21 of display device 2 is disposed in a location where straight line SL20 intersects with final reflective surface 51 and intermediate reflective member 90.

With display system 1B of the present variation, the reflection angle of light at final reflective surface 51 can be reduced, which makes it possible to suppress a drop in optical performance. A drop in the quality of the picture appearing in final reflective surface 51 can therefore be suppressed, which enables the observer to correctly recognize the picture appearing in final reflective surface 51.

Embodiment 2

Display system 1C according to embodiments will be described with reference to the drawings.

(1) Configuration

Figure 9:
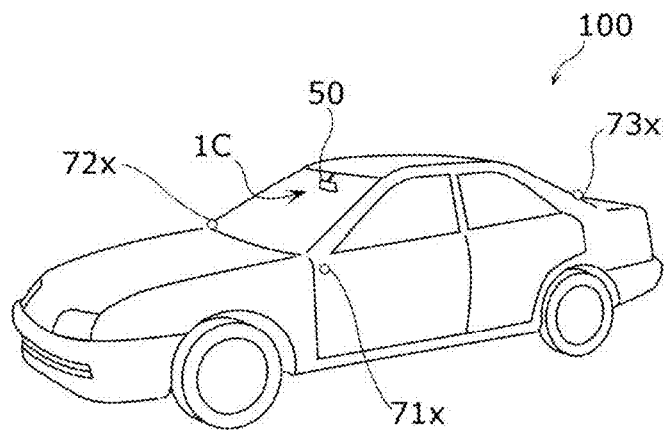
FIG. 9 is a schematic diagram illustrating an example of the vehicle according to Embodiment 2.
Figure 10:
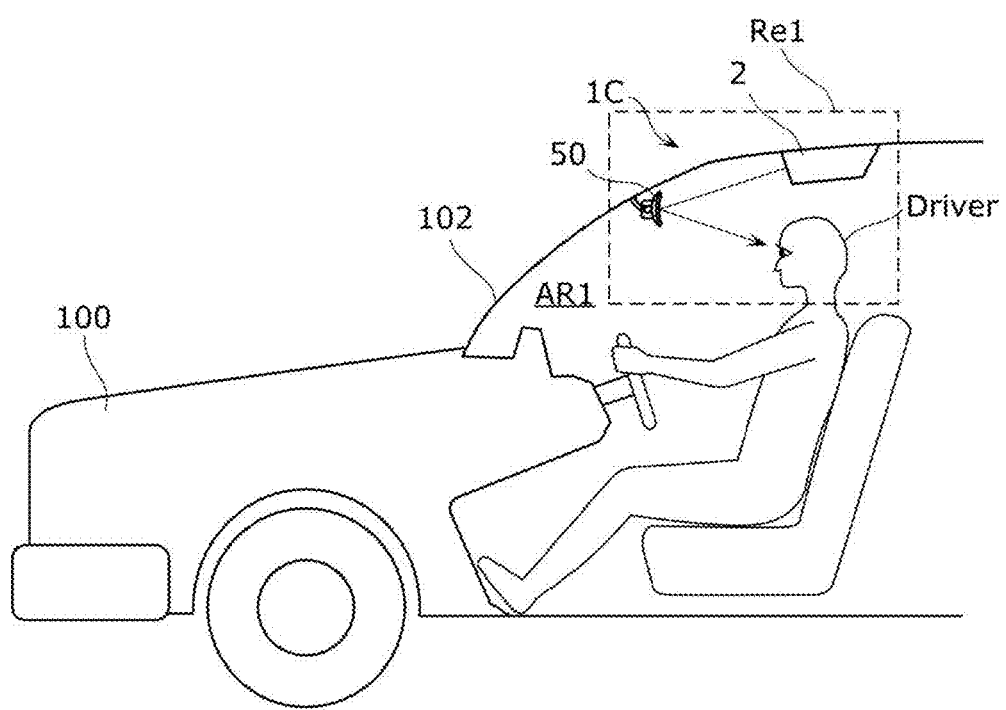
FIG. 10 is a diagram illustrating a cabin interior of the automobile, seen from a left side of the automobile in the horizontal direction.
Figure 11:
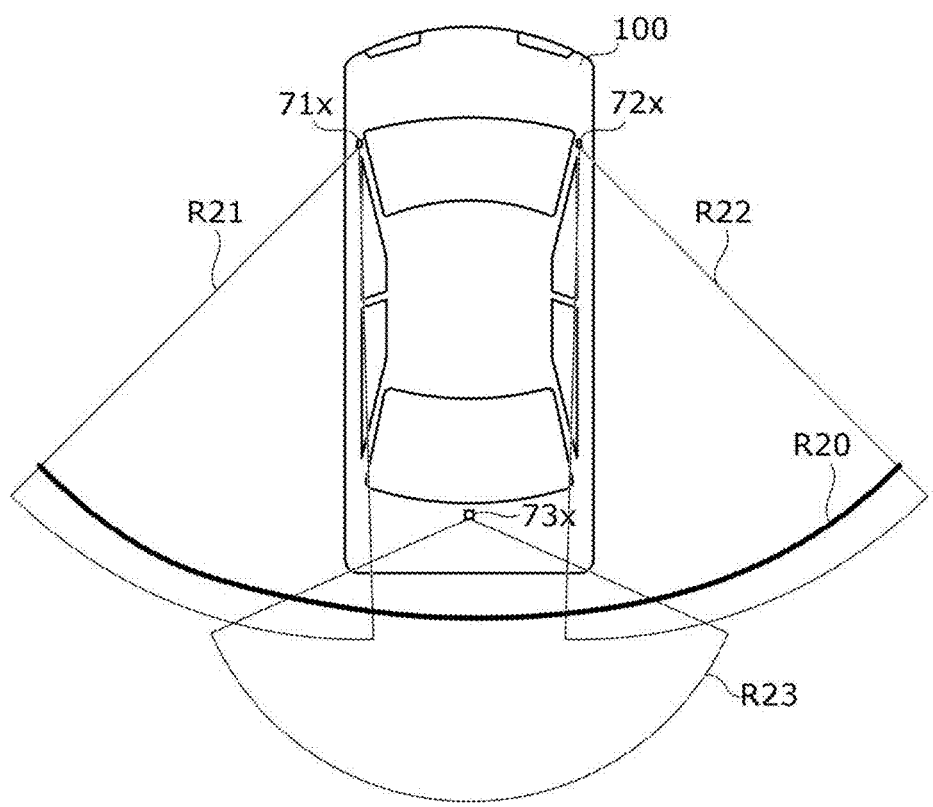
FIG. 11 is a diagram illustrating an image capturing range behind the automobile, captured by an image capturing apparatus according to Embodiment 2.
Figure 12:
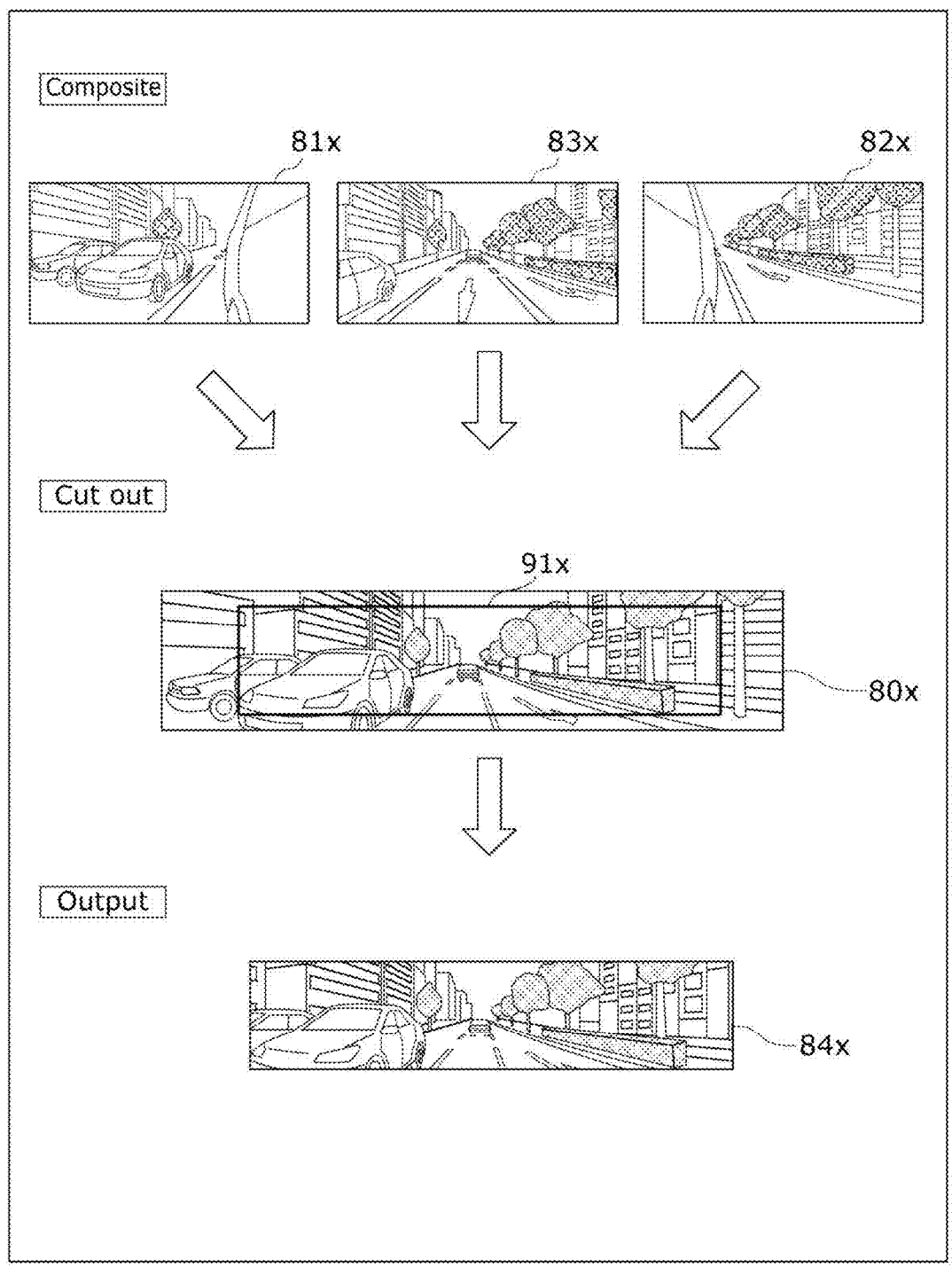
FIG. 12 is an explanatory diagram illustrating an image before and after image processing by an image processing apparatus, and during the image processing, according to Embodiment 2.
Figure 13:
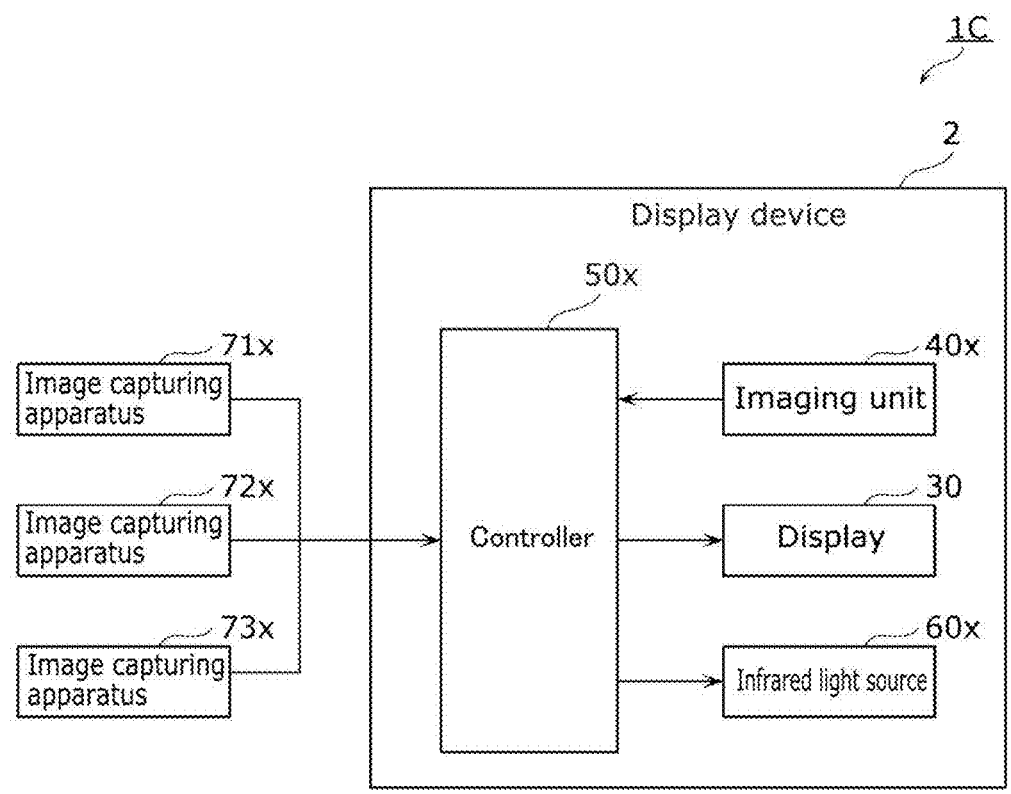
FIG. 13 is a block diagram illustrating an example of the functional configuration of a display system according to Embodiment 2.

FIG. 9 is a schematic diagram illustrating an example of automobile 100 serving as a vehicle according to Embodiment 2. FIG. 10 is a diagram illustrating a cabin interior of automobile 100, seen from a left side of automobile 100 in the horizontal direction. FIG. 11 is a diagram illustrating an image capturing range behind automobile 100, captured by an image capturing apparatus according to Embodiment 2. FIG. 12 is an explanatory diagram illustrating an image before and after image processing by a display apparatus, and during the image processing, according to Embodiment 2. FIG. 13 is a block diagram illustrating an example of the functional configuration of display system 1C according to Embodiment 2.

In the following descriptions, unless otherwise specified, the front, rear, left, and right directions correspond to directions when a travel direction of automobile 100 is the forward direction, and can therefore also be referred to as the front, rear, left, and right directions from the perspective of a user of automobile 100.

As illustrated in these drawings, automobile 100 includes display system 1C. Display system 1C includes final reflective member 50, display device 2, and image capturing apparatuses 71x to 73x.

Final reflective member 50 is disposed at an upper part of windshield 102 of automobile 100, near a center of automobile 100 in the left-right direction. Final reflective member 50 is supported so that the attitude of final reflective member 50 relative to windshield 102 can be changed freely. Accordingly, by adjusting the attitude in accordance with a position of a face of a driver of automobile 100 (also called an "observer"), final reflective member 50 can reflect a picture projected from display device 2 toward the face of the driver of automobile 100. The projected picture is enlarged by being reflected by final reflective member 50, and thus the driver can see an enlarged picture. The driver may be an example of a person within cabin AR1 of automobile 100.

Display device 2 captures an image of the face of the driver via final reflective member 50, and projects, onto final reflective member 50, a picture that is changed in accordance with the captured image of the face of the driver. Display device 2 obtains images of the area behind automobile 100 from each of image capturing apparatuses 71x to 73x, and projects, onto final reflective member 50, composite picture 80x generated based on the obtained plurality of images. Through this, the driver can see a picture of the area behind automobile 100 by looking at final reflective member 50. Display device 2 is disposed at a position of ceiling 101 of cabin AR1 of automobile 100, further toward the rear of automobile 100 than final reflective member 50, and projects the picture from behind final reflective member 50 toward the front. Display device 2 may constitute part of an overhead console disposed in a space above the driver, for example.

Image capturing apparatus 71x is a camera which is fixed near a left-side door of automobile 100 and which captures an image of image capturing range R21 on the rear-left side of automobile 100. Image capturing apparatus 71x generates image 81x by capturing image capturing range R21 on the rear-left side of automobile 100. Image 81x generated by image capturing apparatus 71x will also be called a "rear-left side image".

Image capturing apparatus 72x is a camera which is fixed near a right-side door of automobile 100 and which captures an image of image capturing range R22 on the rear-right side of automobile 100. Image capturing apparatus 72x generates image 82x by capturing image capturing range R22 on the rear-right side of automobile 100. Image 82x generated by image capturing apparatus 72x will also be called a "rear-right side image".

Image capturing apparatus 73x is a camera which is fixed near a rear bumper or a trunk hood of automobile 100 and which captures an image of image capturing range R23 on the rear-center of automobile 100. Image capturing apparatus 73x generates image 83x by capturing image capturing range R23 on the rear-center of automobile 100. Image 83x generated by image capturing apparatus 73x will also be called a "rear-center image".

In this manner, image capturing apparatuses 71x to 73x are disposed in automobile 100 in orientations so as to capture the area behind automobile 100. Image capturing ranges R21 to R23 are captured by image capturing apparatuses 71x to 73x, and thus image capturing range R20, which is broader than each of image capturing ranges R21 to R23, is captured by image capturing apparatuses 71x to 73x.

Note that image capturing ranges R21 and R23 of image capturing apparatuses 71x and 73x partially overlap, and image capturing ranges R22 and R23 of image capturing apparatuses 72x and 73x partially overlap. As such, the same content appears in parts of the rear-left side image and the rear-center image. Likewise, the same content appears in parts of the rear-right side image and the rear-center image.

Image capturing apparatuses 71x, 72x, and 73x generate images by capturing images under mutually-different image capturing conditions. Specifically, image capturing apparatuses 71x, 72x, and 73x are disposed in different positions and facing in different directions, and obtain images at 60 fps, for example. The optical properties of optical systems of image capturing apparatuses 71x, 72x, and 73x may be different as well.

Display device 2 obtains images 81x to 83x from image capturing apparatuses 71x to 73x, respectively, generates the one composite picture 80x based on the obtained images 81x to 83x, and performs image processing for cutting out partial picture 84x of a predetermined range of the generated composite picture 80x. Specifically, of composite picture 80x of image capturing range R20, which is broad, obtained from the obtained images 81x to 83x, display device 2 outputs, as partial picture 84x, a picture of a range estimated, in accordance with a position of the driver's face (also called a "face position" hereinafter), to be visible to the driver through the room mirror when final reflective member 50 is assumed to be the room mirror of automobile 100, or a picture of a predetermined range based on the stated range. The cutout processing performed by display device 2 will be described in detail later.

Figure 14:
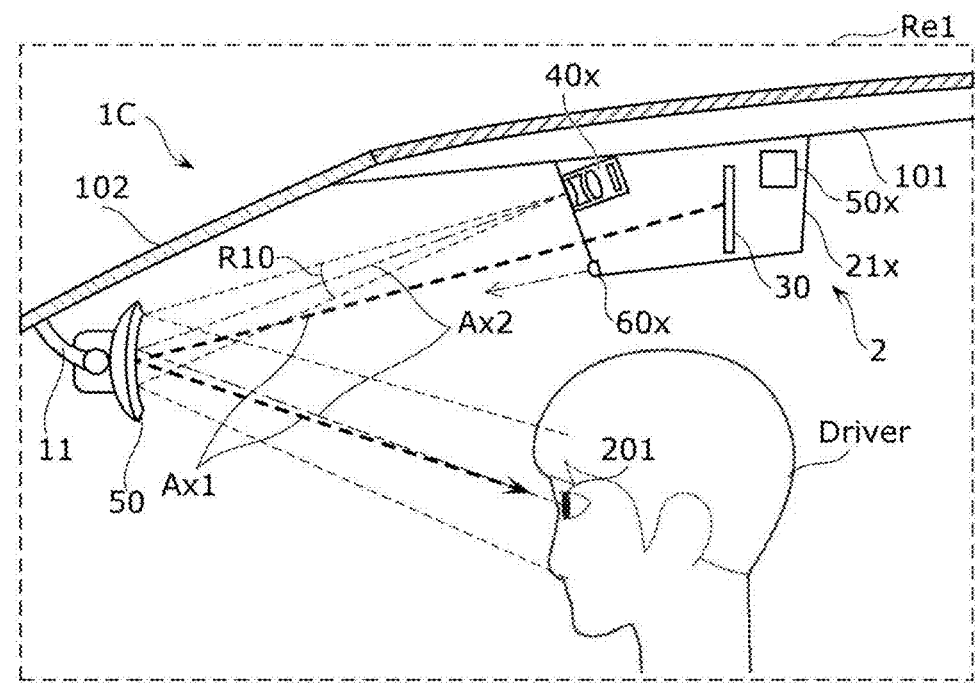
FIG. 14 is an enlarged view illustrating an enlargement of region Re1 in FIG. 10.
Figure 15:
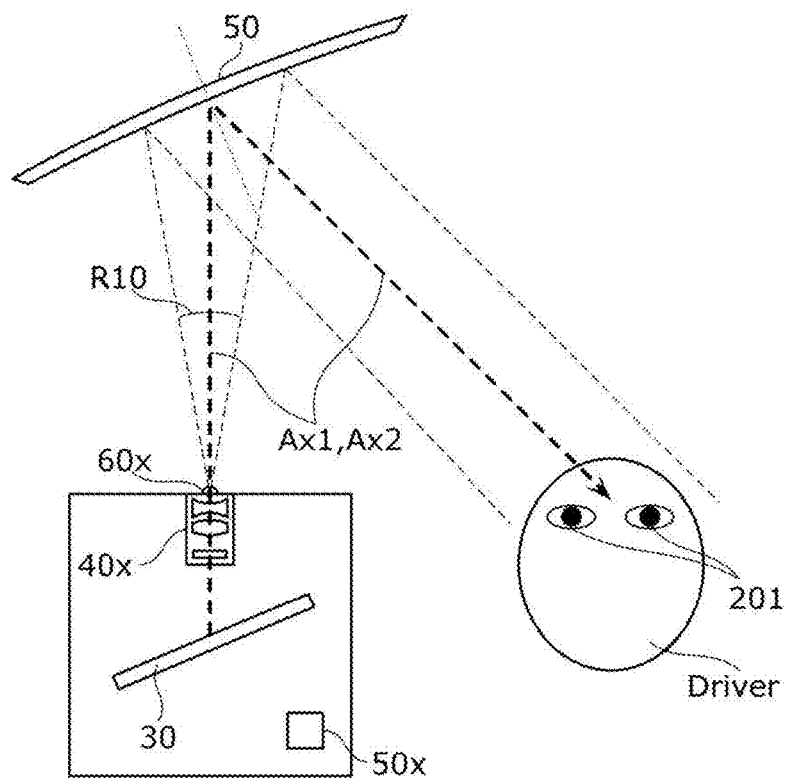
FIG. 15 is a diagram illustrating a positional relationship between each of constituent elements of the display system and a driver of the automobile, seen from above.

The specific configuration of display device 2, and a positional relationship between final reflective member 50, display device 2, and the driver, will be described next with reference to FIG. 14 and FIG. 15. FIG. 14 is an enlarged view illustrating an enlargement of region Re1 in FIG. 10. FIG. 15 is a diagram illustrating a positional relationship between each of constituent elements of display system 1C and a driver of the automobile, seen from above.

Final reflective member 50 is supported relative to windshield 102 by support member 11. One end of support member 11 is fixed to windshield 102, and the other end is connected to final reflective member 50 so as to be capable of rotating freely within a predetermined angular range. The other end of support member 11 is connected near the center of a rear side of final reflective member 50 by a ball joint, for example. This makes it possible to freely change the attitude of final reflective member 50. This also suppresses changes in the position of the center (center of gravity) of final reflective member 50 when the attitude of final reflective member 50 is changed.

Display device 2 includes housing 21x, display 30, imaging unit 40x, and controller 50x. Display device 2 may further include infrared light source 60x.

Housing 21x is fixed to ceiling 101 of cabin AR1, and contains display 30, imaging unit 40x, and controller 50x within. Infrared light source 60x is furthermore disposed in housing 21x. Housing 21x may be an example of a first housing.

Display 30 projects a picture toward final reflective member 50. Specifically, display 30 may project the picture toward the entirety of a region where it is assumed that final reflective member 50 will be present in all attitudes which final reflective member 50 can assume. Through this, the picture is projected by display 30 across the entirety of final reflective member 50 even if the attitude of final reflective member 50 is changed, and thus the driver can see the picture displayed across the entirety of final reflective member 50. Display 30 includes, for example, a light source apparatus and a liquid crystal panel. The liquid crystal panel is disposed to the front of the light source apparatus. The light source apparatus is used as a backlight of the liquid crystal panel. The light source apparatus is a so-called surface light source. The light source apparatus is a side-light-type light source apparatus using solid-state light-emitting elements such as light-emitting diodes or laser diodes. A light beam from the light source apparatus passes through the liquid crystal panel and is emitted from the display surface of display 30. An image is formed by the light beam emitted from the display surface of display 30. The light beam output from the display surface is a light beam expressing the image displayed in the liquid crystal panel. In FIG. 14 and FIG. 15, the path of the light beam output from one point of the image (a given pixel point) displayed in the display surface of display 30 is represented schematically by a dotted line.

Imaging unit 40x captures an image of a region where the picture is projected by display 30. Specifically, by capturing an image of a region including final reflective member 50, imaging unit 40x captures an image of the region where the picture is projected by display 30. Imaging unit 40x captures, for example, image capturing range R10 at a predetermined angle of view. Imaging unit 40x is disposed in an attitude in which an optical axis of imaging unit 40x is parallel to at least part of an optical path of the picture projected by display 30. Specifically, imaging unit 40x is disposed within housing 21x higher than the optical path of the picture projected by display 30, and in the stated optical path in a top view. To be more specific, imaging unit 40x is disposed on the optical axis of display 30, in a top view. Imaging unit 40x may be implemented as a camera module having an optical system which is pre-designed to focus on a region where it is presumed that the face position of the driver will be present via final reflective member 50. Alternatively, imaging unit 40x may be implemented as a commercially-available camera module and an optical system set so that the camera module focuses on a region where it is presumed that the face position of the driver will be present via final reflective member 50. A distance between final reflective member 50 and imaging unit 40x is set to a distance shorter than the focal length of final reflective member 50.

Although image capturing range R10 is within a range of final reflective member 50 in FIG. 14 and FIG. 15, the range is not limited to that illustrated in FIG. 14 and FIG. 15, and it is sufficient for image capturing range R10 to include a range within final reflective member 50.

Accordingly, optical axis Ax1 of a projection optical system for projecting the picture to the driver is arranged so as to be parallel to, as seen from the left-right direction of automobile 100, and coinciding with, in a top view, optical axis Ax2 of an optical imaging system for capturing an image of the face of the driver. Note that the projection optical system includes final reflective member 50 and display 30, and the optical imaging system includes final reflective member 50 and imaging unit 40x.

Figure 16:
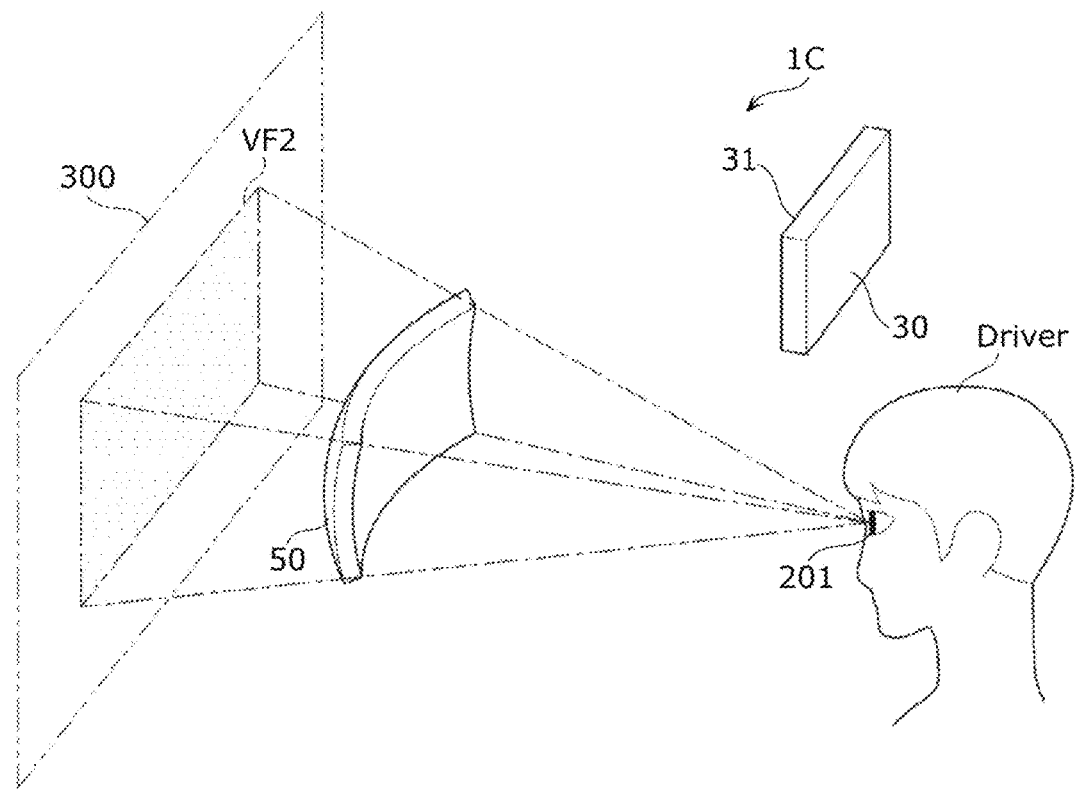
FIG. 16 is a conceptual diagram illustrating a relationship between a visual field of the driver and a virtual image of an image displayed in a display surface, in the display system according to Embodiment 2.
Figure 17:
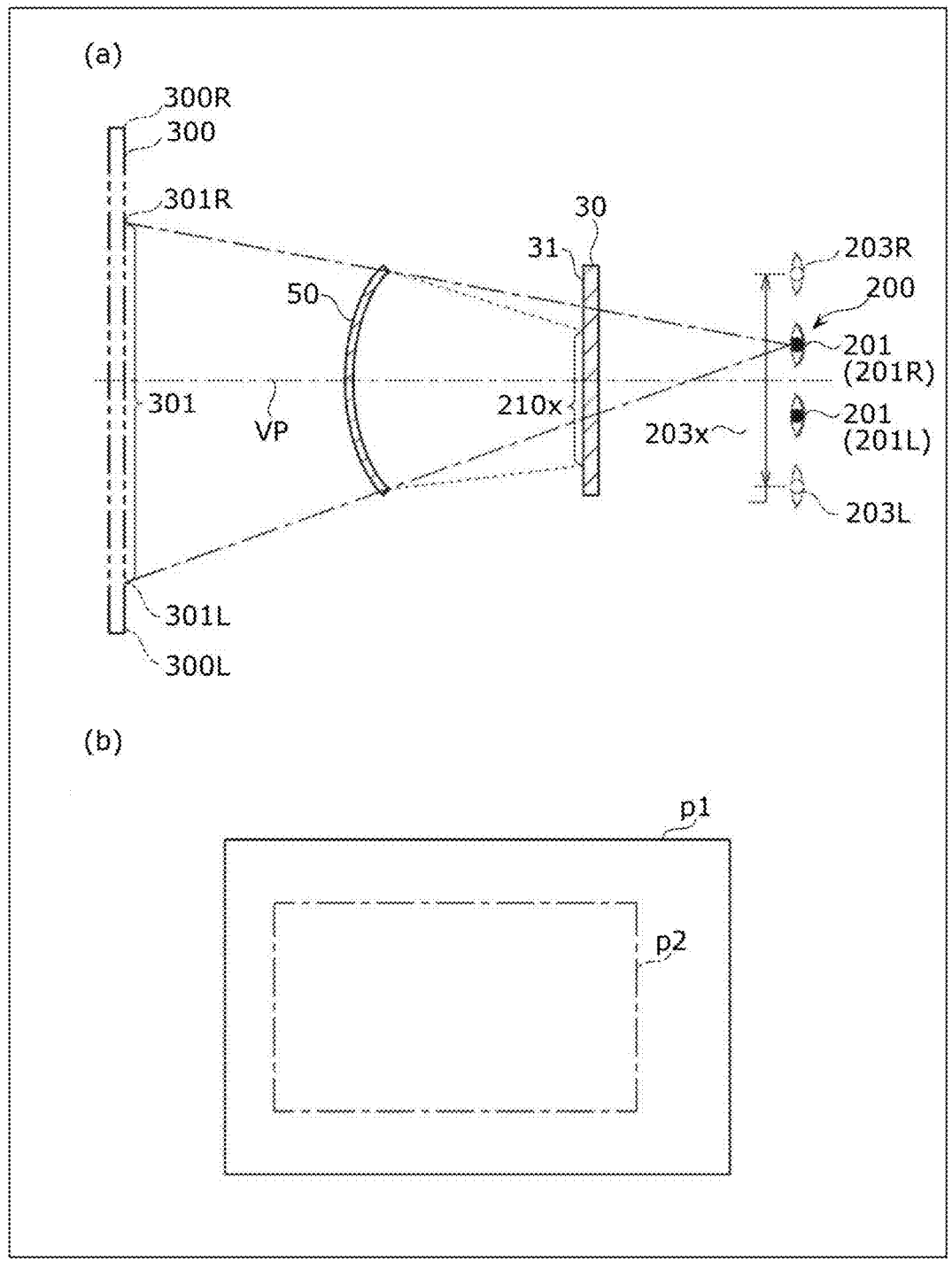
FIG. 17 is a conceptual diagram illustrating a relationship between a visual field of the driver and a virtual image of an image displayed in a display surface, in the display system according to Embodiment 2.
Figure 18:
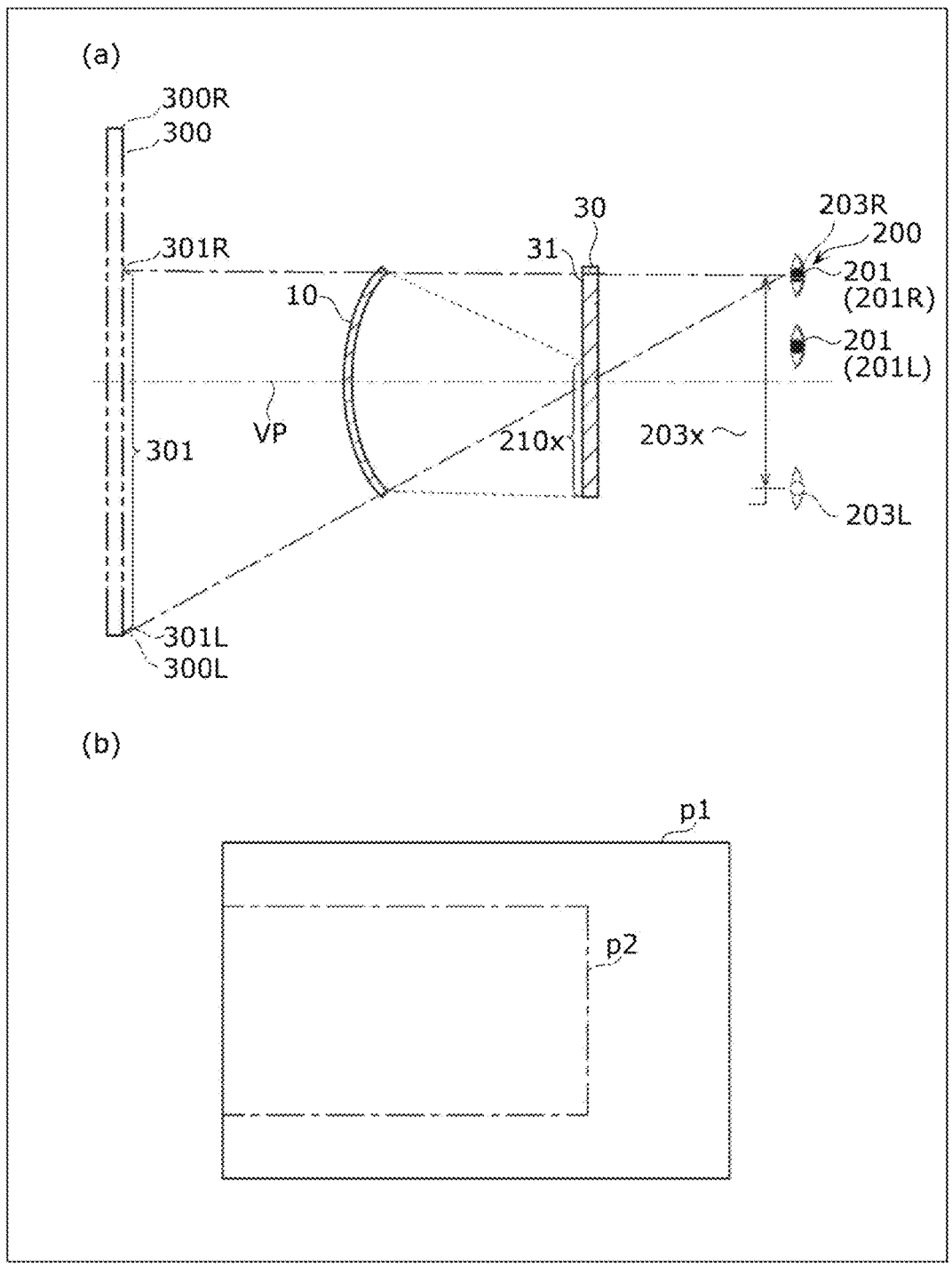
FIG. 18 is a conceptual diagram illustrating a relationship between a visual field of the driver and a virtual image of an image displayed in a display surface, in the display system according to Embodiment 2.

FIG. 16 to FIG. 18 are conceptual diagrams illustrating a relationship between a visual field of the driver and a virtual image of an image displayed in a display surface, in the display system according to Embodiment 2. Although the driver is not directly opposite final reflective member 50 as illustrated in FIG. 15, the driver will be described as being directly opposite final reflective member 50 in Embodiment 2 for the sake of simplicity.

As illustrated in FIG. 16, in display system 1C, the size of final reflective member 50 is determined so that the size of virtual image 300 with respect to the entirety of image p1, on a virtual plane in a space distanced from the driver, is larger than visual field VF2 of eyes 201 of the driver (see FIG. 16), determined by final reflective member 50. Here, in display system 1C, the size of final reflective member 50 is determined so that an outer peripheral edge of visual field VF2 is located on an inner side of an outer peripheral edge of virtual image 300 in the stated virtual plane. Through this, display system 1C is configured so that the position of reflected picture p2 changes in response to movement of eyes 201 of the driver (target person) looking at final reflective member 50 (see FIG. 17 and FIG. 18). Here, reflected picture p2 has a smaller number of pixels than image p1 in both a vertical direction and a horizontal direction of image p1.

In the following, for the sake of simplicity, the driver's two eyes 201 may be referred to as right eye 201R and left eye 201L to distinguish between the two.

(a) in FIG. 17 is a conceptual diagram illustrating a situation where a midpoint of a straight line connecting the driver's right eye 201R and left eye 201L, and a midpoint of display surface 31, are positioned within the same vertical plane VP. (a) in FIG. 18 is a conceptual diagram illustrating a situation where the midpoint of the straight line connecting the driver's right eye 201R and left eye 201L has moved to the right from the position illustrated in (a) of FIG. 17, so that right eye 201R has moved to a right end of eye box 203x. Here, "eye box 203x" is a range in which the driver can see the image without any missing parts. To be more specific, "eye box 203x" is a viewpoint range in which part of virtual image 300 appears within the entire visual field of eyes 201. In display system 1C, reflected picture p2 falls within image p1, as indicated in (b) of FIG. 17 and (b) of FIG. 18, as long as the driver's eyes 201 are within the range of eye box 203x.

Additionally, as illustrated in (a) of FIG. 17 and (a) of FIG. 18, virtual image 301, which is formed by final reflective member 50 reflecting part of image p1, is part of virtual image 300, which is formed if the entirety of image p1 displayed in display surface 31 is reflected by a large concave mirror which is an enlargement of final reflective member 50. Here, in (a) of FIG. 17, a central part of the overall virtual image 300, in both the up-down direction and the left-right direction, corresponds to virtual image 301 visible to the driver. Virtual image 301 is a picture displayed in partial region 210x of display surface 31.

Of virtual image 300, (a) of FIG. 17 illustrates the range of virtual image 301 which is visible to the driver's right eye 201R. The range of virtual image 301 which is visible to the driver's left eye 201L is plane-symmetrical with the range of virtual image 301 visible to right eye 201R, with respect to vertical plane VP.

As illustrated in (a) of FIG. 18, when the midpoint of the straight line connecting the driver's right eye 201R and left eye 201L moves to the right as compared to the position indicated in (a) of FIG. 17, the range of virtual image 301 which is visible to the driver's right eye 201R moves to the left. In (a) of FIG. 18, the driver's right eye 201R is located at right end 203R of eye box 203x, and left end 301L of virtual image 301, which is visible to the driver's right eye 201R, coincides with left end 300L of virtual image 300.

Conversely with respect to (a) of FIG. 18, when the midpoint of the straight line connecting the driver's right eye 201R and left eye 201L moves to the left as compared to the position indicated in (a) of FIG. 17, the range of virtual image 301 which is visible to the driver's left eye 201L moves to the right. When the driver's left eye 201L moves to a position at left end 203L of eye box 203x, right end 301R of virtual image 301, which is visible to the driver's left eye 201L, coincides with right end 300R of virtual image 300.

Accordingly, in display system 1C, when the driver moves their face in the left-right direction, the ranges of virtual image 301 visible in right eye 201R and left eye 201L, respectively, change as the driver moves their face, in the same manner as if the driver was looking at an inside mirror. Here, if the driver's right eye 201R and left eye 201L are within eye box 203x, no parts of the image will appear to be missing.

Additionally, in display system 1C, when the driver moves their face in the up-down direction too, the ranges of virtual image 301 visible in right eye 201R and left eye 201L, respectively, change as the driver moves their face, in the same manner as if the driver was looking at an inside mirror. In other words, if the driver's face moves upward, the ranges of virtual image 301 visible in right eye 201R and left eye 201L, respectively, move downward, and if the driver's face moves downward, the ranges of virtual image 301 visible in right eye 201R and left eye 201L, respectively, move upward. Here, if the driver's right eye 201R and left eye 201L are within eye box 203x, no parts of the image will appear to be missing.

Note that in the present embodiment, image p1 may be changed before and after the driver's face position is moved in the left-right direction.

The descriptions will now return to display device 2. Controller 50x performs display control to display a picture of the area behind automobile 100 in display 30 in accordance with the image captured by imaging unit 40x. Specifically, controller 50x cuts out a part of the picture of the area behind automobile 100 (composite picture 80x) in accordance with the image captured by imaging unit 40x, and displays partial picture 84x, of the partial region cut out from composite picture 80x, in display 30 as image p1 described above.

Controller 50x is constituted by, for example, a processor and memory storing a program executed by the processor. In this case, controller 50x realizes the functions of controller 50x described above by the processor executing the program. In other words, controller 50x is realized by software. However, the configuration is not limited thereto, and controller 50x may be constituted by a dedicated circuit that realizes the functions of controller 50x through hardware, for example.

Infrared light source 60x is a light source that emits infrared light, e.g., a near-infrared LED (Light Emitting Diode). Infrared light source 60x is disposed toward the front of housing 21x, and emits the infrared light toward final reflective member 50.

Specific processing in the display control performed by controller 50x will be described next.

Controller 50x obtains, from image capturing apparatuses 71x to 73x, images 81x to 83x captured by image capturing apparatuses 71x to 73x. Controller 50x obtains the images captured by image capturing apparatuses 71x to 73x at a plurality of different first timings (e.g., at 60 fps). Additionally, controller 50x obtains, from imaging unit 40x, the image captured by imaging unit 40x. Controller 50x obtains the image captured by imaging unit 40x at a plurality of different second timings (e.g., at 60 fps). Note that the plurality of first timings and the plurality of second timings may be the same timing, or may be mutually-different timings.

Controller 50x identifies the driver's face position in cabin AR1 based on the image captured by imaging unit 40x. Specifically, by executing facial recognition processing on the plurality of images obtained from imaging unit 40x, controller 50x specifies the face position of the driver with respect to final reflective member 50 at each of the plurality of second timings. Through this, controller 50x can specify the direction from a reference position of final reflective member 50 to the face position in a sequential manner. Controller 50x can therefore specify displacement in the direction from the reference position to the face position. The reference position is, for example, the position of the center of final reflective member 50. Note that controller 50x may detect the positions of the driver's eyes 201, or may estimate the driver's face position by detecting a position of the driver's head.

Additionally, controller 50x may identify the driver's face position in the front-rear direction by detecting a gap between the driver's two eyes 201 through facial recognition processing. Through this, controller 50x can identify displacement of the driver's face position in the front-rear direction.

Note that controller 50x need not specify the face position at each of the plurality of second timings, and may specify the face position at only some of the plurality of second timings. In other words, controller 50x need not perform processing for specifying the face position on the plurality of images obtained from imaging unit 40x, and may instead perform processing for specifying the face position on images selected every predetermined number of images in the order in which the images have been captured.

Additionally, controller 50x may sequentially specify the direction of the driver's gaze by detecting the direction in which the driver's eyes are facing (gaze direction) through facial recognition processing. Through this, controller 50x can identify displacement in the direction of the driver's gaze.

As described above, controller 50x generates composite picture 80x by compositing images 81x to 83x. Controller 50x generates composite picture 80x for a set of three images 81x to 83x obtained at each of the plurality of first timings.

However, controller 50x need not generate composite picture 80x for a set of three images 81x to 83x obtained at each of the plurality of first timings, and may instead generate composite picture 80x for a set of three images 81x to 83x obtained at only some of the plurality of first timings. In other words, controller 50x need not perform the processing for generating composite picture 80x for a plurality of sets of images 81x to 83x which have been obtained, and may instead generate composite picture 80x for sets selected from every predetermined number of sets in the order in which the sets have been captured.

Next, in accordance with the detected face position of the driver, controller 50x performs image processing of cutting out a range of composite picture 80x corresponding to the face position as a target image. Specifically, in accordance with the detected face position, controller 50x performs image processing to cut out the range of composite picture 80x generated for the set of three images 81x to 83x captured at timing corresponding to the timing at which the face position is detected. Note that the timing at which the set of three images 81x to 83x is captured ("image capturing timing" hereinafter) may be processed as the timing closest to the image capturing timing among the timings at which the face position is detected ("position detection timings" hereinafter), or may be processed as the timing closest to a timing after the image capturing timing among the timings at which the face position is detected ("position detection timing" hereinafter). Controller 50x then displays partial picture 84x, after the image processing, in display 30.

When the detected driver's face position has moved along a first direction orthogonal to the front-rear direction of automobile 100, controller 50x moves the range of the image cut out from composite picture 80x in a second direction, opposite the first direction of automobile 100, relative to the range from before the face position moved. An example of when the driver's face position moves to the right, as the first direction, will be described with reference to FIG. 19 to FIG. 22.

Figure 19:
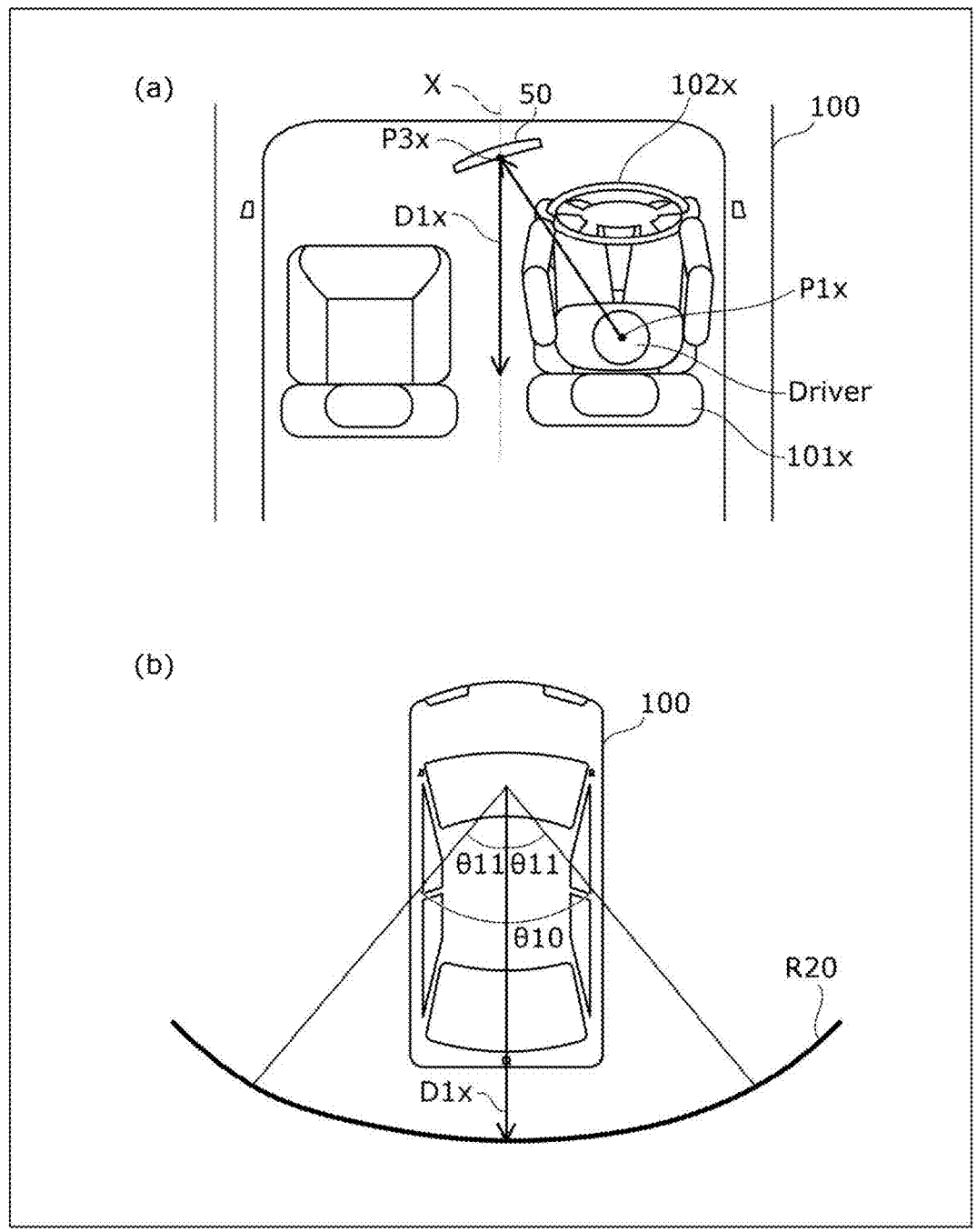
FIG. 19 is a diagram illustrating a range in which a controller cuts out an image at a face position during normal driving.
Figure 20:
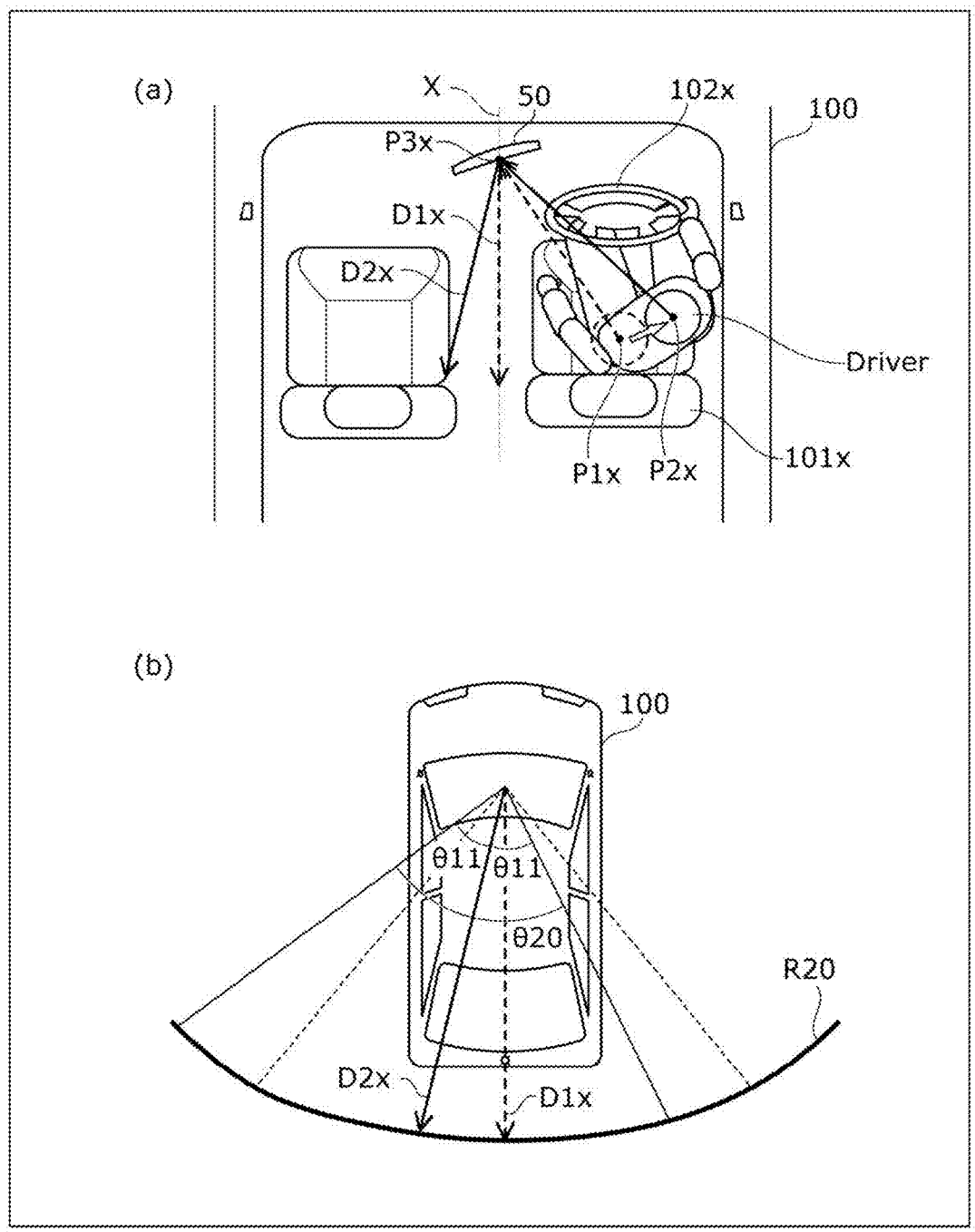
FIG. 20 is a diagram illustrating a range in which the controller cuts out an image at the face position after moving.
Figure 22:
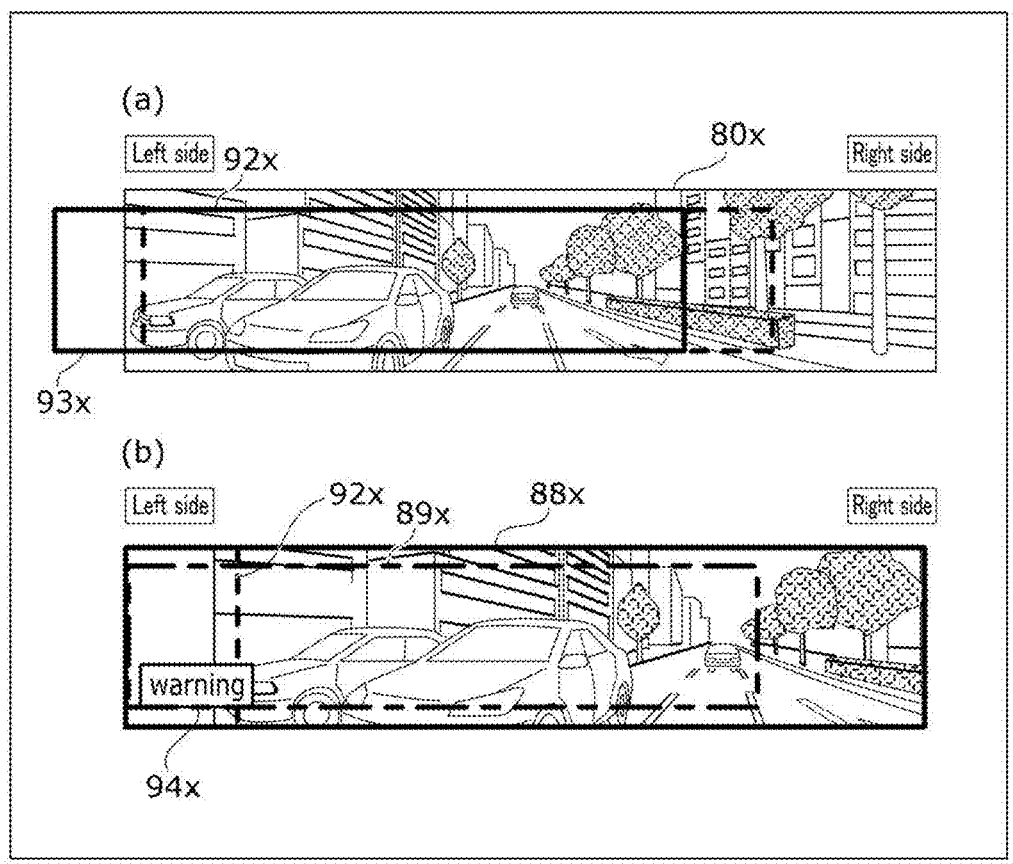
FIG. 22 is a diagram illustrating image processing performed by the controller when the face position has moved further in the same direction from the state illustrated in FIG. 20.

FIG. 19 is a diagram illustrating a range in which controller 50x cuts out the image at the face position during normal driving. FIG. 20 is a diagram illustrating a range in which controller 50x cuts out the image at the face position after moving. FIG. 21 is a diagram illustrating a difference in image processing performed by controller 50x between before and after the face position moves. FIG. 22 is a diagram illustrating image processing performed by controller 50x when the face position has moved further in the same direction from the state illustrated in FIG. 20.

In FIG. 19 and FIG. 20, (a) is a plan view of a front side of the cabin of automobile 100 from above, and (b) is a diagram illustrating the range of the image displayed in display 30 of image capturing range R10 captured by image capturing apparatuses 71x to 73x of automobile 100, as a plan view seen from above. (a1) and (a2) of FIG. 21 are diagrams for illustrating the image processing performed by controller 50x in the state illustrated in FIG. 19, where (a1) illustrates an example of the processing for cutting out partial picture 84x from composite picture 80x, and (a2) illustrates the cut-out partial picture 84x. (b1) and (b2) of FIG. 21 are diagrams for illustrating the image processing performed by controller 50x in the state illustrated in FIG. 20, where (b1) illustrates an example of the processing for cutting out partial picture 86x from composite picture 80x, and (b2) illustrates the cut-out partial picture 86x. Dot-dash line X in FIG. 19 and FIG. 20 indicates the front-rear direction of automobile 100.

Assume that, as illustrated in (a) of FIG. 19, that before the face position is moved, the driver is performing normal driving while holding steering wheel 102x and is seated in the center of driver's seat 101x of automobile 100 in the left and right directions, for example. In this case, it is assumed that the range which controller 50x cuts out is adjusted so that an image is displayed in display 30 in which direction D1x of a center of a view through the room mirror, which is assumed to be final reflective member 50, seen by the driver at face position P1x during normal driving by the driver, is the area behind automobile 100. In other words, in this case, controller 50x determines, as the range of composite picture 80x to cut out, range 91x (see (a1) in FIG. 21), which corresponds to angular range θ10 that takes a center position of final reflective member 50 of automobile 100 (a center position in the left-right direction) as an origin and that is centered on direction D1x of the broad image capturing range R20, as illustrated in (b) of FIG. 19. Angular range θ10 is an angular range obtained by combining angular ranges θ11 which are on the left and right sides of direction D1x and which take the center position of final reflective member 50 as an origin.

Note that in this case, assuming final reflective member 50 is used as the room mirror, the angle of display 30 is adjusted to an angle at which a range directly behind automobile 100 is reflected in the display surface when the driver, who is located at face position P1x, views final reflective member 50. In other words, an angle formed by a line from the driver's face position P1x to position P3x of the center of final reflective member 50 in the left-right direction and the surface of final reflective member 50 at position P3x is substantially equal to an angle formed by direction D1x and the surface of final reflective member 50.

Accordingly, as illustrated in (a1) of FIG. 21, controller 50x cuts out the determined range 91x from composite picture 80x and outputs partial picture 84x obtained from the cutting out, illustrated in (a2) of FIG. 21, to display 30. Note that partial picture 84x may be an example of image p1 output after the image processing performed by controller 50x before the driver moves their face position. As such, the driver can see reflected picture 85x through final reflective member 50. Reflected picture 85x may be an example of reflected picture p2 illustrated in (b) of FIG. 17.

A case where the face position has moved will be described next with reference to FIG. 20.

Consider, for example, a situation where the driver has moved their face to the right of driver's seat 101x, as illustrated in (a) of FIG. 20, as a case where the face position has moved. In this case, at the driver's face position P2x, direction D2x of a center of the view through the room mirror visible to the driver, assuming that final reflective member 50 serves as the room mirror, is further to the left than direction D1x. In this case, controller 50x determines, as the range of composite picture 80x to cut out, range 92x (see (a1) in FIG. 21), which corresponds to angular range θ20 that takes the center position of final reflective member 50 of automobile 100 (the center position in the left-right direction) as an origin and that is centered on direction D2x of the broad image capturing range R20, as illustrated in (b) of FIG. 20. Angular range θ20 is an angular range obtained by combining angular ranges θ11 which are on the left and right sides of direction D2x and which take the center position of final reflective member 50 as an origin.

Note that direction D2x cut out from composite picture 80x is not limited to angular range θ20 centered on direction D2x, and may be any angular range which takes second direction of movement in the direction opposite from the direction in which the face was moved as a reference, rather than the first direction used as a reference for the cutout before the driver's face is moved.

Accordingly, as illustrated in (b1) of FIG. 21, controller 50x cuts out the determined range 93x from composite picture 80x and outputs partial picture 86x obtained from the cutting out, illustrated in (b2) of FIG. 21), to display 30. Thus when the face position has moved from face position P1x to face position P2x, i.e., when a specified face position has moved in one direction with respect to the left-right direction of automobile 100, controller 50x displays, in display 30, partial picture 86x, which is a partial region of composite picture 80x of the area behind automobile 100 that has been shifted in the other direction with respect to the left-right direction of automobile 100, further than partial picture 84x, which is displayed in display 30 before the face position has moved. Note that partial picture 86x may be an example of image p1 output after the image processing performed by controller 50x after the driver moves their face position. As such, the driver can see reflected picture 87x through final reflective member 50. Reflected picture 87x may be an example of reflected picture p2 illustrated in (b) of FIG. 18.

In display system 1C, final reflective member 50 reflects only a partial region of the image displayed in display surface 31 of display 30 as reflected picture p2. Accordingly, even if the driver's face position moves up, down, to the left, or to the right, controller 50x performs display control so that the picture, of the area behind automobile 100, which is on the side opposite from the direction in which the face position has been moved, can be seen through final reflective member 50, and furthermore performs the display control in accordance with the position, in the up-down and left-right directions, of the driver's face. Thus simply by moving the position of their face slightly in the first direction orthogonal to the front-rear direction of automobile 100, the driver can easily see the picture, of the picture of the area behind automobile 100, which is in the second direction opposite from the side to which the face position has been moved. Additionally, combining the change in the visible range corresponding to the movement of the face position with the display control performed by controller 50x in accordance with the position of the driver's face in the up-down and left-right directions, display control which accurately reproduces the change in the visible range when looking at a normal mirror can be performed.

Image processing performed in a case where the face position has moved further to the right will be described next with reference to FIG. 22.

When the face position moves further to the right from position P2x indicated in (a) of FIG. 20, it is necessary for controller 50x to cut out an angular range further to the left than angular range θ20 indicated in (b) of FIG. 20. In this case, as illustrated in (a) of FIG. 22, range 93x extending beyond a left end of composite picture 80x will be determined as the range from which composite picture 80x is cut out. Thus when controller 50x determines that if the driver's face position has moved in one direction of the left-right direction of automobile 100, partial picture 88x of a partial region shifted in the opposite direction will include a boundary, at the other end in the left-right direction, of composite picture 80x of the area behind automobile 100, controller 50x displays a warning by displaying, in display 30, partial picture 88x including warning display 94x. Warning display 94x is provided in a region within reflected picture 89x of partial picture 88x. Controller 50x may also display a warning in display 30 upon determining that the position of the person's face has left the eye box.

Note that warning display 94x may include a message indicating that the driver's face position is too far to one side in the left-right direction, or may include a message prompting the driver to return their face position to the other side. Here, "eye box" is a range in which the driver can see the image without any missing parts.

Although FIG. 22 indicates an example in which partial picture 88x shows the left end of composite picture 80x, i.e., does not show the picture further to the left than the left end, the configuration is not limited thereto. The partial picture may be generated so that the left end of that picture is the left end of composite picture 80x, and may furthermore be generated so that a warning display is superimposed thereon.

Although an example of a situation where the driver's face moves to the right has been described with reference to FIG. 19 to FIG. 22, the same descriptions can be applied for movement in the first direction orthogonal to the front-rear direction of automobile 100, such as to the left, upward, and downward. In this case, the cut-out range moves in the second direction, which is opposite from the first direction. Specifically, when the first direction is left, upward, or downward, the second direction is the opposite thereof, i.e., right, downward, or upward, respectively. Note also that the first direction and the second direction are not limited to upward, downward, left, and right, but can be any directions on a virtual plane orthogonal to the front-rear direction.

Furthermore, in accordance with the direction of the driver's gaze, controller 50x may perform image processing of cutting out a range of composite picture 80x corresponding to the face position as a target image. In this case, like the image processing based on the face position, when the target of the specified gaze direction has moved in one direction with respect to the left-right direction of automobile 100, controller 50x displays, in display 30, partial picture 86x, which is a partial region of composite picture 80x of the area behind automobile 100 that has been shifted in the other direction with respect to the left-right direction of automobile 100, further than partial picture 84x, which is displayed in display 30 before the gaze direction has moved. Controller 50x can therefore accurately perform display control based on the position, in the left-right direction, of the target of the driver's gaze.

Additionally, controller 50x may display the partial picture in display 30 at a larger size the more the driver's face position moves toward the front of automobile 100. In other words, when the driver's face position has moved toward the front of automobile 100, controller 50x displays, in display 30, a partial picture which is enlarged to be larger than the partial picture displayed in display 30 before the face position has moved. Likewise, when the driver's face position has moved toward the rear of automobile 100, controller 50x displays, in display 30, a partial picture which is reduced to be smaller than the partial picture displayed in display 30 before the face position has moved. Controller 50x can therefore accurately perform display control based on the position, in the front-rear direction, of the driver's face.

In addition to the image processing described above, controller 50x may also perform processing (i.e., calibration) to adjust external parameters indicating the positions and attitudes of the cameras of image capturing apparatuses 71x to 73x in three-dimensional space, and internal parameters indicating optical system properties such as the focal lengths, aberration, image centers, and so on of the cameras.

(2) Operations

Operations of display system 1C will be described next.

Figure 23:
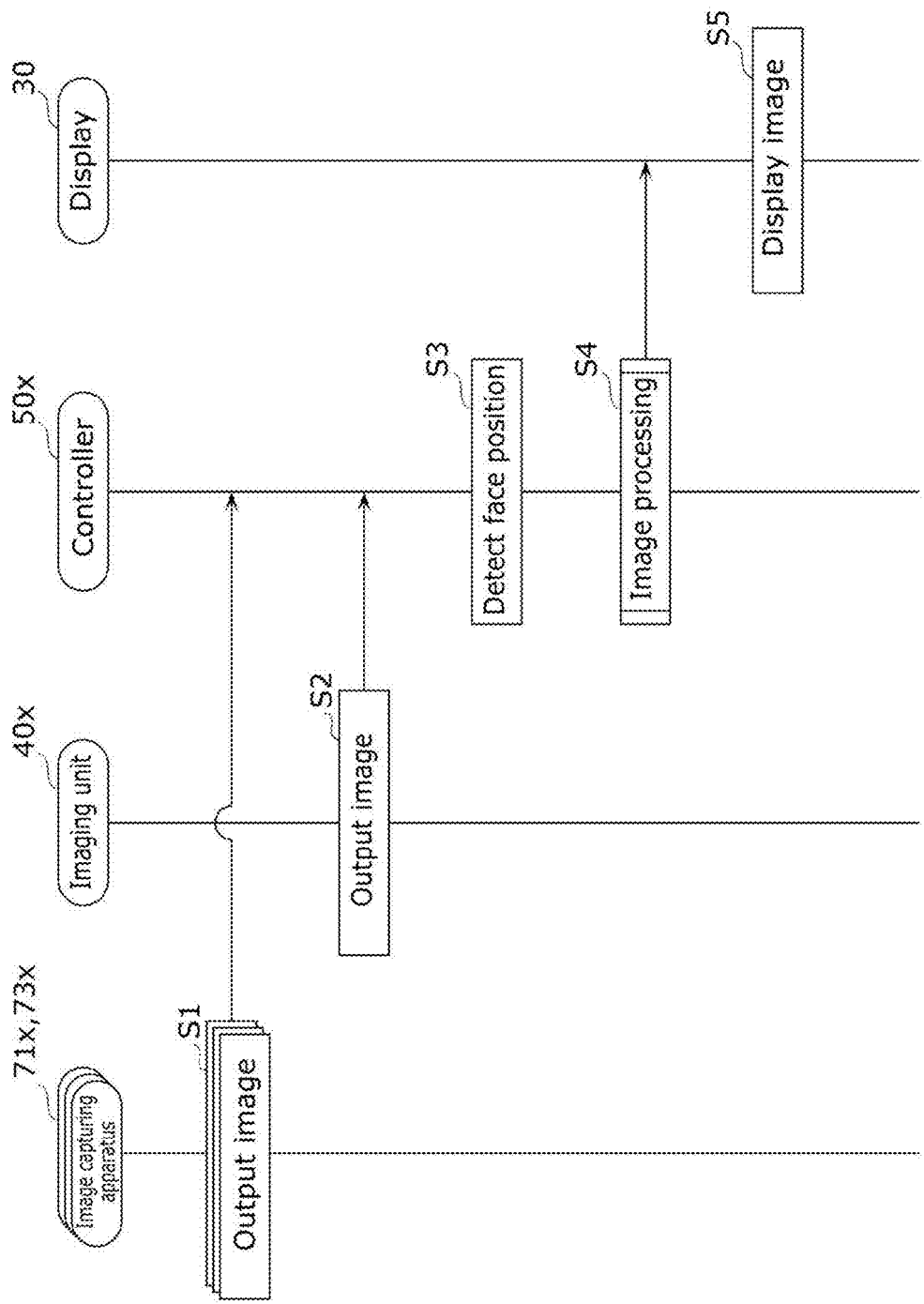
FIG. 23 is a sequence chart illustrating an example of operations performed by the display system according to Embodiment 2.
Figure 24:
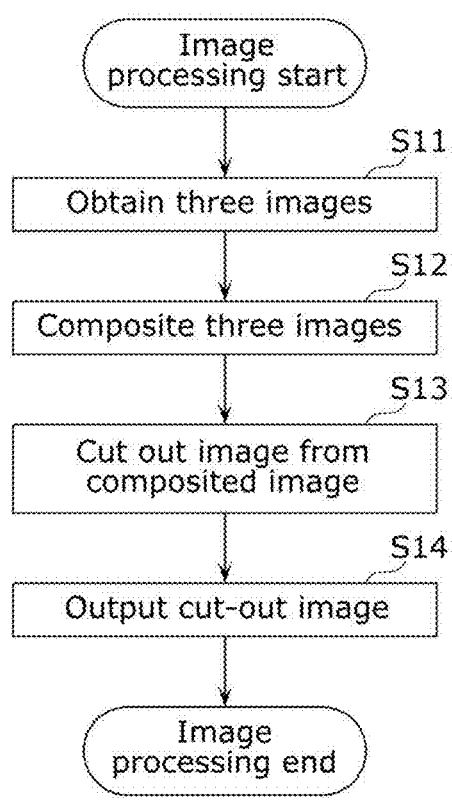
FIG. 24 is a flowchart illustrating an example of image processing performed by the controller according to Embodiment 2.

FIG. 23 is a sequence chart illustrating an example of operations performed by display system 1C according to Embodiment 2. FIG. 24 is a flowchart illustrating an example of image processing performed by controller 50x according to Embodiment 2.

As illustrated in FIG. 23, in display system 1C, each of image capturing apparatuses 71x to 73x outputs a captured image to controller 50x (S1). Imaging unit 40x outputs the captured images to controller 50x (S2).

Controller 50x specifies the driver's face position using the images obtained from imaging unit 40x (S3), executes image processing on the images obtained by image capturing apparatuses 71x to 73x in accordance with the face position detected by controller 50x (S4), and outputs the post-image processing images to display 30. The image processing of step S4 will be described in detail later.

Display 30 obtains the images output from controller 50x and displays the images (S5).

By executing the processes of steps S1 to S5, display system 1C can, in real time, perform image processing on the three images 81x to 83x captured by image capturing apparatuses 71x to 73x at the same timing in accordance with the detected face position and display the post-image processing images in display 30.

The image processing performed by controller 50x will be described next with reference to FIG. 24.

In the image processing, controller 50x obtains the three images 81x to 83x captured by image capturing apparatuses 71x to 73x (S11).

Next, controller 50x composites the three images 81x to 83x and obtains composite picture 80x (S12).

Then, in accordance with the specified face position, controller 50x cuts out, from composite picture 80x, partial picture 84x of range 91x corresponding to the face position (S13).

Controller 50x outputs the cut-out partial picture 84x to display 30 (S14).

Note that the processing for detecting the face position may be performed less frequently than the image processing. This is because when automobile 100 is traveling, the background around automobile 100 changes continuously, and it is therefore necessary to use the most recent images obtained by image capturing apparatuses 71x to 73x. However, the face position does not change frequently, and the speed with which the face position changes is slower than the speed at which automobile 100 travels.

Additionally, the face position detection may use a value obtained by averaging the face position detection results from a plurality of frames. This makes it possible to reduce blur in the picture produced by vibrations.

(3) Effects, etc.

When attempting to detect the driver's gaze within a vehicle cabin, the position of the driver's face may differ in the front-rear direction and the up-down direction depending on the driver's physique. For example, a driver having long legs will set the position of the driver's seat further to the rear than a driver having short legs, and thus the face of the driver having long legs will be located further to the rear than the driver having short legs. Likewise, the face of a driver having a long torso will be located higher than a driver having a short torso.

Therefore, when using a conventional face position detection apparatus that uses a camera to detect the position of the face of a vehicle user, in order to detect the gaze of a person in a conventional vehicular picture system that performs picture display control in accordance with the driver's gaze, the camera in the conventional face position detection apparatus is fixed to the dashboard. As such, unless the angle of view of the camera is set to a wide angle, an image of the driver's face cannot be captured when the driver changes. Additionally, if the angle of view of the camera is set to a wide angle and a single image is captured over a broad image capturing range, the driver's face will appear in a region which is smaller than a predetermined percentage of the obtained image. As such, unless a high-performance camera is used, it will be difficult to accurately specify the position of the driver's face from the obtained image.

Accordingly, display system 1C according to the present embodiment is a display system that displays a picture of the area behind automobile 100 within cabin AR1 of automobile 100, and includes final reflective member 50, display 30, imaging unit 40x, and controller 50x. The attitude of final reflective member 50 can be changed freely. Display 30 is disposed further to the rear than final reflective member 50, and projects a picture toward final reflective member 50. Imaging unit 40x captures an image of a region where the picture is projected by display 30. Controller 50x performs display control to display a picture of the area behind automobile 100 in display 30 in accordance with the image captured by imaging unit 40x. Imaging unit 40x is disposed in an attitude in which an optical axis of imaging unit 40x is parallel to at least part of an optical path of the picture projected by display 30.

Through this, imaging unit 40x captures an image of a region in which the picture is projected by display 30, and thus an image can be captured of the face of the driver who is, in cabin AR1, viewing the picture projected from display 30 and reflected by final reflective member 50. In particular, imaging unit 40x is disposed in an attitude such that an optical axis thereof is parallel to part of the optical path of the picture projected by display 30. Thus when the driver inside cabin AR1 changes the attitude of final reflective member 50 in accordance with the position of their eyes so that the picture is visible, the driver's face is included in image capturing range R10 of imaging unit 40x. Accordingly, the driver's face can be captured without changing the angle of view of imaging unit 40x to an angular range broader than a predetermined angular range, and the position of the driver's face can therefore be specified accurately. Display control based on the position of the driver's face can therefore be performed accurately.

Additionally, in display system 1C according to the present embodiment, imaging unit 40x is disposed further to the rear of automobile 100 than final reflective member 50, and captures an image of a region including final reflective member 50. As such, imaging unit 40x can capture the driver's face via final reflective member 50.

Additionally, in display system 1C according to the present embodiment, final reflective member 50 reflects only a partial region of the picture projected by display 30. Through this, display system 1C is configured so that the position where reflected picture p2 is caused to be seen by a person changes in response to movement of the viewpoint of the person looking at final reflective member 50. Accordingly, the display system can provide the person viewing the displayed image with a sense that the image is three-dimensional.

Additionally, in display system 1C according to the present embodiment, final reflective member 50 is disposed on windshield 102 of automobile 100, and display 30 is disposed on ceiling 101 of cabin AR1. Display 30 can therefore be disposed on the ceiling, where display 30 is less likely to act as an obstruction in cabin AR1. Furthermore, the configuration is such that final reflective member 50 and display 30 are distanced from each other, and thus the sizes of the constituent elements disposed on windshield 102 can be made more compact than in a configuration in which final reflective member 50 and display 30 are disposed together.

Additionally, in display system 1C according to the present embodiment, imaging unit 40x is disposed on ceiling 101 of cabin AR1, and display system 1C further includes housing 21x that contains display 30 and imaging unit 40x. Display 30 and imaging unit 40x can therefore be disposed on the ceiling, where display 30 and imaging unit 40x are less likely to act as obstructions in cabin AR1. Furthermore, the configuration is such that final reflective member 50 and imaging unit 40x are distanced from each other, and thus the sizes of the constituent elements disposed on windshield 102 can be made more compact than in a configuration in which final reflective member 50 and imaging unit 40x are disposed together.

Additionally, in display system 1C according to the present embodiment, imaging unit 40x is disposed on ceiling 101 of cabin AR1. Display system 1C further includes housing 21x that contains display 30 and imaging unit 40x, and infrared light source 60x, which is disposed in housing 21x and emits infrared light toward final reflective member 50. Infrared light for capturing the driver's face using imaging unit 40x can therefore be emitted toward the driver's face. This makes it possible for imaging unit 40x to effectively capture a person's face not only during the day, but also at night.

[Variation 1]

Figure 25:
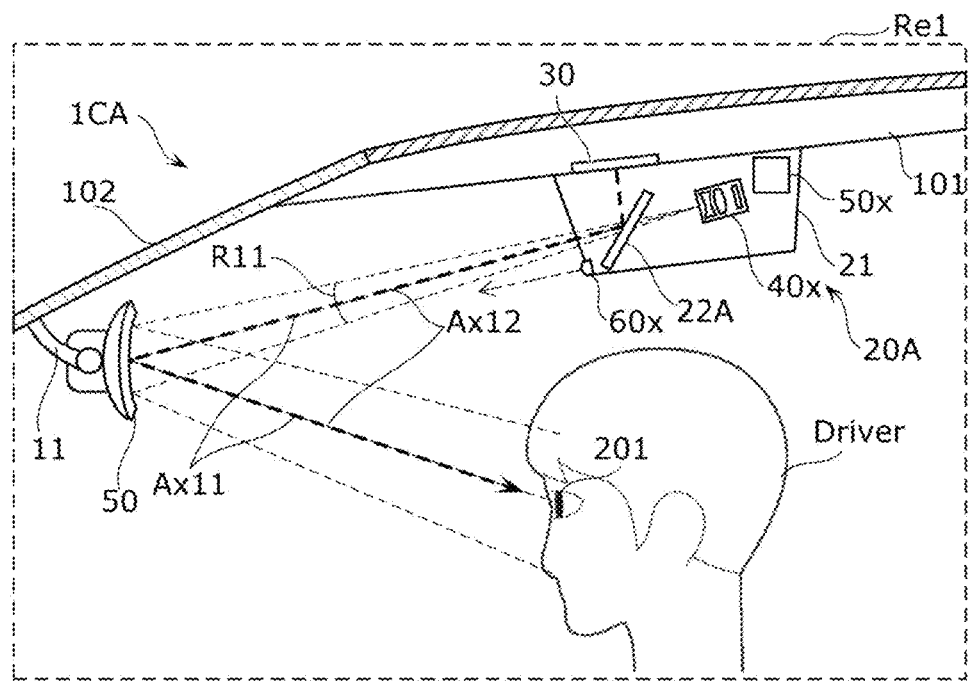
FIG. 25 is an enlarged view illustrating an enlargement of a region corresponding to region Re1 in FIG. 10, according to Variation 1.

In display system 1C according to the foregoing embodiment, imaging unit 40x is described as being disposed within housing 21x higher than the optical path of the picture projected by display 30, and in the stated optical path in a top view. However, the configuration is not limited thereto. For example, as in display system 1CA illustrated in FIG. 25, display 30 and imaging unit 40x may be disposed so that optical axis Ax11 of the projection optical system including display 30 and optical axis Ax12 of the optical imaging system including imaging unit 40x substantially coincide. FIG. 25 is an enlarged view illustrating an enlargement of a region corresponding to region Re1 in FIG. 10, according to Variation 1.

Specifically, display device 20A provided in display system 1CA differs in that optical filter 22A is included in addition to the configuration of display device 2 according to Embodiment 2. Optical filter 22A is contained within housing 21x. Optical filter 22A transmits infrared light and reflects visible light. Optical filter 22A is implemented by, for example, a beam splitter, a spectral filter, or the like.

Optical filter 22A reflects a picture constituted by visible light projected by display 30 disposed above optical filter 22A to final reflective member 50, for example. In other words, display 30 projects the picture, which includes visible light, onto final reflective member 50 after the picture has been reflected by optical filter 22A.

Of the light reflected by final reflective member 50, optical filter 22A transmits infrared light toward imaging unit 40x, which is disposed behind optical filter 22A, for example. In other words, imaging unit 40x captures the infrared light transmitted by optical filter 22A. Imaging unit 40x captures image capturing region R11 at a predetermined angle of view.

Accordingly, optical axis Ax11 of the projection optical system for projecting the picture to the driver and optical axis Ax12 of the optical imaging system for capturing an image of the driver's face substantially coincide, both as seen from the left-right direction of automobile 100, and in a top view. This makes it possible to accurately detect a viewpoint position, gaze direction, and the like, and to perform accurate display control in accordance with the position of the driver's face, the gaze direction, and so on. Note that the projection optical system includes final reflective member 50, optical filter 22A, and display 30, and the optical imaging system includes final reflective member 50, optical filter 22A, and imaging unit 40x.

Figure 26:
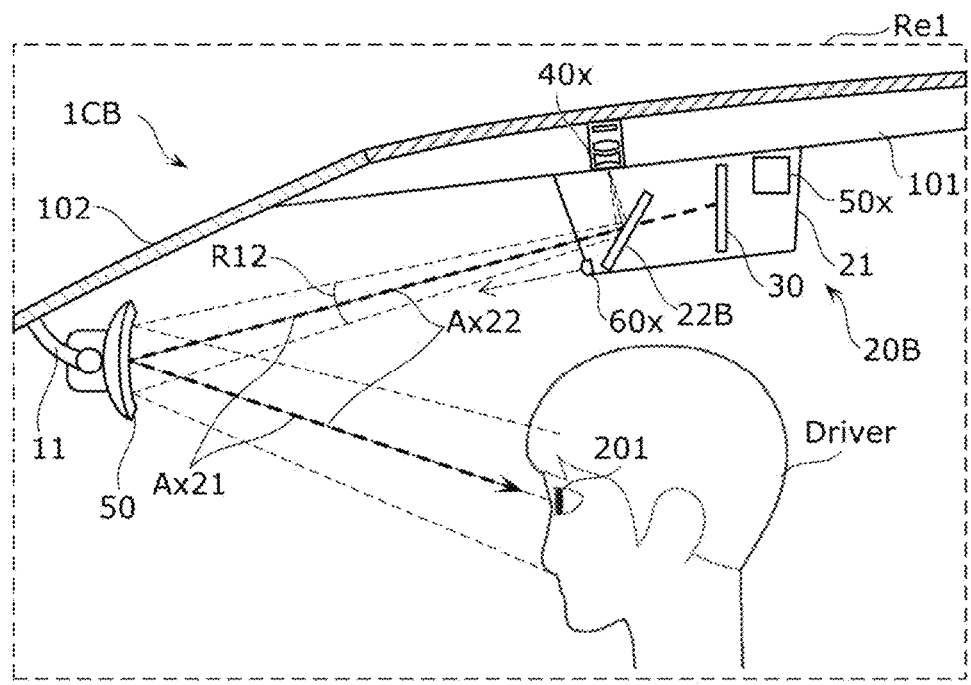
FIG. 26 is an enlarged view illustrating an enlargement of a region corresponding to region Re1 in FIG. 10, according to another example in Variation 1.

Additionally, for example, as in display system 1CB illustrated in FIG. 26, display 30 and imaging unit 40x may be disposed so that optical axis Ax21 of the projection optical system including display 30 and optical axis Ax22 of the optical imaging system including imaging unit 40x substantially coincide. FIG. 26 is an enlarged view illustrating an enlargement of a region corresponding to region Re1 in FIG. 10, according to another example in Variation 1.

Specifically, display device 20B provided in display system 1CB differs in that optical filter 22B is included in addition to the configuration of display device 2 according to Embodiment 2. Optical filter 22B is contained within housing 21x. Optical filter 22B transmits visible light and reflects infrared light. Optical filter 22B is implemented by, for example, a beam splitter, a spectral filter, or the like.

Of the light reflected by final reflective member 50, optical filter 22B reflects infrared light toward imaging unit 40x, which is disposed above optical filter 22B, for example. In other words, imaging unit 40x captures the infrared light reflected by optical filter 22B. Imaging unit 40x captures image capturing region R12 at a predetermined angle of view.

Additionally, optical filter 22B transmits a picture constituted by visible light projected by display 30 disposed to the rear to final reflective member 50, for example. In other words, display 30 projects the picture, which includes visible light, onto final reflective member 50 after the picture has been transmitted by optical filter 22B.

Accordingly, optical axis Ax21 of the projection optical system for projecting the picture to the driver and optical axis Ax22 of the optical imaging system for capturing an image of the driver's face substantially coincide, both as seen from the left-right direction of automobile 100, and in a top view. This makes it possible to accurately detect a viewpoint position, gaze direction, and the like, and to perform accurate display control in accordance with the position of the driver's face, the gaze direction, and so on.

Note that the projection optical system includes final reflective member 50, optical filter 22B, and display 30, and the optical imaging system includes final reflective member 50, optical filter 22B, and imaging unit 40x.

[Variation 2]

Figure 27:
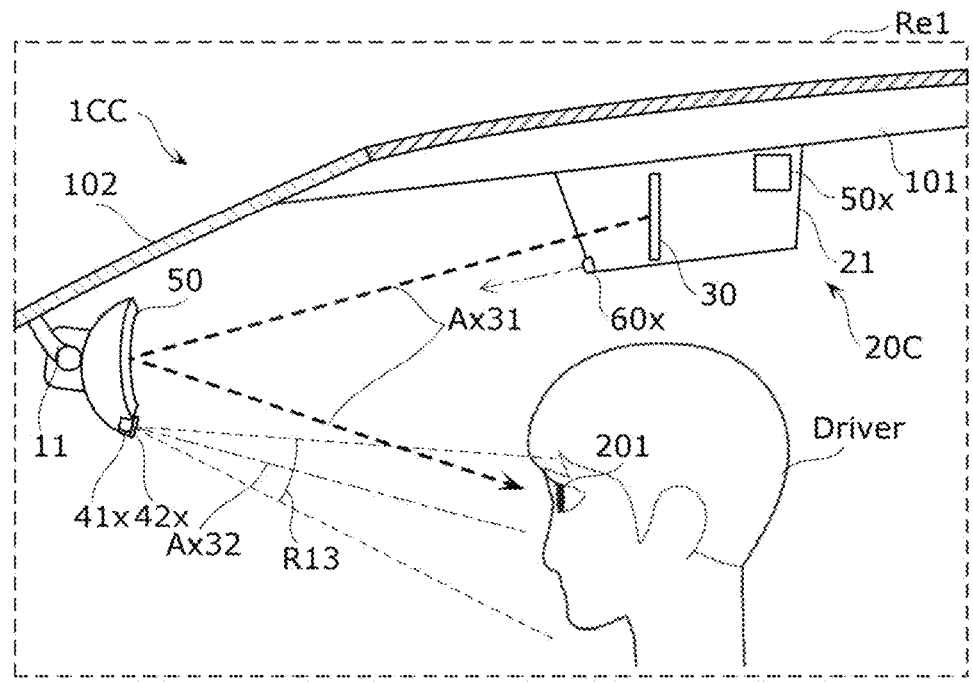
FIG. 27 is an enlarged view illustrating an enlargement of a region corresponding to region Re1 in FIG. 10, according to Variation 2.
Figure 28:
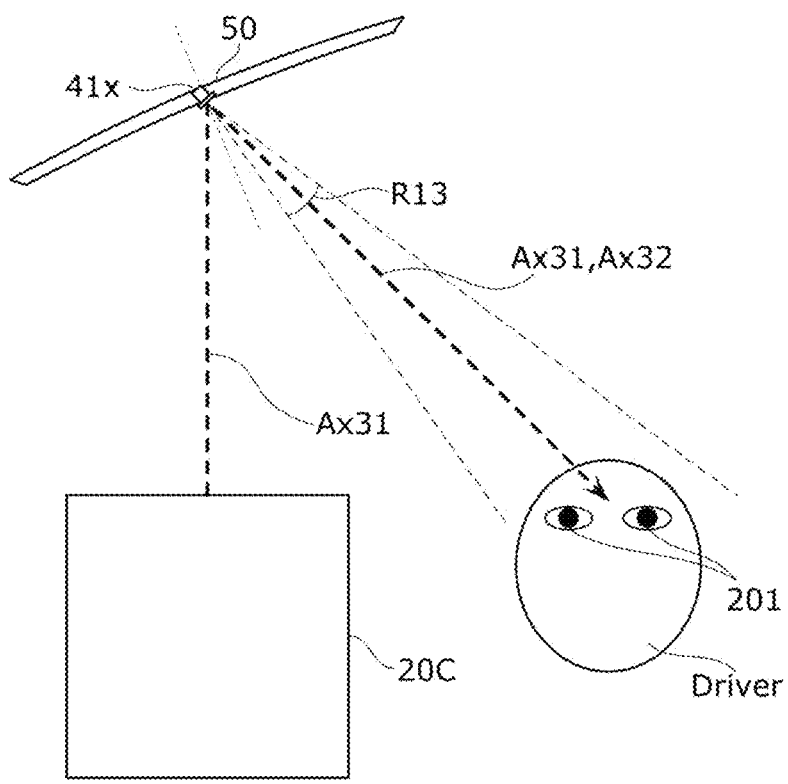
FIG. 28 is a diagram illustrating a positional relationship between each of constituent elements of the display system and a driver of the automobile according to Variation 2, seen from above.

In display system 1C according to the foregoing embodiment and display systems 1CA and 1CB according to Variation 1, imaging unit 40x is included in display devices 2, 20A, 20B disposed on the ceiling. However, the configuration is not limited thereto. For example, as in display system 1CC illustrated in FIG. 27 and FIG. 28, imaging unit 41x may be disposed on a side of final reflective member 50. FIG. 27 is an enlarged view illustrating an enlargement of a region corresponding to region Re1 in FIG. 10, according to Variation 2. FIG. 28 is a diagram illustrating a positional relationship between each of constituent elements of the display system and a driver of the automobile according to Variation 2, seen from above.

Specifically, display device 20C provided in display system 1CC differs from the configuration of display device 2 according to Embodiment 2 in that imaging unit 40x is not provided. An additional difference is that imaging unit 41x is disposed on a side of (specifically, below) final reflective member 50 included in display system 1CC. Optical filter 42x may be disposed on a front surface side (image capturing direction side) of imaging unit 41x. Optical filter 42x transmits infrared light and reflects visible light, for example.

Imaging unit 41x is disposed in a predetermined attitude with respect to final reflective member 50. Imaging unit 41x is fixed, for example, in an attitude at a predetermined angle of elevation or angle of inclination with respect to the normal direction of the center of final reflective member 50, and in an attitude coinciding with the stated normal direction in a top view. Imaging unit 41x captures, for example, image capturing region R13 at a predetermined angle of view.

Accordingly, optical axis Ax31 of the projection optical system for projecting the picture to the driver is arranged so as to be parallel to, as seen from the left-right direction of automobile 100, and coinciding with, in a top view, optical axis Ax32 of the optical imaging system for capturing an image of the driver's face. Note that the projection optical system includes final reflective member 50 and display 30, and the optical imaging system includes imaging unit 41x.

In display system 1CC according to Variation 2, display 30 and imaging unit 41x are disposed so that optical axis Ax31 is parallel to optical axis Ax32, even when imaging unit 41x is disposed on a side of final reflective member 50. Accordingly, the driver's face can be captured easily even without changing the angle of view of imaging unit 41x to an angular range broader than a predetermined angular range, and the position of the driver's face can therefore be specified accurately. Display control based on the position of the driver's face can therefore be performed accurately.

[Variation 3]

The above embodiment describes display device 2 as obtaining an image of the area behind automobile 100 from each of the plurality of image capturing apparatuses 71x to 73x and projecting a picture generated based on the obtained plurality of images. However, the configuration is not limited thereto. Display device 2 may obtain an image of the area behind automobile 100 from one image capturing apparatus and project a picture generated based on the obtained image. In this case, automobile 100 may be configured to have only image capturing apparatus 73x of the plurality of image capturing apparatuses 71x to 73x.

[Variation 4]

The foregoing embodiment describes infrared light source 60x as being disposed toward the front of housing 21x, and emitting the infrared light toward final reflective member 50. However, the configuration is not limited thereto. The infrared light source may be disposed in housing 21x, and may emit infrared light directly from housing 21x toward the driver. The infrared light source in this case emits the infrared light from housing 21x diagonally downward to the rear of automobile 100. The infrared light source may be disposed on a side of final reflective member 50 and may emit infrared light from the side of final reflective member 50 toward the driver. The infrared light source in this case emits the infrared light from the side of final reflective member 50 to the rear of automobile 100.

[Variation 5]

In display system 1C according to the foregoing embodiment, final reflective member 50 reflects only a partial region of the image displayed in display surface 31 of display 30 as reflected picture p2, but the configuration is not limited thereto. Final reflective member 50 may reflect the entire region of the image displayed in display surface 31 of display 30 as reflected picture p2.

[Variation 6]

Figure 29:
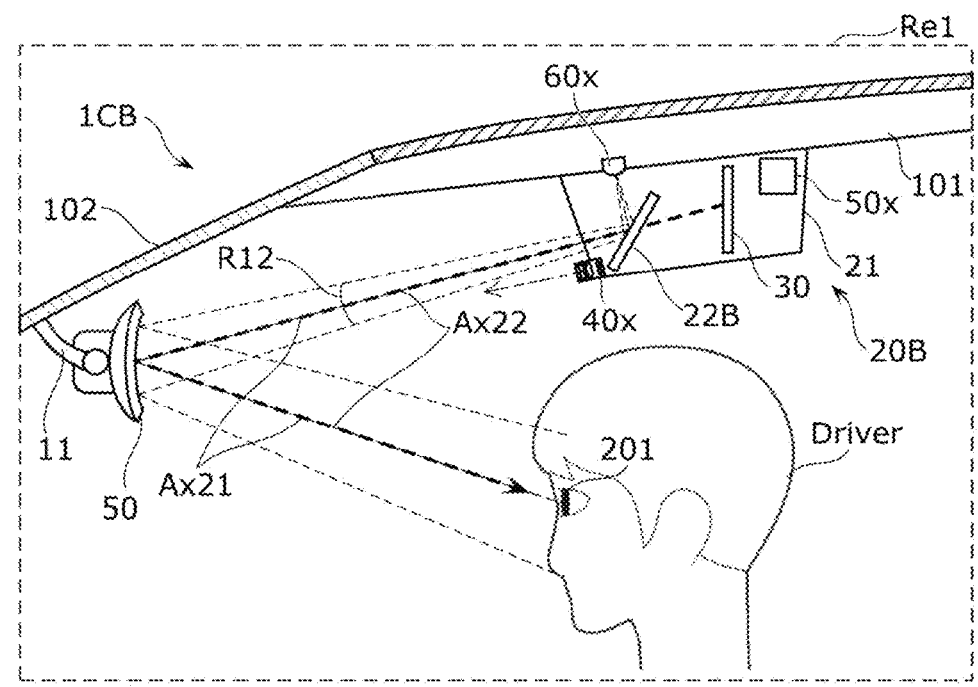
FIG. 29 is an enlarged view illustrating an enlargement of a region corresponding to region Re1 in FIG. 10, according to another example in Variation 5.

In display system 1CB according to Variation 1, as illustrated in FIG. 26, infrared light source 60x is disposed in housing 21x, and imaging unit 40x is disposed on ceiling 101. However, the configuration is not limited thereto. Infrared light source 60x may be disposed on ceiling 101, and imaging unit 40x may be disposed in housing 21x. FIG. 29 is an enlarged view illustrating an enlargement of a region corresponding to region Re1 in FIG. 10, according to another example in Variation 5.

In this manner, in the present variation, display system 1C further includes optical filter 22C, which reflects near-infrared light and transmits visible light, between display 30 and final reflective member 50, which serves as a concave mirror. Optical filter 22C is disposed in housing 21x so as to oppose infrared light source 60x, which is disposed close to ceiling 101.

Accordingly, infrared light source 60x, which emits a large amount of heat, can be disposed on ceiling 101. This makes it easier for heat produced by infrared light source 60x to be dissipated by ceiling 101, which has a high thermal capacity. In other words, in display system 1C, ceiling 101 can be used like a heat sink to dissipate the heat produced by infrared light source 60x. Accordingly, by keeping housing 21x from reaching high temperatures, degradation of display 30 disposed in housing 21x can be suppressed.

Embodiment 3

(1) Configuration

Figure 30A:
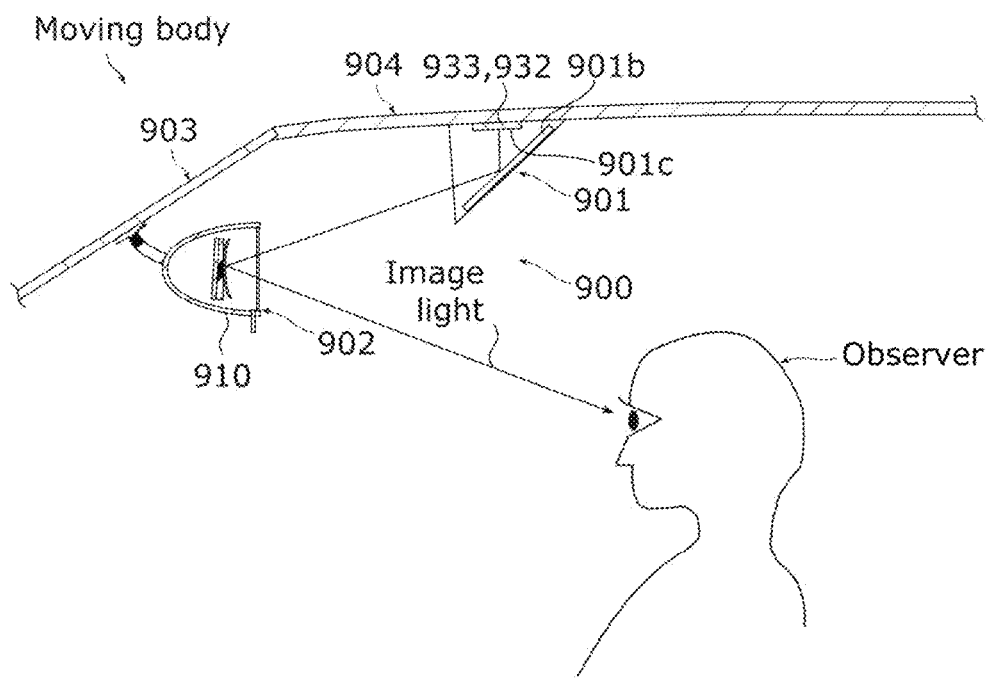
FIG. 30A is a general explanatory diagram illustrating a display system according to Embodiment 3, and illustrates an example of image light being incident on and reflected by a room mirror.
Figure 30B:
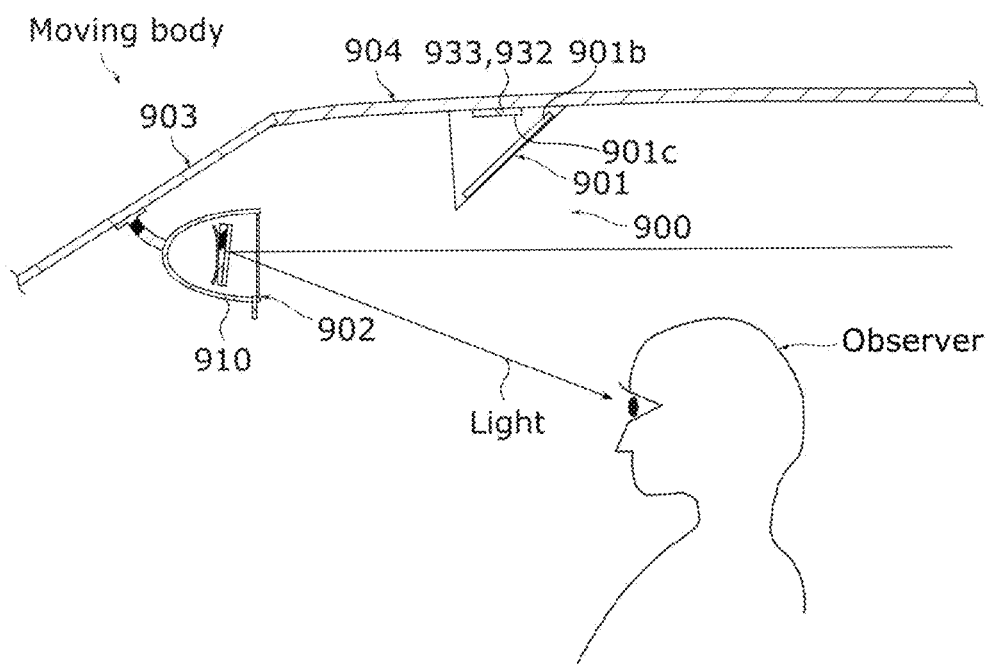
FIG. 30B is a general explanatory diagram illustrating a display system according to Embodiment 3, and illustrates an example of light behind of a moving body being incident on and reflected by a room mirror.

FIG. 30A is a general explanatory diagram illustrating display system 900 according to Embodiment 3 of the present disclosure, and illustrates an example of image light being incident on and reflected by room mirror 902. FIG. 30B is a general explanatory diagram illustrating display system 900 according to Embodiment 3 of the present disclosure, and illustrates an example of light from behind a moving body being incident on and reflected by room mirror 902.

As illustrated in FIG. 30A and FIG. 30B, display system 900 is installed in a moving body, and is disposed, for example, on ceiling 904 of a main body of the moving body, on windshield 903 toward ceiling 904 side, or the like. Display system 900 is driven by AC power obtained from the moving body. The moving body may be a vehicle such as an automobile, a ship, an aircraft, or the like. In the present embodiment, an automobile is used as the moving body.

Display system 900 is configured so that an observer can see objects present behind the moving body. Specifically, display system 900 displays an image captured by imaging unit 905, which is installed in the moving body and will be described later. Display system 900 also shows objects present behind the moving body using light incident from behind the moving body. In other words, display system 900 also functions as a rearview mirror. The observer is a driver, passenger, or the like in the moving body.

Display system 900 has a plurality of operating modes. Of the plurality of operating modes, a first mode is a mode in which image light emitted from display surface 901c of display device 901 is projected onto double-sided reflective optical member 920, which will be described later, and an image represented by the projected image light is displayed on double-sided reflective optical member 920 as a result. Of the plurality of operating modes, a second mode is a mode in which an object behind the moving body is shown by reflecting light incident from behind the moving body.

Figure 31:
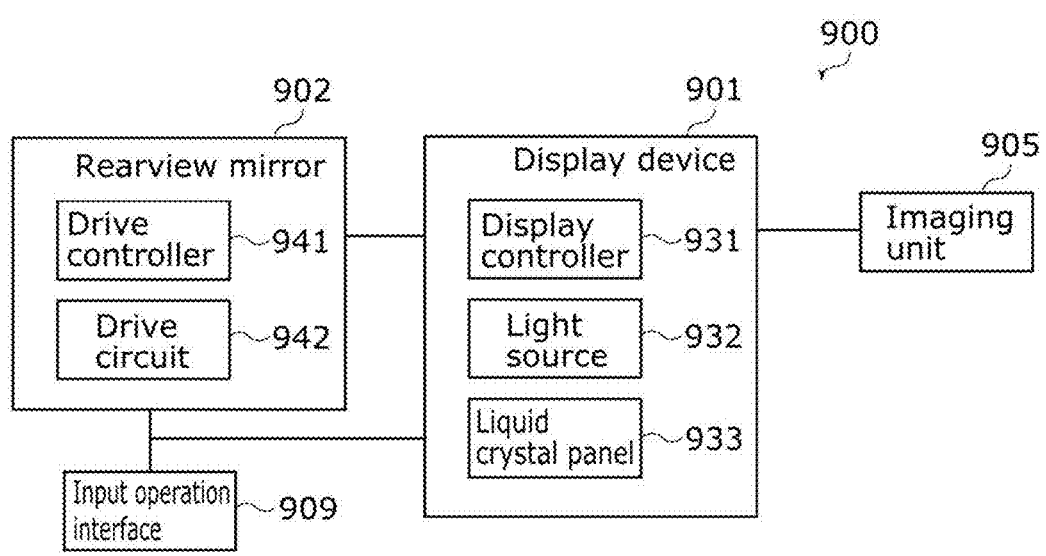
FIG. 31 is a block diagram illustrating an example of the display system according to Embodiment 3.

FIG. 31 is a block diagram illustrating an example of display system 900 according to Embodiment 3 of the present disclosure.

As illustrated in FIG. 30A, FIG. 30B, and FIG. 31, display system 900 includes imaging unit 905, display device 901, room mirror 902, and input operation interface 909.

Imaging unit 905 is mounted on the moving body so as to capture an image of the surroundings of the moving body, and particularly behind the moving body. Imaging unit 905 outputs image data of the image captured of the area behind the moving body to display device 901. Imaging unit 905 is, for example, a CMOS image sensor, and captures an image of the area behind the moving body. Imaging unit 905 is not limited to a CMOS image sensor, and may instead be an image sensor such as a CCD image sensor.

Display device 901 is disposed in an attitude at which the image captured by imaging unit 905 can be emitted toward room mirror 902, and is disposed on ceiling 904 of the main body of the moving body, with display surface 901c facing downward. Display device 901 is provided in an overhead console or the like, for example. Display device 901 emits image light that forms an image. Display device 901 may be an example of a display.

Display device 901 includes display controller 931, light source 932, and liquid crystal panel 933.

Display controller 931 controls a display state of the image by display device 901. Display controller 931 is communicably connected to imaging unit 905 via an in-vehicle network of the moving body, and obtains image data of the captured image from imaging unit 905. Display controller 931 causes an image based on the image data obtained from imaging unit 905 to be displayed in liquid crystal panel 933, i.e., to be displayed in display surface 901c of display device 901. Display controller 931 may be an example of a controller.

Additionally, when a second mode has been executed (when double-sided reflective optical member 920 has taken on a second attitude, which will be described later), display controller 931 stops the light emitted from light source 932. In other words, display controller 931 controls the light emitted from light source 932 to turn on and off in accordance with a state of switching between the first mode and the second mode.

Light source 932 is a light-emitting module used as a backlight of liquid crystal panel 933. Light source 932 is a sidelight-type light source 932 using solid-state light-emitting elements such as light-emitting diodes or laser diodes, and is disposed above liquid crystal panel 933. The light emitted from light source 932 serves as the image light emitted from display surface 901c of display device 901 by passing through liquid crystal panel 933 and being emitted from display surface 901c of display device 901.

Liquid crystal panel 933 is a liquid crystal element disposed below light source 932. For example, liquid crystal panel 933 is a light-transmissive or semi-transmissive TFT liquid crystal (Thin Film Transistor Liquid Crystal Display) or the like. In liquid crystal panel 933, light is emitted from light source 932 disposed on the rear side of liquid crystal panel 933, and an emission surface (i.e., display surface 901*c* of display device 901), which is on a side opposite optical member 901*b*, emits light as a result of the transmitted light. Liquid crystal panel 933 causes the image light, which indicates images including numbers, letters, graphics, or the like, to be emitted from liquid crystal panel 933 in response to control instructions from display controller 931. Liquid crystal panel 933 may be an example of a display.

Display device 901 displays the image captured by imaging unit 905 in display surface 901*c*, and image light indicating the image is emitted from display surface 901*c*. The image light emitted from display surface 901*c* is reflected by optical member 901*b* and is then incident on room mirror 902, and is then reflected by room mirror 902 and enters an eye of an observer. In other words, the observer can see the image expressed by the image light emitted to room mirror 902 based on the image displayed in display surface 901*c* of display device 901.

Room mirror 902 is, for example, a rearview mirror of the moving body, is disposed on a ceiling 904 side of windshield 903 for viewing the area behind the moving body, and is attached at a position in view of the observer seated in a front seat. Room mirror 902 is attached to windshield 903 of the moving body by mounting bracket 911, which will be described later. To enable the observer to adjust room mirror 902 to a preferred position and angle, room mirror 902 includes a hinge, which is not shown, between housing 910, which will be described later, and mounting bracket 911. Note that room mirror 902 may be provided in an overhead console or the like, and is not limited to windshield 903.

By adjusting the attitudes of double-sided reflective optical member 920 and anti-glare mirror 925, which will be described later, room mirror 902 can execute a plurality of operating modes.

Figure 32A:
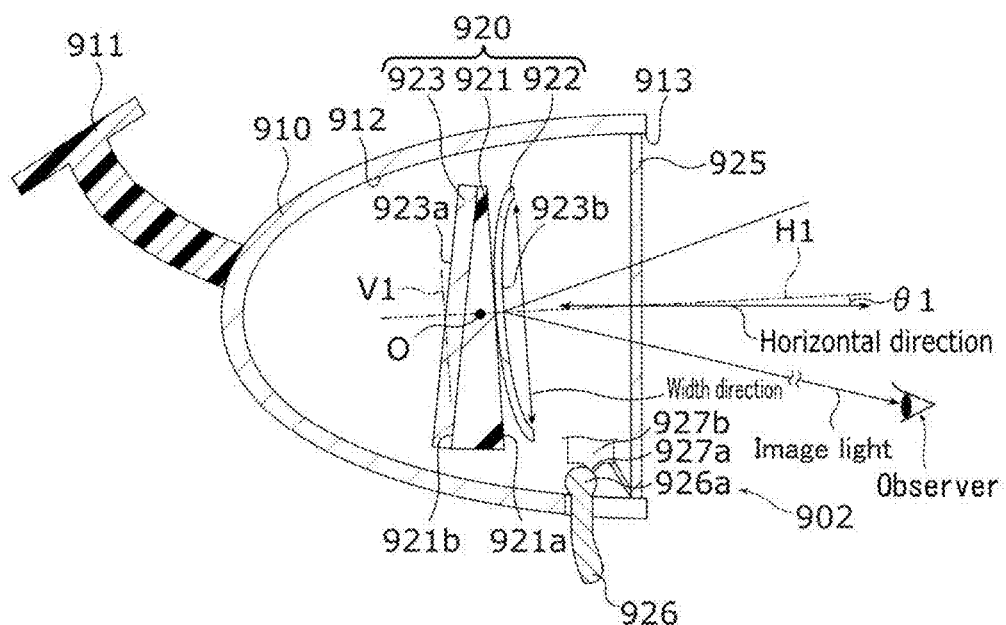
FIG. 32A is a general explanatory diagram illustrating the display system according to Embodiment 3, and illustrates an example of image light being incident on and reflected by a room mirror when a double-sided reflective optical member is put in a first state.
Figure 32B:
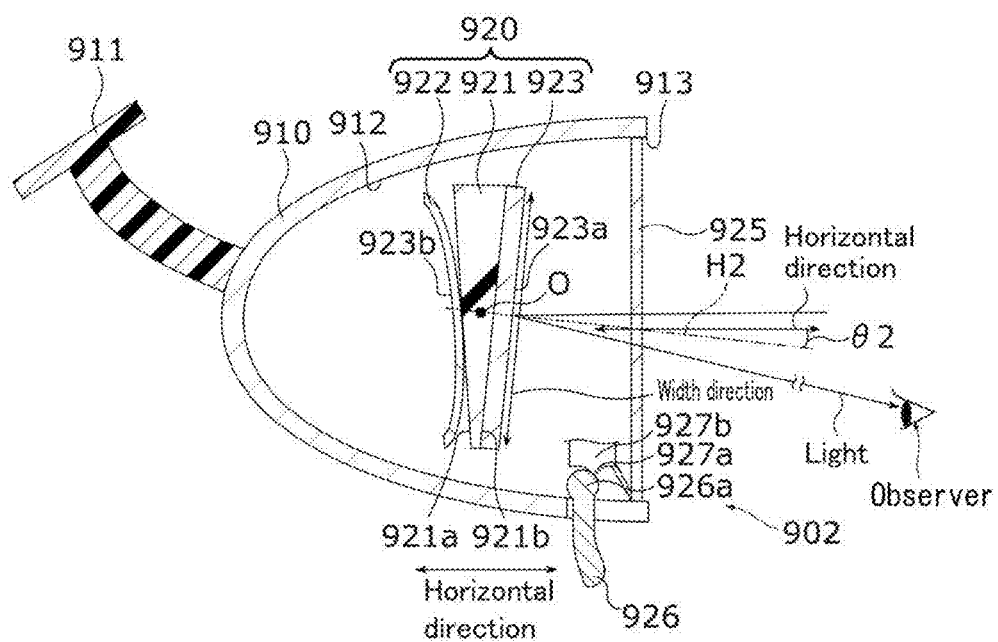
FIG. 32B is a general explanatory diagram illustrating the display system according to Embodiment 3, and illustrates an example of light behind a moving body being incident on and reflected by a room mirror when a double-sided reflective optical member is put in a second state.

FIG. 32A is a general explanatory diagram illustrating display system 900 according to Embodiment 3 of the present disclosure, and illustrates an example of image light being incident on and reflected by room mirror 902 when double-sided reflective optical member 920 is put in a first state. Note that for the sake of simplicity, FIG. 32A illustrates only the observer's eye. The same applies in FIG. 32B and on as well. FIG. 32B is a general explanatory diagram illustrating display system 900 according to Embodiment 3 of the present disclosure, and illustrates an example of light from behind the moving body being incident on and reflected by room mirror 902 when double-sided reflective optical member 920 is put in a second state.

As illustrated in FIG. 30A to FIG. 32B, room mirror 902 includes housing 910, double-sided reflective optical member 920, anti-glare mirror 925, drive controller 941, and drive circuit 942.

As illustrated in FIG. 32A and FIG. 32B, housing 910 is a receptacle body constituted by a molded component or the like formed from synthetic resin, for example. Housing 910 has housing space 912 inside, and when the moving body is a vehicle, is formed as a parallelepiped which is open on an observer side and is longer in a vehicle width direction. Housing 910 is formed having a shape so that when housing 910 is attached to the moving body, a dimension in the left-right direction of the moving body (the vehicle width direction) is larger than a dimension in the up-down direction and a dimension in the front-rear direction. Housing 910 contains double-sided reflective optical member 920 and anti-glare mirror 925 within housing space 912.

Housing 910 holds double-sided reflective optical member 920 in a rotatable state. Housing 910 holds double-sided reflective optical member 920 in a rotatable state within housing space 912 in a state in which double-sided reflective optical member 920 is contained within housing space 912. Specifically, side walls on both sides of housing 910 in the vehicle width direction hold a double-sided reflective optical member 920 so as to be capable of rotating about axis center O. Housing 910 may be an example of a second housing.

Additionally, housing 910 holds anti-glare mirror 925, which is disposed closer to the observer than double-sided reflective optical member 920, i.e., on an opening 913 side. Specifically, housing 910 holds anti-glare mirror 925 within housing space 912, in a position where anti-glare mirror 925 does not interfere with the rotation of double-sided reflective optical member 920 within housing space 912.

Double-sided reflective optical member 920 includes support body 921, concave mirror 922, and flat mirror 923.

Support body 921 has one surface 921*a* that supports concave mirror 922, and other surface 921*b*, which is on the side opposite from one surface 921*a* and which supports flat mirror 923. One surface 921*a* of support body 921 is tilted relative to other surface 921*b*, and support body 921 is wedge-shaped when viewed along the direction of the axis center O of support body 921 (the vehicle width direction). In the present embodiment, support body 921 is in the form of a flat plate which is longer in the vehicle width direction, and one edge in the width direction is thinner than another edge. In the present embodiment, support body 921 is in the form of a flat plate which is longer in the vehicle width direction.

Support body 921 supports concave mirror 922 and flat mirror 923 so that concave mirror 922 and flat mirror 923 overlap with each other. In other words, support body 921 is interposed between concave mirror 922 and flat mirror 923. Specifically, concave mirror 922 is fixed to one surface 921*a* of support body 921, and flat mirror 923 is fixed to other surface 921*b* of support body 921, so that flat mirror surface 923*a* is tilted relative to plane V1 indicated in FIG. 32A, which is orthogonal to normal direction H1 of a center of concave mirror surface 923*b*. In other words, support body 921 supports flat mirror 923 and concave mirror 922 so that a width direction of concave mirror 922 is tilted relative to flat mirror 923.

Support body 921 has a pair of cylindrical projections, which are not shown, the projections being supported by the side walls on both sides of housing 910 in the vehicle width direction while supporting concave mirror 922 and flat mirror 923. The pair of projections are rotatably supported by the side walls by being supported by one of the two side walls in the vehicle width direction, respectively.

A gear mechanism which is automatically rotationally controlled by drive circuit 942 illustrated in FIG. 31 is connected to the pair of projections. The pair of projections rotate about axis center O as a result of drive circuit 942 illustrated in FIG. 31 driving and controlling the gear mechanism, and thus double-sided reflective optical member 920 also rotates.

Concave mirror surface 923*b*, on which the image light emitted from display surface 901*c* of display device 901 is directly or indirectly incident, and which reflects the incident image light, is formed in concave mirror 922. "Directly incident" refers to the image light emitted from display surface 901*c* being directly incident on concave mirror surface 923*b* without traversing optical member 901*b* illustrated in FIG. 30A, whereas "indirectly incident" refers to the image light emitted from display surface 901*c* being incident on concave mirror surface 923b through optical member 901b illustrated in FIG. 30A. Optical member 901b of FIG. 30A is an light-reflecting member such as a mirror or the like that reflects light, a light guiding member that guides light, or the like. When concave mirror 922 faces the opening 913 side of housing 910, i.e., toward the observer, concave mirror surface 923b reflects the image light emitted from display surface 901c of display device 901 toward the observer.

Concave mirror 922 is disposed overlapping with support body 921 so that concave mirror surface 923b faces in the direction opposite from support body 921, and is supported by one surface 921a of support body 921. Specifically, concave mirror 922 is curved in an arc shape along axis center O, and a central part of concave mirror 922 is supported by and fixed to one surface 921a of support body 921 so that both edges of concave mirror 922 are separated from one surface 921a of support body 921 in the width direction.

Flat mirror surface 923a is formed in flat mirror 923 for reflecting an object located behind the moving body by reflecting light incident from behind the moving body. When flat mirror 923 faces the opening 913 side of housing 910, i.e., toward the observer, flat mirror 923 reflects the light incident from behind the moving body toward the observer.

An attitude of double-sided reflective optical member 920 can be switched between a first state and a second state by rotating double-sided reflective optical member 920.

The first state is a state in which, when the first mode is executed, concave mirror 922 of double-sided reflective optical member 920 faces the opening 913 side of housing 910, i.e., faces the observer. The first state can also be called an attitude (first attitude) of double-sided reflective optical member 920. In the first state, the image light emitted from display surface 901c of display device 901 is directly or indirectly incident on concave mirror surface 923b, and the incident image light is reflected toward the observer's eye.

The second state is a state in which, when the second mode is executed, flat mirror 923 of double-sided reflective optical member 920 faces the opening 913 side of housing 910, i.e., faces the observer. The second state can also be called an attitude (second attitude) of double-sided reflective optical member 920. In the second state, light is incident on flat mirror surface 923a from behind the moving body, and the incident light is reflected toward the observer's eye.

In other words, double-sided reflective optical member 920 is provided in housing 910 so that angle θ1 between normal direction H1 of a center of concave mirror surface 923b and a horizontal direction in the first state is different from angle θ2 between normal direction H2 of flat mirror surface 923a and the horizontal direction in the second state. Additionally, an angle between the direction in which the image light is incident on concave mirror surface 923b and the direction in which the light is reflected by concave mirror surface 923b toward the observer in the first state is greater than an angle between the direction in which the light from behind the moving body is incident on flat mirror surface 923a and the direction in which the light is reflected by flat mirror surface 923a toward the observer in the second state.

Anti-glare mirror 925 is held by housing 910, closer to the observer than double-sided reflective optical member 920, so as to cover opening 913 in housing 910.

Figure 32C:
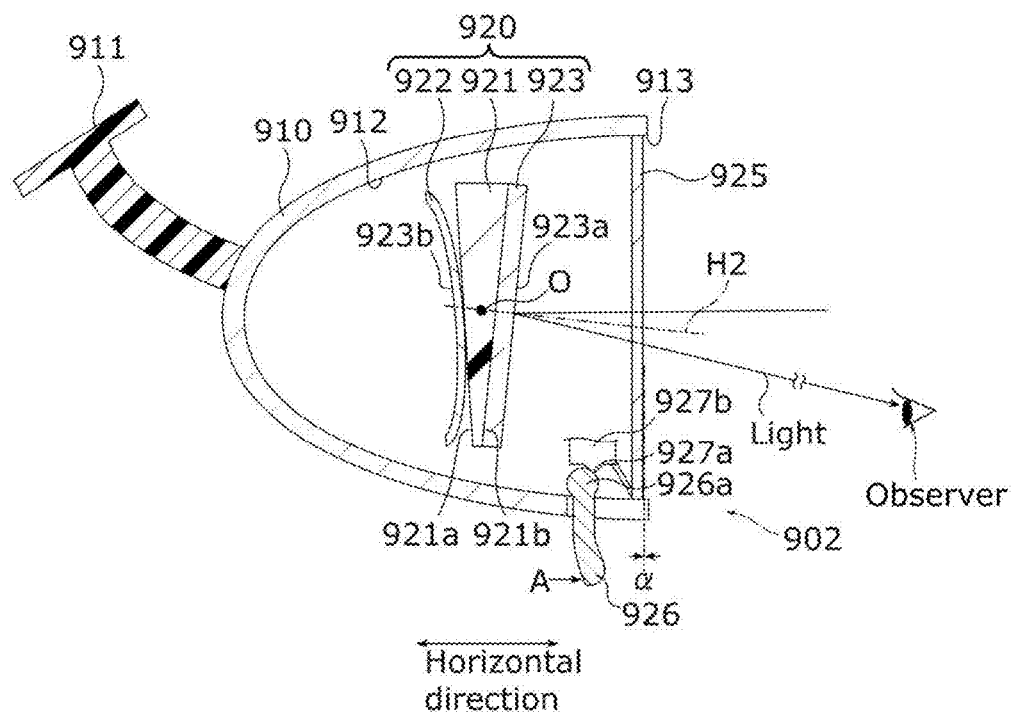
FIG. 32C is a general explanatory diagram illustrating the display system according to Embodiment 3, and illustrates an example of a state in which an anti-glare function is not being executed when a double-sided reflective optical member is in a second state.
Figure 32D:
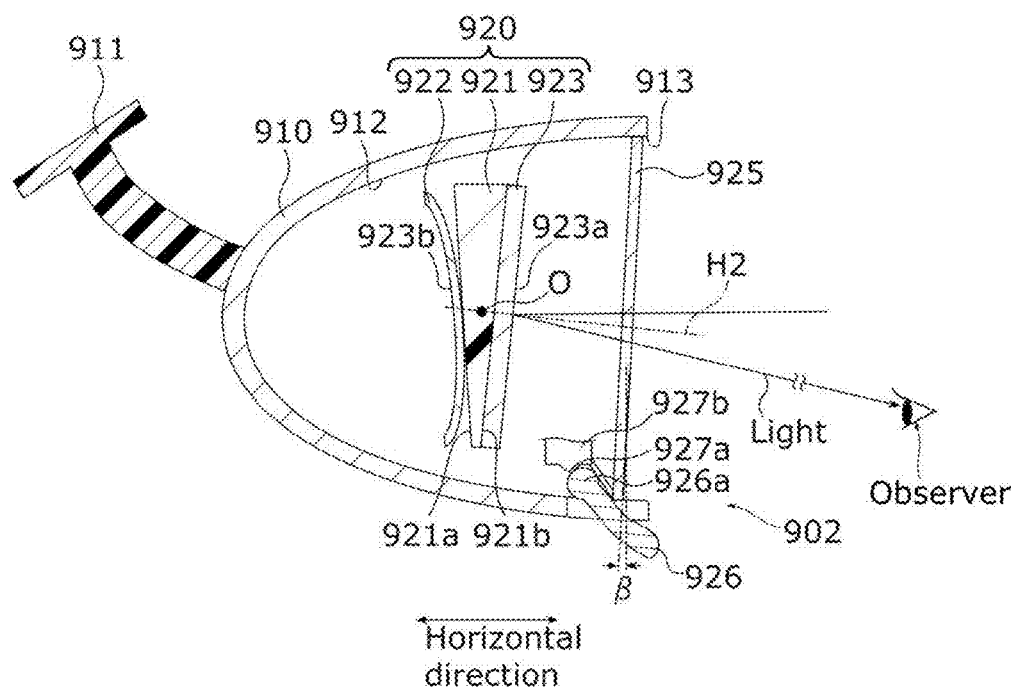
FIG. 32D is a general explanatory diagram illustrating the display system according to Embodiment 3, and illustrates an example of a state in which an anti-glare function is being executed when a double-sided reflective optical member is in a second state.

FIG. 32C is a general explanatory diagram illustrating display system 900 according to Embodiment 3 of the present disclosure, and illustrates an example of a state in which an anti-glare function is not being executed when double-sided reflective optical member 920 is in the second state. FIG. 32D is a general explanatory diagram illustrating display system 900 according to Embodiment 3 of the present disclosure, and illustrates an example of a state in which an anti-glare function is being executed when double-sided reflective optical member 920 is in the second state.

As illustrated in FIG. 32C and FIG. 32D, anti-glare mirror 925 changes a reflection angle of light by being rotated by an anti-glare mirror driving mechanism in response to an operation of rotating lever part 926. For example, the anti-glare mirror driving mechanism includes lever part 926, shaft part 926a, hinge part 927a, and spring part 927b. The anti-glare mirror driving mechanism sets the angle of anti-glare mirror 925 (a light reflection angle) in response to lever part 926 being manipulated.

Specifically, when anti-glare mirror 925 is in an angle α position, rotating lever part 926 in the direction of arrow A causes shaft part 926a to rotate while pushing hinge part 927a upward against a spring force of spring part 927b. At this time, shaft part 926a moves relatively toward windshield 903 using hinge part 927a as a fulcrum, and a lower part of anti-glare mirror 925 also moves to the rear in the same manner. As a result, anti-glare mirror 925 tilts, and anti-glare mirror 925 takes on an angle β position.

It may also be made possible to execute the anti-glare function of anti-glare mirror 925 only when double-sided reflective optical member 920 is in the second state.

Note that the means for changing the angle of anti-glare mirror 925 is not limited to that described above, and for example, the configuration may be such that a tilt of housing 910 is changed by manipulating lever part 926. In this case, the attitude of double-sided reflective optical member 920 is also adjusted so that double-sided reflective optical member 920 is not affected.

As illustrated in FIG. 30A to FIG. 32D, drive controller 941 executes a plurality of operating modes by controlling drive circuit 942. In the present embodiment, drive controller 941 can execute a desired one of the first mode and the second mode as the plurality of operating modes. Drive controller 941 may be an example of a controller.

For example, drive controller 941 switches between the first state and the second state by controlling drive circuit 942. Specifically, upon obtaining a control instruction for switching double-sided reflective optical member 920 from the first state to the second state (called a "first control instruction" hereinafter) from operation interface 909, drive controller 941 causes double-sided reflective optical member 920 to rotate so that flat mirror surface 923a of flat mirror 923 faces the observer, by controlling the rotation of double-sided reflective optical member 920 via drive circuit 942. In other words, drive controller 941 switches from the first mode to the second mode. Flat mirror surface 923a of flat mirror 923 faces the observer as a result.

Likewise, upon obtaining a control instruction for switching double-sided reflective optical member 920 from the second state to the first state (called a "second control instruction" hereinafter) from operation interface 909, drive controller 941 causes double-sided reflective optical member 920 to rotate so that concave mirror surface 923b of concave mirror 922 faces the observer, by controlling the rotation of double-sided reflective optical member 920 via drive circuit 942. In other words, drive controller 941 switches from the second mode to the first mode. Concave mirror surface 923b of concave mirror 922 faces the observer as a result.

Note that if display surface 901c of display device 901 has malfunctioned, drive controller 941 need not output the control instruction for switching double-sided reflective optical member 920 from the second state to the first state. In this case, if double-sided reflective optical member 920 is in the first state, drive controller 941 may switch to the second state. Drive controller 941 may implement this by obtaining a malfunction signal from display device 901.

Drive circuit 942 is an actuator that causes double-sided reflective optical member 920 to rotate. Drive circuit 942 controls the rotation of double-sided reflective optical member 920 by switching double-sided reflective optical member 920 between the first state and the second state in response to a control instruction obtained from drive controller 941. Upon obtaining the first control instruction, drive circuit 942 switches double-sided reflective optical member 920 from the first state to the second state by causing double-sided reflective optical member 920 to rotate about axis center O. Likewise, upon obtaining the second control instruction, drive circuit 942 switches double-sided reflective optical member 920 from the second state to the first state by causing double-sided reflective optical member 920 to rotate about axis center O.

Operation interface 909 is an input interface, which accepts input operations from the observer for executing the first mode or the second mode. Operation interface 909 outputs a control instruction based on an operation input by the observer to drive controller 941. Operation interface 909 may be, for example, a dedicated switch provided in a center console.

(2) Processing

Figure 33:
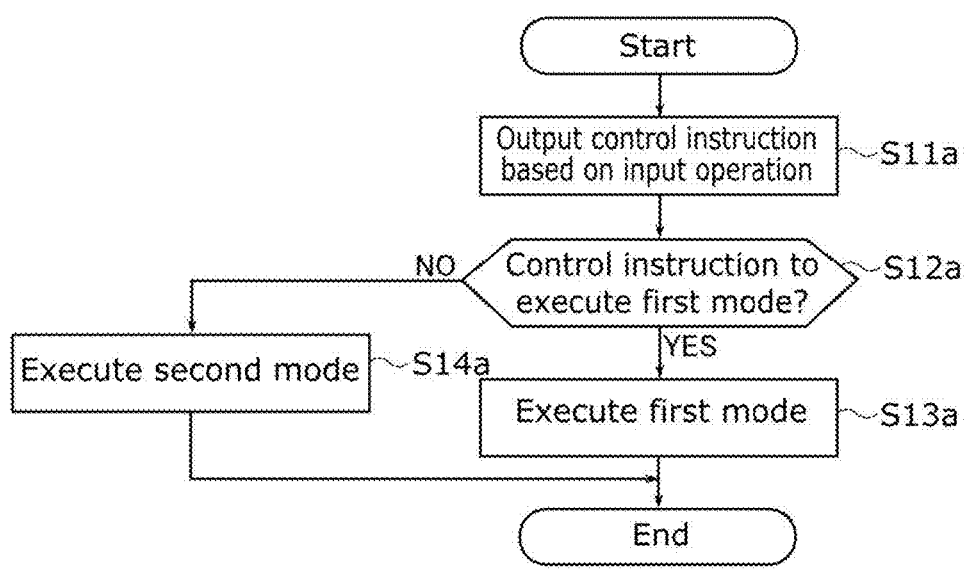
FIG. 33 is a flowchart illustrating an example of processing of a room mirror in the display system according to Embodiment 3.

FIG. 33 is a flowchart illustrating an example of processing of room mirror 902 in display system 900 according to Embodiment 3 of the present disclosure.

First, as illustrated in FIG. 33, operation interface 909 accepts an input operation from the observer for executing the first mode or the second mode. Operation interface 909 outputs a control instruction based on the input operation to drive controller 941 (S11$a$).

Next, drive controller 941 determines whether or not a control instruction for executing the first mode has been obtained (S12$a$).

When a control instruction for executing the first mode has been obtained (YES in S12$a$), drive controller 941 executes the first mode (S13$a$). For example, if the second mode is being executed, drive controller 941 switches from the second mode to the first mode. Specifically, upon obtaining the control instruction for switching double-sided reflective optical member 920 from the first state to the second state from operation interface 909, drive controller 941 controls drive circuit 942 and causes double-sided reflective optical member 920 to rotate. Upon obtaining the instruction from drive controller 941, drive circuit 942 causes double-sided reflective optical member 920 to rotate approximately 180 degrees so that concave mirror surface 923$b$ of concave mirror 922 faces the observer. Through this, double-sided reflective optical member 920 causes concave mirror surface 923$b$ of concave mirror 922 to face the observer. Display system 900 then ends the processing.

When a control instruction for executing the second mode has been obtained (NO in S12$a$), drive controller 941 executes the second mode (S14$a$). For example, if the first mode is being executed, drive controller 941 switches from the first mode to the second mode. Specifically, upon obtaining the control instruction for switching double-sided reflective optical member 920 from the first state to the second state from operation interface 909, drive controller 941 controls drive circuit 942 and causes double-sided reflective optical member 920 to rotate. Upon obtaining the instruction from drive controller 941, drive circuit 942 causes double-sided reflective optical member 920 to rotate approximately 180 degrees so that flat mirror surface 923$a$ of flat mirror 923 faces the observer. Through this, double-sided reflective optical member 920 causes flat mirror surface 923$a$ of flat mirror 923 to face the observer. Display system 900 then ends the processing.

(3) Effects

However, in a conventional display system, a picture image (image light) emitted from the display device, which is the display source, and an object far away from the observer, are displayed on a double-sided reflective optical member, which is a double-sided screen. With this double-sided reflective optical member, the concave mirror surface, which is a concave surface, and the flat mirror surface, which is a flat surface, are disposed substantially parallel to each other, and thus it is necessary to change the attitude of the double-sided reflective optical member between when the image light is displayed in the concave mirror surface and when displaying the object in the flat mirror surface. The observer may make fine adjustments to the position of the double-sided screen in order to display the image light or the object to be visible in the double-sided screen. This makes the operations difficult and complicated for the observer.

Accordingly, display system 900 according to the present embodiment includes: double-sided reflective optical member 920, which has concave mirror 922, in which concave mirror surface 923$b$ is formed, and flat mirror 923, in which flat mirror surface 923$a$ is formed and which is disposed so as to overlap with concave mirror 922; and housing 910, which holds double-sided reflective optical member 920 in a rotatable state. Additionally, the attitude of double-sided reflective optical member 920 is switched between the first state and the second state by rotating double-sided reflective optical member 920. In the first state, the image light emitted from the display surface of display device 901 is directly or indirectly incident on concave mirror surface 923$b$, and concave mirror surface 923$b$ reflects the image light toward the observer's eye. In the second state, light from outside display system 900 is incident on flat mirror surface 923$a$, and flat mirror surface 923$a$ reflects the incident light toward the observer's eye. Furthermore, double-sided reflective optical member 920 is provided in housing 910 so that an angle between normal direction H1 of a center of concave mirror surface 923$b$ and a horizontal direction in the first state is different from an angle between normal direction H2 of flat mirror surface 923$a$ and the horizontal direction in the second state.

Figure 34A:
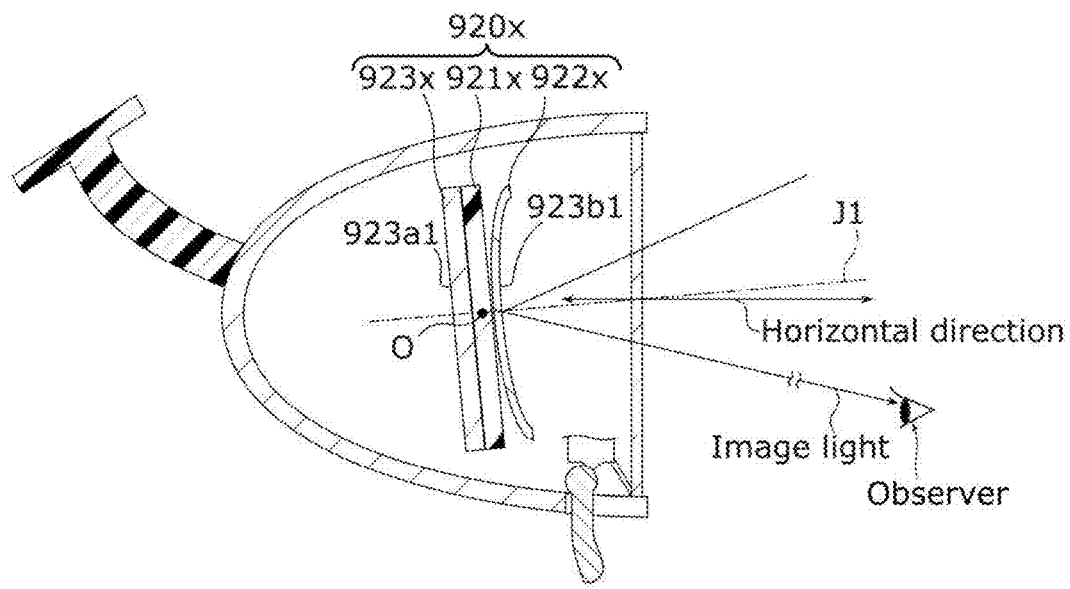
FIG. 34A is a general explanatory diagram illustrating an example of image light being incident on and reflected by a concave mirror, when a double-sided reflective optical member in which a width direction of the concave mirror and a flat mirror are stacked substantially parallel and put into a first state.
Figure 34B:
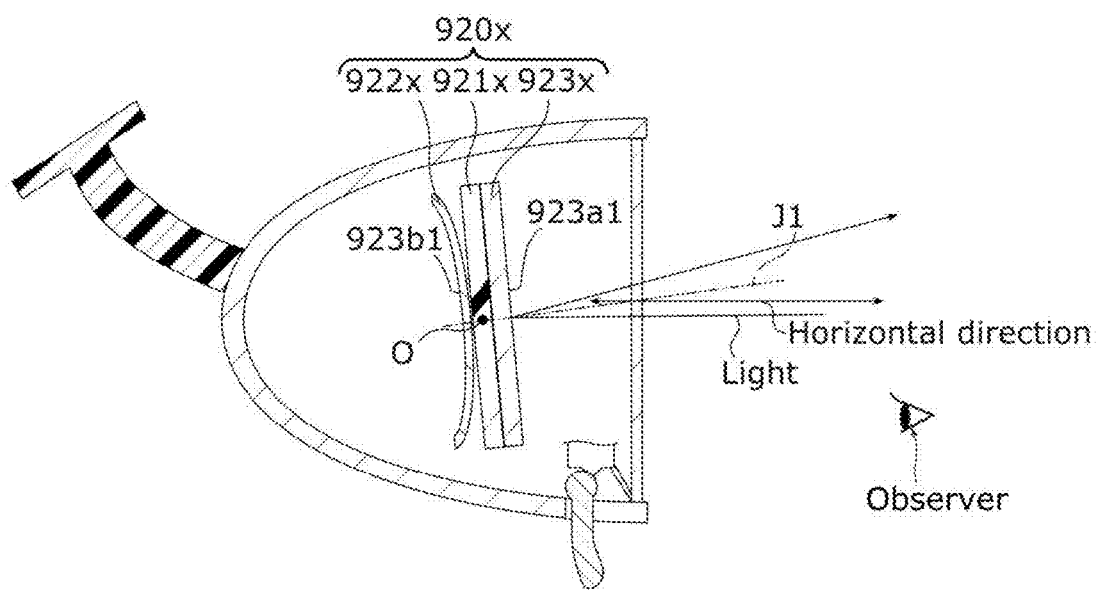
FIG. 34B is a general explanatory diagram illustrating an example of light being incident on and reflected by a flat mirror, when a double-sided reflective optical member in which a width direction of the concave mirror and the flat mirror are stacked substantially parallel and put into a first state.

FIG. 34A is a general explanatory diagram illustrating an example of image light being incident on and reflected by concave mirror 922$x$, when double-sided reflective optical member 920$x$ in which a width direction of concave mirror 922$x$ and flat mirror 923$x$ are stacked substantially parallel and put into the first state. FIG. 34B is a general explanatory diagram illustrating an example of light being incident on and reflected by flat mirror 923$x$, when double-sided reflective optical member 920$x$ in which a width direction of concave mirror 922$x$ and flat mirror 923$x$ are stacked substantially parallel and put into the first state.

As illustrated in FIG. 34A and FIG. 34B, when, for example, double-sided reflective optical member 920$x$ is used, in the first state illustrated in FIG. 34A, an angle between normal direction 31 of a center of concave mirror surface 923$b$1 and the horizontal direction tends to decrease in order to cause image light emitted from a display device provided in an overhead console or the like to be incident on concave mirror surface 923$b$1 and reflect the image light toward the observer. However, with double-sided reflective optical member 920x, if double-sided reflective optical member 920x is simply rotated 180 degrees to switch from the first state to the second state illustrated in FIG. 34B, when light from behind the moving body is incident on flat mirror surface 923a1, it is difficult to reflect that light toward the observer.

When switching from the first state to the second state in order to reflect light toward the observer, it is necessary to rotate double-sided reflective optical member 920x at an angle less than 180 degrees. In other words, if the rotation angle for switching double-sided reflective optical member 920x from the first state to the second state and the rotation angle for switching double-sided reflective optical member 920x from the second state to the first state are simply set to the same rotation angle, the image light and the object will not appear in double-sided reflective optical member 920x correctly, making it difficult for the observer to see the image light and the object. The observer may therefore make fine adjustments to the position of double-sided reflective optical member 920x by manipulating double-sided reflective optical member 920x in order to make the image light or the object visible.

Accordingly, with double-sided reflective optical member 920 of display system 900 according to the present embodiment, an angle between normal direction H1 of a center of concave mirror surface 923b and a horizontal direction in the first state is different from an angle between normal direction H2 of flat mirror surface 923a and the horizontal direction in the second state. In other words, double-sided reflective optical member 920 is provided in housing 910 in a state in which flat mirror 923 is tilted relative to the width direction of concave mirror 922. As such, in an attitude in which, for example, normal direction H1 of concave mirror surface 923b and the horizontal direction are substantially parallel, if double-sided reflective optical member 920 is rotated 180 degrees in order to switch double-sided reflective optical member 920 from the first state to the second state, the normal direction of flat mirror surface 923a of flat mirror 923 will be at an angle tilted relative to the horizontal direction. In other words, the angle between the gaze of the observer looking at concave mirror surface 923b of double-sided reflective optical member 920 and normal direction H1 of concave mirror surface 923b in the first state will be different from the angle between the gaze of the observer looking at flat mirror surface 923a and normal direction H2 of flat mirror surface 923a in the second state.

For this reason, if the angle between the width direction of concave mirror 922 and the width direction of flat mirror 923 is set in advance, the observer will be able to see an image displayed in the first state, and an object behind the moving body appearing in the second state, simply by rotating double-sided reflective optical member 920 by a predetermined amount (approximately 180 degrees, in the present embodiment).

Thus according to display system 900, the display state can easily be adjusted between the image light and light entering from outside display system 900.

Additionally, in display system 900 according to the present embodiment, double-sided reflective optical member 920 further includes support body 921. Support body 921 has one surface 921a and other surface 921b, which is a surface on the side opposite from one surface 921a. Concave mirror 922 is fixed to one surface 921a, and flat mirror 923 is fixed to other surface 921b, so that flat mirror surface 923a is tilted relative to a plane orthogonal to normal direction H1 of a center of concave mirror surface 923b.

Accordingly, if the angle between one surface 921a of support body 921 and other surface 921b relative to one surface 921a is set in advance, support body 921 can support flat mirror 923 in a state tilted relative to the width direction of concave mirror 922. Concave mirror 922 and flat mirror 923 can therefore be fixed to and supported by support body 921 at a predetermined attitude with ease.

Additionally, double-sided reflective optical member 920 can be switched between the first state and the second state simply by rotating support body 921, and the attitude of double-sided reflective optical member 920 can therefore be switched with ease.

Additionally, display system 900 according to the present embodiment includes: anti-glare mirror 925, which is disposed in housing 910 further toward a side on which light is incident than double-sided reflective optical member 920 and which is light-transmissive; and adjuster 944, which adjusts an angle of anti-glare mirror 925 relative to the vertical direction of automobile 100.

Accordingly, by adjusting the angle of anti-glare mirror 925, situations in which glare from behind the moving body, emitted toward double-sided reflective optical member 920, is reflected to the observer's eye can be suppressed. This makes it less likely for the observer to be bothered by glare, and enables the observer to confirm objects to the rear through double-sided reflective optical member 920.

Embodiment 4

(1) Configuration

Display system 900a according to Embodiment 4 will be described with reference to FIG. 35.

Figure 35:
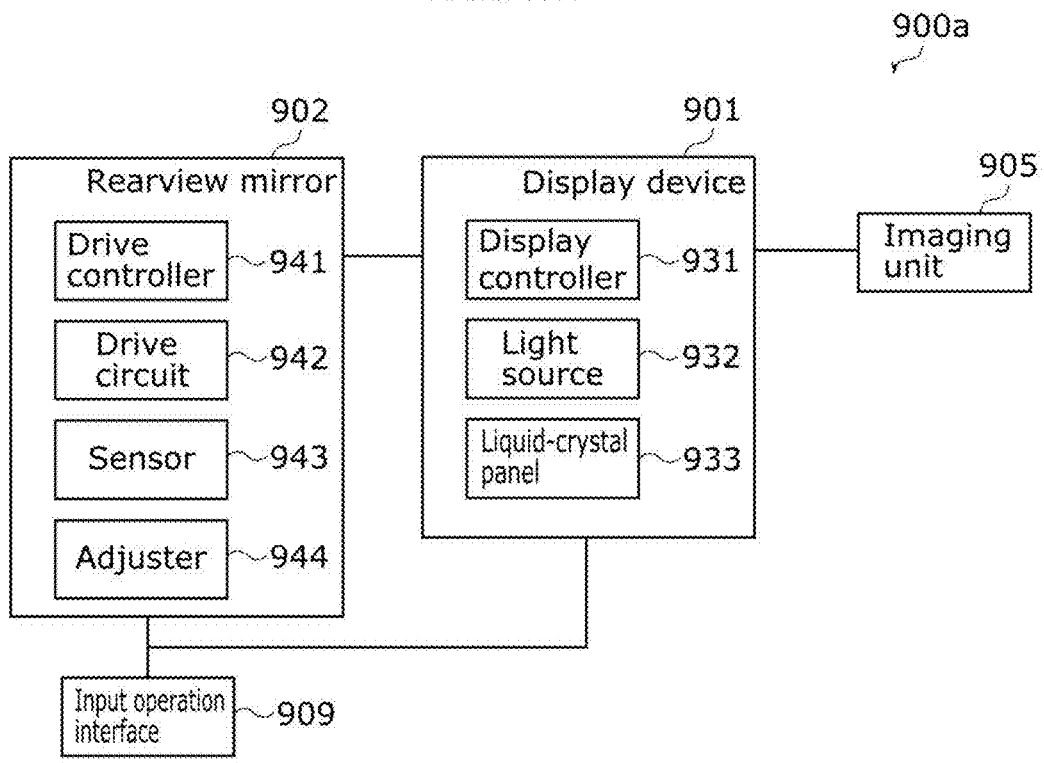
FIG. 35 is a block diagram illustrating an example of a display system according to Embodiment 4.

FIG. 35 is a block diagram illustrating an example of display system 900a according to Embodiment 4 of the present disclosure.

The present embodiment differs from Embodiment 3 in that sensor 943 controls a state of double-sided reflective optical member 920 in accordance with a brightness of light incident on room mirror 902, controls the tilt of anti-glare mirror 925, and so on. Unless specifically mentioned, other configurations in the present embodiment are the same as in Embodiment 3. Like configurations will be given like reference signs, and detailed descriptions of those configurations will be omitted.

As illustrated in FIG. 35, room mirror 902 of display system 900a includes sensor 943 and adjuster 944 in addition to drive controller 941 and drive circuit 942.

Sensor 943 is, for example, a photodetector such as a photodiode. Sensor 943 mainly detects a light amount of light incident from behind the moving body. Sensor 943 is communicably connected to drive controller 941, and outputs information indicating the detected light amount to drive controller 941.

Sensor 943 is provided in housing 910 so as to detect a light amount of light passing through opening 913 in housing 910. Sensor 943 may, for example, be disposed near opening 913 within housing space 912 of housing 910, disposed outside of housing 910, or may be provided on double-sided reflective optical member 920 (e.g., the aforementioned pair of projections). It is sufficient for sensor 943 to be substantially capable of detecting a light amount of light passing through opening 913, and thus sensor 943 may be provided in the overhead console or the like rather than housing 910.

Drive controller 941 switches double-sided reflective optical member 920 between the first state and the second state by controlling drive circuit 942 based on the information indicating the light amount obtained from sensor 943. Drive controller 941 switches from the second mode to the first mode if the light amount obtained from sensor 943 is less than a first prescribed light amount. In other words, drive controller 941 outputs the second control instruction for switching from the second mode to the first mode to drive circuit 942, and causes drive circuit 942 to switch double-sided reflective optical member 920 from the second state to the first state. As a result, concave mirror 922 takes on an attitude of facing anti-glare mirror 925, and thus an image expressed by the image light is displayed in concave mirror surface 923b. The first prescribed light amount may be an example of a prescribed light amount.

Additionally, drive controller 941 switches from the first mode to the second mode if the light amount obtained from sensor 943 is at least the first prescribed light amount. In other words, by outputting the first control instruction for switching from the first mode to the second mode to drive circuit 942, drive controller 941 causes drive circuit 942 to switch double-sided reflective optical member 920 from the first state to the second state. As a result, flat mirror 923 takes on an attitude of facing anti-glare mirror 925, and thus the object appears in flat mirror surface 923a.

Additionally, when double-sided reflective optical member 920 is in the second state, by controlling adjuster 944 when the light amount obtained from sensor 943 is at least a second prescribed light amount, which is greater than the first prescribed light amount, drive controller 941 adjusts the angle of anti-glare mirror 925 relative to the vertical direction (or flat mirror surface 923a) to execute the anti-glare function. This automatically swings anti-glare mirror 925 from the angle α position to the angle β position, as illustrated in FIG. 32C and FIG. 32D, which reduces glare. Likewise, when double-sided reflective optical member 920 is in the first state, by switching double-sided reflective optical member 920 to the second state and then controlling adjuster 944 when the light amount obtained from sensor 943 is at least the second prescribed light amount, drive controller 941 adjusts the angle of anti-glare mirror 925 relative to flat mirror surface 923a to execute the anti-glare function.

Additionally, when switching double-sided reflective optical member 920 from the second state to the first state by controlling drive circuit 942, drive controller 941 stops the anti-glare function by anti-glare mirror 925 before making the switch. Specifically, when drive controller 941 obtains the second control instruction, which is a control instruction for switching double-sided reflective optical member 920 from the second state to the first state, from operation interface 909, before switching from the second mode to the first mode, drive controller 941 outputs, to adjuster 944, a control instruction for adjusting the angle of anti-glare mirror 925 relative to the vertical direction and stopping the anti-glare function by adjusting adjuster 944. When the anti-glare function is executed in a state where concave mirror surface 923b of double-sided reflective optical member 920 is facing the observer, it is difficult for the image light incident on concave mirror surface 923b to be reflected toward the observer's eye, and thus drive controller 941 cancels the anti-glare function and switches to the first mode from the second mode. As a result, the observer can see the image expressed by the image light displayed in concave mirror 922.

Adjuster 944 is an actuator for swinging anti-glare mirror 925. Adjuster 944 adjusts the angle of anti-glare mirror 925 relative to the vertical direction. Upon receiving a control instruction for stopping the anti-glare function from drive controller 941, adjuster 944 causes anti-glare mirror 925 to swing from the angle β position to the angle α position to stop the anti-glare function of anti-glare mirror 925, as illustrated in FIG. 32C and FIG. 32D.

Additionally, upon receiving a control instruction for executing the anti-glare function from drive controller 941, adjuster 944 causes anti-glare mirror 925 to swing from the angle α position to the angle β position to execute the anti-glare function of anti-glare mirror 925, as illustrated in FIG. 32C and FIG. 32D.

Although the present embodiment describes the angle of anti-glare mirror 925 being changed automatically in accordance with the light amount, the angle of anti-glare mirror 925 may be capable of being changed manually.

(2) Processing

Figure 36A:
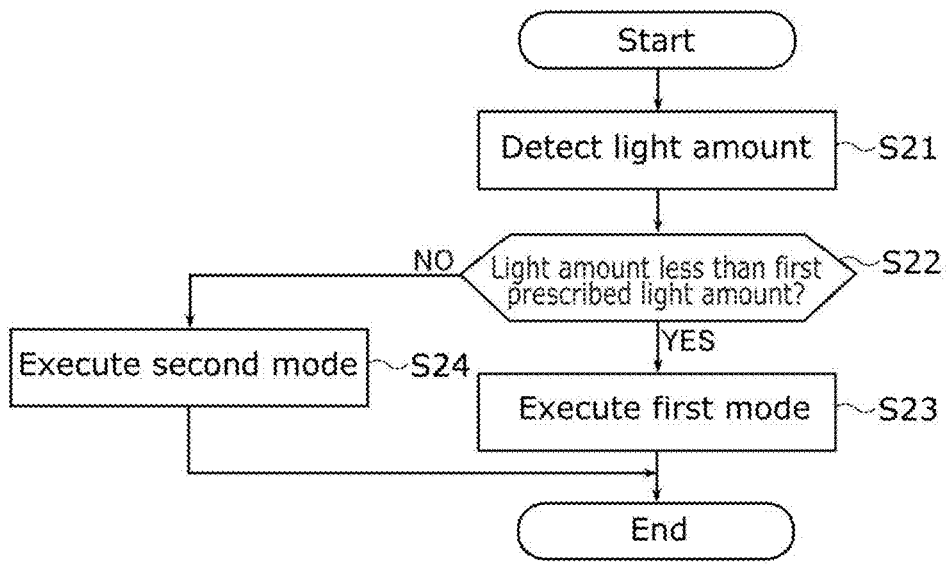
FIG. 36A is a flowchart illustrating an example of processing in which the display system executes a first mode or a second mode in accordance with a light amount, according to Embodiment 4.

FIG. 36A is a flowchart illustrating an example of processing in which display system 900a executes the first mode or the second mode in accordance with the light amount, according to Embodiment 4 of the present disclosure.

First, as illustrated in FIG. 36A, sensor 943 detects a light amount of light passing through opening 913 in housing 910, as a light amount of light incident from behind the moving body (S21). Sensor 943 outputs information indicating the detected light amount to drive controller 941.

Next, upon obtaining information indicating the light amount from sensor 943, drive controller 941 determines whether or not the light amount indicated by the obtained information is at least the first prescribed light amount (S22).

If the light amount is less than the first prescribed light amount (YES in S22), drive controller 941 executes the first mode (S23). Specifically, if the second mode is being executed, drive controller 941 switches from the second mode to the first mode. To be more specific, by outputting the second control instruction to drive circuit 942 and controlling drive circuit 942, drive controller 941 causes drive circuit 942 to switch double-sided reflective optical member 920 from the second state to the first state. Concave mirror surface 923b takes on an attitude of facing the observer as a result of drive circuit 942 switching double-sided reflective optical member 920 from the second state to the first state. The image light appears in concave mirror 922 as a result. Room mirror 902 then ends the processing.

If the light amount is at least the first prescribed light amount (NO in S22), drive controller 941 executes the second mode (S23). Specifically, if the first mode is being executed, drive controller 941 switches from the first mode to the second mode. To be more specific, by outputting the first control instruction to drive circuit 942 and controlling drive circuit 942, drive controller 941 causes drive circuit 942 to switch double-sided reflective optical member 920 from the first state to the second state. Flat mirror surface 923a takes on an attitude of facing the observer as a result of drive circuit 942 switching double-sided reflective optical member 920 from the first state to the second state. The object behind the moving body is displayed in flat mirror 923 as a result. Room mirror 902 then ends the processing.

Processing for executing the anti-glare function will be described next.

Figure 36B:
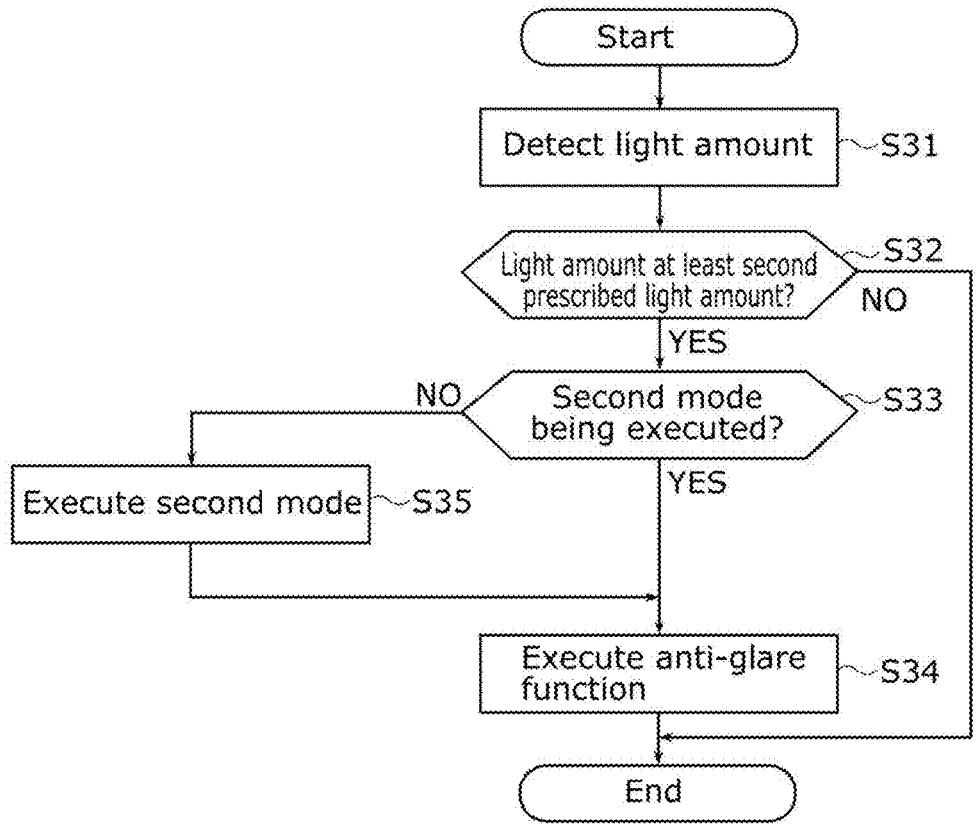
FIG. 36B is a flowchart illustrating an example of processing in which the display system executes an anti-glare function in accordance with a light amount, according to Embodiment 4.

FIG. 36B is a flowchart illustrating an example of processing in which display system 900a executes the anti-glare function in accordance with the light amount, according to Embodiment 4 of the present disclosure.

First, as illustrated in FIG. 36B, sensor 943 detects a light amount of light passing through opening 913 in housing 910, as a light amount of light incident from behind the moving body (S31). Sensor 943 outputs information indicating the detected light amount to drive controller 941.

Next, upon obtaining information indicating the light amount from sensor 943, drive controller 941 determines whether or not the light amount indicated by the obtained information is at least the second prescribed light amount (S32).

If the light amount is less than the second prescribed light amount (NO in S32), drive controller 941 ends the processing. In this case, drive controller 941 does not cause the anti-glare function to be executed.

However, if the light amount is at least the second prescribed light amount (YES in S32), drive controller 941 determines whether or not double-sided reflective optical member 920 is in the second state, i.e., whether or not the second mode is being executed (S33).

If the second mode is being executed (YES in S33), drive controller 941 causes anti-glare mirror 925 to execute the anti-glare function by outputting a control instruction for automatically executing the anti-glare function to adjuster 944 and controlling adjuster 944 (S34). Adjuster 944 causes anti-glare mirror 925 to swing from the angle α position to the angle β position, as illustrated in FIG. 32C and FIG. 32D. By executing the anti-glare function automatically in this manner, glare which bothers the observer due to the light reflected by flat mirror surface 923a can be reduced. Room mirror 902 then ends the processing.

If the first mode is not being executed (NO in S33), drive controller 941 adjusts the angle of anti-glare mirror 925 relative to flat mirror surface 923a and executes the anti-glare function by controlling adjuster 944 (S34) after switching double-sided reflective optical member 920 from the first state to the second state by controlling drive circuit 942 (executes the second mode) (S35). Specifically, by outputting the first control instruction to drive circuit 942 and controlling drive circuit 942, drive controller 941 causes drive circuit 942 to switch double-sided reflective optical member 920 from the first state to the second state. Flat mirror surface 923a takes on an attitude of facing the observer as a result of drive circuit 942 switching double-sided reflective optical member 920 from the first state to the second state. The object behind the moving body appears in flat mirror 923 as a result. Room mirror 902 then ends the processing.

(3) Effects

Display system 900a according to the present embodiment includes: sensor 943, which detects light; drive circuit 942, which switches double-sided reflective optical member 920 between the first state and the second state; and drive controller 941, which controls drive circuit 942. Drive controller 941 controls drive circuit 942 to put double-sided reflective optical member 920 into the first state when the light amount of the light detected by sensor 943 is less than the first prescribed light amount.

Accordingly, if the light amount of light entering housing 910 is less than the first prescribed light amount, drive controller 941 controls drive circuit 942 to put double-sided reflective optical member 920 into the first state, and thus the observer is less likely to be bothered by glare from outside light reflected by room mirror 902. As a result, when the observer is the driver driving the vehicle, the driver can appropriately check the area behind the vehicle. Additionally, drive controller 941 controls drive circuit 942 to put double-sided reflective optical member 920 into the second state when the light amount of the light entering housing 910 is at least the first prescribed light amount. As a result, the chance of outside light being focused when double-sided reflective optical member 920 is in the first state can be reduced.

Display system 900a according to the present embodiment further includes: anti-glare mirror 925, which is disposed in housing 910 further toward a side on which light is incident than double-sided reflective optical member 920 and which is light-transmissive; adjuster 944, which adjusts the angle of anti-glare mirror 925 relative to the vertical direction; and drive controller 941, which stops the anti-glare function by anti-glare mirror 925 in a case where the state is to be switched from the second state to the first state, before the switch is made.

Accordingly, the anti-glare function can be stopped when executing the first mode, and thus the observer can reliably see the image expressed by the image light displayed in concave mirror surface 923b of double-sided reflective optical member 920. Additionally, when, for example, the observer is the driver who drives the vehicle, no operation for stopping the anti-glare function need be performed when executing the first mode, and display system 900a therefore provides superior operability.

The present embodiment also provides similar effects as those provided by Embodiment 3.

[Variation 1]

The foregoing embodiment is merely one of various embodiments of the present disclosure. As long as the object of the present disclosure can be achieved, various changes can be made on the foregoing embodiment in accordance with the design or the like. The present variation differs from Embodiment 4 in that sensor 943 is proximity sensor 943. Unless specifically mentioned, other configurations in the present embodiment are the same as in Embodiment 4. Like configurations will be given like reference signs, and detailed descriptions of those configurations will be omitted. As such, the present variation will be described mainly with reference to FIG. 35.

Sensor 943 is proximity sensor 943, which detects an object near display system 900a. Sensor 943 detects a distance from sensor 943 to the object, and outputs distance information indicating the detected distance to drive controller 941. Although the present embodiment describes an example in which a proximity sensor is an example of sensor 943 and operations are performed with respect to a prescribed distance serving as a detection area, sensor 943 may be a detection sensor that detects the presence of an object within a predetermined detection area (the detection sensor will be described later in Embodiment 8).

Drive controller 941 switches double-sided reflective optical member 920 between the first state and the second state by controlling drive circuit 942 based on the distance information obtained from sensor 943. Drive controller 941 switches from the second mode to the first mode if the distance indicated by the distance information obtained from sensor 943 is at least the prescribed distance. In other words, by outputting the second control instruction for switching from the second mode to the first mode to drive circuit 942, drive controller 941 controls drive circuit 942 to put double-sided reflective optical member 920 in the first state, i.e., causes drive circuit 942 to switch double-sided reflective optical member 920 from the second state to the first state. As a result, concave mirror 922 takes on an attitude of facing anti-glare mirror 925, and thus an image expressed by the image light is displayed in concave mirror surface 923b.

Additionally, drive controller 941 switches from the first mode to the second mode if the distance indicated by the distance information obtained from sensor 943 is less than the prescribed distance (also referred to as being "within the prescribed distance"). In other words, by outputting the first control instruction for switching from the first mode to the second mode to drive circuit 942, drive controller 941 causes drive circuit 942 to switch double-sided reflective optical member 920 from the first state to the second state. As a result, flat mirror 923 takes on an attitude of facing anti-glare mirror 925, and thus the object appears in flat mirror surface 923*a*.

Note that when sensor 943 is the aforementioned detection sensor, drive controller 941 may switch between the first mode and the second mode depending on whether or not an object is present within the detection area. For example, if the information obtained from sensor 943 is information indicating that an object is present (or during a period in which information indicating the presence of an object continues to be obtained), drive controller 941 switches from the first mode to the second mode. On the other hand, if the information obtained from sensor 943 is information indicating that an object is not present (or if information indicating the presence of an object is not obtained), drive controller 941 switches from the second mode to the first mode.

Processing performed by display system 900*a* according to the present variation will be described next.

Figure 36C:
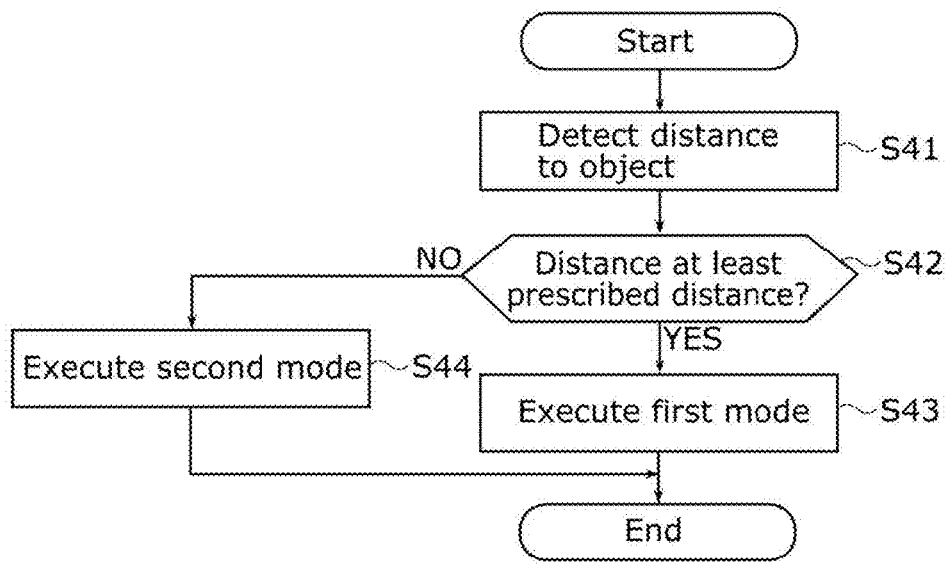
FIG. 36C is a flowchart illustrating an example of processing in which the display system executes a first mode or a second mode in accordance with distance from a sensor to an object, according to Variation 1 on Embodiment 4.

FIG. 36C is a flowchart illustrating an example of processing in which display system 900*a* executes the first mode or the second mode in accordance with the distance from sensor 943 to an object, according to Variation 1 on Embodiment 4 of the present disclosure.

First, as illustrated in FIG. 36C, sensor 943 detects an object near sensor 943, and detects the distance from sensor 943 to the object (S41). Sensor 943 outputs the distance information indicating the detected distance of the object to drive controller 941.

Next, upon obtaining the distance information from sensor 943, drive controller 941 determines whether or not the distance indicated by the obtained distance information is at least a prescribed distance (S42).

If the distance is at least the prescribed distance (YES in S42), drive controller 941 executes the first mode (S43). Specifically, if the second mode is being executed, drive controller 941 switches from the second mode to the first mode. To be more specific, by outputting the second control instruction to drive circuit 942 and controlling drive circuit 942, drive controller 941 causes drive circuit 942 to switch double-sided reflective optical member 920 from the second state to the first state. Concave mirror surface 923*b* takes on an attitude of facing the observer as a result of drive circuit 942 switching double-sided reflective optical member 920 from the second state to the first state. The image light appears in concave mirror 922 as a result. Room mirror 902 then ends the processing.

If the distance is less than the prescribed distance (NO in S42), drive controller 941 executes the second mode (S43). Specifically, if the first mode is being executed, drive controller 941 switches from the first mode to the second mode. To be more specific, by outputting the first control instruction to drive circuit 942 and controlling drive circuit 942, drive controller 941 causes drive circuit 942 to switch double-sided reflective optical member 920 from the first state to the second state. Flat mirror surface 923*a* takes on an attitude of facing the observer as a result of drive circuit 942 switching double-sided reflective optical member 920 from the first state to the second state. The object behind the moving body is displayed in flat mirror 923 as a result. Room mirror 902 then ends the processing.

Display system 900*a* according to the present variation includes: sensor 943, which detects a nearby object; drive circuit 942, which switches double-sided reflective optical member 920 between the first state and the second state; and drive controller 941, which controls drive circuit 942. When sensor 943 detects an object within a prescribed distance from sensor 943 (within a detection area), drive controller 941 controls drive circuit 942 to put double-sided reflective optical member 920 in the second state.

Accordingly, if an object near housing 910 is at least at the prescribed distance, an image expressed by image light can be displayed in double-sided reflective optical member 920 by drive controller 941 controlling drive circuit 942 to put double-sided reflective optical member 920 into the first state. The observer can therefore see the image displayed in concave mirror surface 923*b*, and can therefore appropriately check behind the vehicle. Additionally, if the object near housing 910 is at less than the prescribed distance, drive controller 941 controls drive circuit 942 to put double-sided reflective optical member 920 into the second state. As a result, the chance of an object being present at a location where outside light is focused when double-sided reflective optical member 920 is in the first state can be reduced.

[Variation 2]

The present variation differs from Embodiment 4 in that double-sided reflective optical member 920*a* includes flat mirror 923*d* and concave mirror 922 of the liquid crystal panel. Unless specifically mentioned, other configurations in the present embodiment are the same as in Embodiment 4. Like configurations will be given like reference signs, and detailed descriptions of those configurations will be omitted.

Figure 37A:
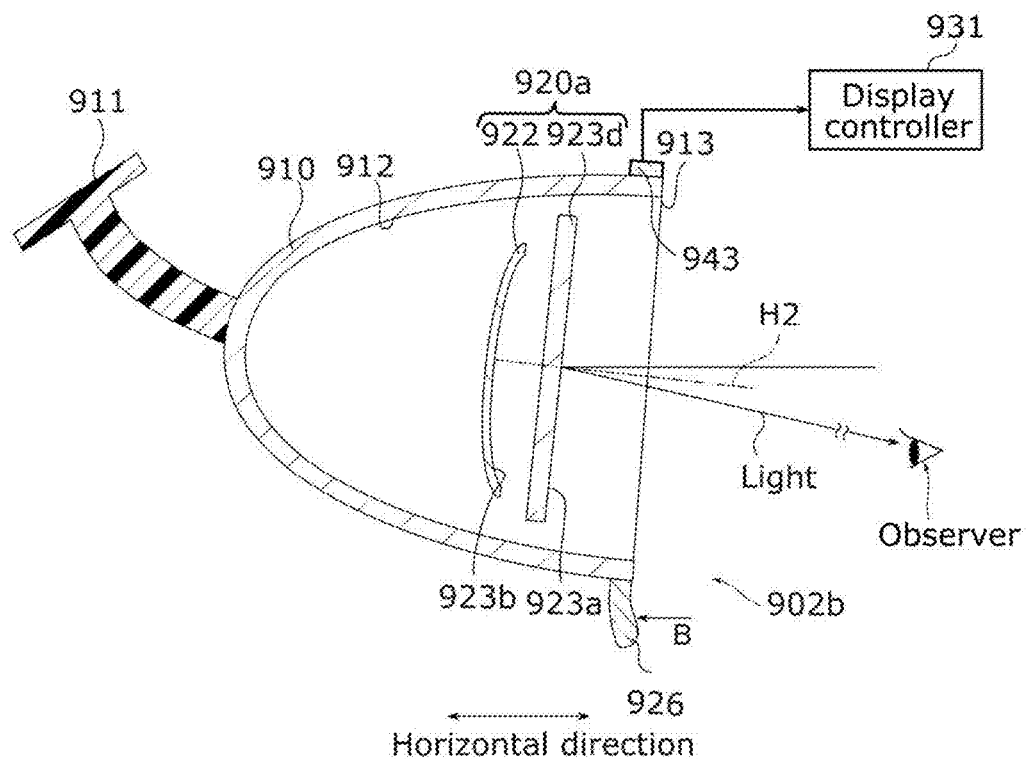
FIG. 37A is a general explanatory diagram illustrating a display system according to Variation 2 on Embodiment 4, when a flat mirror is in a reflective mode.
Figure 37B:
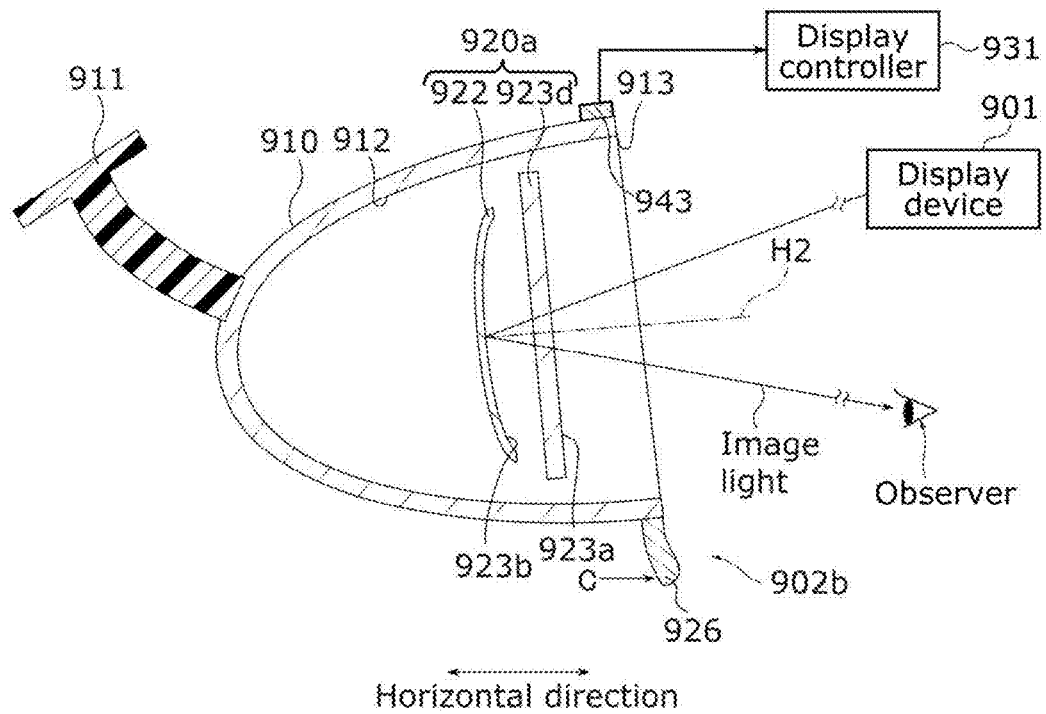
FIG. 37B is a general explanatory diagram illustrating the display system according to Variation 2 on Embodiment 4, when the flat mirror is in the reflective mode.

FIG. 37A is a general explanatory diagram illustrating the display system according to Variation 2 on Embodiment 4 of the present disclosure, when flat mirror 923*d* is in the reflective mode. FIG. 37B is a general explanatory diagram illustrating the display system according to Variation 2 on Embodiment 4 of the present disclosure, when flat mirror 923*d* is in the reflective mode.

Double-sided reflective optical member 920*a* includes concave mirror 922 and flat mirror 923*d*.

Concave mirror 922 is disposed in housing space 912 of housing 910 and fixed so that concave mirror surface 923*b* faces the opening 913 side of housing 910.

Flat mirror 923*d* is a liquid crystal panel, and by being controlled by display controller 931, executes a reflective mode in which incident light is reflected, and a transmissive mode in which image light is transmitted.

As illustrated in FIG. 37A, housing 910 can be tilted downward relative to mounting bracket 911 by pressing lever part 926 in the direction of arrow B (toward windshield 903). Thus by tilting housing 910 using a hinge, which is not shown, provided between housing 910 and mounting bracket 911, flat mirror surface 923*a* can be tilted so as to face the observer's eye. For example, display controller 931 switches flat mirror 923*d* from the transmissive mode to the reflective mode when a light amount detected by sensor 943 is at least a prescribed light amount. Specifically, display controller 931 puts flat mirror 923*d* into the reflective mode, in which light is reflected, by stopping the application of a voltage to flat mirror 923*d*. Accordingly, room mirror 902*b* can cause flat mirror surface 923*a* to reflect, to the observer's eye, light which is incident from behind the moving body.

Additionally, as illustrated in FIG. 37A, housing 910 can be tilted upward relative to mounting bracket 911 by pressing lever part 926 in the direction of arrow C (the direction opposite from the direction of arrow B; toward the observer). Thus by tilting housing 910, flat mirror surface 923a can be tilted so as to face display device 901. For example, display controller 931 switches flat mirror 923d from the reflective mode to the transmissive mode when the light amount detected by sensor 943 is less than the prescribed light amount. Specifically, display controller 931 puts flat mirror 923d into the transmissive mode, in which light is transmitted, by applying a voltage to flat mirror 923d from a power source circuit, which is not shown. Thus room mirror 902b can cause concave mirror surface 923b to reflect image light emitted from display device 901 toward the observer's eye.

Embodiments 5 to 9 described hereinafter are embodiments assuming configurations in which light-blocking member 8, holding structure 200, and the like, which will be described later, are combined with Embodiments 1 to 4.

Embodiment 5

(1) Overview

Figure 38:
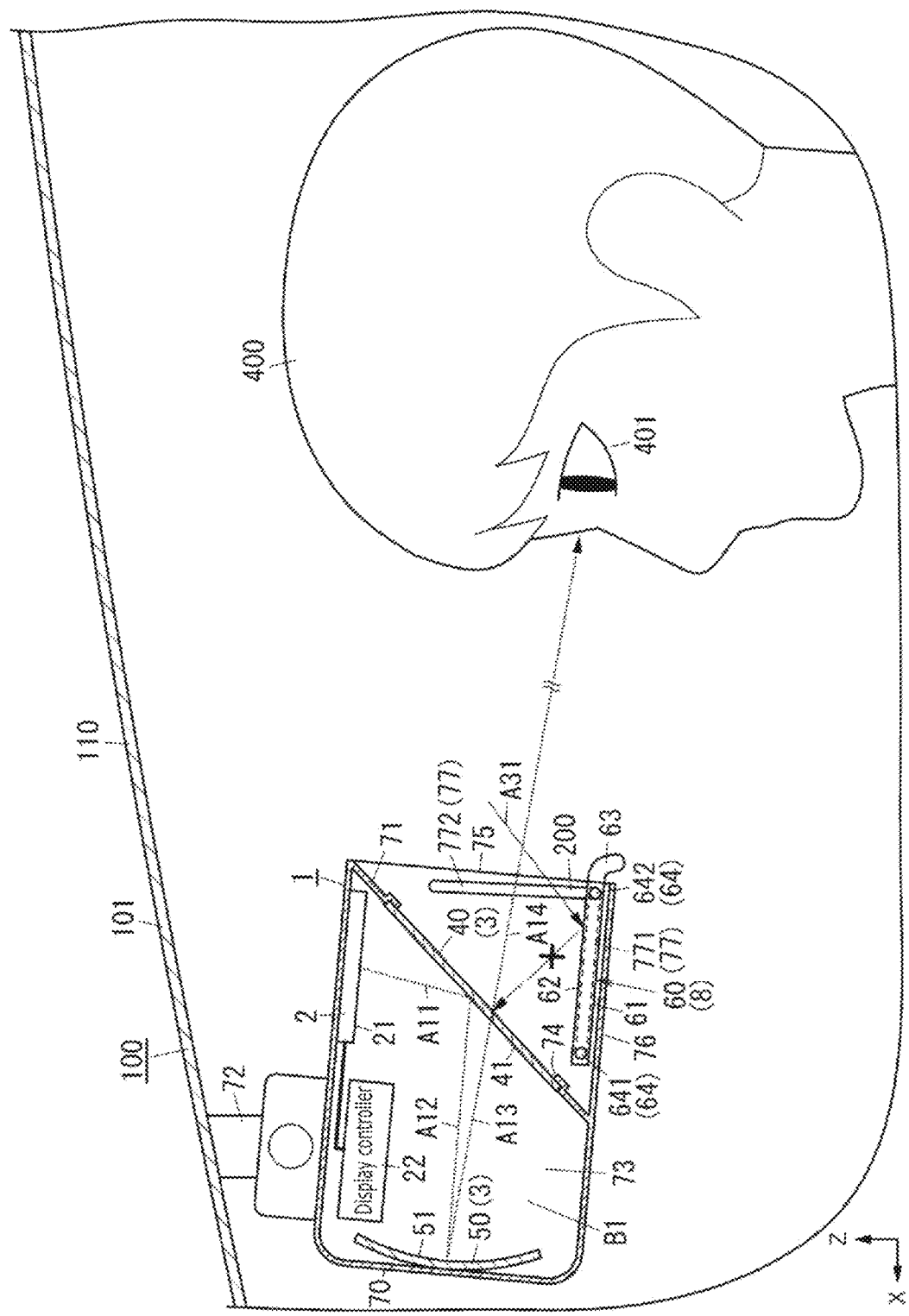
FIG. 38 is a general explanatory diagram illustrating a display system according to Embodiment 5, when a mirror member is in a first position.
Figure 39:
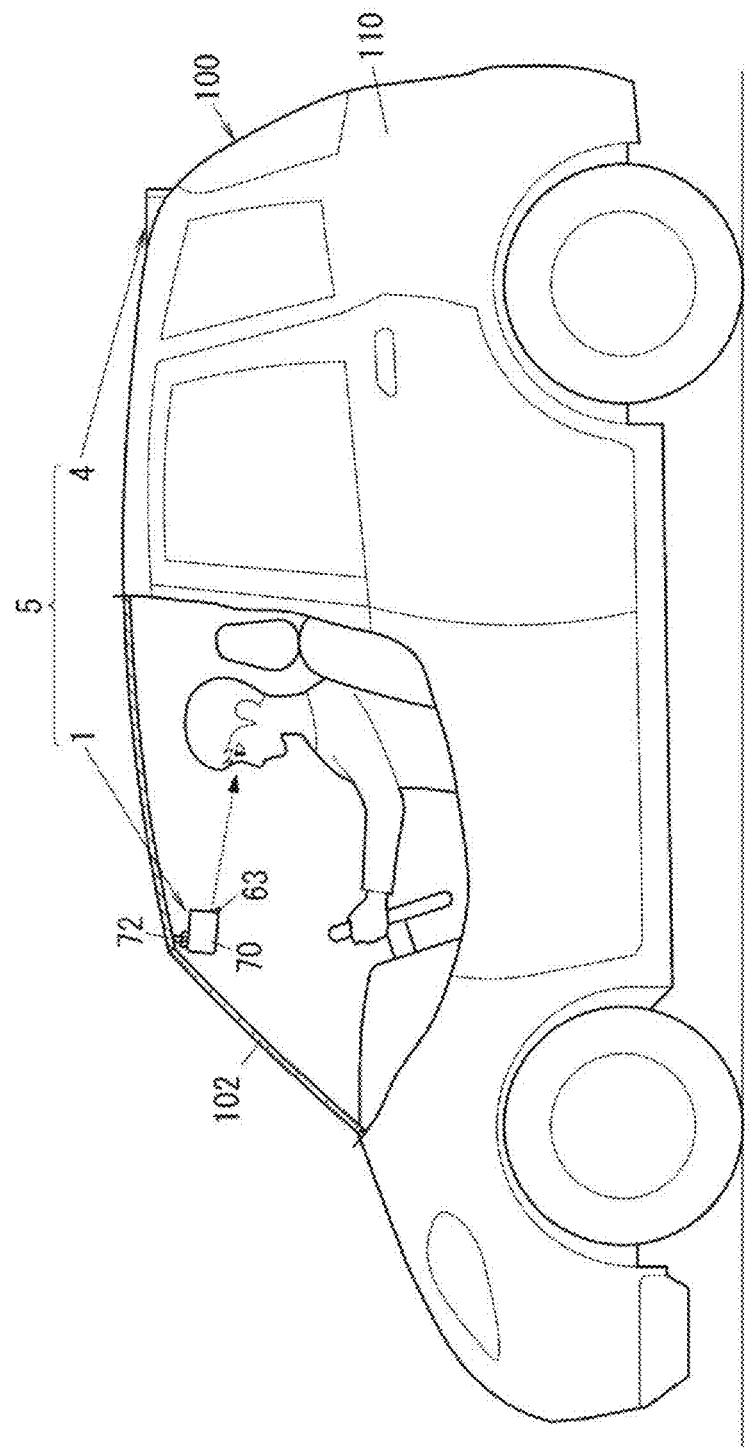
FIG. 39 is a general explanatory diagram illustrating a moving body provided with an electronic mirror system including the aforementioned display system.
Figure 40:
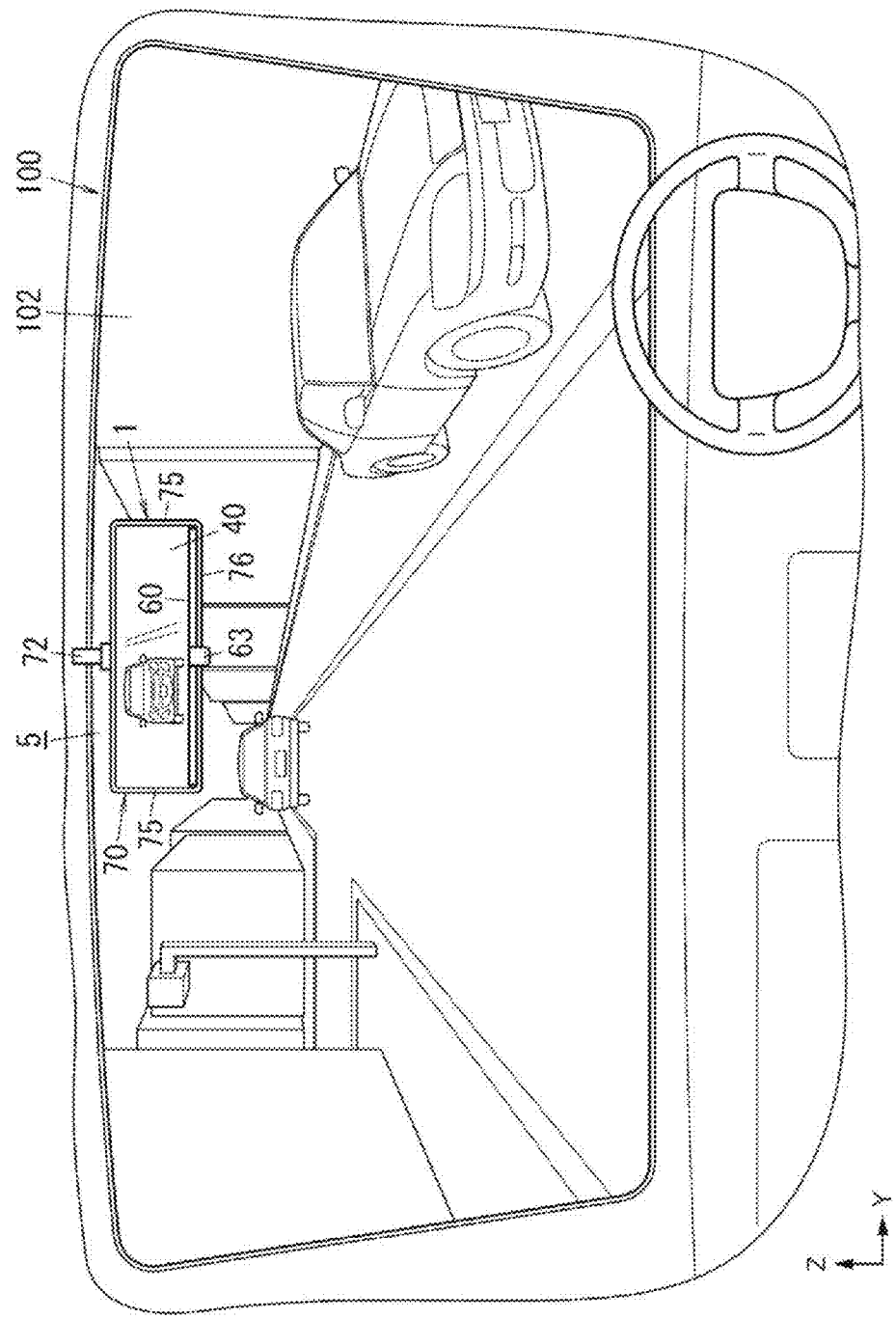
FIG. 40 is an explanatory diagram illustrating a usage state of the aforementioned electronic mirror system.

Display system 1 according to the present embodiment is used in, for example, automobile 100, which is a moving body, as illustrated in FIG. 38 to FIG. 40.

As illustrated in FIG. 38, display system 1 includes: display device 2, which has display surface 21; reflecting optical system B1, which includes at least final reflective member 50; housing 70, which holds display device 2 and reflecting optical system B1; and light-blocking member 8. Final reflective member 50 may be an example of a concave mirror. Housing 70 may be an example of a second housing.

Light emitted from display surface 21 of display device 2 is directly or indirectly incident on final reflective member 50. Final reflective member 50 reflects the incident light toward eye 401 of observer 400.

Light-blocking member 8 is held by housing 70 in one of the blocking state and the inactive state. The blocking state is a state in which light-blocking member 8 blocks at least some of light incident on final reflective member 50 or light reflected by final reflective member 50. The inactive state is a state in which the blocking state of light-blocking member 8 is inactive. Additionally, in the blocking state, light-blocking member 8 reflects outside light entering housing 70 toward eye 401 of observer 400. Housing 70 includes holding structure 200, which holds light-blocking member 8 in either one of the blocking state and the inactive state.

Here, the light emitted from display surface 21 of display device 2 being "indirectly incident" on final reflective member 50 refers to a situation in which the light emitted from display surface 21 is incident on final reflective member 50 after being reflected or refracted by at least one optical component such as a mirror, a lens, a prism, or the like.

Additionally, reflecting optical system B1 includes at least one reflective member (including final reflective member 50), and causes the light output from display surface 21 of display device 2 to enter eye 401 of observer 400 after being reflected at least once by the at least one reflective member. Final reflective member 50 is a reflective member that, of the at least one reflective members in reflecting optical system B1, reflects light last, and causes the light to enter eye 401 of observer 400.

Additionally, the "holding" of light-blocking member 8 by holding structure 200 includes a state in which holding structure 200, which holds at least light-blocking member 8, is integrally attached to housing 70 so as to be inseparable from housing 70. For example, holding structure 200 may be attached to housing 70 in advance so as to be inseparable from housing 70, and light-blocking member 8 may then be removably attached to holding structure 200. Additionally, light-blocking member 8 and holding structure 200 may be integrally attached to housing 70 so as to be inseparable from housing 70. The "holding" of light-blocking member 8 by holding structure 200 also includes a state in which light-blocking member 8 is held internally in housing 70. Here, "internally" includes a state in which light-blocking member 8 is contained within housing 70, and a state in which light-blocking member 8 is attached to the outside of housing 70 with the primary elements of light-blocking member 8 falling within a projection range of housing 70. The primary elements of light-blocking member 8 falling within a projection range of housing 70 refers to a state in which light-blocking member 8 falls within housing 70 when housing 70 is viewed from any observation direction.

"Blocking state" is a state in which light-blocking member 8 blocks at least some of light incident on final reflective member 50 or light reflected by final reflective member 50, and light-blocking member 8 reflects the outside light entering housing 70 toward eye 401 of observer 400. When light-blocking member 8 is held in the blocking state by holding structure 200, light-blocking member 8 stops the display based on the image displayed in display surface 21 of display device 2 by blocking at least some of the light incident on final reflective member 50 or the light reflected by final reflective member 50. Additionally, when light-blocking member 8 is held in the blocking state by holding structure 200, outside light entering housing 70 is reflected toward eye 401 of observer 400 by light-blocking member 8, and thus display system 1 functions as an optical mirror.

On the other hand, "inactive state" is a state in which the blocking of the light incident on final reflective member 50, and the light reflected by final reflective member 50, by light-blocking member 8 is inactive, and is a state in which the light incident on final reflective member 50 and the light reflected by final reflective member 50 is not blocked by light-blocking member 8. In the inactive state, the light output from display surface 21 of display device 2 enters eye 401 of observer 400 after being reflected by reflecting optical system B1, and thus observer 400 can see an image (also called a "second image" hereinafter) based on an image displayed in display surface 21 of display device 2 (also called a "first image" hereinafter).

Incidentally, there are situations where abnormalities arise in the display of display device 2, such as when display device 2 malfunctions and no image is displayed in display surface 21. There are also situations where when the picture from imaging unit 4 is displayed in display device 2, abnormalities arise in the display of display device 2 due to malfunctions in imaging unit 4, abnormalities in the communication between imaging unit 4 and display device 2, and so on. With display system 1, display system 1 is caused to function as an optical mirror by setting the state of light-blocking member 8 to the blocking state when an abnormality arises in the display of display device 2 due to an abnormality or the like in display device 2. Thus by adjusting the angle of the entire housing 70 without using light-blocking member 8, the amount by which housing 70 is tilted can be reduced compared to when using half mirror 40 included in reflecting optical system B1 as an optical mirror. Accordingly, display system 1 of the present embodiment has an advantage in that even if an abnormality arises in the display by display device 2, an alternative display can be made, while at the same time reducing the likelihood that the view of observer 400 will be obstructed by housing 70. Furthermore, because light-blocking member 8 is held in housing 70 by holding structure 200 in both the blocking state and the inactive state, there is an advantage in that light-blocking member 8 can be held in housing 70 in both the blocking state and the inactive state with less effort than when light-blocking member 8 is separate from housing 70.

Figure 41:
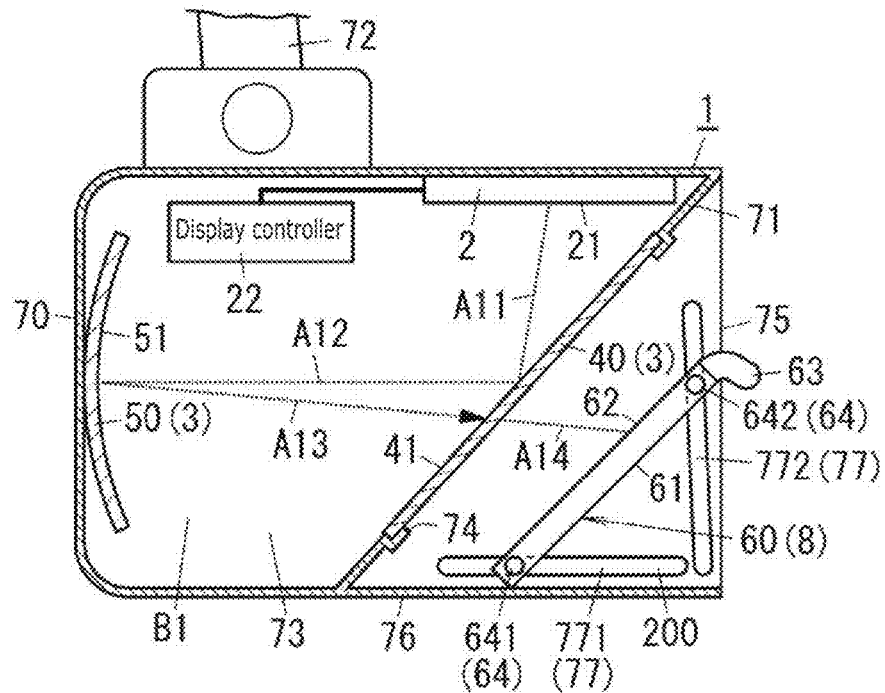
FIG. 41 is a general explanatory diagram illustrating the aforementioned display system, when the mirror member is in a position between the first position and a second position.
Figure 42:
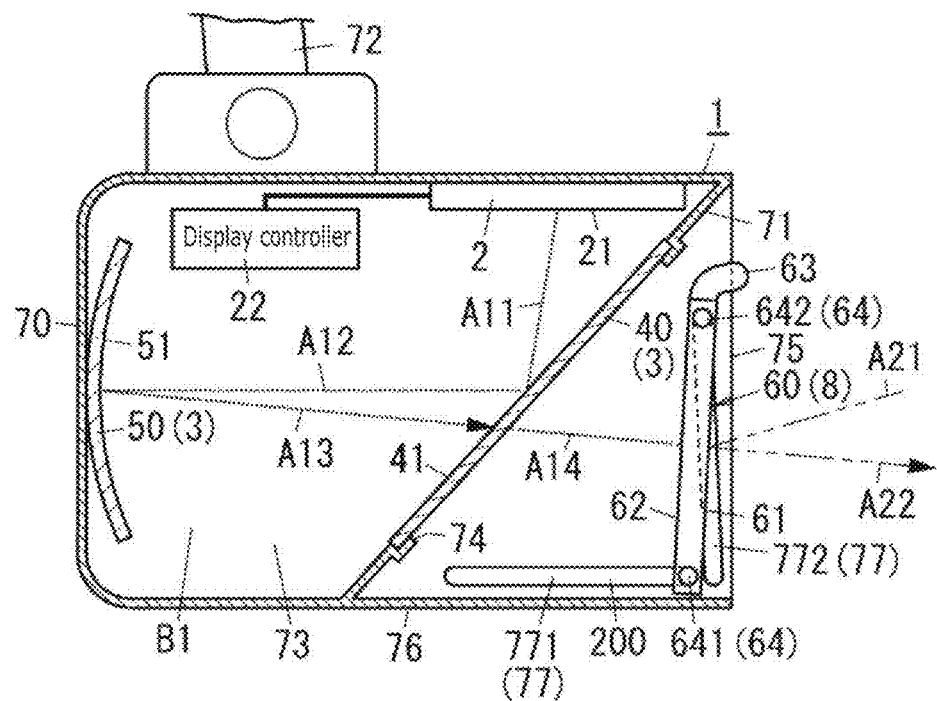
FIG. 42 is a general explanatory diagram illustrating the aforementioned display system, when the mirror member is in the second position.

Optical paths A11 to A14, over which light emitted from near a center of display surface 21 of display device 2 travels through half mirror 40 and is emitted to the exterior of housing 70, are indicated by dotted lines in FIG. 38, FIG. 41, and FIG. 42. Additionally, optical paths A21 to A22, over which light incident near a center of mirror member 60 from outside housing 70 is reflected by mirror member 60, are indicated by dotted lines in FIG. 42. In FIG. 38, FIG. 12, and FIG. 42, the lines indicating optical paths A11 to A14 and A21 to A22 are provided only for descriptive purposes, and are not actually displayed.

(2) Details

Display system 1 and electronic mirror system 5 according to Embodiment 5 will be described in detail below with reference to FIG. 38 to FIG. 43. In the following descriptions, the X axis direction indicated in FIG. 38 is defined as the front-rear direction, the Z axis direction indicated in FIG. 38 and FIG. 40 is defined as the up-down direction, and the Y axis direction indicated in FIG. 40 is defined as the left-right direction. Furthermore, the positive orientation in the X axis direction is defined as a front side, the positive orientation in the Y axis direction is defined as a right side, and the positive orientation in the Z axis direction is defined as an upper side. However, these directions are merely examples, and are not intended to limit the direction of display system 1 and electronic mirror system 5 during use. Moreover, the arrows indicating the respective directions in the drawings are provided for descriptive purposes only, and do not indicate actual directions.

(3) Configuration

As described above, display system 1 according to the present embodiment includes: display device 2; reflecting optical system B1, which includes at least final reflective member 50; mirror member 60, which is light-blocking member 8; and housing 70. Display system 1 further includes display controller 22.

In the present embodiment, reflecting optical system B1 further includes half mirror 40. Light emitted from display surface 21 of display device 2 is incident on final reflective member 50 via half mirror 40, and the light reflected by final reflective member 50 passes through half mirror 40 and enters eye 401 of observer 400.

Additionally, in the present embodiment, mirror member 60, which has a plate shape and has reflective surface 61 as one surface, is provided in housing 70 as light-blocking member 8. A state of mirror member 60 can be switched to one of a third state and a fourth state by a sliding action and a rotation action of mirror member 60. The third state is an inactive state in which mirror member 60 is disposed at a first position outside the optical path of the light entering eye 401 of observer 400 from final reflective member 50. The fourth state is a blocking state in which mirror member 60 is disposed in a second position, between final reflective member 50 and observer 400, with reflective surface 61 facing the observer, such that a reflected image, formed by light from outside housing 70 being reflected by reflective surface 61, is displayed to eye 401 of observer 400. In other words, light-blocking member 8 is an optical mirror (mirror member 60). The optical mirror (mirror member 60) includes reflective surface 61, which, when the state of light-blocking member 8 is the blocking state, reflects light in a reflection direction of the light reflected by final reflective member 50 (in the inactive state).

Electronic mirror system 5 is constituted by display system 1 and imaging unit 4 (see FIG. 39) of the present embodiment, and display device 2 displays an image captured by imaging unit 4 in display surface 21. Electronic mirror system 5 is installed in moving body main body 110 of automobile 100, which serves as a moving body. In other words, moving body (automobile 100) includes electronic mirror system 5, as well as moving body main body 110, in which electronic mirror system 5 is installed.

Display device 2, reflecting optical system B1 including final reflective member 50, and display controller 22 are contained within housing chamber 73 of housing 70.

Housing 70 is attached to a front-side part of ceiling 101 of moving body main body 110, close to windshield 102 (the windshield), at a position that is within the view of observer 400 sitting in the front seat (see FIG. 39). Housing 70 is attached to ceiling 101 of moving body main body 110, so as to be suspended from ceiling 101, via support member 72, which is a ball joint or the like, and is disposed to the front of observer 400. Support member 72 includes an adjustment mechanism for adjusting the orientation of housing 70 (e.g., a ball joint or the like). In FIG. 38 and FIG. 39, support member 72 is disposed at a top part of housing 70 and suspended from ceiling 101, but the structure may be such that the support member is disposed on a rear surface side of housing 70 (toward the front of the vehicle) and attached to windshield 102.

Rear wall 71 of housing 70 is tilted at an angle, and through-hole 74 is provided in rear wall 71. Through-hole 74 has a larger dimension in the left-right direction (a direction orthogonal to the up-down direction and the front-rear direction) than in the up-down direction, and a ratio between the dimension in the left-right direction (a longer-side dimension) and the dimension in the up-down direction (a shorter-side dimension) is approximately 3 to 6:1. Half mirror 40 is attached within through-hole 74. In housing 70, horizontal hood 75 projecting to the rear from each of left and right side edges of rear wall 71, and lower hood 76 projecting to the rear from a lower side edge of rear wall 71, are integrated with housing 70. Here, horizontal hood 75 and lower hood 76 are provided as a single entity.

The liquid crystal panel is disposed to the front of the light source apparatus. The light source apparatus is a so-called surface light source.

Display system 1 according to the present embodiment includes half mirror 40 and the above-described final reflective member 50 as at least two reflective members 3, which reflect light emitted from display surface 21 of display device 2. In other words, display system 1 includes reflecting optical system B1, which is constituted by half mirror 40 and final reflective member 50.

Half mirror 40 is attached in through-hole 74 provided in rear wall 71 of housing 70. Half mirror 40 is light-transmissive. Half mirror 40 functions so as to transmit part of incident light and reflect another part of the incident light. In the present embodiment, half mirror 40 is constituted by a plate-shaped beam splitter having a light transmittance and reflectance of approximately 50%. Half mirror 40 is disposed at an angle relative to the up-down direction so that an upper end of half mirror 40 projects further to the rear than a lower end.

Surface 41 of half mirror 40 on a housing chamber 73-side (also called an "inner surface" hereinafter) faces display surface 21 of display device 2 and final reflective surface 51 (an example of a reflective surface) of final reflective member 50. Here, two surfaces or components "facing" each other is not limited to being disposed in a state of being parallel to each other, but can also include states that are not parallel, i.e., a state in which one is disposed tilted relative to the other. In the present embodiment, half mirror 40 is disposed so that a normal direction of inner surface 41 intersects obliquely with the incidence direction of the light from display surface 21 of display device 2 and the incidence direction of the light from final reflective surface 51, respectively. Although inner surface 41, which is a reflective surface that reflects light from display device 2, is flat in the present embodiment, inner surface 41 may be a curved surface such as a free-form surface. By making inner surface 41 of half mirror 40 a free-form surface, distortion in the image formed on final reflective surface 51 can be reduced, curvature in the image plane can be reduced, and the resolution can be improved.

Final reflective member 50 is, for example, a concave mirror. Final reflective surface 51 of final reflective member 50 is formed by, for example, depositing a reflective metal film such as aluminum on a surface of glass. Final reflective member 50 is disposed in a front part of housing chamber 73 with final reflective surface 51 facing rearward. In other words, final reflective member 50 is disposed within housing chamber 73, in a position facing inner surface 41 of half mirror 40. Note that final reflective member 50 is not limited to a concave mirror, and may be a flat mirror instead.

In the present embodiment, inner surface 41 of half mirror 40 reflects part of the light emitted from display surface 21 of display device 2 toward final reflective surface 51 of final reflective member 50. Final reflective surface 51 of final reflective member 50 reflects the reflected light, which has been reflected by inner surface 41 of half mirror 40, toward half mirror 40. Half mirror 40 transmits part of the light incident from final reflective member 50, and the light transmitted through half mirror 40 enters eye 401 of observer 400. As a result, observer 400 can see an image based on the image displayed in display surface 21 of display device 2. In other words, observer 400 can see an image reflected by half mirror 40 and final reflective member 50. Accordingly, the image of display device 2 will appear to be being displayed at a display position further from final reflective surface 51 (e.g., 1 to 3 m from the viewpoint of observer 400), in the direction in which observer 400 views final reflective surface 51 of final reflective member 50 via half mirror 40. In other words, the image of display device 2 is a virtual image. There is therefore an advantage in that it is easier to adjust the focus when observer 400 views the image (virtual image) displayed by display system 1 from a state in which the view to the front is being viewed through windshield 102. Display device 2 also emits light in a direction oblique to the normal direction of display surface 21 (the direction of optical path A11). By emitting the light in an oblique direction in this manner, a virtual image distance (a distance from the viewpoint to the position where the image is visible) at an upper side of the image can be made farther (longer), and the virtual image distance at a lower side of the image can be made closer (shorter). Because the perspective of the image of the area behind automobile 100 captured by imaging unit 4 is in a relationship which is close to the perspective of the virtual image distance, a simulated sense of depth can be created, which makes it easier for observer 400 to grasp a sense of the distance from a following vehicle. However, trapezoidal distortion will arise in the virtual image if display device 2 emits light in an oblique direction. As such, setting final reflective surface 51 to a reflection angle that is slightly downward relative to the incident light makes it possible to reduce the occurrence of trapezoidal distortion in the virtual image.

Mirror member 60 is attached to housing 70 so as to be movable between a first position (the position of mirror member 60 in FIG. 38) and a second position (the position of mirror member 60 in FIG. 42). Furthermore, mirror member 60, which is light-blocking member 8, is held in housing 70 by holding structure 200 so as to be capable of moving between the first position and the second position.

The first position is a position in which mirror member 60 is disposed above lower hood 76 of housing 70, so as to be parallel to lower hood 76. In other words, the first position is a position outside the optical path of light passing through half mirror 40 and entering eye 401 of observer 400, and is a position through which light reflected by final reflective member 50 does not pass. Accordingly, in the third state, in which mirror member 60 is in the first position, mirror member 60 is in the inactive state in which the light reflected by final reflective member 50 is not blocked, and observer 400 can therefore see a reflected image (the second image) resulting from reflecting optical system B1 reflecting the image of display surface 21 of display device 2 (the first image).

The second position is a position in which mirror member 60 is disposed between half mirror 40 and observer 400. The second position is a position in which mirror member 60 is disposed so that a surface of mirror member 60 intersects, at an angle close to 90 degrees, with optical path A14 of the light passing through half mirror 40 and entering eye 401 of observer 400. In the fourth state, in which mirror member 60 is positioned in the second position, mirror member 60 is in the blocking state, where the light reflected by final reflective member 50 is blocked. In the fourth state, light from outside housing 70 and which has been reflected by reflective surface 61 enters the observer's eye, and thus the observer can see the reflected image reflected by reflective surface 61.

Note that the first position is not limited to the position of mirror member 60 illustrated in FIG. 38, and can be changed as appropriate. Likewise, the second position is not limited to the position of mirror member 60 illustrated in FIG. 42, and can be changed as appropriate, as long as the position enables observer 400 to see the reflected image appearing in reflective surface 61.

Here, in both the first position and the second position, mirror member 60 is disposed in a space enclosed within horizontal hood 75, lower hood 76, and half mirror 40 (i.e., is within housing 70), and thus mirror member 60 can be disposed without increasing the size of housing 70.

Mirror member 60 is formed as a flat plate having a shape which is rectangular in a plan view. A dimension in the left-right direction and a dimension in the up-down direction of mirror member 60 disposed in the second position are set to the same dimensions as the apparent dimensions of half mirror 40 when viewed from the position of eye 401 of observer 400. Accordingly, in the fourth state (the blocking state), where mirror member 60 is disposed in the second position, half mirror 40 is entirely covered by mirror member 60 from the perspective of observer 400. In the fourth state, it is not necessary for half mirror 40 to be entirely covered by mirror member 60 from the perspective of observer 400, and half mirror 40 may be partially visible to observer 400.

Here, one surface of mirror member 60 (a surface on the side opposite from half mirror 40, i.e., the surface facing toward observer 400, in a state where mirror member 60 is disposed in the second position, i.e., in the blocking state) serves as reflective surface 61, which reflects at least light in the visible light range. Accordingly, in a state where mirror member 60 is disposed in the second position, observer 400 can see the reflected image produced by mirror member 60 reflecting light from behind automobile 100, by adjustment mechanism of support member 72 adjusting the orientation of housing 70. Note that reflective surface 61 provided on one surface of mirror member 60 may be a flat surface, or may be a convex surface. In other words, mirror member 60 may be a flat mirror or a convex mirror.

A surface of mirror member 60 on the side opposite from reflective surface 61 is light-blocking surface 62, which has a lower reflectance than reflective surface 61 with respect to at least light in the visible light range. In the third state, in which mirror member 60 is disposed in the first position, light-blocking surface 62 of mirror member 60 faces half mirror 40. Furthermore, in the present embodiment, light-blocking surface 62 of mirror member 60 has a function of absorbing incident light. A color of light-blocking surface 62 is a darker color than an inner surface of ceiling 101 of moving body main body 110 (see FIG. 39), and is black, for example. Light-blocking surface 62 is provided with the function of absorbing incident light by making the color of light-blocking surface 62 a dark color such as black. Thus as illustrated in FIG. 38, in the inactive state, in which mirror member 60 is disposed in the first position, a situation in which light incident on light-blocking surface 62 of mirror member 60 through optical path A31 from outside housing 70 is reflected by light-blocking surface 62 can be suppressed. Accordingly, a situation in which light incident on light-blocking surface 62 from outside housing 70 is reflected by light-blocking surface 62 and half mirror 40 and enters eye 401 of observer 400 can be suppressed, and the contrast of the image displayed by display system 1 can be improved.

Although light-blocking surface 62 has a function for absorbing light, light-blocking surface 62 may be provided with a function for scattering light by forming light-blocking surface 62 on a rough surface. By having light-blocking surface 62 scatter incident light during the inactive state, in which mirror member 60 is disposed in the first position, a situation in which light incident on light-blocking surface 62 from outside housing 70 is reflected by light-blocking surface 62 and half mirror 40, and enters eye 401 of observer 400, can be suppressed.

In this manner, it is sufficient for light-blocking surface 62 of mirror member 60 to perform at least one of absorption and scattering of at least light in the visible light range, which makes it possible to suppress situations where light from outside is reflected by half mirror 40 and enters eye 401 of observer 400. Note that it is sufficient for light-blocking surface 62 to perform at least one of absorption and scattering of at least light in the visible light range, and thus light-blocking surface 62 may transmit light aside from light in the visible light range, e.g., light in the infrared range.

Figure 43:
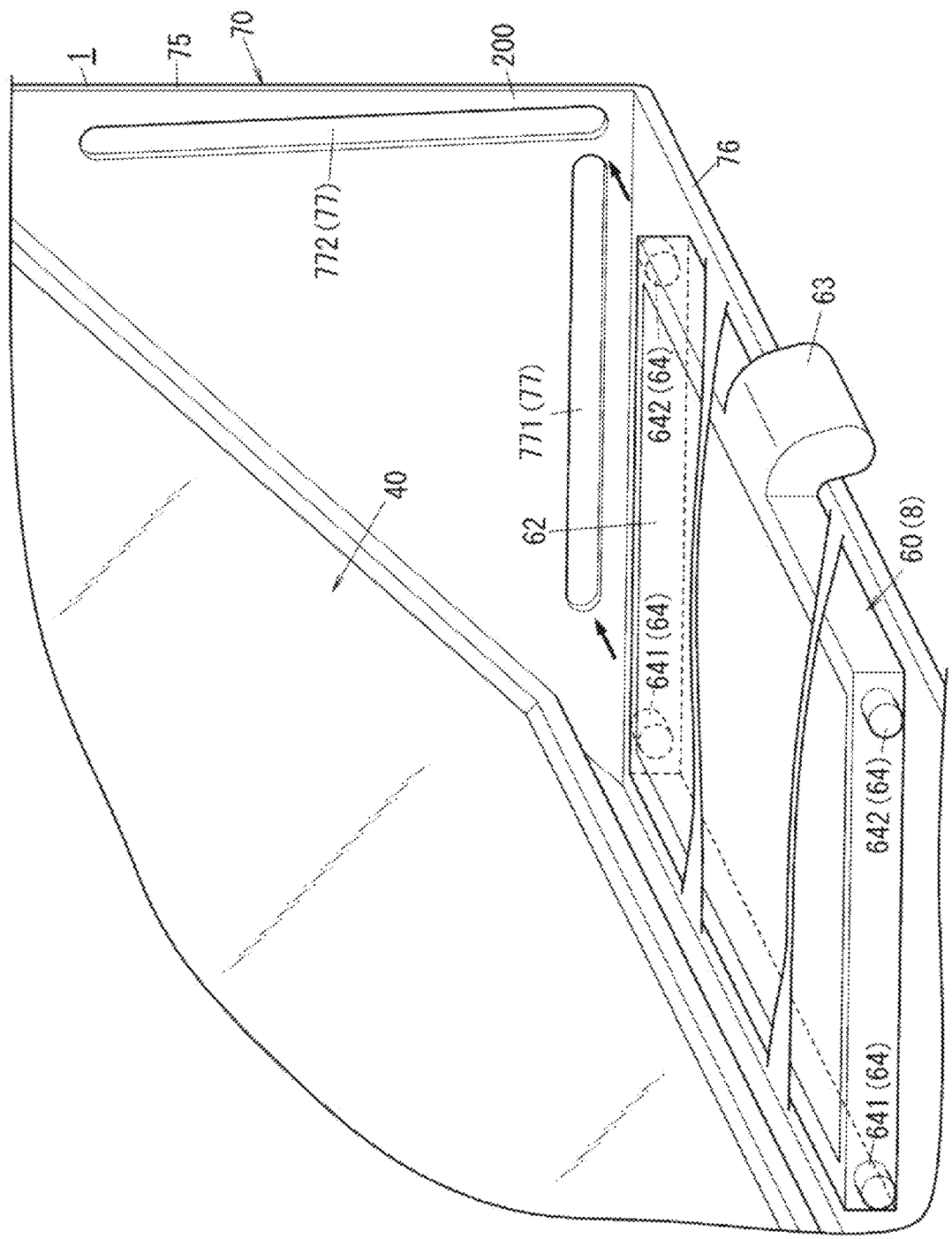
FIG. 43 is a perspective view of primary elements of the aforementioned display system.

As illustrated in FIG. 38 and FIG. 43, a plurality of cylindrical projections 64 are provided at left and right side edges of mirror member 60. In the present embodiment, the plurality of projections 64 include first projections 641, which are provided on left and right side surfaces, toward the front, of mirror member 60 in the first position, and second projections 642, which are provided on left and right side surfaces, toward the rear, of mirror member 60 in the first position. Additionally, projecting tab 63, which projects at a downward angle, is provided integrally with a rear-end part of mirror member 60, in a state where mirror member 60 is positioned in the first position. A user of display system 1 (e.g., observer 400, who is a driver or the like of automobile 100), can move mirror member 60 by using their finger to push up or pull down on projecting tab 63, which serves as an operating part. In other words, display system 1 further includes an operating part (projecting tab 63) for manually switching the state of mirror member 60 to either of the third state and the fourth state. Although projecting tab 63 is provided in, for example, a center, in the left-right direction, of the rear-end part of mirror member 60, a plurality of projecting tabs 63 may be provided on both sides in the left-right direction. Additionally, a projecting tab projecting in the left-right direction from a left side edge or a right side edge of mirror member 60 may project outside housing 70 through a through-hole provided in horizontal hood 75, and the part of the projecting tab projecting outside housing 70 may be used as the operating part.

Housing 70 is provided with a plurality of guide grooves 77, into which respective ones of the plurality of projections 64 of mirror member 60 are inserted, on left and right inside surfaces of horizontal hood 75. The plurality of guide grooves 77 include first guide grooves 771, into which first projections 641 of mirror member 60 are inserted, and second guide grooves 772, into which second projections 642 of mirror member 60 are inserted. First guide grooves 771 are provided in inner surfaces of horizontal hood 75, parallel to the front-rear direction. Second guide grooves 772 are provided in inner surfaces of horizontal hood 75, parallel to the up-down direction. In the present embodiment, projections 64 are provided in mirror member 60 and guide grooves 77 are provided in housing 70, but instead, projections may be provided in housing 70, and guide grooves into which the projections are inserted may be provided in mirror member 60. Here, holding structure 200 which holds mirror member 60, serving as light-blocking member 8, includes: projections 64, which are provided in one of housing 70 and mirror member 60; and guide grooves 77, which are provided in the other of housing 70 and mirror member 60, and into which projections 64 are inserted. Then, by changing the positions of projections 64 within guide grooves 77, the state of mirror member 60 can be switched to one of the third state (the inactive state) and the fourth state (the blocking state).

As illustrated in FIG. 38, when mirror member 60 is in the third state and is positioned in the first position, first projections 641 are positioned near front ends of the insides of first guide grooves 771, and second projections 642 are positioned near lower ends of the insides of second guide grooves 772. In the third state (the inactive state), mirror member 60 is disposed above lower hood 76 and along an upper surface of lower hood 76, and is therefore disposed outside the optical path of light passing through half mirror 40 and entering eye 401 of observer 400. Accordingly, when the state of mirror member 60 is the third state, observer 400 can see the image displayed in display surface 21 of display device 2 (the first image), as an image which has been enlarged and made to appear at a farther viewpoint by being reflected by reflecting optical system B1 (the second image). Note that in the state in which mirror member 60 is disposed at the first position, mirror member 60 is held in the third state by, for example, an end part of mirror member 60 being latched using a hook or the like provided in housing 70.

When the user pushes projecting tab 63 of mirror member 60 upward when mirror member 60 is in the third state, first projections 641 slide rearward within first guide grooves 771, and second projections 642 slide upward within second guide grooves 772, as illustrated in FIG. 41. Here, mirror member 60 moves toward the second position while rotating as a whole as a result of first projections 641 and second projections 642 sliding while rotating within first guide grooves 771 and second guide grooves 772. In other words, mirror member 60 moves from the first position to the second position, and from the second position to the first position, as a result of sliding and rotating. Here, the sliding and rotation of mirror member 60 may occur simultaneously or separately.

Then, when mirror member 60 is moved to the second position, first projections 641 are positioned near rear ends of the insides of first guide grooves 771, and second projections 642 are positioned near upper ends of the insides of second guide grooves 772, as illustrated in FIG. 42. In the fourth state (the blocking state), in which mirror member 60 is disposed in the second position, mirror member 60 is disposed parallel to the up-down direction in a state where reflective surface 61 faces the direction opposite from half mirror 40. Note that being "disposed parallel to the up-down direction" is not limited to being disposed parallel to the vertical direction, and mirror member 60 may be disposed tilted relative to the vertical direction, as long as the area behind automobile 100 can be seen via reflective surface 61. In the fourth state, half mirror 40 is almost completely covered by mirror member 60 as seen from observer 400, and observer 400 can therefore see light from outside housing 70 (e.g., from behind automobile 100) as a reflected image reflected by reflective surface 61. Note that when mirror member 60 is disposed in the second position, light passing through half mirror 40 is blocked by mirror member 60, and thus observer 400 cannot see the image displayed in display surface 21 of display device 2. As such, when an abnormality has arisen in the display of display device 2, observer 400 can see the reflected image reflected by reflective surface 61 by switching the state of mirror member 60 from the third state to the fourth state. Note that in the fourth state in which mirror member 60 is disposed at the second position, mirror member 60 is held in the fourth state by, for example, an end part of mirror member 60 being latched using a hook or the like provided in housing 70.

When switching the state of mirror member 60 from the fourth state (the blocking state) to the third state (the inactive state), the user (e.g., observer 400) pulls projecting tab 63 of mirror member 60 downward. When projecting tab 63 is pulled downward, first projections 641 move forward within first guide grooves 771, and second projections 642 move downward within second guide grooves 772, which switches the state of mirror member 60 from the fourth state to the third state. By switching the state of mirror member 60 to the third state, observer 400 can see a reflected image resulting from the image in display surface 21 of display device 2 being reflected by reflecting optical system B1.

In this manner, in the present embodiment, mirror member 60 is provided with projections 64, and housing 70 is provided with guide grooves 77 into which projections 64 are inserted. By changing the positions of projections 64 within guide grooves 77, mirror member 60 can be moved to the first position or the second position, and the state of mirror member 60 can be switched to one of the third state and the fourth state.

Although the present embodiment describes projections 64 as being cylindrical projections fixed to mirror member 60, projection 64 may be cylindrical rollers rotatably attached to shafts provided in mirror member 60. Using rotatable rollers as projections 64 makes it less likely that projections 64 will catch when sliding within guide grooves 77 and reduces friction of projections 64, and thus the state of mirror member 60 can be smoothly switched to the third state or the fourth state.

Display controller 22 controls a display state of the image by display device 2. Display controller 22 communicates (through wired or wireless communication) with imaging unit 4 via an in-vehicle network of automobile 100, for example. Display controller 22 is input with image data of a captured image of the area behind automobile 100 from imaging unit 4. Display controller 22 causes display device 2 to display an image based on the captured image input from imaging unit 4.

Here, the image based on the captured image may be the captured image itself, an image obtained by processing the captured image, or a CG (Computer Graphics) image created based on the captured image. For example, the image captured by imaging unit 4 becomes darker at night, and thus brightness correction may be performed on the image captured by imaging unit 4. Based on the image captured by imaging unit 4, a CG image, a marker, or the like indicating an obstacle or the like appearing in the image may be created, and an image in which the CG image, the marker, or the like is superimposed on the image captured by imaging unit 4 may be displayed in display surface 21 of display device 2. Also, an image in which a marker indicating driving assistance information (e.g., vehicle speed information, navigation information, pedestrian information, forward vehicle information, lane departure information, vehicle condition information, or the like) is superimposed on the image captured by imaging unit 4 may be displayed in display device 2.

Imaging unit 4 outputs the image data captured of the area behind automobile 100 to display controller 22 over the in-vehicle network, for example. Imaging unit 4 is disposed in the center of a rear part of automobile 100 with respect to the left-right direction, and captures a range visible with a conventional room the mirror, and electronic mirror system 5 is used as a rearview mirror, like a conventional room mirror. Because imaging unit 4 is attached in the rear of automobile 100, rear seats, pillars, and the like do not appear in the image captured by imaging unit 4. Imaging unit 4 may also capture an image of a rear-side of automobile 100. Imaging unit 4 may capture a range visible with a conventional door mirror and fender mirror, and electronic mirror system 5 may be used as a rearview mirror in place of the conventional door mirror and fender mirror. Imaging unit 4 is attached at the rear of moving body main body 110 and at an upper position of moving body main body 110, but the attachment position of imaging unit 4 is merely an example, and it is sufficient for imaging unit 4 to be mounted at a position where the desired range can be captured.

In display system 1 according to the present embodiment, the image displayed by display device 2, i.e., the light output from display surface 21 of display device 2, is reflected multiple times (twice, for example, in the present embodiment) by half mirror 40 and final reflective member 50. Here, a distance from observer 400 to the display position of the image visible to observer 400 (a viewing distance) is determined by an optical path length from display surface 21 of display device 2 to final reflective surface 51, a focal length of reflecting optical system B1, and so on. In the present embodiment, by reflecting the light output from display surface 21 of display device 2 twice, the size of housing 70 (housing chamber 73) can be reduced while keeping the viewing distance to the display position of the image at a desired distance. Accordingly, housing 70 can be made more compact in the direction in which observer 400 views final reflective surface 51 through half mirror 40.

(4) Operations

Operations of display system 1, and of electronic mirror system 5 including display system 1, according to the present embodiment will be described below. It is assumed that the state of mirror member 60 is switched to the third state (the inactive state) in which mirror member 60 is disposed at the first position, as illustrated in FIG. 38.

For example, electronic mirror system 5 starts operating when power is supplied to electronic mirror system 5 from a battery of automobile 100 and a control signal for starting operations is input to electronic mirror system 5 from an ECU (Electronic Control Unit) included in automobile 100.

When a control signal for causing display controller 22 to start operations is input from the ECU of automobile 100, display controller 22 causes imaging unit 4 to capture an image of the area behind automobile 100 at a predetermined frame rate, and obtains image data of the captured image from imaging unit 4.

When the image data of the captured image is input from imaging unit 4, display controller 22 creates an image based on the captured image, and causes the created image to be displayed in display surface 21 of display device 2.

When the image is displayed in display surface 21 of display device 2, the light forming the image is emitted toward inner surface 41 of half mirror 40 in a direction parallel to optical path A11. Half mirror 40 is a beam splitter, and inner surface 41 of half mirror 40 reflects part of the light incident from display device 2 toward final reflective surface 51 of final reflective member 50. Final reflective surface 51 is a concave mirror, and reflects light forming an enlarged image, which is the image in display surface 21 in an enlarged state, toward inner surface 41 of half mirror 40. When the light reflected by final reflective surface 51 is incident on inner surface 41 of half mirror 40, some of the incident light passes through half mirror 40 and is emitted to the outside of housing 70, and observer 400 can therefore see the image enlarged by final reflective surface 51. Accordingly, observer 400 can confirm a state in the area behind automobile 100 by viewing, through half mirror 40, the image enlarged by final reflective surface 51.

When an abnormality has arisen in the image displayed in display surface 21 of display device 2 due to an abnormality in display device 2, imaging unit 4, or the like, observer 400 pushes projecting tab 63 upward and switches the state of mirror member 60 to the fourth state (the blocking state), in which mirror member 60 is disposed in the second position. As illustrated in FIG. 42, in the fourth state, mirror member 60 is disposed in the second position between half mirror 40 and observer 400, in a state in which reflective surface 61 faces toward observer 400. Accordingly, when the state of mirror member 60 has been switched to the fourth state and the orientation of housing 70 has been adjusted by the adjustment mechanism of support member 72, observer 400 can see a reflected image produced by reflective surface 61 reflecting light incident from outside housing 70 (e.g., from the area behind automobile 100). As such, even if an abnormality has arisen in the display of display device 2, observer 400 can confirm the state in the area behind automobile 100 by using mirror member 60, which has been switched to the fourth state, to view the reflected image in reflective surface 61 of mirror member 60. In other words, even if an abnormality has arisen in the display by display device 2, display system 1 can use mirror member 60 to provide an alternative display. Although the orientation of housing 70 is finely adjusted by the adjustment mechanism of support member 72 in the present embodiment as well, the reflected image in reflective surface 61 of mirror member 60 is shown to observer 400 by switching the state of mirror member 60 to the fourth state. Thus by adjusting the angle of the entire housing 70 without using mirror member 60, the amount by which housing 70 is tilted can be reduced compared to when using half mirror 40 as an optical mirror. As such, situations where the view of observer 400 (the view to the rear of observer 400) is blocked by housing 70 can be suppressed, and a drop in forward visibility can be suppressed as well.

Note that display system 1 may further include a detection switch for detecting that mirror member 60 is disposed in the second position. When the detection switch detects that mirror member 60 is disposed in the second position, display controller 22 may stop the display in display device 2 based on a result of the detection by the detection switch, which makes it possible to reduce the amount of power consumed by display system 1.

[Variations]

The foregoing embodiment is merely one of various embodiments of the present disclosure. As long as the object of the present disclosure can be achieved, various changes can be made on the foregoing embodiment in accordance with the design or the like.

Examples of variations on the foregoing embodiment will be described below. The variations described below can be applied in combination with each other as appropriate.

Display system 1 according to the present disclosure includes a computer system. The computer system is constituted mainly by a processor and memory as hardware. Functions of display system 1 according to the present disclosure (e.g., functions of display controller 22) are implemented by the processor executing a program recorded in the memory of the computer system. The program may be recorded in advance in the memory of the computer system, provided over a telecommunication line, or provided having been recorded in a non-transitory recording medium, such as a memory card, an optical disc, a hard disk drive, or the like that can be read by the computer system. The processor of the computer system is constituted by one or more electronic circuits including a semiconductor integrated circuit (IC) or a large-scale integrated circuit (LSI). The integrated circuits referred to by the terms "IC", "LSI", and the like are given different names depending on the degree of integration, and include integrated circuits referred to as "system LSI", "VLSI (Very Large Scale Integration)", or "ULSI (Ultra Large Scale Integration)". Furthermore, and FPGA (Field Programmable Gate Array), which is programmed after the manufacture of the LSI circuit, or a logic device capable of reconfiguring connection relationships in the LSI circuit or reconfiguring circuit sections within the LSI circuit, may also be employed as the processor. The plurality of electronic circuits may be provided on a single chip or may be distributed throughout a plurality of chips. The plurality of chips may be provided in a single apparatus or may be distributed throughout a plurality of apparatuses. Here, the computer system includes a microcontroller having one or more processors and one or more memories. Accordingly, the microcontroller is also constituted by one or more electronic circuits including a semiconductor integrated circuit or a large-scale integrated circuit.

[Variation 1]

Figure 44:
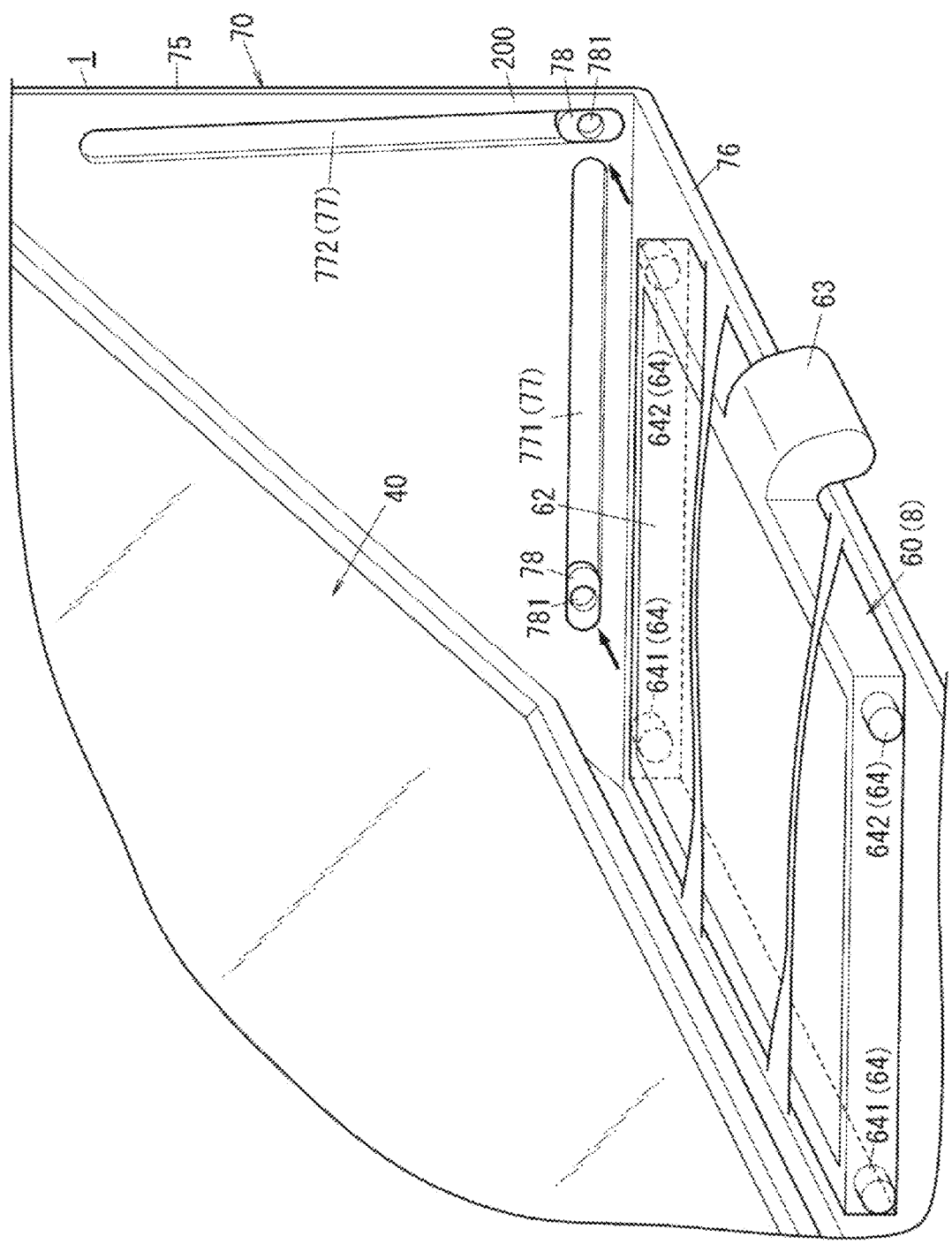
FIG. 44 is a perspective view of primary elements of a display system according to Variation 1 on Embodiment 5.

Display system 1 according to Variation 1 will be described based on FIG. 44.

Display system 1 according to Variation 1 differs from the foregoing embodiment in that guide members 78, which are inserted into guide grooves 77 and slide along guide grooves 77, are further provided. Note that aside from guide members 78, the configuration is the same as in the foregoing embodiment. Like constituent elements will therefore be given like reference signs, and will not be described.

In the present variation, guide members 78 are disposed in both first guide grooves 771 and second guide grooves 772. Guide members 78 are, for example, molded components formed from synthetic resin, and are formed so that both end surfaces with respect to the direction of sliding are curved surfaces. Round holes 781 into which the cylindrical projections 64 are inserted are formed in guide members 78, and projections 64 are supported by guide members 78 in a rotatable state.

Here, in the third state, guide members 78 inserted into first guide grooves 771 are positioned near front ends of first guide grooves 771, and guide members 78 inserted into second guide grooves 772 are positioned near lower ends of second guide grooves 772.

When observer 400 pushes projecting tab 63 upward to switch the state of mirror member 60 to the fourth state, guide members 78 within first guide grooves 771 slide rearward, and guide members 78 within second guide grooves 772 slide upward. In response to the sliding of guide members 78, projections 64 rotate relative to guide members 78, and mirror member 60 moves from the first position to the second position as a result of the sliding of guide members 78 and the rotation of projections 64.

Furthermore, when observer 400 pulls projecting tab 63 downward to switch mirror member 60 from the fourth state to the third state, guide members 78 within first guide grooves 771 and second guide grooves 772 slide downward. In response to the sliding of guide members 78, projections 64 rotate relative to guide members 78, and mirror member 60 moves from the second position to the first position as a result of the sliding of guide members 78 and the rotation of projections 64.

In this manner, according to display system 1 of Variation 1, the members which slide (guide members 78) and the members which rotate (projections 64) when mirror member 60 moves between the first position and the second position are provided as separate members. In Variation 1, guide members 78, which slide within guide grooves 77, do not rotate, which makes the sliding of guide members 78 smoother, and makes it possible to smoothly move mirror member 60 between the first position and the second position. Furthermore, projections 64 only rotate, and do not slide, which provides an advantage in that the likelihood of friction arising when projections 64 slide can be reduced.

[Variation 2]

Display system 1 according to Variation 2 will be described with reference to FIG. 45.

Figure 45:
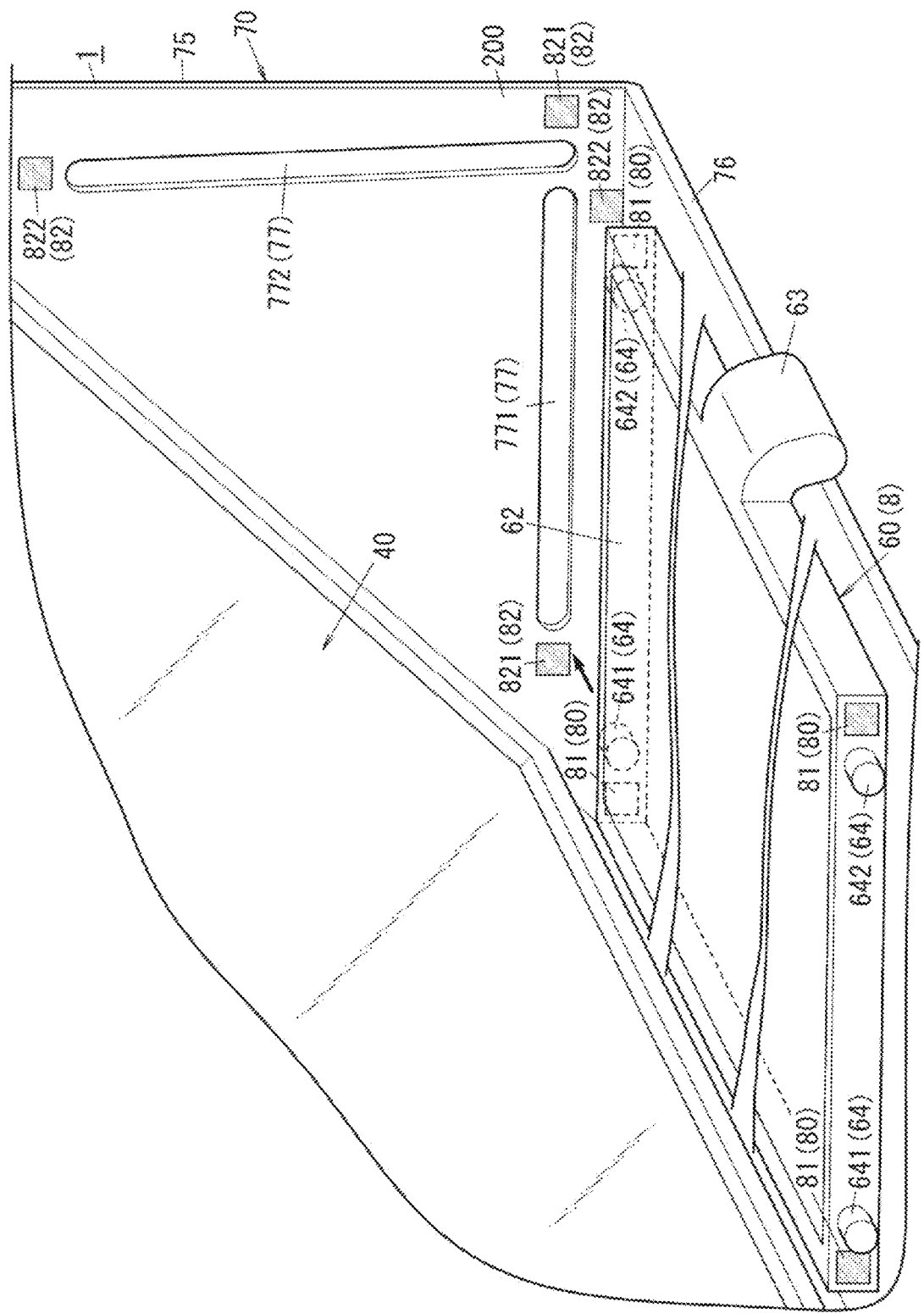
FIG. 45 is a perspective view of primary elements of a display system according to Variation 2 on Embodiment 5.

As illustrated in FIG. 45, display system 1 according to Variation 2 differs from the foregoing embodiment in that state holding member 80, which holds the state of mirror member 60 in each of the third state and the fourth state, is further provided. Note that aside from state holding member 80, the configuration is the same as in the foregoing embodiment. Like constituent elements will therefore be given like reference signs, and will not be described.

In the present variation, state holding member 80 includes a plurality of magnets 81 provided in mirror member 60, for example. Mirror member 60 has a plate shape which is rectangular in plan view, and a plurality of (e.g., four) magnets 81, such as permanent magnets, are attached to both end parts, in the front-rear direction, of left and right side surfaces of mirror member 60, when mirror member 60 is disposed in the first position.

A plurality of plate pieces 82 constituted by a magnetic material (e.g., iron or the like), which are attracted by magnetic force of magnets 81, are attached to inner surfaces of horizontal hood 75 on the left and right of housing 70. Here, the plurality of plate pieces 82 include four first plate pieces 821, which are disposed in four locations opposing magnets 81 of mirror member 60 when in the first position, and four second plate pieces 822, which are disposed in four locations opposing magnets 81 of mirror member 60 when in the second position.

In the third state (the inactive state), when mirror member 60 is disposed in the first position, the four magnets 81 of mirror member 60 attach to respective ones of the four first plate pieces 821 of housing 70, which holds mirror member 60 in the first position.

On the other hand, when projecting tab 63 of mirror member 60 is pushed upward and mirror member 60 is moved to the first position, magnets 81 separate from first plate pieces 821, and the state held by the magnetic force of magnets 81 is canceled. When projecting tab 63 of mirror member 60 is pushed further upward and mirror member 60 is moved to the second position, the four magnets 81 of mirror member 60 attach to respective ones of the four second plate pieces 822 of housing 70, which holds mirror member 60 in the second position. In this manner, mirror member 60 is held in the fourth state (the blocking state) by magnets 81 provided at the four corners of mirror member 60 attaching to second plate pieces 822 provided in housing 70, and thus rattling of mirror member 60 due to vibration and the like of automobile 100 can be reduced.

Additionally, when projecting tab 63 of mirror member 60 in the second position is pulled downward, magnets 81 separate from second plate pieces 822, and the state held by the magnetic force of magnets 81 is canceled. When the state held by the magnetic force of magnets 81 is canceled, mirror member 60 moves from the second position to the first position under its own weight. Then, when mirror member 60 is moved to the first position, the four magnets 81 of mirror member 60 attach to respective ones of the four first plate pieces 821 of housing 70, which holds mirror member 60 in the first position. In this manner, mirror member 60 moves to the first position under its own weight when projecting tab 63 of mirror member 60 in the second position is pulled downward and the state held by magnets 81 is canceled, and thus the operation for switching the state of mirror member 60 to the third state can be performed with ease.

Although plate pieces 82, constituted by a magnetic material which is attracted by the magnetic force of magnets 81 of mirror member 60, are provided in housing 70, magnets, such as permanent magnets, to which magnets 81 of mirror member 60 are attracted, may be provided in housing 70.

Additionally, magnets 81 may be provided in housing 70, and plate pieces 82 to which magnets 81 are attracted may be provided in mirror member 60. In other words, in the present variation, magnets 81 may be provided in one of mirror member 60 and housing 70, and plate pieces constituted by a magnetic material or magnets to which magnets 81 may be provided in the other of mirror member 60 and housing 70. In other words, it is sufficient for state holding member 80 to include magnets 81 provided in at least one of mirror member 60 and housing 70, and for the state of mirror member 60 to be held in the third state and the fourth state by the magnetic force of magnets 81. The state of mirror member 60 is held in each of the third state and the fourth state by the magnetic force of magnets 81 serving as state holding member 80, a situation where the position of mirror member 60 rattles can be suppressed in both the third state and the fourth state.

Additionally, in the present variation, the number and arrangement of magnets 81 constituting state holding member 80 can be changed as appropriate in accordance with the shape of mirror member 60, the holding force at which mirror member 60 is to be held, and so on.

Additionally, in the present variation, magnets 81 included in state holding member 80 are not limited to permanent magnets, and may be electromagnets. When state holding member 80 includes electromagnets, the holding state by state holding member 80 can be canceled by stopping the energizing of coils of the electromagnets. Here, for example, when display system 1 illustrated in FIG. 45 is used with housing 70 inverted vertically, mirror member 60 can be moved from the first position to the second position under its own weight when the holding state by state holding member 80 is canceled. According to this configuration, by providing a switch (not shown) to stop energizing the coils of the electromagnets, mirror member 60 can be moved from the first position (the position of the inactive state) to the second position (the position of the blocking state) at any timing by observer 400, such as the driver, operating the switch. Once mirror member 60 moves to the second position as a result of the energizing of the coils of the electromagnets being stopped, the coils of the electromagnets may be energized again. This makes it possible to suppress rattling in mirror member 60 in the second position.

[Variation 3]

Figure 46:
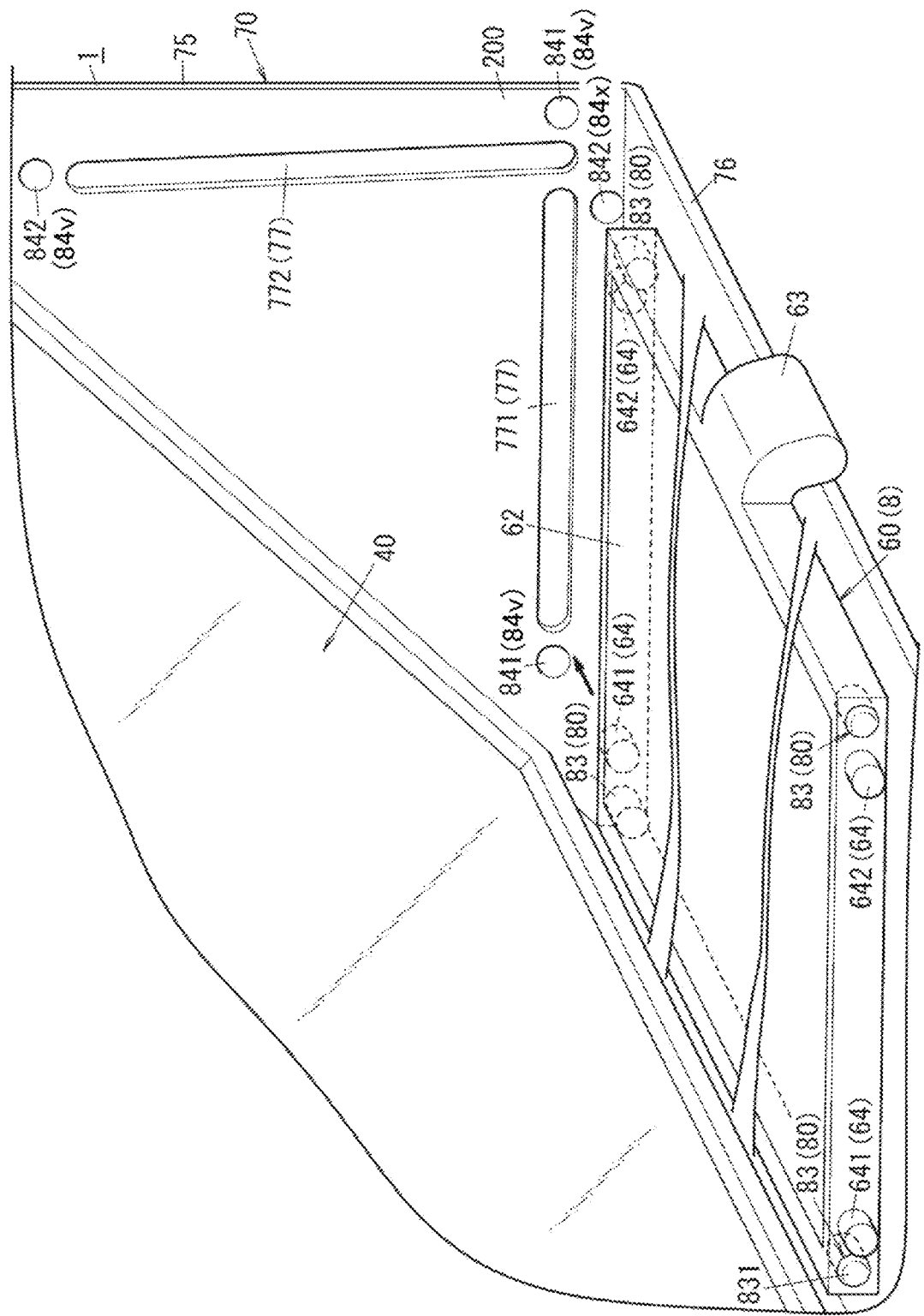
FIG. 46 is a perspective view of primary elements of a display system according to Variation 3 on Embodiment 5.

Display system 1 according to Variation 3 will be described with reference to FIG. 46.

Display system 1 according to Variation 3 differs from Variation 2 in that state holding member 80 includes ball plungers 83 provided in mirror member 60. Note that aside from state holding member 80, the configuration is the same as in Variation 2 or the foregoing embodiment. Like constituent elements will therefore be given like reference signs, and will not be described.

Mirror member 60 has a plate shape which is rectangular in plan view, and ball plungers 83 are attached to both end parts, in the front-rear direction, of left and right side surfaces of mirror member 60, when mirror member 60 is disposed in the first position.

Receiving holes 84v into which ball parts 831 of ball plungers 83 are provided in inner surfaces of horizontal hood 75 on the left and right of housing 70. A plurality of (e.g., four) ball plungers 83 are provided in mirror member 60, and a plurality of receiving holes 84v into which ball parts 831 of ball plungers 83 are respectively inserted are provided in inner surfaces of horizontal hood 75 on the left and right of housing 70. The plurality of receiving holes 84v includes, for example, four first receiving holes 841 four second receiving holes 842. Ball parts 831 of ball plungers 83 of mirror member 60 are inserted into first receiving holes 841 when mirror member 60 is in the first position. Ball parts 831 of ball plungers 83 of mirror member 60 are inserted into second receiving holes 842 when mirror member 60 is in the second position. In other words, the state of mirror member 60 is held in each of the third state and the fourth state as a result of ball parts 831 of ball plungers 83 being inserted into receiving holes 84v.

Here, in a state where mirror member 60 is disposed in the first position, mirror member 60 is held in the first position by ball parts 831 of ball plungers 83 being inserted into first receiving holes 841 in housing 70. In the third state, ball parts 831 of ball plungers 83, which are located at the four corners of mirror member 60, are inserted into respective ones of first receiving holes 841 in housing 70, and thus rattling of mirror member 60 due to vibrations and the like in automobile 100 can be suppressed.

When projecting tab 63 of mirror member 60 is pushed upward and mirror member 60 is moved to the first position, ball parts 831 move out of first receiving holes 841, and the state held by ball plungers 83 is canceled as a result. Then, when projecting tab 63 of mirror member 60 is pushed further upward and mirror member 60 is moved to the second position, ball parts 831 of ball plungers 83 are inserted into second receiving holes 842, and mirror member 60 is held in the second position as a result. In this manner, ball parts 831 of ball plungers 83, which are located at the four corners of mirror member 60, are inserted into respective ones of second receiving holes 842, which holds mirror member 60 in the fourth state and makes it possible to reduce rattling of mirror member 60 due to vibrations and the like in automobile 100.

Additionally, when projecting tab 63 of mirror member 60, which is disposed in the second position, is pulled downward, ball parts 831 of ball plungers 83 move out of second receiving holes 842, and the state of mirror member 60 held by ball plungers 83 is canceled as a result. When, after the state held by ball plungers 83 is canceled, projecting tab 63 of mirror member 83 is pulled further downward and mirror member 60 is moved to the first position, ball parts 831 of ball plungers 83 are inserted into first receiving holes 841, and mirror member 60 is held in the first position as a result.

Although ball plungers 83 are provided in mirror member 60 in the present variation, ball plungers 83 may be provided in housing 70, and receiving holes 84v, into which ball parts 831 of ball plungers 83 are inserted, may be provided in mirror member 60. In other words, in the present variation, it is sufficient for ball plungers 83 to be provided in one of mirror member 60 and housing 70, and for receiving holes 84v, into which ball parts 831 of ball plungers 83 are inserted, to be provided in the other of mirror member 60 and housing 70. To rephrase, in state holding member 80, it is sufficient for ball plungers 83 to be provided in one of housing 70 and mirror member 60, and for receiving holes 84v, into which ball parts 831 of ball plungers 83 are inserted, to be provided in the other of housing 70 and mirror member 60. The state of mirror member 60 is held in each of the third state and the fourth state as a result of ball parts 831 being inserted into receiving holes 84v.

Additionally, in the present variation, the number and arrangement of ball plungers 83 constituting state holding member 80 can be changed as appropriate in accordance with the shape of mirror member 60, the holding force at which mirror member 60 is to be held, and so on.

Although display system 1 according to Variations 2 and 3 includes state holding member 80, which has magnets 81 or ball plungers 83, state holding member 80, which holds mirror member 60 in the third state and the fourth state, is not limited to magnets or ball plungers. State holding member 80 may be a claw or the like provided in one of mirror member 60 and housing 70. Each of the third state and the fourth state may be held by hooking the claw provided in one of mirror member 60 and housing 70 on the other of mirror member 60 and housing 70.

Although in Variations 2 and 3, state holding member 80 holds the state of mirror member 60 in each of the third state and the fourth state, it is sufficient for state holding member 80 to hold the state in at least one of the third state and the fourth state (e.g., in the fourth state).

[Variation 4]

Display system 1 according to Variation 4 will be described with reference to FIG. 47 and FIG. 48.

Figure 47:
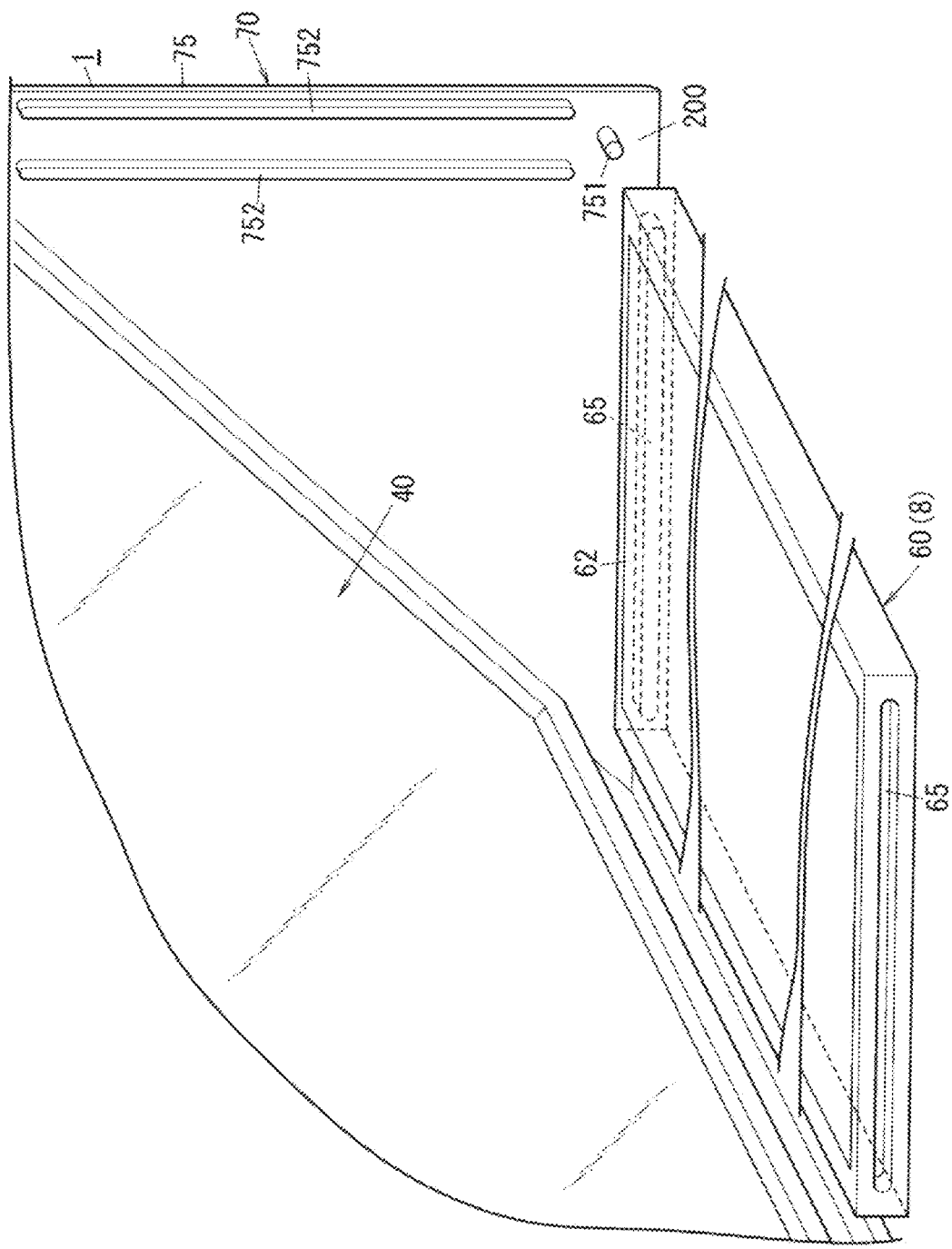
FIG. 47 is a perspective view of primary elements of a display system according to Variation 4 on Embodiment 5.

As illustrated in FIG. 47, display system 1 according to Variation 4 differs from the foregoing embodiments in that projections 751 are provided on inner surfaces of horizontal hood 75 on the left and right of housing 70, and guide grooves 65, into which projections 751 are inserted, are provided in left and right side surfaces of mirror member 60. Note that aside from projections 751 and guide grooves 65, the configuration is the same as in the foregoing embodiment. Constituent elements which are the same as in the foregoing embodiment will therefore be given like reference signs, and will not be described.

Projections 751 provided in housing 70 are inserted into guide grooves 65 of mirror member 60, and mirror member 60 slides and rotates relative to housing 70 in a state in which projections 751 are inserted into guide grooves 65. Projecting tab 63A (see FIG. 48), which projects downward when mirror member 60 is disposed in the first position, is provided in a front end part of a lower surface of mirror member 60. Two guide projections 752, which guide mirror member 60, are formed in the inner surfaces of horizontal hood 75 on the left and right of housing 70, so as to be parallel to the up-down direction. In housing 70, a lower side of mirror member 60 is open when disposed in the first position, and lower hood 76 is not provided below mirror member 60.

Figure 48:
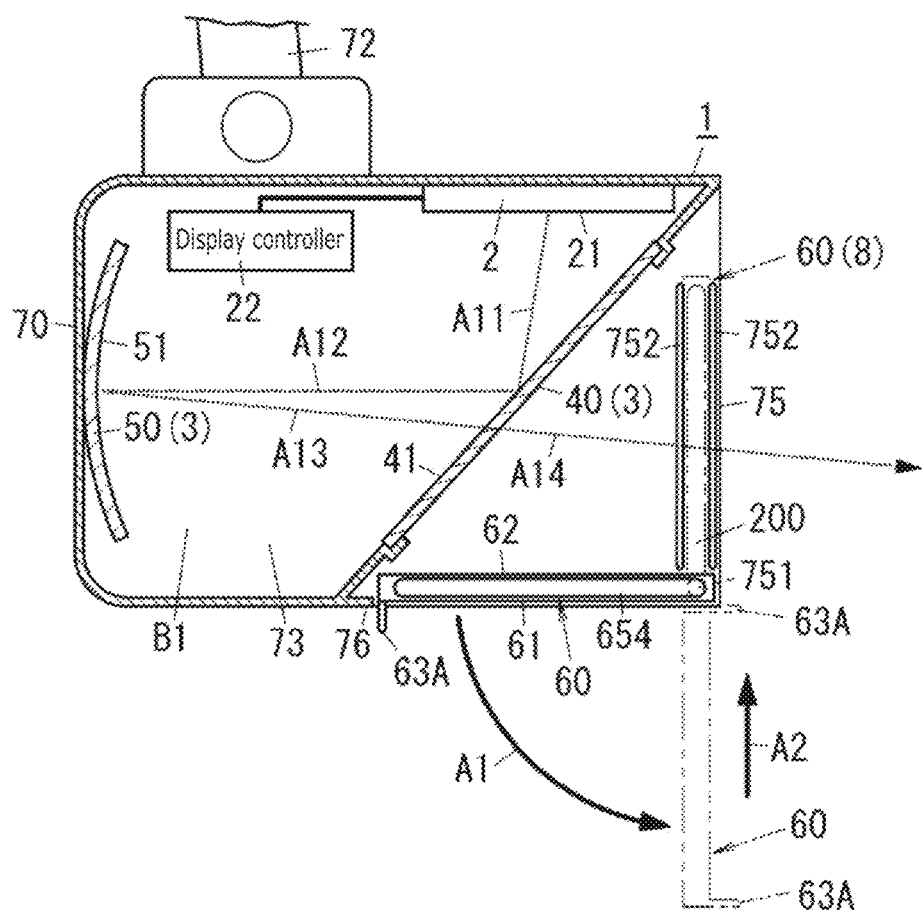
FIG. 48 is a general explanatory diagram illustrating the display system of Variation 4 on Embodiment 5.

As illustrated in FIG. 48, in the third state, in which mirror member 60 is disposed in the first position, projections 751 are located inside guide grooves 65, near right ends of guide grooves 65. When mirror member 60 is disposed in the first position, mirror member 60 is held in the third state, in which mirror member 60 is disposed in the first position, by state holding member 80 described in Variation 2 or 3.

When switching mirror member 60 from the third state to the fourth state, the user of display system 1 (e.g., observer 400) pulls projecting tab 63A downward and rotates mirror member 60 counterclockwise (in the direction of arrow A1) about projections 751. Then, observer 400 holds projecting tab 63A and moves mirror member 60 upward (in the direction of arrow A2). At this time, mirror member 60 moves to the second position while being guided by guide projections 752, in a state where projections 751 are inserted into guide grooves 65. When mirror member 60 has been moved to the second position, mirror member 60 is held in the fourth state, in which mirror member 60 is disposed in the second position, by state holding member 80 described in Variation 2 or 3.

In display system 1 according to the foregoing embodiment and Variation 4, projections 64 or 751 are provided in one of housing 70 and mirror member 60, and guide grooves 77 or 65, into which projections 64 or 751 are inserted, and provided in the other of housing 70 and mirror member 60. Then, by changing the positions of projections 64 or 751 within guide grooves 77 or 65, the state of mirror member 60 can be switched to one of the third state and the fourth state. In this manner, the state of mirror member 60 can be changed to one of the third state and the fourth state by changing the positions of projections 64 or 751 along guide grooves 77 or 65, which makes it possible to smoothly move mirror member 60.

[Variation 5]

Display system 1 according to Variation 5 will be described with reference to FIG. 49.

Figure 49:
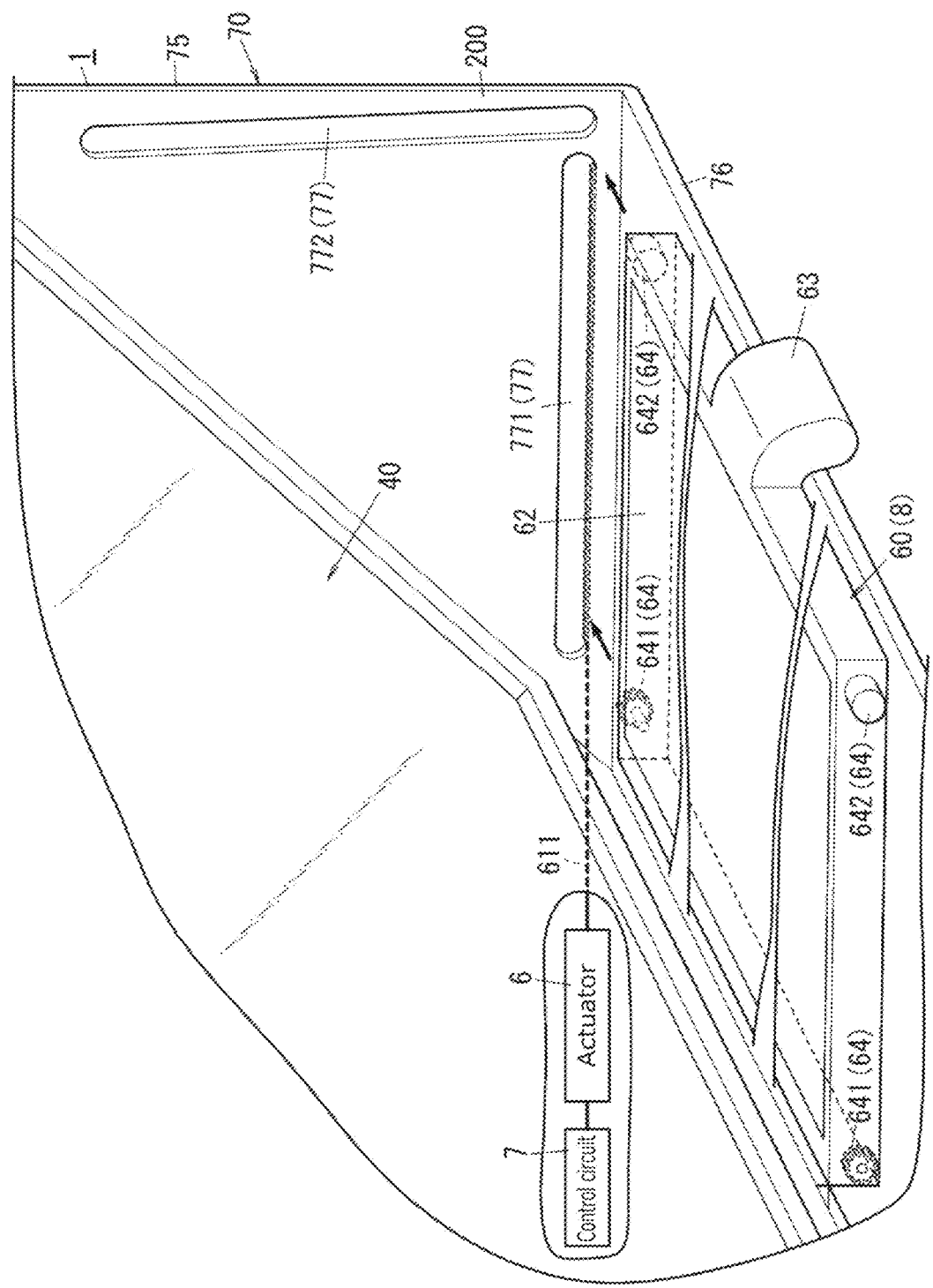
FIG. 49 is a general explanatory diagram of a display system according to Variation 5 on Embodiment 5.

As illustrated in FIG. 49, display system 1 according to Variation 5 differs from the foregoing embodiment in that actuator 6, which moves mirror member 60 between the first position and the second position, is further included. Constituent elements that are the same as in the foregoing embodiment will be given like reference numerals, and will not be described.

In the present variation, worm gear 611 is disposed along first guide groove 771, for example, within horizontal hood 75. Worm gear 611 is disposed so as to be capable of rotating. One end of worm gear 611 is inserted into housing chamber 73. Actuator 6 includes an electric motor, for example, and one end of worm gear 611 is coupled to an output shaft of the motor. Control circuit 7, which controls the motor (actuator 6), is housed within housing chamber 73. Control circuit 7 may be an example of a controller.

Part of worm gear 611 is exposed within first guide groove 771, and a pinion gear is formed on a circumferential surface of first projection 641 that is inserted into first guide groove 771. In a state in which first projection 641 is inserted into first guide groove 771, worm gear 611, which is disposed within first guide groove 771, meshes with the pinion gear provided in first projection 641.

Here, first projections 641 are fixed with respect to mirror member 60, and thus when control circuit 7 controls actuator 6 and causes worm gear 611 to rotate, first projections 641 move within first guide grooves 771 in response to the rotation of worm gear 611. Mirror member 60 moves between the first position and the second position as a result of first projections 641 moving within first guide grooves 771.

When, for example, an abnormality signal indicating an abnormality in the display by display device 2 is input from display device 2, display controller 22, or the like, control circuit 7 controls the motor (actuator 6) to move mirror member 60 from the first position to the second position. Accordingly, mirror member 60 is disposed in the second position when an abnormality has arisen in the display by display device 2, observer 400 can see the reflected image appearing in reflective surface 61 of mirror member 60. Display system 1 can therefore provide an alternative display even when an abnormality has arisen in the display by display device 2.

Note that when, for example, a notification signal indicating that the display by display device 2 has recovered is input from display device 2, display controller 22, or the like, control circuit 7 may control the motor (actuator 6) to move mirror member 60 to the first position. Thus when the display by display device 2 has recovered, observer 400 can see the image displayed by display device 2 via reflecting optical system B1.

Although the present variation describes moving mirror member 60 by the motor rotating worm gear 611, the mechanism through which the motor moves mirror member 60 may be changed as appropriate. For example, mirror member 60 may be moved between the first position and the second position by using a motor to rotate a rotational drum that reels in and lets out a wire connected at one end to mirror member 60. Additionally, actuator 6 is not limited to a motor, and may be a solenoid or the like that drives a mechanism which moves mirror member 60 from the first position to the second position.

[Variation 6]

Figure 50:
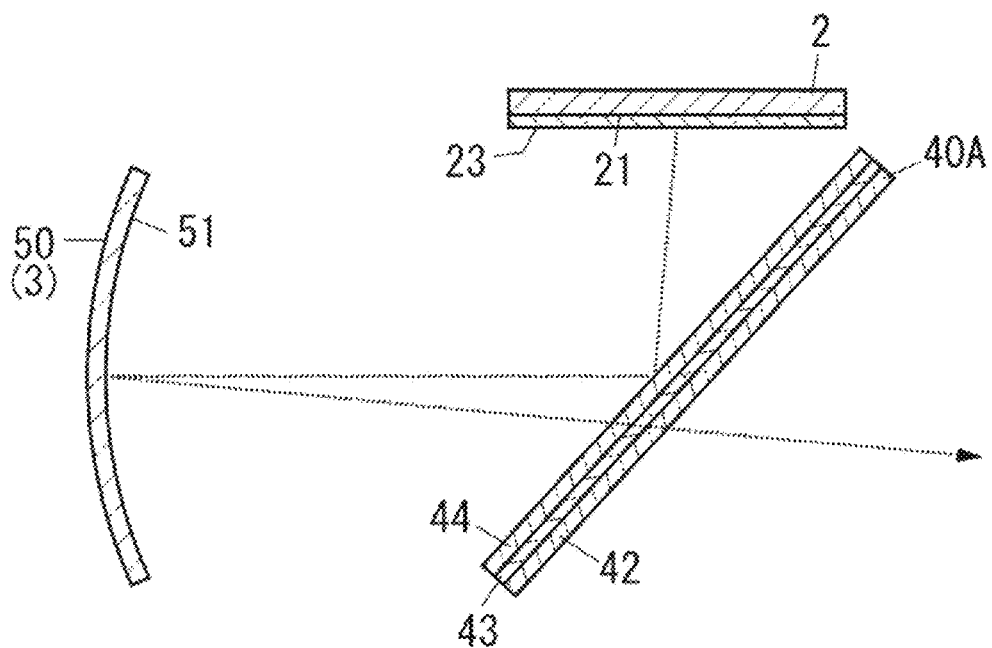
FIG. 50 is a general explanatory diagram of a display system according to Variation 6 on Embodiment 5.

In the foregoing embodiment, half mirror 40 is a vapor-deposited type beam splitter, but half mirror 40 is not limited to a vapor-deposited type beam splitter. As illustrated in FIG. 50, display device 2 may be a liquid crystal panel with λ/4 phase difference film 23 disposed on display surface 21, and half mirror 40A may be configured by laminating reflective polarizing element 43, which is a wire grid or the like, and λ/4 phase difference film 44 upon flat glass 42.

In other words, half mirror 40A illustrated in FIG. 50 has a layered structure in which a reflective polarizing film (reflective polarizing element 43) and λ/4 phase difference film 44 are layered. Reflective polarizing element 43 transmits light in a predetermined oscillation direction. λ/4 phase difference film 44 produces a quarter-wavelength phase difference between the light incident on and light emitted from half mirror 40, in an electrical field oscillation direction. Here, reflective polarizing element 43 constituting half mirror 40A is a polarizing element that reflects S-polarized light and transmits P-polarized light, for example.

When such a configuration is employed, P-polarized light emitted from display surface 21 is converted to circular polarized light by λ/4 phase difference film 23 on display surface 21, and is then converted to S-polarized light by λ/4 phase difference film 44 on reflective polarizing element 43. Most of the S-polarized light beams are reflected by reflective polarizing element 43, and that reflected light is converted into circular polarized light by λ/4 phase difference film 44 on reflective polarizing element 43. The circular polarized light is reflected by final reflective member 50, and is then incident on λ/4 phase difference film 44 on reflective polarizing element 43 again, and is converted to P-polarized light as a result. Most of the P-polarized light beams are transmitted by reflective polarizing element 43, and the transmitted light reaches eye 401 of observer 400. According to this configuration, light from display device 2 can reach eye 401 of observer 400 more efficiently than when using a vapor-deposited type beam splitter.

Note that in the present variation, when using a liquid crystal such as a liquid crystal mirror as light-blocking member 8 instead of an optical mirror, it is preferable that a configuration such as that described below be used. When light-blocking member 8 is a liquid crystal mirror, liquid crystal mirror is disposed, for example, in an optical path between half mirror 40 and observer 400. The light transmittance of the liquid crystal mirror changes in accordance with an applied voltage. More specifically, in the liquid crystal mirror, the transmittance of at least visible light varies in accordance with the applied voltage. In other words, the liquid crystal mirror can take on either one of the blocking state, in which some of the visible light is blocked, and the inactive state, in which the blocking of visible light is inactive, in accordance with the applied voltage. The blocking state is a state in which the visible light transmittance of the liquid crystal mirror is comparatively low. The inactive state is a state in which the visible light transmittance of the liquid crystal mirror is comparatively high. Here, reflecting optical system B1 including λ/4 phase difference films 44 and 23 on half mirror 40 and display surface 21 may be designed so that when the liquid crystal mirror is in the inactive state, a polarization direction of the light reflected by half mirror 40 follows the direction of the molecular orientation of the liquid crystal mirror when the reflected light reaches the liquid crystal mirror. Furthermore, reflecting optical system B1 including λ/4 phase difference films 44 and 23 on half mirror 40 and display surface 21 may be designed so that when the liquid crystal mirror is in the blocking state, a polarization direction of the light intersects with the direction of the molecular orientation of the liquid crystal mirror when the light reaches the liquid crystal mirror.

[Variation 7]

Figure 51:
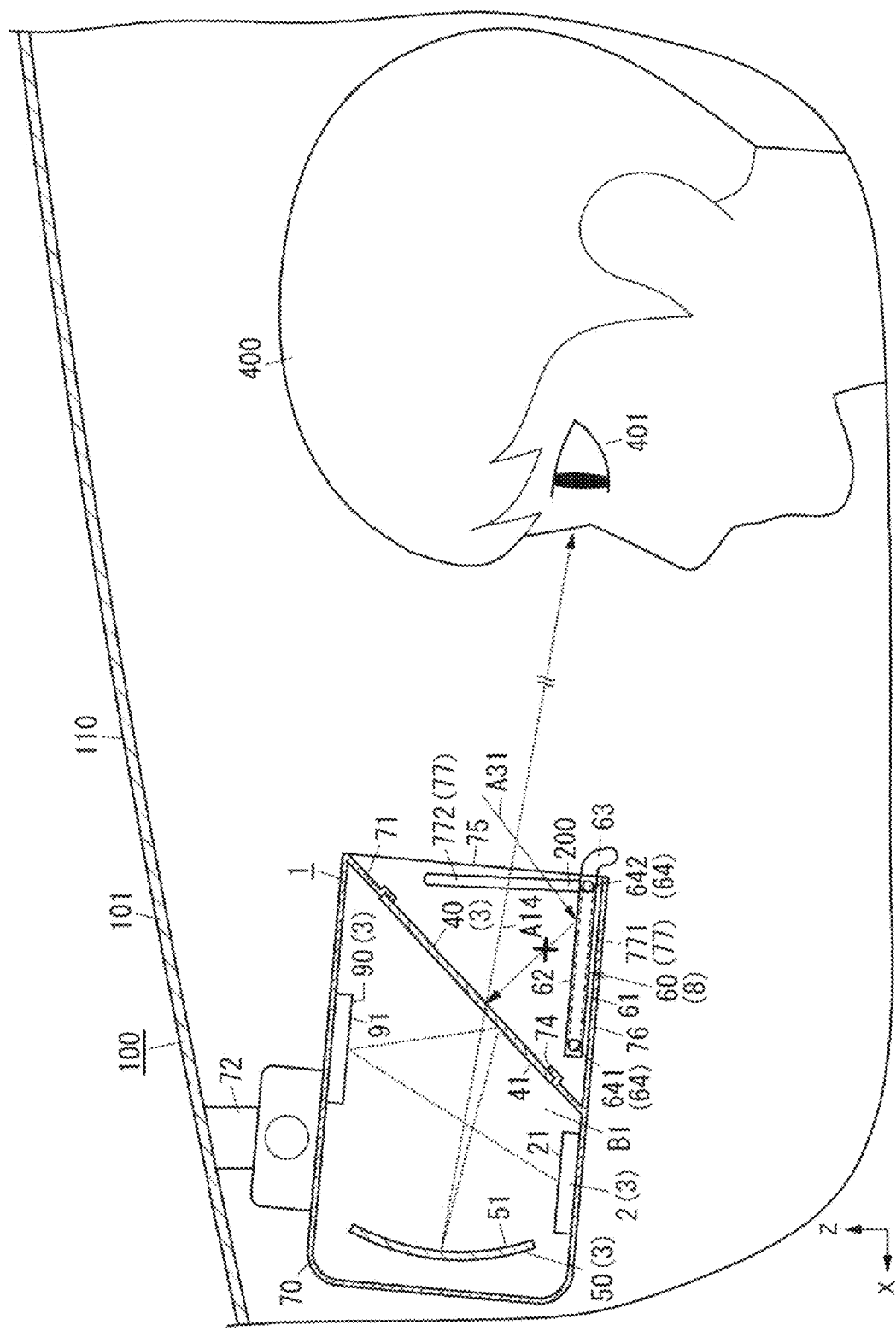
FIG. 51 is a general explanatory diagram of a display system according to Variation 7 on Embodiment 5.

In the foregoing embodiment and Variations 1 to 6, reflecting optical system B1 may further include intermediate reflective member 90. FIG. 51 is a general explanatory diagram illustrating display system 1 according to Variation 7. Aside from reflecting optical system B1, the configuration is the same as in Embodiment 5. Like constituent elements will therefore be given like reference signs, and will not be described.

Display system 1 according to Variation 7 includes reflecting optical system B1, which including intermediate reflective member 90 and final reflective member 50.

Display device 2 is housed in a lower part of housing chamber 73, in a state in which display surface 21 faces upward.

Intermediate reflective member 90 is, for example, a flat mirror, and is disposed in an upper part of housing chamber 73 in a state where reflective surface 91 faces downward. Intermediate reflective member 90 reflects light emitted from display surface 21 of display device 2 toward half mirror 40. In other words, in display system 1 according to Variation 7, reflecting optical system B1 further includes intermediate reflective member 90, which reflects light emitted from display surface 21 of display device 2 toward half mirror 40. Note that intermediate reflective member 90 is not limited to a flat mirror, and may be a concave mirror or a convex mirror, or may be constituted by a Fresnel mirror.

Final reflective member 50 is, for example, a concave mirror. Final reflective member 50 is disposed in a front part of housing chamber 73 with final reflective surface 51 facing rearward.

In Variation 7, reflecting optical system B1 includes intermediate reflective member 90 and final reflective member 50, and light emitted from display surface 21 of display device 2 is incident on reflective surface 91 of intermediate reflective member 90 and is reflected toward half mirror 40 by reflective surface 91. The light incident on half mirror 40 is reflected by half mirror 40 and is incident on final reflective member 50. Final reflective member 50 reflects the incident light toward half mirror 40, and half mirror 40 transmits part of the incident light, which then enters the eye of observer 400.

Although there is a single intermediate reflective member 90 in Variation 7, the number of intermediate reflective members 90 is not limited to 1, and can be changed as appropriate.

Additionally, although reflecting optical system B1 includes half mirror 40 in the foregoing embodiment and Variations 1 to 6, it is not absolutely necessary for reflecting optical system B1 to include half mirror 40. A transparent cover may be attached to housing 70 instead of half mirror 40, and the light reflected by final reflective member 50 may be output to the exterior through the transparent cover.

[Other Variations]

Although display device 2 is disposed on the upper side of housing chamber 73 in the foregoing embodiment, display device 2 may be disposed on the lower side of housing chamber 73.

In this case, the arrangement of display device 2, half mirror 40, final reflective member 50, and mirror member 60 is inverted vertically from the arrangement illustrated in FIG. 38. Half mirror 40 is disposed tilted so that a lower end thereof projects further rearward than an upper end, and mirror member 60 is disposed above half mirror 40 when in the third state.

In the third state, in which mirror member 60 is disposed in the first position, mirror member 60 moves to the second position under its own weight when projecting tab 63 is manipulated to move mirror member 60 from the first position. In other words, when mirror member 60 is moved from the first position using the operating part (projecting tab 63), the state of mirror member 60 switches from the third state to the fourth state under the weight of mirror member 60. Accordingly, display system 1 which can make an alternative display, even when an abnormality has arisen in the display by display device 2, can be provided. The operation for switching the state of mirror member 60 from the third state to the fourth state can also be performed with ease.

Electronic mirror system 5 according to the foregoing embodiment and variations is not limited to being applied in automobile 100, and can also be applied in moving bodies aside from automobile 100, such as motorcycles, trains, aircraft, construction equipment, ships, and the like, for example.

Embodiment 6

Display system 1 according to Embodiment 6 will be described with reference to FIG. 52 to FIG. 54.

Display system 1 according to Embodiment 6 differs from the foregoing Embodiment 5 in that at least two reflective members 3 further include intermediate reflective member 90, which reflects light emitted from display surface 21 of display device 2 toward half mirror 40. Note that aside from intermediate reflective member 90, the configuration is the same as in the foregoing Embodiment 5. Constituent elements which are the same as in Embodiment 5 will therefore be given like reference signs, and will not be described.

In Embodiment 6, the at least two reflective members 3 include intermediate reflective member 90, half mirror 40, and final reflective member 50. In other words, reflecting optical system B1 includes intermediate reflective member 90, half mirror 40, and final reflective member 50. Intermediate reflective member 90, half mirror 40, and final reflective member 50 are housed within housing chamber 73 of housing 70. Additionally, although not illustrated in FIG. 52 to FIG. 54, display controller 22 is also housed within housing chamber 73.

In Embodiment 6, display device 2 is housed in an upper part of housing chamber 73, in a state in which display surface 21 faces downward. Intermediate reflective member 90 is, for example, a flat mirror, and is disposed on the lower side of housing chamber 73 in a state where reflective surface 91 faces upward. Half mirror 40 is attached in through-hole 74 provided in rear wall 71 of housing 70. Final reflective member 50 is disposed on the front side of housing chamber 73 with final reflective surface 51 facing rearward. Here, half mirror 40 is disposed at an angle so that an upper end of half mirror 40 projects further to the rear than a lower end.

Figure 52:
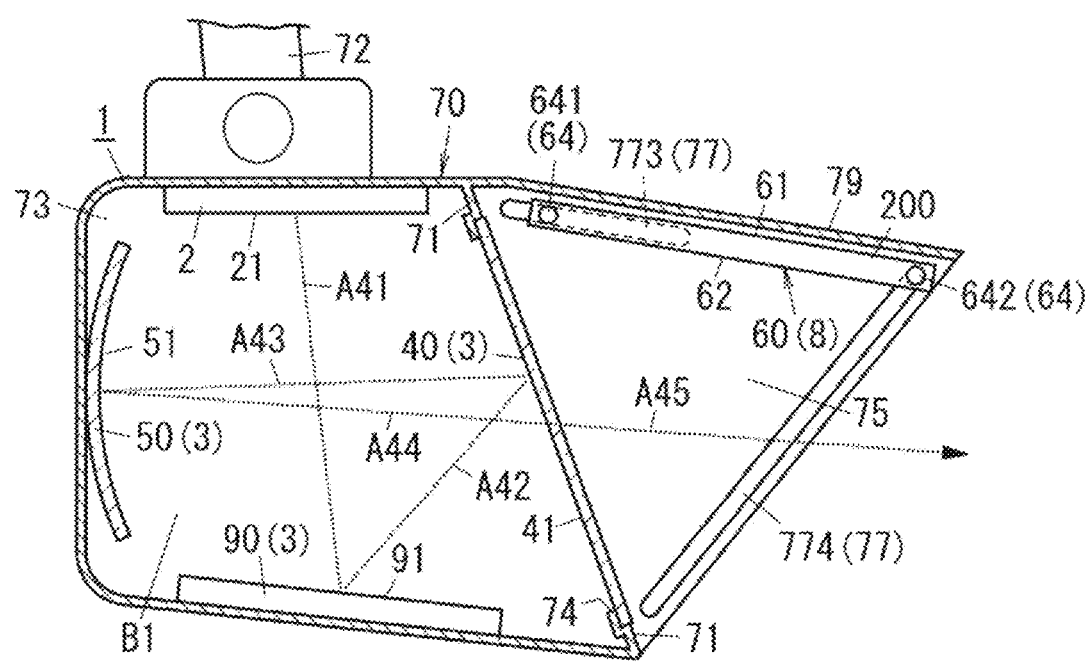
FIG. 52 is a general explanatory diagram illustrating a display system according to Embodiment 6, when a mirror member is in a first position.
Figure 53:
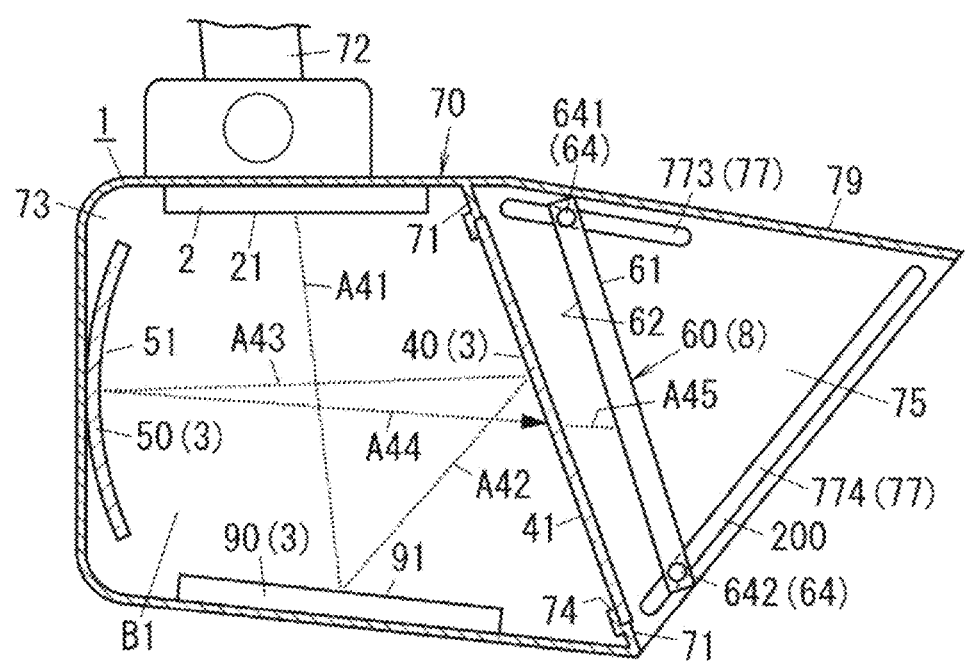
FIG. 53 is a general explanatory diagram illustrating the aforementioned display system, when the mirror member is in a position between the first position and a second position.
Figure 54:
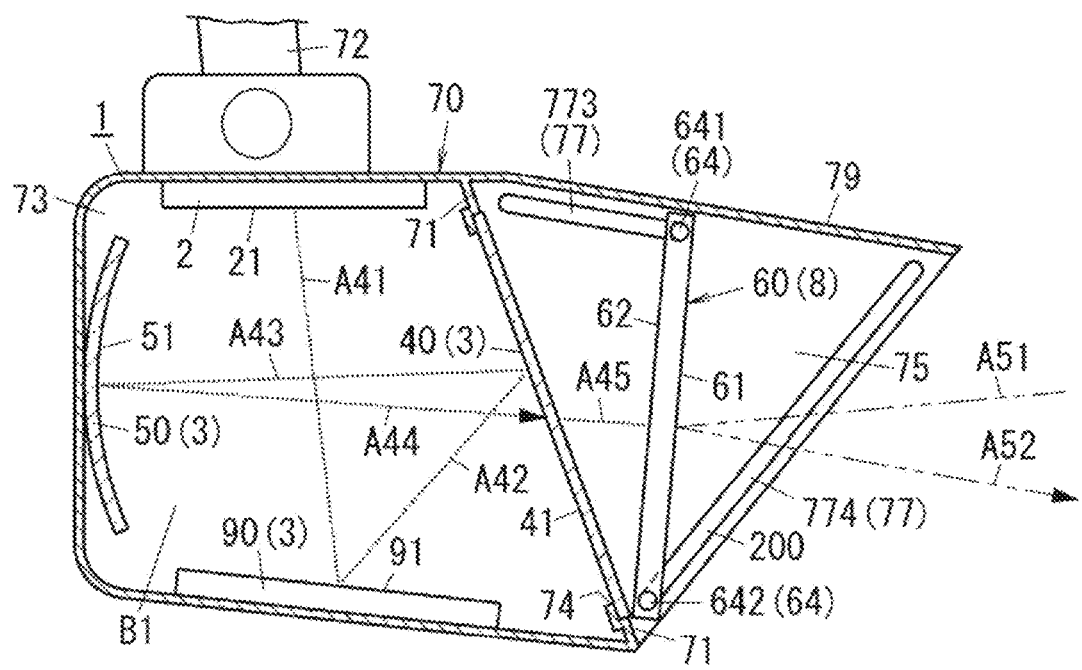
FIG. 54 is a general explanatory diagram illustrating the aforementioned display system, when the mirror member is in the second position.

Optical paths A41 to A45, over which light emitted from near a center of display surface 21 of display device 2 travels through half mirror 40 and is emitted to the exterior of housing 70, are indicated by dotted lines in FIG. 52 to FIG. 54. Additionally, optical paths A51 to A52, over which light incident near a center of mirror member 60 from outside housing 70 is reflected by mirror member 60, are indicated by dotted lines in FIG. 54. In FIG. 52 to FIG. 54, the lines indicating optical paths A41 to A45 and A51 to A52 are provided only for descriptive purposes, and are not actually displayed.

As illustrated in FIG. 52, in the present embodiment, light emitted from display device 2 is reflected by intermediate reflective member 90 and half mirror 40, is then reflected toward half mirror 40 by final reflective member 50, passes through half mirror 40, and exits to the exterior. Because these optical paths A41 to A44 are formed, display device 2 emits light in a direction oblique to the normal direction of display surface 21 (the direction of optical path A11). In the present embodiment, the light output from display surface 21 of display device 2 is reflected three times, and thus the size of housing 70 (housing chamber 73) can be reduced even more while keeping the viewing distance to the display position of the image at a desired distance.

As in Embodiment 5, a plurality of (e.g., four) cylindrical projections 64 are provided on the left and right side edges of mirror member 60. In the present embodiment, the plurality of projections 64 include first projections 641, which are provided on left and right side surfaces, toward the front, of mirror member 60 in the first position, and second projections 642, which are provided on left and right side surfaces, toward the rear, of mirror member 60 in the first position. Additionally, a projecting tab (operating part), which projects at a downward angle, is provided integrally with a rear-end part of mirror member 60 when in the first position. Note that the projecting tab is not shown in FIG. 52 to FIG. 54.

Additionally, in the present embodiment, in housing 70, horizontal hood 75 projecting to the rear from each of left and right side edges of rear wall 71, and upper hood 79 projecting to the rear from an upper side edge of rear wall 71, are integrated with housing 70. Here, horizontal hood 75 and upper hood 79 are provided as a single entity.

Mirror member 60 is attached to housing 70 so as to be movable between a first position (the position illustrated in FIG. 52) and a second position (the position illustrated in FIG. 54). The first position is a position in which mirror member 60 is disposed below upper hood 79 of housing 70, so as to be parallel to upper hood 79. The second position is a position in which mirror member 60 is disposed between half mirror 40 and observer 400. The second position is a position in which mirror member 60 is disposed so that a surface of mirror member 60 intersects, at an angle close to 90 degrees, with optical path A45 of the light passing through half mirror 40 and entering eye 401 of observer 400. Here, mirror member 60 is disposed in a space enclosed within horizontal hood 75, upper hood 79, and half mirror 40. In other words, mirror member 60 is held (contained) in housing 70 so as to fit within a projection range of housing 70, and thus mirror member 60 can be disposed without increasing the size of housing 70.

One surface of mirror member 60 (a surface on the side opposite from half mirror 40, i.e., the surface facing toward observer 400, in a state where mirror member 60 is disposed in the second position) serves as reflective surface 61, which reflects at least light in the visible light range. Additionally, a surface of mirror member 60 on the side opposite from reflective surface 61 is light-blocking surface 62, which has a lower reflectance than reflective surface 61 with respect to light in the visible light range.

Housing 70 is provided with a plurality of guide grooves 77, into which respective ones of the plurality of projections 64 of mirror member 60 are inserted, on left and right inside surfaces of horizontal hood 75. In the present embodiment, the plurality of guide grooves 77 include first guide grooves 773, into which first projections 641 of mirror member 60 are inserted, and second guide grooves 774, into which second projections 642 of mirror member 60 are inserted. First guide grooves 773 are provided in inner surfaces of horizontal hood 75, parallel to the front-rear direction. Second guide grooves 774 are provided in inner surfaces of horizontal hood 75, parallel to a direction intersecting with first guide grooves 773.

As illustrated in FIG. 52, when mirror member 60 is in the third state (the inactive state) and is positioned in the first position, first projections 641 are positioned near front ends of the insides of first guide grooves 773, and second projections 642 are positioned near upper ends of the insides of second guide grooves 774. Mirror member 60 is disposed below upper hood 79 and along a lower surface of upper hood 79, and is therefore disposed outside the optical path of light passing through half mirror 40 and entering eye 401 of observer 400. Accordingly, when the state of mirror member 60 is the third state, observer 400 can see the image displayed in display surface 21 of display device 2 (the first image), as an image which has been enlarged and made to appear at a farther viewpoint by being reflected by reflecting optical system B1 (the second image). Note that when mirror member 60 is disposed in the first position, mirror member 60 is held in the third state by state holding member 80 described in the foregoing Variation 2 or 3.

When observer 400 pulls the projecting tab of mirror member 60 downward when mirror member 60 is in the third state, first projections 641 move rearward within first guide grooves 773, and second projections 642 move downward within second guide grooves 774, as illustrated in FIG. 53. Here, mirror member 60 moves toward the second position while rotating as a whole as a result of first projections 641 and second projections 642 sliding while rotating within first guide grooves 773 and second guide grooves 774. Note that when mirror member 60 is moved from the first position by pulling projecting tab downward when mirror member 60 is in the third state, mirror member 60 moves from the first position to the second position under the weight of mirror member 60. Accordingly, the operation for switching the state of mirror member 60 from the third state to the fourth state can be performed with ease.

Then, when the state of mirror member 60 is switched to the fourth state, first projections 641 are positioned near rear ends of the insides of first guide grooves 773, and second projections 642 are positioned near lower ends of the insides of second guide grooves 774, as illustrated in FIG. 54. In the fourth state, mirror member 60 is disposed parallel to the up-down direction in a state where reflective surface 61 faces the direction opposite from half mirror 40 (i.e., faces observer 400). In this case, half mirror 40 is almost completely covered by mirror member 60 as seen from observer 400, and observer 400 can therefore see light from outside housing 70 (e.g., from behind automobile 100) as a reflected image reflected by reflective surface 61. Note that when mirror member 60 is disposed in the second position, light passing through half mirror 40 is blocked by light-blocking surface 62 of mirror member 60, and thus observer 400 cannot see the image displayed in display surface 21 of display device 2. As such, when an abnormality has arisen in the display of display device 2 due to a malfunction in display device 2, imaging unit 4, or the like, observer 400 can see the reflected image reflected by reflective surface 61 by putting the state of mirror member 60 into the fourth state. Note that when mirror member 60 is disposed in the second position, mirror member 60 is held in the fourth state by state holding member 80 described in the foregoing Variation 2 or 3.

When switching the state of mirror member 60 from the fourth state to the third state, the user (e.g., observer 400) pushes projecting tab of mirror member 60 upward. When projecting tab is pushed upward, first projections 641 move forward within first guide grooves 773, and second projections 642 move upward within second guide grooves 774, which switches the state of mirror member 60 from the fourth state to the third state. By switching the state of mirror member 60 to the third state, observer 400 can see a reflected image (the second image) resulting from the image (the first image) in display surface 21 of display device 2 being enlarged and reflected by reflecting optical system B1.

In the present embodiment, in the third state, mirror member 60 is disposed below upper hood 79 with light-blocking surface 62 facing downward, and thus situations where light incident on light-blocking surface 62 from outside housing 70 is reflected by light-blocking surface 62 and appears in half mirror 40 can be suppressed. Additionally, in the third state, mirror member 60 is disposed below upper hood 79 with light-blocking surface 62 facing downward, which provides an advantage in that dust and the like is less likely to accumulate on light-blocking surface 62.

Note that in the present embodiment, a second intermediate reflective member which reflects light reflected by half mirror 40 toward final reflective member 50 may be provided instead of intermediate reflective member 90 (a first intermediate reflective member). The second intermediate reflective member is disposed in a lower side of housing chamber 73, with a reflective surface facing upward. In this case, light emitted from display device 2 is first reflected by half mirror 40 toward second intermediate reflective member. This reflected light is then reflected by second intermediate reflective member toward final reflective member 50. Furthermore, the light reflected by final reflective member 50 reaches half mirror 40 and is transmitted through half mirror 40 to the exterior. In this manner, in the present embodiment, the number and arrangement of the reflective members constituting reflecting optical system B1 can be changed as appropriate.

Additionally, although display device 2 is disposed on the upper side of housing chamber 73 in Embodiment 6, display device 2 may be disposed on the lower side of housing chamber 73.

In this case, the arrangement of display device 2, intermediate reflective member 90, half mirror 40, final reflective member 50, and mirror member 60 is inverted vertically from the arrangement illustrated in FIG. 52. Half mirror 40 is disposed tilted so that an upper end thereof projects further rearward than a lower end, and mirror member 60 is disposed below half mirror 40 when in the third state.

Additionally, in Embodiment 5 and Embodiment 6, half mirror 40 is a vapor-deposited type beam splitter, but half mirror 40 is not limited to a vapor-deposited type beam splitter. Display device 2 may be a liquid crystal panel with a $\lambda/4$ phase difference film disposed on display surface 21, and half mirror 40 may be configured by laminating a reflective polarizing element (a reflective polarizing film), which is a wire grid or the like, and the $\lambda/4$ phase difference film upon a flat glass. Here, reflective polarizing element constituting half mirror 40 is a polarizing element that reflects S-polarized light and transmits P-polarized light, for example. When such a configuration is employed, P-polarized light emitted from display surface 21 is converted to circular polarized light by $\lambda/4$ phase difference film on display surface 21, and is then converted to S-polarized light by λ/4 phase difference film on reflective polarizing element. Most of the S-polarized light beams are reflected by reflective polarizing element, and that reflected light is converted into circular polarized light by λ/4 phase difference film on reflective polarizing element. The circular polarized light is reflected by final reflective member 50, and is then incident on λ/4 phase difference film on reflective polarizing element again, and is converted to P-polarized light as a result. Most of the P-polarized light beams are transmitted by reflective polarizing element, and the transmitted light reaches eye 401 of observer 400. According to this configuration, light from display device 2 can reach eye 401 of observer 400 more efficiently than when using a vapor-deposited type beam splitter.

Although there is a single intermediate reflective member 90 in Embodiment 6, the number of intermediate reflective members 90 is not limited to 1, and can be changed as appropriate. Additionally, intermediate reflective member 90 is not limited to a flat mirror, and may be a concave mirror or a convex mirror, or may be constituted by a Fresnel mirror.

Embodiment 7

Display system 1 according to Embodiment 7 will be described with reference to FIG. 55 to FIG. 56.

In display system 1 according to the foregoing Embodiment 5 or 2, mirror member 60, which serves as light-blocking member 8, is held outside housing 70 in a state in which mirror member 60 cannot separate from housing 70. However, in the present embodiment, mirror member 60A, which serves as light-blocking member 8, is housed within housing 70. Aside from mirror member 60A being housed within housing 70, the configuration of display system 1 is the same as in Embodiment 6. Constituent elements which are the same as in Embodiment 6 will be given like reference signs, and will not be described. Note that optical paths A41 to A44, over which light emitted from near a center of display surface 21 of display device 2 travels through half mirror 40 and is emitted to the exterior of housing 70, are indicated by dotted lines in FIG. 55. Additionally, optical paths A51 to A52, over which light incident near a center of mirror member 60A from outside housing 70 is reflected by mirror member 60A, are indicated by dotted lines in FIG. 56. In FIG. 55 and FIG. 56, the lines indicating optical paths A41 to A44 and A51 to A52 are provided only for descriptive purposes, and are not actually displayed.

Display system 1 includes: display device 2; reflecting optical system B1; mirror member 60A, which serves as light-blocking member 8; holding structure 200, which holds mirror member 60A in one of the inactive state and the blocking state; and housing 70.

Display device 2 is housed in an upper part of housing chamber 73, in a state in which display surface 21 faces downward.

Reflecting optical system B1 includes intermediate reflective member 90 such as a flat mirror, half mirror 40, and final reflective member 50.

Mirror member 60A, which has a plate shape and has reflective surface 61A as one surface, is provided in housing 70 as light-blocking member 8.

Holding structure 200 holds mirror member 60A, and furthermore holds final reflective member 50.

This holding structure 200 holds final reflective member 50 and mirror member 60A so as to be rotatable relative to housing 70, in a state in which reflective surface 61A of mirror member 60A and final reflective surface 51 of final reflective member 50 face in opposite directions.

A state in which holding structure 200 has rotated final reflective member 50 and mirror member 60A to a rotation position where final reflective surface 51 of final reflective member 50 opposes half mirror 40 (the position indicated in FIG. 55) is the inactive state, in which light incident on final reflective member 50 and light reflected by final reflective member 50 are not blocked. In the inactive state, mirror member 60A is disposed in a position on the opposite side of final reflective member 50 as half mirror 40, and in a position which is outside an optical path between final reflective member 50 and half mirror 40. Furthermore, in the inactive state, final reflective surface 51 of final reflective member 50 reflects light incident from half mirror 40 toward eye 401 of observer 400, and observer 400 can therefore see the image (the second image) based on the image (the first image) displayed in display surface 21 of display device 2.

Figure 55:
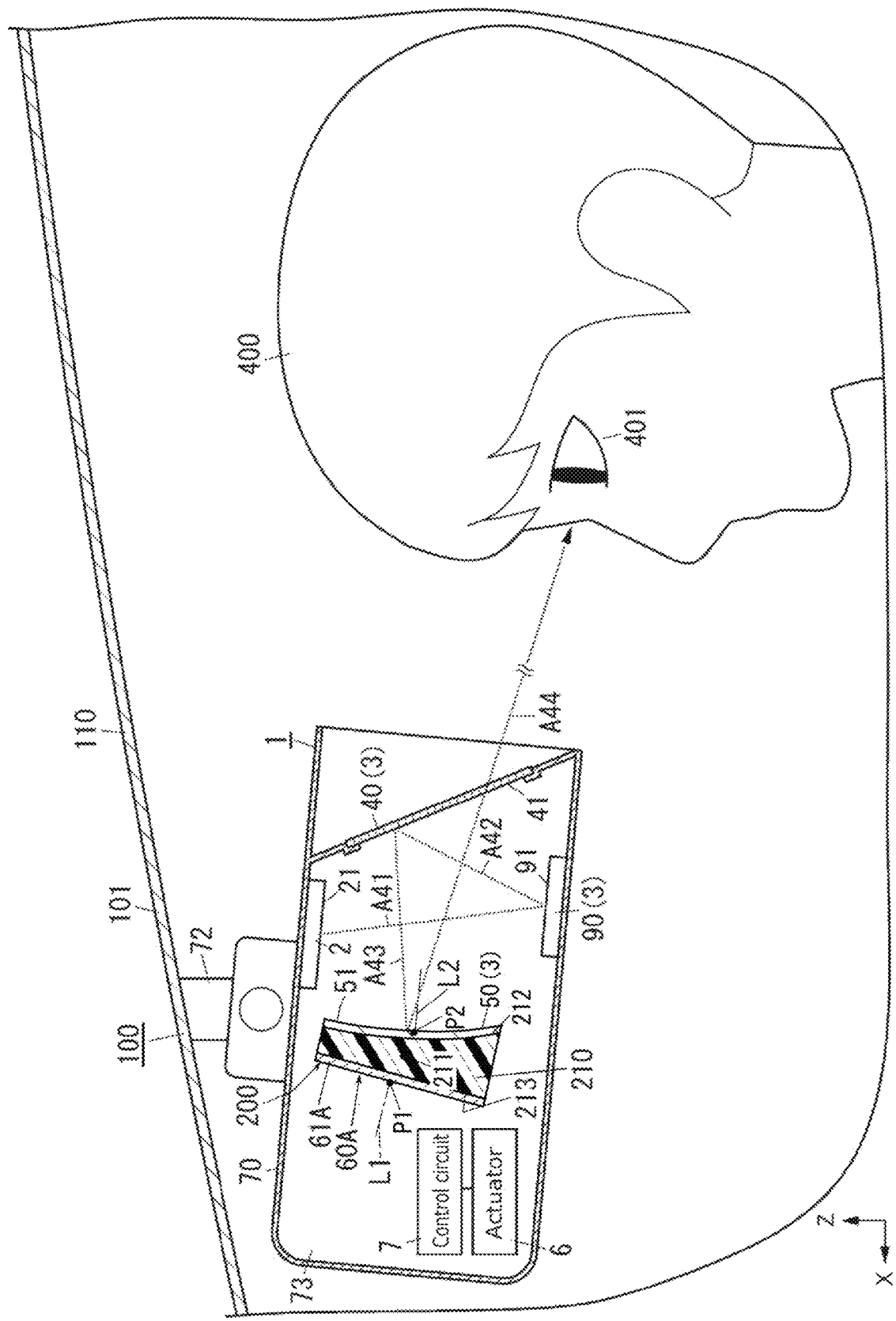
FIG. 55 is a general explanatory diagram illustrating a display system according to Embodiment 7, when a mirror member is in an inactive state.

On the other hand, a state in which holding structure 200 has rotated final reflective member 50 and mirror member 60A to a rotation position rotated 180 degrees from the rotation position illustrated in FIG. 55 (i.e., the position illustrated in FIG. 56) is the blocking state, in which light incident on final reflective member 50 is blocked. Here, holding structure 200 holds final reflective member 50 and mirror member 60A so that normal line L1 at center point P1 of reflective surface 61A of mirror member 60A and normal line L2 at center point P2 of final reflective surface 51 of final reflective member 50 are nonparallel. "Normal line at a center point of a reflective surface" is a line which passes through the center point of the reflective surface and is orthogonal to a tangent line at the center point of the reflective surface. Note that "orthogonal" as used here is not limited to intersecting with a line or a plane at a right angle, and may be shifted slightly (by several degrees) from the orthogonal direction as long as the angle appears substantially orthogonal to the human eye.

In the blocking state, mirror member 60A is disposed in the optical path between half mirror 40 and final reflective member 50. When, in the blocking state, light is emitted from display surface 21 of display device 2, that light is incident on mirror member 60A after being reflected by intermediate reflective member 90 and half mirror 40, and thus light incident on final reflective member 50 is blocked by mirror member 60A. Additionally, because normal line L1 of reflective surface 61A of mirror member 60A and normal line L2 of final reflective surface 51 of final reflective member 50 are nonparallel, light incident on mirror member 60A from display device 2 via intermediate reflective member 90 and half mirror 40 is reflected in a direction different from eye 401 of observer 400 by mirror member 60A. In other words, as a result of mirror member 60A reflecting light emitted from display surface 21 of display device 2 in a direction different from the direction of eye 401 of observer 400, the state becomes one in which observer 400 cannot see the image (the second image) based on the image (the first image) displayed in display device 2, i.e., the image displayed in display device 2 is blocked from observer 400. Note that it is preferable that when control circuit 7 has used actuator 6 to rotate mirror member 60A to a position facing observer 400, display controller 22 receive a signal indicating the blocking state from control circuit 7 and stop the display in display device 2.

As described above, in the blocking state, light emitted from display surface 21 of display device 2 is incident on mirror member 60A after being reflected by intermediate reflective member 90 and half mirror 40, and is reflected in a direction different from the direction of eye 401 of observer 600 by mirror member 60A. In other words, mirror member 60A reflects light, which is incident via intermediate reflective member 90 and half mirror 40 from display surface 21 of display device 2, in a direction different from the direction of eye 401 of observer 600, and thus the state is the blocking state, in which observer 400 cannot see the image based on the image displayed in display surface 21 of display device 2. In the blocking state, the light incident on mirror member 60A via half mirror 40 from outside housing 70 is reflected in the direction of eye 401 of observer 400 by mirror member 60A, and thus observer 400 can see the reflected image in which the light from outside housing 70 has been reflected by reflective surface 61.

In the present embodiment, holding structure 200 includes rotating body 210, which is held so as to be capable of rotating relative to housing 70, and final reflective member 50 and mirror member 60A are held by rotating body 210. Rotating body 210 is provided so as to be capable of rotating about axis of rotation 211, between a first rotation position and second rotation position. As illustrated in FIG. 55, the first rotation position is a position in which final reflective surface 51 of final reflective member 50 faces observer 400 in the inactive state. As illustrated in FIG. 56, the second rotation position is a position in which reflective surface 61A of mirror member 60A faces observer 400 in the blocking state. Rotating body 210 has what is a trapezoidal shape when viewed from an axial direction of axis of rotation 211, with final reflective member 50 attached to one attachment surface 212, and mirror member 60A attached to another attachment surface 213. Here, mirror member 60A is a concave mirror, and thus attachment surface 213 to which mirror member 60A is formed as a curved surface that matches the curvature of mirror member 60A. Rotating body 210 holds mirror member 60A and final reflective member 50 so that normal line L1 at center point P1 of reflective surface 61A of mirror member 60A and normal line L2 at center point P2 of final reflective surface 51 of final reflective member 50 are nonparallel. Rotating body 210 is driven by actuator 6 (e.g., a motor) housed within housing chamber 73 of housing 70. Control circuit 7, which controls actuator 6, is housed within housing chamber 73. In other words, display system 1 further includes actuator 6 that drives rotating body 210 between the first rotation position and the second rotation position.

Here, when a signal indicating that the display made by display device 2 is normal is being input from display device 2, display controller 22, or the like, control circuit 7 controls actuator 6 to rotate rotating body 210 to the first rotation position. In a state where rotating body 210 is rotated to the first rotation position, the light emitted from display surface 21 of display device 2 is incident on final reflective member 50 after being reflected by intermediate reflective member 90 and half mirror 40. Final reflective member 50 reflects the incident light from half mirror 40 toward half mirror 40. Part of the light reflected by final reflective member 50 passes through half mirror 40 and enters eye 401 of observer 400, and thus observer 400 can see an image based on the image displayed in display surface 21 of display device 2. Note that light from behind automobile 100, which has passed through half mirror 40 and is incident on final reflective surface 51 of final reflective member 50, is reflected in a direction different from the direction of eye 401 of observer 400 (the eye box) by final reflective surface 51, which suppresses situations where ambient light enters eye 401 of observer 400.

On the other hand, when an abnormality signal indicating an abnormality in the display made by display device 2 is being input from display device 2, display controller 22, or the like, control circuit 7 controls the motor (actuator 6) to rotate rotating body 210 to the second rotation position. Note that when there is an abnormality in the display made by display device 2, display controller 22 stops the display in display device 2, and light is not output from display surface 21 of display device 2. When rotating body 210 has been rotated to the second rotation position, light incident on reflective surface 61A of mirror member 60A from outside housing 70 (e.g., from behind automobile 100) via half mirror 40 is reflected toward eye 401 of observer 400 by reflective surface 61A of mirror member 60A. Accordingly, observer 400 can see the reflected image appearing in reflective surface 61A of mirror member 60A.

Here, in the present embodiment, final reflective member 50 and mirror member 60A are held by rotating body 210 so that normal line L1 at center point P1 of reflective surface 61A of mirror member 60A and normal line L2 at center point P2 of final reflective surface 51 of final reflective member 50 are nonparallel. Accordingly, when rotating body 210 is rotated 180 degrees from a state in which rotating body 210 is positioned at a position where light reflected by final reflective member 50 is reflected toward observer 400, the light reflected by mirror member 60A can be reflected toward observer 400. Accordingly, in the present embodiment, the state can be switched between the inactive state and the blocking state in an alternating manner by rotating rotating body 210 180 degrees. In this manner, the rotation angle of rotating body 210 is the same angle when switched to the inactive state and when switched to the blocking state, which provides an advantage in that the same state holding member that holds the position of rotating body 210 can be used for the inactive state and for the blocking state. Additionally, because display system 1 further includes actuator 6 that moves rotating body 210 between the first rotation position and the second rotation position, the state can be switched between the inactive state and the blocking state using actuator 6.

In the present embodiment, final reflective member 50 and mirror member 60A are held by rotating body 210 so that normal line L1 at center point P1 of reflective surface 61A of mirror member 60A and normal line L2 at center point P2 of final reflective surface 51 of final reflective member 50 are nonparallel. However, the configuration of holding structure 200 can be changed as appropriate.

Figure 57:
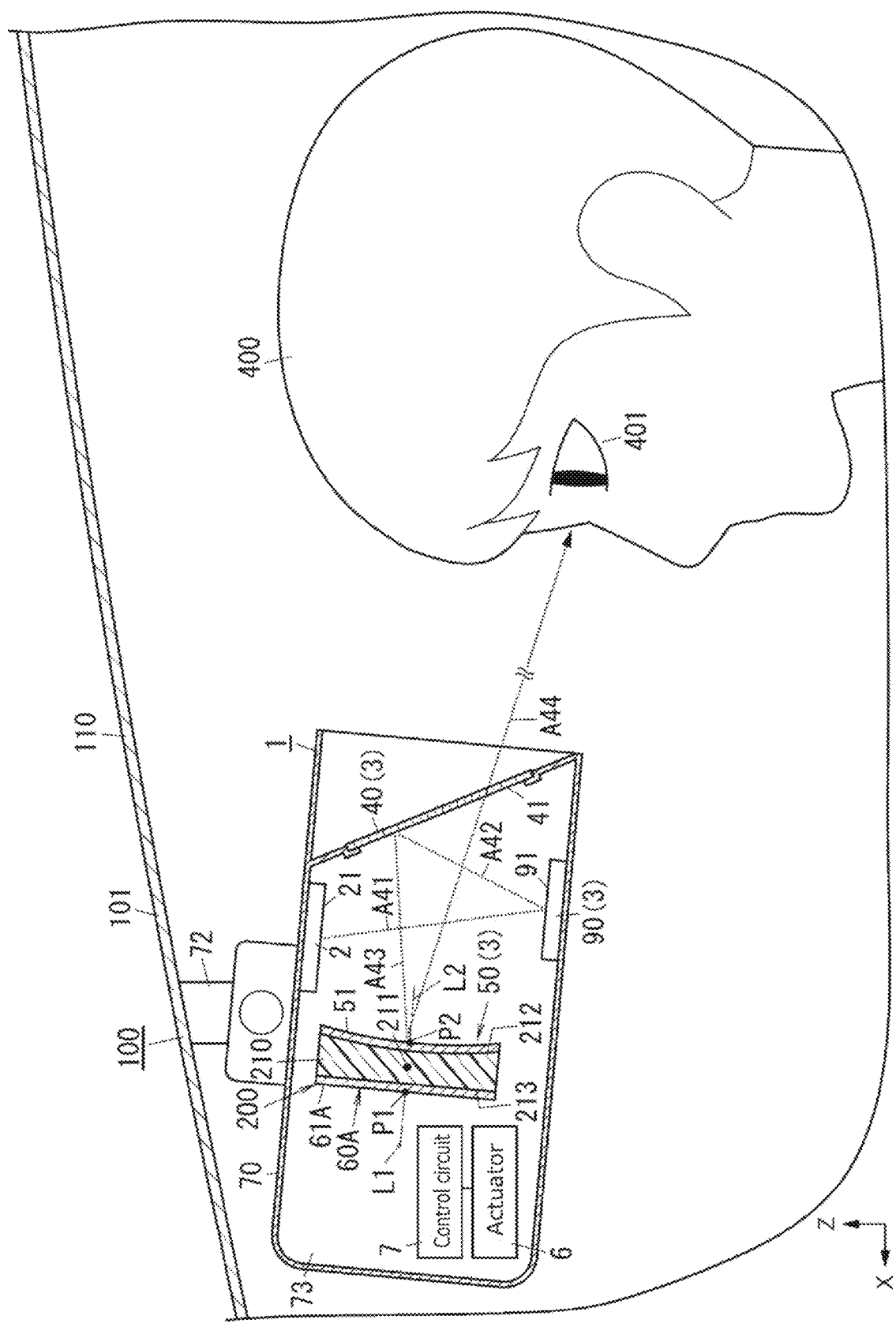
FIG. 57 is a general explanatory diagram illustrating a display system according to a variation on Embodiment 7, when the mirror member is in the inactive state.

For example, as illustrated in FIG. 57, rotating body 210 may hold mirror member 60A and final reflective member 50 so that reflective surface 61A of mirror member 60A and final reflective surface 51 of final reflective member 50 face in opposite directions, and normal line L1 at center point P1 of reflective surface 61A of mirror member 60A and normal line L2 at center point P2 of final reflective surface 51 of final reflective member 50 are parallel. Note that "parallel" as used here is not limited to a state of being perfectly parallel to a line or plane, and may be shifted slightly (by several degrees) from a parallel state as long as the lines appear substantially parallel to the human eye.

Here, when control circuit 7 controls actuator 6 and rotates rotating body 210 in one direction (clockwise or counterclockwise), rotating body 210 is rotated at different angles when switching from the inactive state to the blocking state, and when switching from the blocking state to the inactive state. In other words, the angle that rotating body 210 rotates between the first rotation position (the position of the inactive state) and the second rotation position (the position of the blocking state) is a predetermined angle aside from 180 degrees. By using different angles for the rotation angle of rotating body 210 when switching from the inactive state to the blocking state and for the rotation angle of rotating body 210 when switching from the blocking state to the inactive state, the direction parallel to normal line L2 at center point P2 of final reflective surface 51 of final reflective member 50 in the inactive state, and the direction parallel to normal line L1 at center point P1 of reflective surface 61A of mirror member 60A in the blocking state, can be set to different directions.

Through this, in the inactive state, light which has been emitted from display surface 21 of display device 2 and reflected by intermediate reflective member 90 and half mirror 40 is reflected in the direction of observer 400 by final reflective member 50, and thus observer 400 can see the image (the second image) based on the image (the first image) displayed in display device 2. On the other hand, in the blocking state, light which has passed through half mirror 40 from outside housing 70 (e.g., from behind automobile 100) and is incident on reflective surface 61A of mirror member 60A is reflected in the direction of observer 400 by reflective surface 61A, and thus observer 400 can see the reflected image from reflective surface 61A (the image of the area behind automobile 100). In the blocking state, the light emission by display device 2 is stopped, but even if light is being emitted from display surface 21 of display device 2, that emitted light is reflected by intermediate reflective member 90 and half mirror 40, and is then reflected in a direction different from the direction of observer 400 (the eye box) by reflective surface 61A of mirror member 60A, and therefore does not enter eye 401 of observer 400.

Although final reflective member 50 and light-blocking member 8 are held by rotating body 210 in the present embodiment, rotating body 210 is not a necessary constituent element and can be omitted as appropriate. Holding structure 200 may be attached directly to housing 70 in a state in which final reflective member 50 and light-blocking member 8 can each rotate independently with respect to housing 70.

Additionally, although final reflective member 50, and mirror member 60A serving as light-blocking member 8, are held by rotating body 210 in the present embodiment, one or more other mirror members may further be held by rotating body 210. In the following, mirror member 60A serving as light-blocking member 8 may be called a "first mirror member", and the other mirror member, aside from mirror member 60A serving as light-blocking member 8, may be called a "second mirror member".

Figure 58:
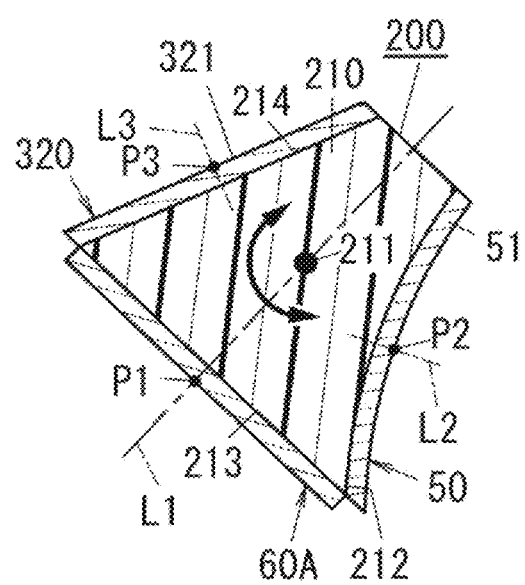
FIG. 58 is an explanatory diagram illustrating another holding structure of the aforementioned display system.

For example, FIG. 58 illustrates an example of rotating body 210 that holds one second mirror member 320 in addition to final reflective member 50 and first mirror member 60A. Second mirror member 320 is, for example, a flat anti-glare mirror which has a lower reflectance than first mirror member 60A. Here, normal line L3 at center point P3 of reflective surface 321 of second mirror member 320 (the other mirror member) is nonparallel with respect to both normal line L2 at center point P2 of final reflective surface 51 of final reflective member 50 and normal line L1 at center point P1 of reflective surface 61A of first mirror member (mirror member) 60A. Note that second mirror member 320 is not limited to a flat anti-glare mirror, and may be a convex mirror capable of providing a wide visual field.

Here, rotating body 210 has what is a trapezoidal shape when viewed from an axial direction of axis of rotation 211, with final reflective member 50, first mirror member 60A, and second mirror member 320 attached to three surfaces 212 to 214, respectively, which, of the four surfaces parallel to axis of rotation 211, exclude one of two parallel surfaces (e.g., the smallest surface). Final reflective member 50, first mirror member 60A, and second mirror member 320 are attached to rotating body 210 so that first mirror member 60A is disposed between final reflective member 50 and second mirror member 320.

With this display system 1, in the inactive state, control circuit 7 controls actuator 6 to rotate rotating body 210 so that final reflective member 50 is disposed in a position which faces observer 400. Accordingly, observer 400 can see an image based on the image displayed in display surface 21 of display device 2.

On the other hand, in the blocking state, control circuit 7 controls actuator 6 to rotate rotating body 210 so that first mirror member 60A or second mirror member 320 is disposed in a position which faces observer 400. When first mirror member 60A is disposed in a position which faces observer 400, light which has passed through half mirror 40 from behind housing 70 and is incident on reflective surface 61A of first mirror member 60A is reflected in the direction of observer 400 by reflective surface 61A, and thus observer 400 can see the reflected image from reflective surface 61A (the image of the area behind automobile 100). Likewise, when second mirror member 320 is disposed in a position which faces observer 400, light which has passed through half mirror 40 from behind housing 70 and is incident on reflective surface 321 of second mirror member 320 is reflected in the direction of observer 400 by reflective surface 321, and thus observer 400 can see the reflected image from reflective surface 321 (the image of the area behind automobile 100). Note that when second mirror member 320 is an anti-glare mirror having a lower reflectance than first mirror member 60A, the light amount of the reflected light is lower than with first mirror member 60A. Thus even when, for example, bright light is incident, such as from the headlights of a following vehicle at night, the likelihood that observer 400 will be bothered by glare can be reduced.

Figure 59A:
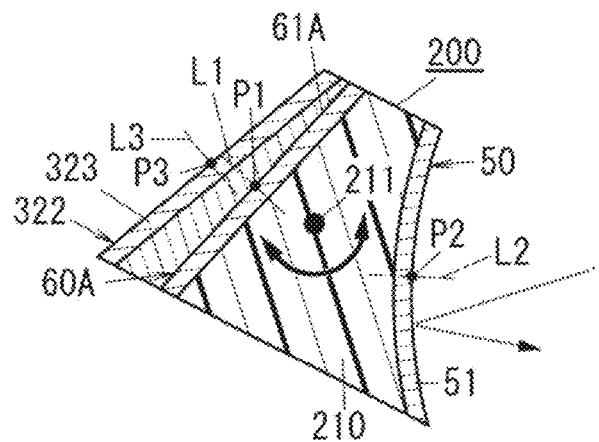
FIG. 59A is an explanatory diagram illustrating a state, in the aforementioned display system, in which reflected light from a final reflective member is reflected in the direction of an observer.
Figure 59B:
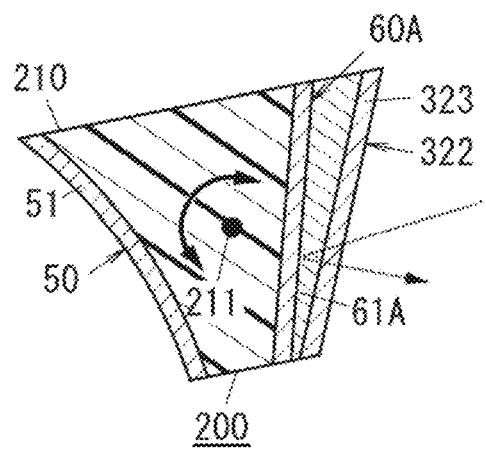
FIG. 59B is an explanatory diagram illustrating a state, in the aforementioned display system, in which reflected light from a first mirror member is reflected in the direction of an observer.
Figure 59C:
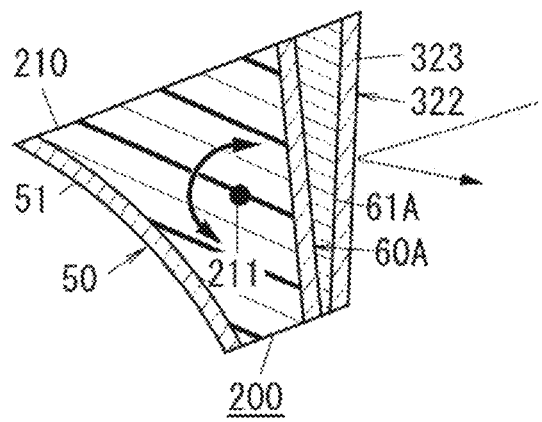
FIG. 59C is an explanatory diagram illustrating a state, in the aforementioned display system, in which reflected light from a second mirror member is reflected in the direction of an observer.

As illustrated in FIG. 59A to FIG. 59C, of the four surfaces, parallel to axis of rotation 211, of rotating body 210, which has a cross-section which is a trapezoid when viewed from the axial direction of axis of rotation 211, final reflective member 50 may be disposed on one of the two nonparallel surfaces, and mirror member 60A may be disposed on the other of the two nonparallel surfaces. Furthermore, rotating body 210 may be provided with anti-glare mirror 322, which is transmissive on the side on which light is incident on mirror member 60A. The reflectance of anti-glare mirror 322 is lower than the reflectance of mirror member 60A, and is approximately 10%, for example. Note that mirror member 60A and anti-glare mirror 322 are flat mirrors, and are held by rotating body 210 so that the reflective surface of mirror member 60A and reflective surface 323 of anti-glare mirror 322 are nonparallel to each other. In other words, mirror member 60A and anti-glare mirror 322 are held by rotating body 210 so that, as seen from the axial direction of axis of rotation 211 of rotating body 210, normal line L1 at center point P1 of reflective surface 61A of mirror member 60A and normal line L3 at center point P3 of reflective surface 323 of anti-glare mirror 322 are nonparallel. Note that light-transmissive member (e.g., glass, acrylic resin, or the like) is disposed between mirror member 60A and anti-glare mirror 322. Anti-glare mirror 322 reflects part of the light incident on anti-glare mirror 322. The rest of the incident light passes through anti-glare mirror 322 and is incident on mirror member 60A, and is reflected by mirror member 60A in a reflection direction which is different from the reflection direction by anti-glare mirror 322.

Here, as illustrated in FIG. 59A, in the inactive state, in which rotating body 210 is rotated to a position where final reflective member 50 faces observer 400, the light emitted from display surface 21 of display device 2 is incident on final reflective surface 51 of final reflective member 50 after being reflected by intermediate reflective member 90 and half mirror 40. Furthermore, final reflective surface 51 of final reflective member 50 reflects light incident from half mirror 40 toward eye 401 of observer 400, and observer 400 can therefore see an image based on the image displayed in display surface 21 of display device 2.

On the other hand, as illustrated in FIG. 59B, when rotating body 210 is rotated to a position where light reflected by reflective surface 61A of mirror member 60A enters eye 401 of observer 400, observer 400 sees the reflected image from mirror member 60A. In other words, most of light incident from outside housing 70 through half mirror 40 passes through anti-glare mirror 322 and is incident on mirror member 60A, and is reflected by reflective surface 61A of mirror member 60A. The light reflected by reflective surface 61A passes through half mirror 40 and enters eye 401 of observer 400, and observer 400 can therefore see the reflected image from mirror member 60A. Although part of the incident light is also reflected by anti-glare mirror 322, anti-glare mirror 322 reflects the light in a different direction from observer 400, and thus the reflected image from anti-glare mirror 322 is not seen by observer 400.

Additionally, as illustrated in FIG. 59C, when rotating body 210 is rotated to a position where light reflected by reflective surface 323 of anti-glare mirror 322 enters eye 401 of observer 400, observer 400 sees the reflected image from anti-glare mirror 322. In other words, part of the light incident from outside housing 70 through half mirror 40 is reflected by reflective surface 323 of anti-glare mirror 322. The light reflected by this reflective surface 323 passes through half mirror 40 and enters eye 401 of observer 400, and observer 400 can therefore see the reflected image from anti-glare mirror 322. Because the reflectance of anti-glare mirror 322 is lower than the reflectance of mirror member 60A, even when, for example, bright light is incident from outside housing 70 (such as light from the headlights of a following vehicle), the likelihood that observer 400 will be bothered by glare can be reduced. Although most of light incident on anti-glare mirror 322 passes through anti-glare mirror 322, is incident on mirror member 60A, and is then reflected by reflective surface 61A of mirror member 60A, reflective surface 61A reflects the incident light in a different direction from observer 400, and thus the reflected image from mirror member 60A will not be seen by observer 400.

In this manner, final reflective member 50, mirror member 60A, and anti-glare mirror 322 are held by rotating body 210, and the state can be switched between a state in which an image based on the image displayed in display device 2 is shown to observer 400 (the inactive state) and a state in which a reflected image from mirror member 60A or anti-glare mirror 322 is shown to observer 400 (the blocking state) by changing the rotation position of rotating body 210.

Figure 60:
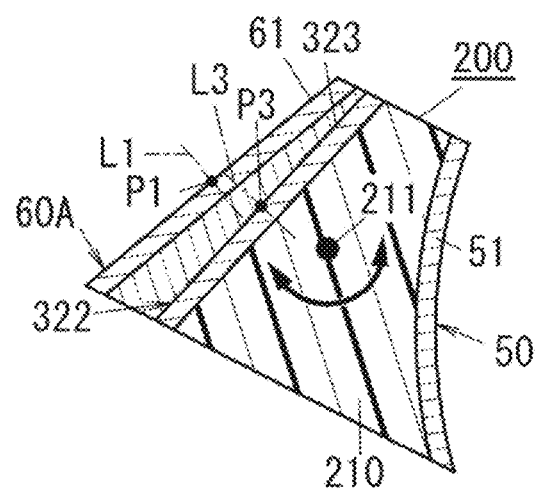
FIG. 60 is an explanatory diagram illustrating another holding structure of the aforementioned display system.

In the display system illustrated in FIG. 59A to FIG. 59C, anti-glare mirror 322 is disposed on the side of mirror member 60A on which light is incident, but as illustrated in FIG. 60, anti-glare mirror 322 may be disposed on one surface of rotating body 210, and mirror member 60A may then be disposed on the side of anti-glare mirror 322 on which light is incident.

Figure 61:
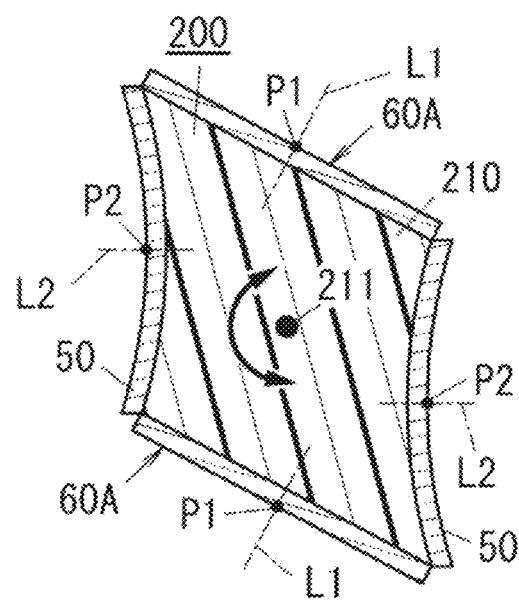
FIG. 61 is an explanatory diagram illustrating another holding structure of the aforementioned display system.

Additionally, as illustrated in FIG. 61, rotating body 210 may be a quadrangular prism in which a shape of a cross-section intersecting with the axial direction of axis of rotation 211 is square. Two final reflective members 50 and two mirror members 60A may then be disposed in an alternating manner on the four side surfaces of rotating body 210 that are parallel to the axial direction of axis of rotation 211.

Here, the shape of rotating body 210, in a cross-section intersecting with the axial direction of axis of rotation 211, is a parallelogram. The two final reflective members 50 and the two mirror members 60A are held by rotating body 210 so that when normal line L2 at a center point of final reflective surface 51 of each final reflective member 50 is rotated 90 degrees about axis of rotation 211 in a plane orthogonal to axis of rotation 211, normal line L2 is non-parallel to normal line L1 at center point P1 of reflective surface 61 of each mirror member 60A.

Accordingly, when switching from the inactive state to the blocking state or when switching from the blocking state to the inactive state, control circuit 7 may control actuator 6 to rotate rotating body 210 90 degrees.

In the inactive state, one of the two final reflective members 50 is disposed so as to face observer 400, and thus observer 400 can see an image based on the image displayed in display surface 21 of display device 2.

On the other hand, in the blocking state, one of the two mirror members 60A is disposed facing observer 400. When mirror member 60A is disposed in a position which faces observer 400, light which has passed through half mirror 40 from behind housing 70 and is incident on reflective surface 61A of mirror member 60A is reflected in the direction of observer 400 by reflective surface 61A, and thus observer 400 can see the reflected image from reflective surface 61A (the image of the area behind automobile 100).

Thus with holding structure 200 illustrated in FIG. 61, the state can be switched from the inactive state to the blocking state or from the blocking state to the inactive state by rotating rotating body 210 90 degrees, and thus the angle by which rotating body 210 is rotated in order to switch to the inactive state or the blocking state can be made smaller than 180 degrees. When, in the orientation illustrated in FIG. 61, rotating body 210 is rotated 90 degrees in either one of the clockwise and counterclockwise direction, the state can be changed between the inactive state and the blocking state.

Here, the two mirror members 60A attached to rotating body 210 may be flat mirrors, convex mirrors, or Fresnel mirrors.

Additionally, although the two mirror members 60A held by rotating body 210 are the same type of mirrors, two final reflective members 50 may be attached to two opposing surfaces of rotating body 210, while mirror member (first mirror member) 60A and another mirror member aside from mirror member 60A (second mirror member 320) are attached to the remaining two surfaces of rotating body 210. Second mirror member 320 may, for example, be an anti-glare mirror having a lower reflectance than mirror member 60A, or may be a convex mirror that can provide a wide visual field.

Figure 62:
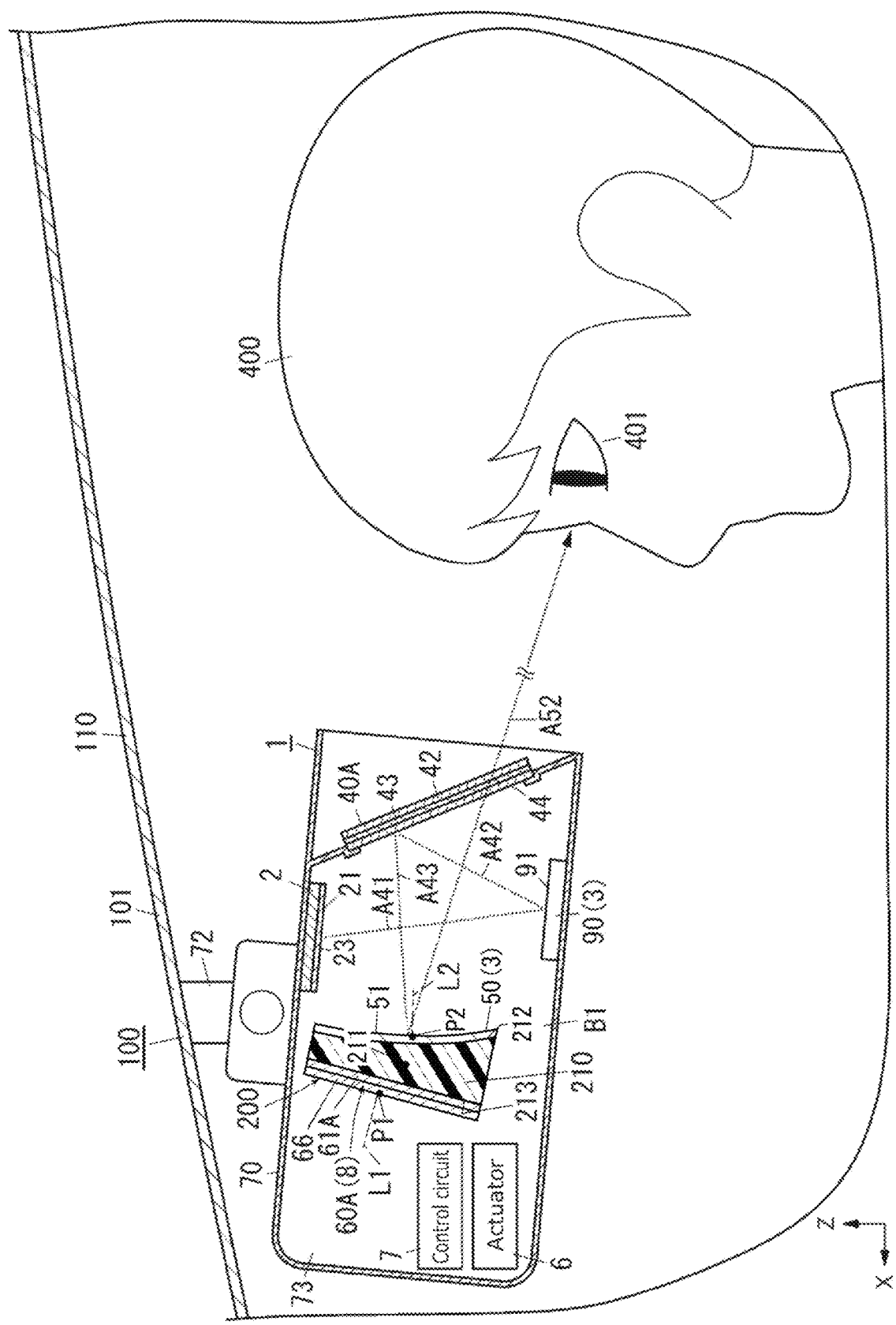
FIG. 62 is a general explanatory diagram illustrating a display system according to another variation on Embodiment 7, when the mirror member is in the inactive state.

Note that in the present embodiment, half mirror 40A having the same configuration as in Variation 6 on Embodiment 5 may be applied as the half mirror included in reflecting optical system B1, as illustrated in FIG. 62. In other words, half mirror 40A having a layered structure in which a reflective polarizing film (reflective polarizing element 43) through which light of a predetermined oscillation direction passes and λ/4 phase difference film 44 are layered may be used as the half mirror included in reflecting optical system B1. λ/4 phase difference film (first λ/4 phase difference film) 44 produces a quarter-wavelength phase difference between the light incident on and light emitted from half mirror 40A, in an electrical field oscillation direction. Light emitted from display surface 21 of display device 2 is incident on final reflective member 50 via half mirror 40A, and the light reflected by final reflective member 50 is displayed as a picture by passing through half mirror 40A and entering eye 401 of observer 400.

In this case, display device 2 may be a liquid crystal panel with λ/4 phase difference film 23 disposed on display surface 21, and half mirror 40A may be configured by laminating reflective polarizing element 43, which is a wire grid or the like, and λ/4 phase difference film 44 upon flat glass 42.

Additionally, in the present embodiment, mirror member 60A, which has a plate shape and has reflective surface 61A as one surface, is provided in housing 70 as light-blocking member 8. In the inactive state, mirror member 60A is disposed at a first position outside the optical path of the light entering eye 401 of observer 400 from final reflective member 50, as illustrated in FIG. 62. In the blocking state, rotating body 210, which holds mirror member 60A, is rotated 180 degrees, and mirror member 60A is disposed between final reflective member 50 and observer 400 in a state in which reflective surface 61A faces observer 400. λ/4 phase difference film (second λ/4 phase difference film) 66 is provided on a surface of mirror member 60A. λ/4 phase difference film 66 produces a quarter-wavelength phase difference between the light incident on and light emitted from mirror member 60A, in an electrical field oscillation direction.

When such a configuration is employed, in the inactive state, P-polarized light emitted from display surface 21 is converted to circular polarized light by λ/4 phase difference film 23 on display surface 21, and is then converted to S-polarized light by λ/4 phase difference film 44 on reflective polarizing element 43. Most of the S-polarized light beams are reflected by reflective polarizing element 43, and that reflected light is converted into circular polarized light by λ/4 phase difference film 44 on reflective polarizing element 43. The circular polarized light is reflected by final reflective member 50, and is then incident on λ/4 phase difference film 44 on reflective polarizing element 43 again, and is converted to P-polarized light as a result. Most of the P-polarized light beams are transmitted by reflective polarizing element 43, and the transmitted light reaches eye 401 of observer 400. According to this configuration, light from display device 2 can reach eye 401 of observer 400 more efficiently than when using a vapor-deposited type beam splitter.

Meanwhile, in the blocking state, light incident from outside housing 70 passes through half mirror 40A and enters into housing 70, but the P component of the incident light passes through reflective polarizing element 43 and is converted into circular polarized light by λ/4 phase difference film 44. The circular polarized light which has passed through half mirror 40A is polarized as S-polarized light by λ/4 phase difference film 66, and is incident on reflective surface 61A of mirror member 60A. Reflective surface 61A of mirror member 60A reflects the incident light. The reflected light is converted into circular polarized light by again passing through λ/4 phase difference film 66, and is then incident on half mirror 40A. At this time, the light incident on half mirror 40A (circular polarized light) is converted into P-polarized light by passing through λ/4 phase difference film 44. Most of the P-polarized light beams are transmitted by reflective polarizing element 43, and the transmitted light reaches eye 401 of observer 400. According to this configuration, even in the blocking state, light from display device 2 can reach eye 401 of observer 400 more efficiently than when using a vapor-deposited type beam splitter.

Embodiment 8

Display system 1 according to Embodiment 8 will be described with reference to FIG. 63 to FIG. 65.

Figure 63:
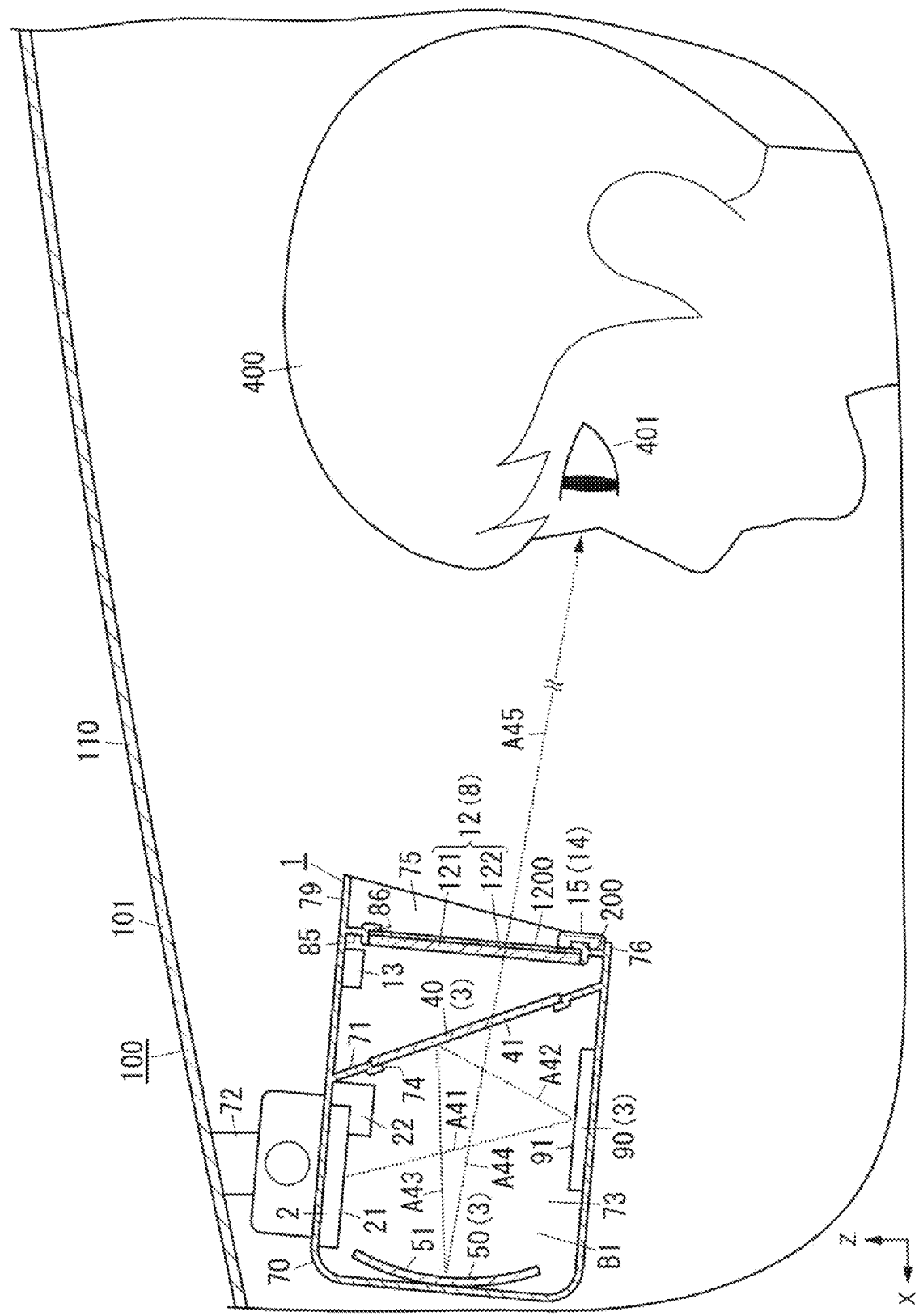
FIG. 63 is a general explanatory diagram illustrating a display system according to Embodiment 8, when a state of a liquid crystal mirror is an inactive state.
Figure 64:
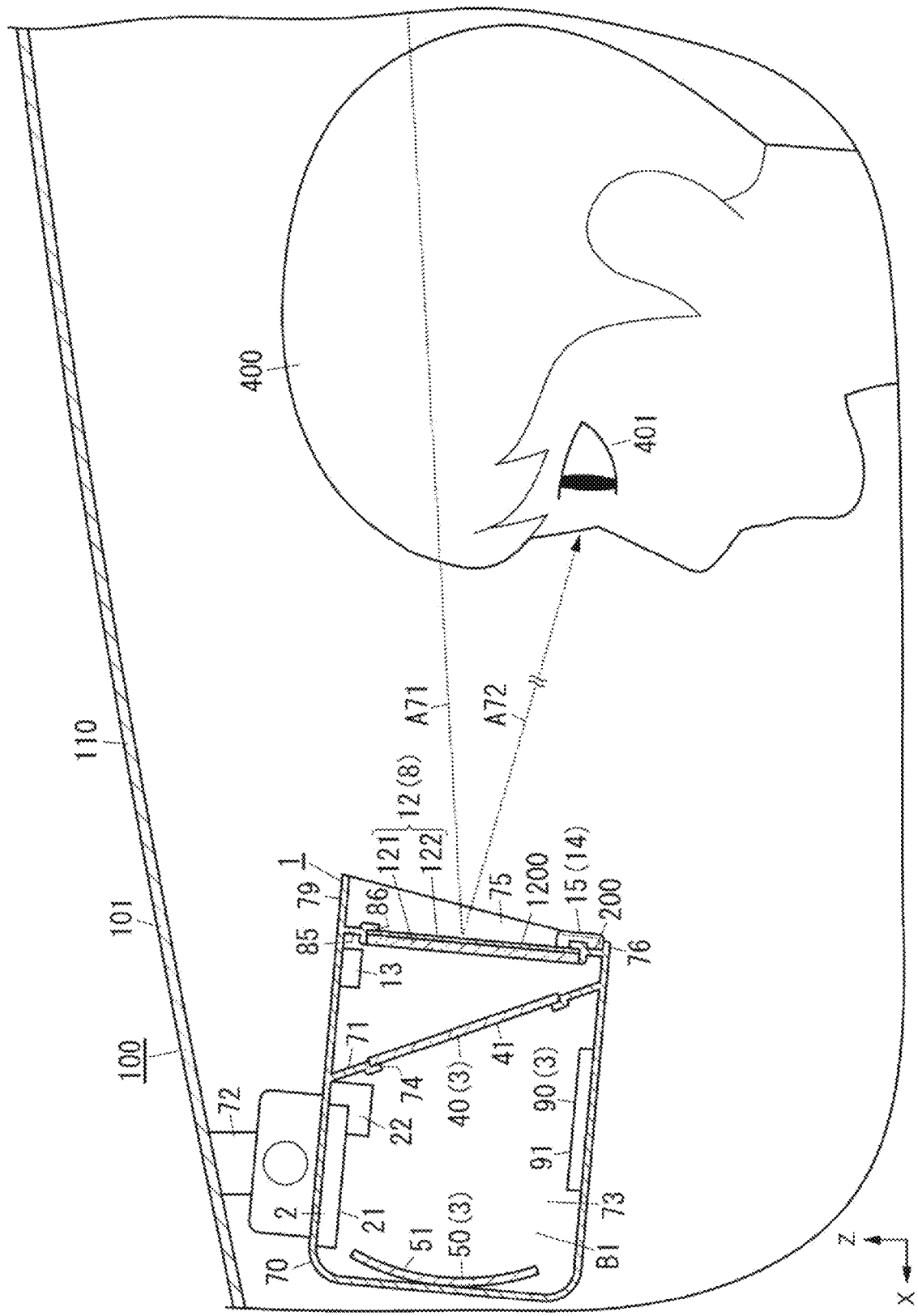
FIG. 64 is a general explanatory diagram illustrating the aforementioned display system, when the state of the liquid crystal mirror is a blocking state.

As illustrated in FIG. 63, display system 1 according to the present embodiment includes: display device 2, which has display surface 21; at least two reflective members 3 including half mirror 40 and final reflective member 50; and housing 70, which holds display device 2 and the at least two reflective members 3. Note that optical paths A41 to A45, over which light emitted from near a center of display surface 21 of display device 2 travels through half mirror 40 and liquid crystal mirror 12 and is emitted to the exterior of housing 70, are indicated by dotted lines in FIG. 63. In FIG. 63, the lines indicating optical paths A41 to A45 are provided only for descriptive purposes, and are not actually displayed.

As described above, display system 1 includes reflecting optical system B1, which has half mirror 40. Light emitted from display surface 21 of display device 2 is incident on final reflective member 50 via half mirror 40. A picture (image) is displayed by the light reflected by final reflective member 50 entering eye 401 of observer 400 via half mirror 40. Final reflective member 50 is a concave mirror.

Display system 1 further includes light-blocking member 8 (liquid crystal mirror 12) and drive circuit (drive circuit 13). Light-blocking member 8 can take on either one of two states, namely the blocking state, in which at least part of the light reflected by final reflective member 50 is blocked, and the inactive state, in which the blocking of the light reflected by final reflective member 50 is inactive. The drive circuit switches the state of light-blocking member 8 from the inactive state to the blocking state in accordance with an output from detection sensor 14. Detection sensor 14 detects a state in a predetermined detection area R1 (see FIG. 65).

According to the present embodiment, the drive circuit (drive circuit 13) switches the state of light-blocking member 8 (liquid crystal mirror 12) from the inactive state to the blocking state in accordance with a state in detection area R1. In this case, a situation where light is incident on the concave mirror (final reflective member 50) can be suppressed, and thus a situation where light incident on the concave mirror is focused on detection area R1 as light reflected by the concave mirror can be suppressed. Accordingly, the likelihood of object O1 present in detection area R1 (see FIG. 65) being heated by the light can be reduced.

To describe in further detail, detection sensor 14 according to the present embodiment includes object sensor 15. Detection area R1 is an area through which the optical path of light reflected by final reflective member 50 passes. Object sensor 15 detects the presence or absence of object O1 in detection area R1. The drive circuit (drive circuit 13) switches the state of light-blocking member 8 (liquid crystal mirror 12) from the inactive state to the blocking state when object sensor 15 detects that object O1 is present in detection area R1. Accordingly, the likelihood of object O1 present in detection area R1 being heated by the light can be further reduced.

Display system 1 according to the present embodiment differs from the foregoing Embodiment 5 in that the drive circuit (drive circuit 13) switches the state of light-blocking member 8 (liquid crystal mirror 12) from the inactive state to the blocking state in accordance with a detection result from detection sensor 14. Note that in display system 1 according to the present embodiment, constituent elements that are the same as in the foregoing embodiments will be given like reference numerals, and will not be described.

As described above, display system 1 according to the present embodiment includes display device 2, at least two reflective members 3, housing 70, light-blocking member 8 (liquid crystal mirror 12), and the drive circuit (drive circuit 13). Display system 1 further includes display controller 22 and detection sensor 14. The at least two reflective members 3 further include intermediate reflective member 90 in addition to the above-described half mirror 40 and final reflective member 50. Intermediate reflective member 90 reflects light emitted from display surface 21 of display device 2 toward half mirror 40.

Display system 1 according to the present embodiment includes liquid crystal mirror 12 as light-blocking member 8. Liquid crystal mirror 12 is disposed in optical paths A44 to A45 of the light reflected by final reflective member 50. Half mirror 40 is disposed between liquid crystal mirror 12, which is the light-blocking member, and final reflective member 50. The light transmittance of liquid crystal mirror 12 (light-blocking member 8) changes in accordance with an applied voltage (an output of detection sensor 14). More specifically, the transmittance of at least visible light varies in liquid crystal mirror 12 in accordance with the applied voltage. In other words, in accordance with the applied voltage, liquid crystal mirror 12 can take on either one of two states, namely the blocking state, in which at least part of visible light such as the light reflected by final reflective member 50 is blocked, and the inactive state, in which the blocking of visible light such as the light reflected by final reflective member 50 is inactive. The blocking state is a state in which the light transmittance of liquid crystal mirror 12 is comparatively low. The inactive state is a state in which the light transmittance of liquid crystal mirror 12 is comparatively high. In other words, the "blocking state" in the present disclosure is not limited to a state in which light is completely blocked, and may be any state in which it is more difficult for light to pass than in the inactive state. Drive circuit 13 includes, for example, a power source circuit and a semiconductor integrated circuit (IC). Drive circuit 13 freely switches the state of liquid crystal mirror 12 between the inactive state and the blocking state by controlling the voltage applied to liquid crystal mirror 12. Here, when the state of the light-blocking member (liquid crystal mirror 12) is in the blocking state, the light-blocking member (liquid crystal mirror 12) is disposed so that half mirror 40 is positioned between the light-blocking member (liquid crystal mirror 12) and final reflective member 50.

Furthermore, when liquid crystal mirror 12 is in the blocking state, outer surface 1200 of liquid crystal mirror 12 (a surface on the side of observer 400) is a reflective surface (a mirror surface) that reflects visible light. Outer surface 1200 is a surface facing in the direction opposite from final reflective surface 51, which is the reflective surface of final reflective member 50.

Liquid crystal mirror 12 includes liquid crystal layer 121 and light diffusion layer 122. Liquid crystal layer 121 is a part in which the transmittance changes in accordance with the voltage applied from drive circuit 13. To be more specific, the direction of the molecular orientation of liquid crystal layer 121 changes in accordance with the applied voltage, which causes a switch between transmitting and blocking light. Light diffusion layer 122 is laminated to liquid crystal layer 121. Light diffusion layer 122 is formed, for example, by blending scattering particles into a base material. Light diffusion layer 122 diffuses light, which reduces the appearance of the light in liquid crystal mirror 12.

Part of the light emitted from display surface 21 of display device 2, reflected by intermediate reflective member 90, reflected by half mirror 40, and reflected by the final reflective member 50, passes through half mirror 40 and reaches liquid crystal mirror 12.

When liquid crystal mirror 12 is in the blocking state, most of the light reflected by final reflective member 50 is absorbed or reflected (blocked) by liquid crystal mirror 12, so that the picture displayed in display surface 21 cannot be seen from outside housing 70. Additionally, as illustrated in FIG. 64, when liquid crystal mirror 12 is in the blocking state, outer surface 1200 of liquid crystal mirror 12 (the surface on the side of observer 400) is a mirror surface. Accordingly, observer 400 can see an image of the area behind automobile 100, which appears in liquid crystal mirror 12. In other words, display system 1 can provide an alternative display, as a mirror image appearing in liquid crystal mirror 12, even when an abnormality has arisen in the display by display device 2. Optical paths A71 to A72, over which light incident near a center of liquid crystal mirror 12 from outside housing 70 is reflected by liquid crystal mirror 12, are indicated by dotted lines in FIG. 64. In FIG. 64, the lines indicating optical paths A71 to A72 are provided only for descriptive purposes, and are not actually displayed.

As illustrated in FIG. 63, when liquid crystal mirror 12 is in the inactive state, most of the light reflected by final reflective member 50 passes through liquid crystal mirror 12, so that the picture displayed in display surface 21 can be seen from outside housing 70 (see optical paths A41 to A45).

Figure 65:
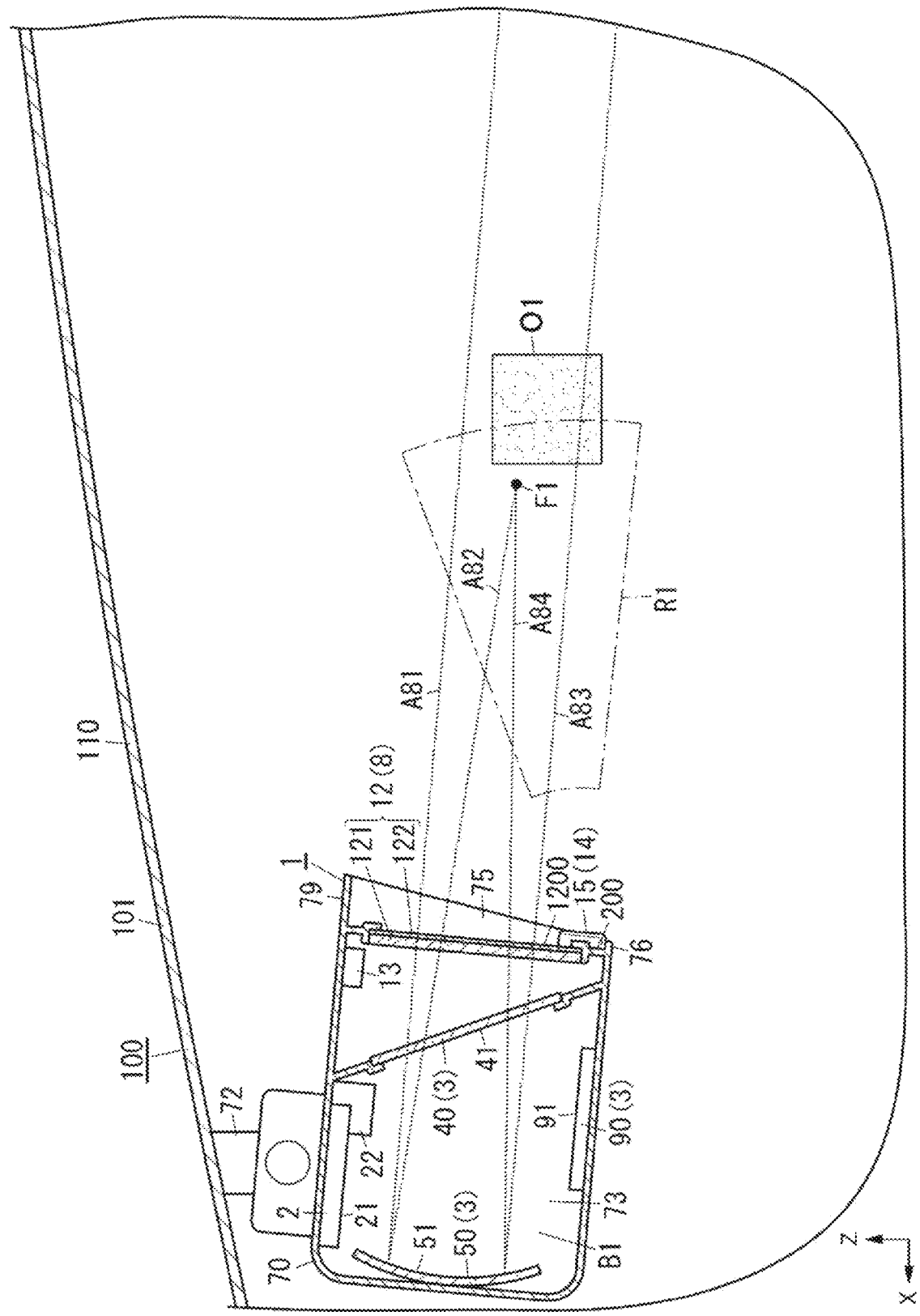
FIG. 65 is a general explanatory diagram illustrating the aforementioned display system, and illustrates an optical path of outside light when the state of the liquid crystal mirror is the inactive state.

Incidentally, detection sensor 14 detects the state in detection area R1, as illustrated in FIG. 65. Detection sensor 14 according to the present embodiment includes object sensor 15, which detects the presence or absence of object O1 in detection area R1. Object sensor 15 according to the present embodiment is a proximity sensor. For example, an ultrasonic sensor, an electrostatic capacitance proximity switch, a PSD (Position Sensitive Device), or the like can be used as object sensor 15. Detection sensor 14 may be the above-described proximity sensor 943. Specific examples of object O1 are luggage brought by a person, curtains and other fixtures, ornaments such as character straps attached inside the vehicle, body parts of a person or animal, and so on. Object O1 is only conceptually illustrated in FIG. 65, and FIG. 65 does not represent the actual shape of object O1.

Object sensor 15 is held by housing 70. To be more specific, object sensor 15 is housed within housing 70. However, object sensor 15 may be disposed outside housing 70.

Detection area R1 is an area of a predetermined size behind housing 70. Detection area R1 is also an area which includes focal point F1 of final reflective member 50. When using, for example, an ultrasonic sensor as object sensor 15, the range of detection area R1 can be limited by measuring a Received Signal Strength Indication (RSSI). In other words, drive circuit 13 can determine that object O1 is present in detection area R1 when the receives signal strength indication from ultrasonic sensor is within a predetermined range. A shortest distance between a center of detection area R1 and housing 70 is, for example, approximately 10 cm. Additionally, a shortest distance between a center of the eye box (the position of eye 401 of observer 400, such as the driver of automobile 100) and housing 70 is longer than a shortest distance between detection area R1 and housing 70. The eye box is located outside detection area R1. A shortest distance between the center of the eye box and housing 70 is, for example, approximately 50 cm.

Parallel light incident on final reflective member 50 is focused at focal point F1. In FIG. 65, two optical paths of the parallel light incident on final reflective member 50 from outside housing 70 are indicated by dotted lines. One of the two optical paths is optical paths A81 to A82, and the other is optical paths A83 to A84. In FIG. 65, the lines indicating optical paths A81 to A82 and A83 to A84 are provided only for descriptive purposes, and are not actually displayed.

It is possible that light such as sunlight (outside light) will be incident on final reflective member 50. It is furthermore possible that light reflected by final reflective member 50 will be focused at focal point F1. If object O1 is present at focal point F1 or near focal point F1, object O1 may be heated by the light reflected by final reflective member 50. Accordingly, drive circuit 13 switches the state of liquid crystal mirror 12 from the inactive state to the blocking state in accordance with an output from detection sensor 14. To be more specific, drive circuit 13 switches the state of liquid crystal mirror 12 from the inactive state to the blocking state when object sensor 15 of detection sensor 14 detects that object O1 is present in detection area R1. Accordingly, the likelihood of object O1 present in detection area R1 being heated by the light can be reduced. Additionally, when the state of liquid crystal mirror 12 is switched to the blocking state in this manner, a reflected image produced by light from outside housing 70 being reflected by outer surface 1200 of liquid crystal mirror 12 can be shown to observer 400.

Additionally, there are situations where abnormalities arise in the display of display device 2, when display device 2 malfunctions and no image is displayed in display surface 21. There are also situations where when the picture from imaging unit 4 is displayed in display device 2, abnormalities arise in the display of display device 2 due to malfunctions in imaging unit 4, abnormalities in the communication between imaging unit 4 and display device 2, and so on. When an abnormality has occurred in the display of display device 2, a reflected image produced by outer surface 1200 of liquid crystal mirror 12 reflecting light from outside housing 70 can be shown to observer 400 by switching the state of liquid crystal mirror 12 from the inactive state to the blocking state. Additionally, in the present embodiment, a reflected image produced by outer surface 1200 of liquid crystal mirror 12 reflecting light from outside housing 70 (light from behind observer 400) can be shown to observer 400 by switching the state of liquid crystal mirror 12 from the inactive state to the blocking state. Accordingly, by adjusting the angle of the entire housing 70 without using liquid crystal mirror 12, the amount by which housing 70 is tilted can be reduced compared to when using half mirror 40 in place of an optical mirror, and situations where the forward view (in front of observer 400) is blocked by housing 70 can be suppressed. Thus according to the present embodiment, display system 1, which can make an alternative display even when an abnormality has arisen in the display by display device 2, and which can suppress a drop in forward visibility, can be provided. According to the present embodiment, the state of liquid crystal mirror 12 can be switched from the inactive state to the blocking state without tilting housing 70.

Additionally, drive circuit 13 puts the state of liquid crystal mirror 12 into the blocking state when automobile 100 is in a stopped state. "Stopped state" refers to a state in which automobile 100 has stopped functions pertaining to travel. To be more specific, "stopped state" refers to a state in which the circuits required for automobile 100 to travel are not being electrified. For example, if automobile 100 is a gasoline vehicle having an ignition coil, the "stopped state" refers to a state in which the ignition coil is not being electrified. Note that in the foregoing Embodiments 3 to 5, actuator 6 may move mirror members 60 and 60A to the second position, and put mirror members 60 and 60A into the blocking state, when in the stopped state, in which automobile 100 has stopped functions pertaining to travel.

Housing 70 of display system 1 includes a middle wall (or rear wall 71). The middle wall is tilted at an angle, and through-hole 74 is provided in the middle wall. Through-hole 74 has a larger dimension in the left-right direction (a direction orthogonal to the up-down direction and the front-rear direction) than in the up-down direction, and a ratio between the dimension in the left-right direction (a longer-side dimension) and the dimension in the up-down direction (a shorter-side dimension) is approximately 3 to 6:1. Half mirror 40 is attached within through-hole 74.

Housing 70 further includes rear wall 85. Rear wall 85 is formed behind the middle wall. Rear wall 85 is formed parallel to the up-down direction. Opening 86 is provided in rear wall 85. Opening 86 connects spaces, of housing 70, to the front and rear of rear wall 85. Opening 86 has a larger dimension in the left-right direction (a direction orthogonal to the up-down direction and the front-rear direction) than in the up-down direction, and a ratio between the dimension in the left-right direction (a longer-side dimension) and the dimension in the up-down direction (a shorter-side dimension) is approximately 3 to 6:1. Liquid crystal mirror 12 is attached within opening 86. Here, holding structure 200 is configured to hold liquid crystal mirror 12, which serves as light-blocking member 8, in both the inactive state and the blocking state, using rear wall 85 and the like of housing 70.

In housing 70, horizontal hood 75 projecting to the rear from each of left and right side edges of rear wall 85, and lower hood 76 projecting to the rear from a lower side edge of rear wall 85, are integrated with housing 70. In other words, housing 70 includes horizontal hood 75 and lower hood 76. Here, horizontal hood 75 and lower hood 76 are provided as a single entity. Furthermore, housing 70 includes upper hood 79, which projects rearward from an upper side edge of rear wall 85.

Display system 1 according to the present embodiment includes half mirror 40, final reflective member 50, and intermediate reflective member 90 as the at least two reflective members 3, which reflect light emitted from display surface 21 of display device 2. In other words, display system 1 includes reflecting optical system B1, which is constituted by half mirror 40, final reflective member 50, and intermediate reflective member 90.

Half mirror 40 is attached in through-hole 74 provided in the middle wall of housing 70. Half mirror 40 is light-transmissive. Half mirror 40 functions so as to transmit part of incident light and reflect another part of the incident light. In the present embodiment, half mirror 40 is constituted by a plate-shaped beam splitter having a light transmittance and reflectance of approximately 50%. Half mirror 40 is disposed at an angle relative to the up-down direction so that an upper end of half mirror 40 projects further to the rear than a lower end.

Surface 41 of half mirror 40 on a final reflective member 50 side (also called an "inner surface" hereinafter) faces display surface 21 of display device 2 and final reflective surface 51 of final reflective member 50. In the present embodiment, half mirror 40 is disposed so that a normal direction of inner surface 41 intersects obliquely with the incidence direction of the light from display surface 21 of display device 2 and the incidence direction of the light from final reflective surface 51, respectively. Although inner surface 41, which is a reflective surface that reflects light from display device 2, is flat in the present embodiment, inner surface 41 may be a curved surface such as a free-form surface. By making inner surface 41 of half mirror 40 a free-form surface, distortion in the image formed on final reflective surface 51 can be reduced, curvature in the image plane can be reduced, and the resolution can be improved.

Final reflective member 50 is a concave mirror. Final reflective surface 51 of final reflective member 50 is formed by, for example, depositing a reflective metal film such as aluminum on a surface of glass. Final reflective member 50 is disposed in a front part of housing chamber 73 with final reflective surface 51 facing rearward. In other words, final reflective member 50 is disposed within housing chamber 73, in a position facing inner surface 41 of half mirror 40.

In the present embodiment, inner surface 41 of half mirror 40 reflects the light emitted from display surface 21 of display device 2 toward final reflective surface 51 of final reflective member 50. Final reflective surface 51 of final reflective member 50 reflects the reflected light, which has been reflected by inner surface 41 of half mirror 40, toward half mirror 40. Half mirror 40 transmits the light incident from final reflective member 50, and the light transmitted through half mirror 40 enters eye 401 of observer 400. As a result, observer 400 can see an image based on the image displayed in display surface 21 of display device 2.

Operations of display system 1, and of electronic mirror system 5 including display system 1, according to the present embodiment will be described below. Note that the state of liquid crystal mirror 12 is assumed to be switched to the inactive state, in which the light reflected by final reflective member 50 is not blocked.

For example, electronic mirror system 5 starts operating when power is supplied to electronic mirror system 5 from a battery of automobile 100 and a control signal for starting operations is input to electronic mirror system 5 from an ECU (Electronic Control Unit) included in automobile 100.

For example, when a control signal for causing display controller 22 to start operations is input from the ECU of automobile 100, display controller 22 causes imaging unit 4 to capture an image of the area behind automobile 100 at a predetermined frame rate, and obtains image data of the captured image from imaging unit 4.

When the image data of the captured image is input from imaging unit 4, display controller 22 creates an image based on the captured image, and causes the created image to be displayed in display surface 21 of display device 2.

When the image is displayed in display surface 21 of display device 2, the light forming the image is emitted toward reflective surface 91 of intermediate reflective member 90 in a direction parallel to optical path A41. The light reflected by intermediate reflective member 90 is emitted toward inner surface 41 of half mirror 40. Half mirror 40 is a beam splitter, and inner surface 41 of half mirror 40 reflects part of the light reflected by intermediate reflective member 90 toward final reflective surface 51 of final reflective member 50. Final reflective surface 51 is a concave mirror, and reflects light forming an enlarged image, which is the image in display surface 21 in an enlarged state, toward inner surface 41 of half mirror 40. When the light reflected by final reflective surface 51 is incident on inner surface 41 of half mirror 40, some of the incident light passes through half mirror 40 and liquid crystal mirror 12 and is emitted to the outside of housing 70, and observer 400 can therefore see the image enlarged by final reflective surface 51. Accordingly, observer 400 can confirm a state in the area behind automobile 100 by viewing, through half mirror 40 and liquid crystal mirror 12, the image enlarged by final reflective surface 51.

Additionally, drive circuit 13 switches the state of liquid crystal mirror 12 from the inactive state to the blocking state when object sensor 15 of detection sensor 14 detects that object O1 is present in detection area R1. Accordingly, the likelihood of object O1 present in detection area R1 being heated by the light can be reduced. Additionally, when the state of liquid crystal mirror 12 is switched to the blocking state in this manner, a reflected image produced by light from outside housing 70 being reflected by outer surface 1200 of liquid crystal mirror 12 can be shown to observer 400.

After this, drive circuit 13 switches the state of liquid crystal mirror 12 from the blocking state to the inactive state when object sensor 15 of detection sensor 14 no longer detects that object O1 is present in detection area R1.

Note that drive circuit 13 may switch the state of liquid crystal mirror 12 from the blocking state to the inactive state when a predetermined amount of time has passed after the last time object sensor 15 of detection sensor 14 has detected the presence of object O1 in detection area R1.

Note also that display controller 22 may stop the display in display device 2 when the state of liquid crystal mirror 12 has been switched to the blocking state. The amount of power consumed by display system 1 can be reduced as a result.

Note that the configuration described in Embodiment 8 (including variations) can be applied in combination with the configuration described in Embodiment 5, 6, or 7 (including variations) as appropriate. In other words, in Embodiment 5, 6, or 7, control circuit 7 may drive actuator 6 based on a detection result from detection sensor 14 (object sensor 15) and switch the state of light-blocking member 8 to one of the inactive state and the blocking state.

Embodiment 9

Display system 1 according to Embodiment 9 will be described with reference to FIG. 66.

Display system 1 according to Embodiment 9 differs from the foregoing Embodiment 8 in that detection sensor 14 includes light sensor 16 instead of object sensor 15. Note that aside from light sensor 16, the configuration is the same as in the foregoing Embodiment 8. Constituent elements which are the same as in Embodiment 8 will therefore be given like reference signs, and will not be described.

Figure 66:
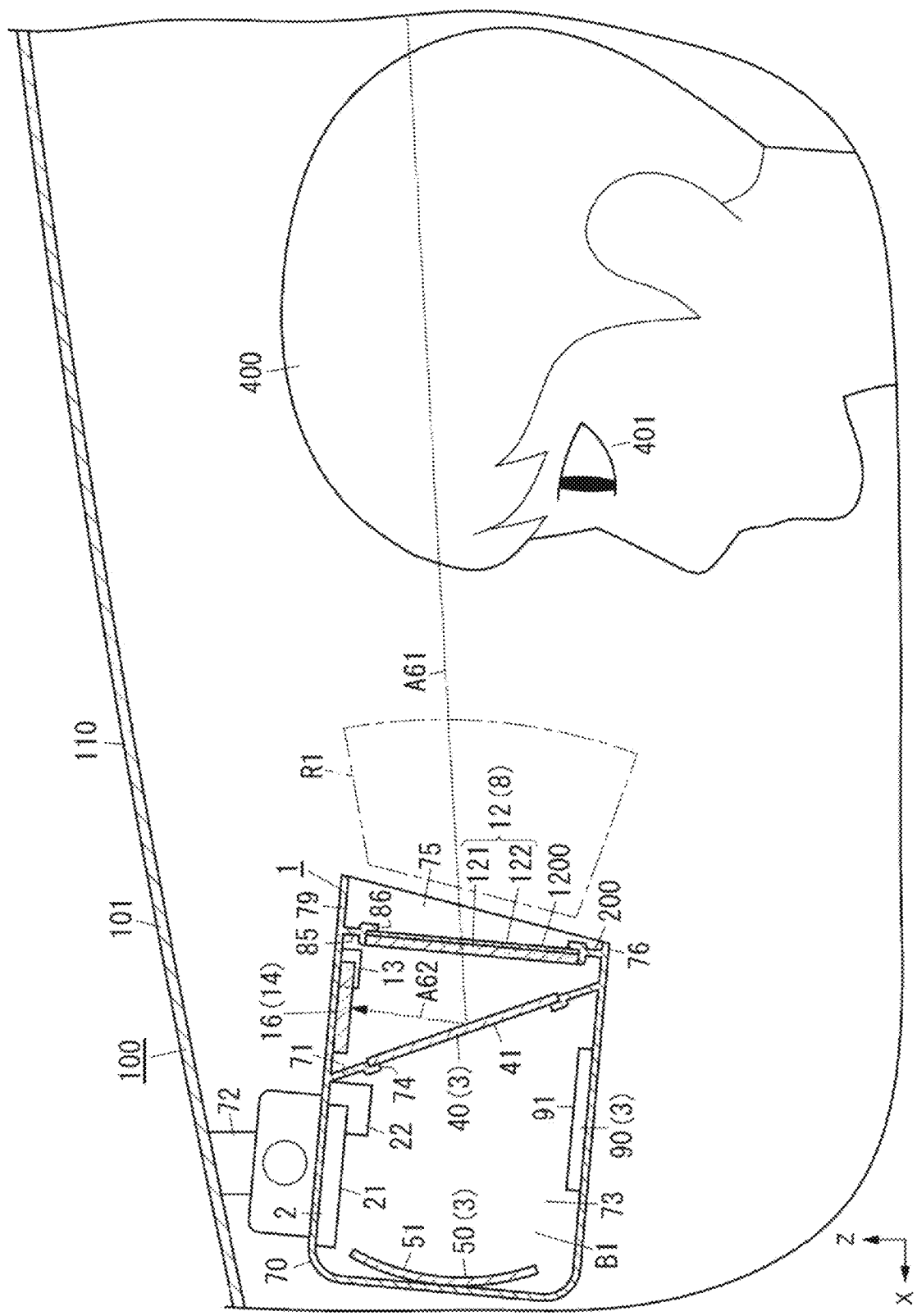
FIG. 66 is a general explanatory diagram illustrating a display system according to Embodiment 9, when a state of a liquid crystal mirror is an inactive state.

Optical paths A61 to A62, over which light incident near a center of liquid crystal mirror 12 from outside housing 70 is reflected by liquid crystal mirror 12 and is then incident on light sensor 16, are indicated by dotted lines in FIG. 66. In FIG. 66, the lines indicating optical paths A61 to A62 are provided only for descriptive purposes, and are not actually displayed.

Light sensor 16 detects the amount of at least part of the light incident from the detection area R1 side as a state in detection area R1. In the present embodiment, light sensor 16 detects the light amount of light which reaches light sensor 16 through detection area R1. In the present embodiment, light sensor 16 is housed within housing 70. Specifically, light sensor 16 is disposed within housing 70, along an upper surface of housing 70. Light sensor 16 therefore detects the amount of at least part of the light entering housing 70 from the detection area R1 side. Preferably, light sensor 16 can detect at least a wavelength of sunlight. Light sensor 16 is, for example, a solar cell panel. The solar cell panel generates power based on an amount of light received. The power generated by the solar cell panel is output to drive circuit 13. Here, detection area R1 may be an area different from detection area R1 of Embodiment 5. Detection area R1 according to the present embodiment may be an area through which the optical path of light reflected by final reflective member 50 does not pass. Note that light sensor 16 may be disposed along a lower surface of housing 70 within housing 70. It is sufficient for light sensor 16 to be disposed along the lower surface or the upper surface of housing 70.

Drive circuit 13 switches the state of liquid crystal mirror 12 from the inactive state to the blocking state based on an output from light sensor 16. For example, drive circuit 13 switches the state of liquid crystal mirror 12 from the inactive state to the blocking state when a light amount based on the output of light sensor 16 is greater than a predetermined value. Accordingly, even if object O1 is present in detection area R1, the likelihood of object O1 being heated by light reflected by final reflective member 50 can be reduced. When the light amount based on the output of light sensor 16 is no greater than the predetermined value and the state of liquid crystal mirror 12 is the inactive state, the light amount in detection area R1 is relatively low, and thus even if object O1 is present in the detection area R1, the likelihood that object O1 will be heated is relatively low. The likelihood of object O1 being heated can therefore be reduced both when the state of liquid crystal mirror 12 is the inactive state and the blocking state. In other words, the same actions and effects as in Embodiment 6 can be achieved in Embodiment 9 as well.

Additionally, when a predetermined amount of time has passed after the state of liquid crystal mirror 12 has been switched from the inactive state to the blocking state, drive circuit 13 switches the state of liquid crystal mirror 12 from the blocking state to the inactive state. Display system 1 can therefore automatically restore the function of an electronic mirror.

Note that a photodiode, a phototransistor, or a photo resistor may be used as light sensor 16.

Additionally, detection sensor 14 may further include object sensor 15 in addition to light sensor 16. Drive circuit 13 may switch the state of liquid crystal mirror 12 between the inactive state and the blocking state based on both the output of light sensor 16 and the output of object sensor 15. For example, when the light amount based on the output of light sensor 16 is greater than the predetermined value and it is determined that object O1 is present in detection area R1 based on the output of object sensor 15, drive circuit 13 may switch the state of liquid crystal mirror 12 from the inactive state to the blocking state. Accordingly, when, for example, the light amount is no greater than the predetermined value, drive circuit 13 does not switch the state of liquid crystal mirror 12 to the blocking state even if it is determined that object O1 is present in detection area R1, which greatly increases the opportunity for observer 400 to see the image enlarged by final reflective surface 51.

Additionally, drive circuit 13 switches the state of liquid crystal mirror 12 from the inactive state to the blocking state when a light amount based on the output of light sensor 16 is greater than a first value (the predetermined value). Then, once a predetermined amount of time has passed, the reflectance of liquid crystal mirror 12 may be changed to a level between the reflectance in the inactive state and the reflectance in the blocking state (called an "intermediate reflectance" hereinafter) for a predetermined period (a short period). The predetermined period may be any period which is at least the minimum period in which light sensor 16 can detect the light amount, and is preferably as short as possible. If, after changing the reflectance to the intermediate reflectance, the light amount detected by light sensor 16 is greater than a second value, the light amount in detection area R1 is still high, and thus drive circuit 13 may again return the reflectance of liquid crystal mirror 12 to the reflectance in the blocking state. In other words, at this time, drive circuit 13 puts the state of liquid crystal mirror 12 into the blocking state. Thereafter, drive circuit 13 may set the reflectance of liquid crystal mirror 12 to the intermediate reflectance for the predetermined period (the short period) each time the predetermined amount of time passes, until the light amount detected by light sensor 16 falls below the second value. On the other hand, after changing the reflectance to the intermediate reflectance, drive circuit 13 may put the state of liquid crystal mirror 12 into the inactive state when the light amount detected by light sensor 16 has become no greater than the second value. The second value described above is lower than the first value, for example. By employing such a configuration, the state of liquid crystal mirror 12 can be automatically switched from the blocking state to the inactive state when the light amount in detection area R1 becomes low.

Variations on Embodiment 9

[Variation 1]

Display system 1 according to Variation 1 on Embodiment 9 will be described based on FIG. 67.

Figure 67:
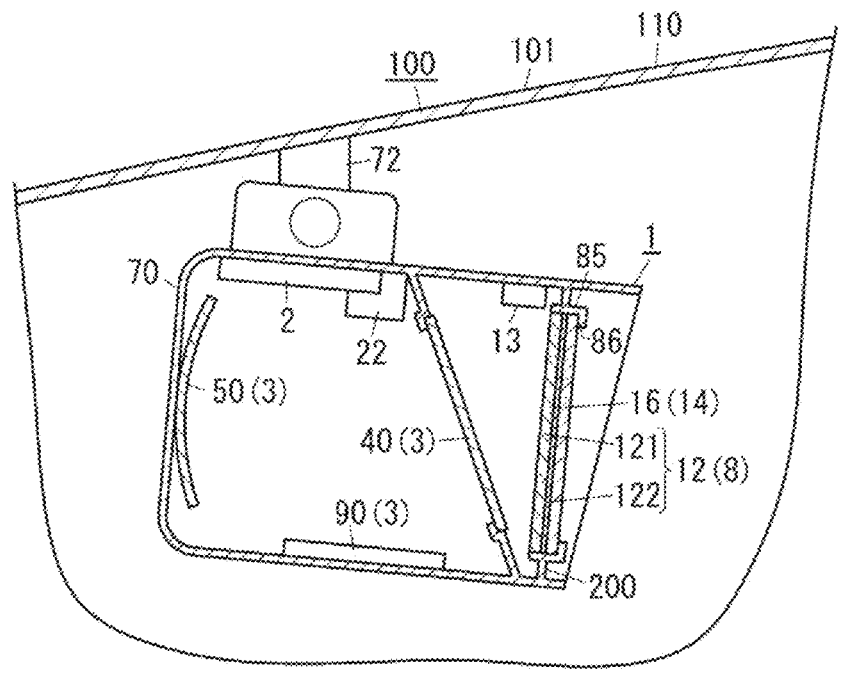
FIG. 67 is a general explanatory diagram of a display system according to Variation 1 on Embodiment 9.

As illustrated in FIG. 67, display system 1 according to the present variation differs from the foregoing Embodiment 9 in that light sensor 16 is disposed on an outer side of liquid crystal mirror 12. Note that aside from the location of light sensor 16, the configuration is the same as in the foregoing Embodiment 9. Like constituent elements will therefore be given like reference signs, and will not be described.

Light sensor 16 is light-transmissive. Light sensor 16 is, for example, a dye-sensitized solar cell panel. Light sensor 16 overlaps liquid crystal mirror 12. Light sensor 16 is disposed on a surface of liquid crystal mirror 12, which serves as a light-blocking member. To be more specific, light sensor 16 is disposed so as to cover liquid crystal mirror 12 from the rear. When the state of liquid crystal mirror 12 is the inactive state, light emitted from display device 2 and reflected by final reflective member 50 passes through liquid crystal mirror 12 and light sensor 16, and is emitted to the exterior of housing 70. Note that light sensor 16 need not cover the entire surface of liquid crystal mirror 12, and may cover only part of liquid crystal mirror 12. Light sensor 16 and liquid crystal mirror 12 are attached in opening 86 in rear wall 85.

In the foregoing Embodiment 9, light from outside housing 70 does not reach light sensor 16 when the state of liquid crystal mirror 12 is the blocking state. However, in the present variation, light from outside housing 70 reaches light sensor 16 both when the state of liquid crystal mirror 12 is the blocking state and when the state of liquid crystal mirror 12 is the inactive state.

Additionally, drive circuit 13 switches the state of liquid crystal mirror 12 from the inactive state to the blocking state when the light amount based on the output of light sensor 16 is greater than a first threshold. Drive circuit 13 then switches the state of liquid crystal mirror 12 from the blocking state to the inactive state when the light amount based on the output of light sensor 16 is less than a second threshold. In other words, in the present variation, the state of liquid crystal mirror 12 can be switched from the blocking state to the inactive state in accordance with the output of light sensor 16.

The second threshold may be the same value as the first threshold, or may be a lower value than the first threshold. The latter configuration makes it possible to suppress what is known as "chattering", in which the state of liquid crystal mirror 12 is rapidly switched between the blocking state and the inactive state, and which can arise in the former configuration when the light amount is near the first threshold.

Additionally, because light sensor 16 at least partially overlaps with liquid crystal mirror 12, space for installing light sensor 16 can easily be secured. However, it is not necessary for light sensor 16 to at least partially overlap with liquid crystal mirror 12. Light sensor 16 may be disposed in any desired location to the rear of liquid crystal mirror 12 (the negative side in the X axis direction). Additionally, although light sensor 16 may be a photodiode, a phototransistor, a photoresistor, or the like, it is preferable that light sensor 16 not overlap with liquid crystal mirror 12 if light sensor 16 is not light-transmissive.

[Variation 2]

Display system 1 according to Variation 2 on Embodiment 9 will be described based on FIG. 68.

Figure 68:
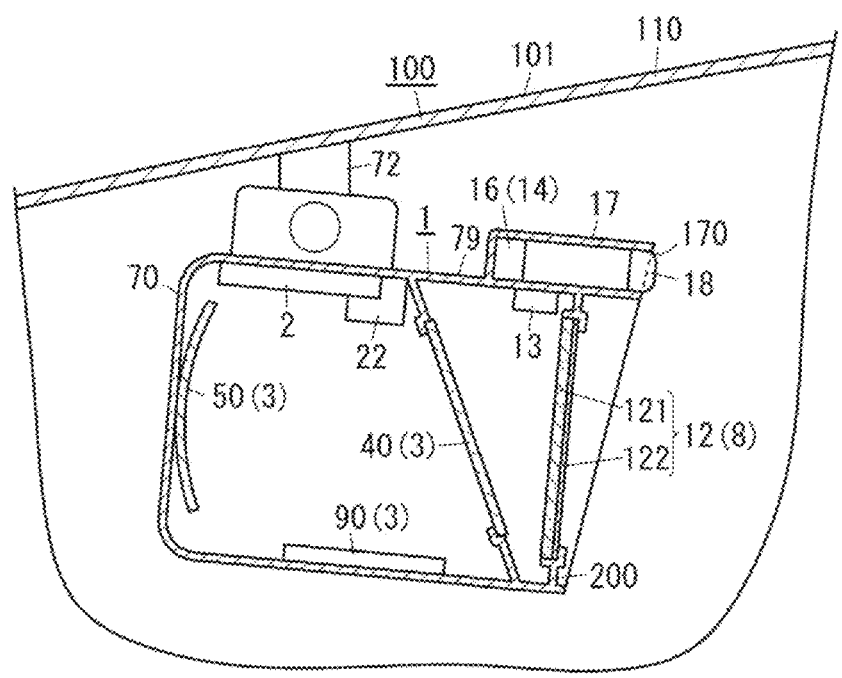
FIG. 68 is a general explanatory diagram of a display system according to Variation 2 on Embodiment 9.

As illustrated in FIG. 68, display system 1 according to the present variation differs from the foregoing Embodiment 9 in that box-shaped part 17 and lens 18 are further provided. Note that aside from box-shaped part 17 and lens 18, the configuration is the same as in the foregoing Embodiment 9. Like constituent elements will therefore be given like reference signs, and will not be described.

Box-shaped part 17 is disposed next to housing 70. More specifically, box-shaped part 17 is disposed next to upper hood 79 of housing 70. Box-shaped part 17 is formed integrally with housing 70. Box-shaped part 17 has opening 170 in one end, on a detection area R1 side. The shape of box-shaped part 17 is analogous to the shape of housing 70. As such, the amount of light entering box-shaped part 17 changes in proportion to the amount of light entering housing 70. In other words, the amount of light entering housing 70 can be detected indirectly by light sensor 16 detecting the amount of light entering box-shaped part 17. Note that "analogous" as used in the present disclosure includes not only cases where the two shapes are perfectly identical, but also cases having a permissible range of error.

Light sensor 16 is housed within box-shaped part 17. Light sensor 16 is disposed near an end of box-shaped part 17 on the opposite side from the side where opening 170 is located (i.e., a base surface). Similarly to final reflective member 50 being disposed at the front end of housing 70, light sensor 16 is disposed at the front end of box-shaped part 17. In other words, the location of light sensor 16 relative to box-shaped part 17 corresponds to the location of final reflective member 50 relative to housing 70. Light sensor 16 according to the present variation is, for example, a photodiode.

Lens 18 is formed from a synthetic resin material, for example. Lens 18 is disposed so as to cover opening 170. Lens 18 focuses light onto light sensor 16. Accordingly, the amount of light which reaches light sensor 16 can be increased as compared to a case where lens 18 is not provided, and thus light sensor 16 can accurately detect the light amount even when the light amount at opening 170 is comparatively low.

As in the foregoing Variation 1, outside light reaches light sensor 16 both when the state of liquid crystal mirror 12 is the blocking state and when the state of liquid crystal mirror 12 is the inactive state. Additionally, drive circuit 13 switches the state of liquid crystal mirror 12 from the inactive state to the blocking state when the light amount based on the output of light sensor 16 is greater than a first threshold. Drive circuit 13 then switches the state of liquid crystal mirror 12 from the blocking state to the inactive state when the light amount based on the output of light sensor 16 is less than a second threshold. In other words, like Variation 1, in the present variation, the state of liquid crystal mirror 12 can be switched from the blocking state to the inactive state in accordance with the output of light sensor 16.

[Variation 3]

Display system 1 according to Variation 3 on Embodiment 9 will be described based on FIG. 69.

Figure 69:
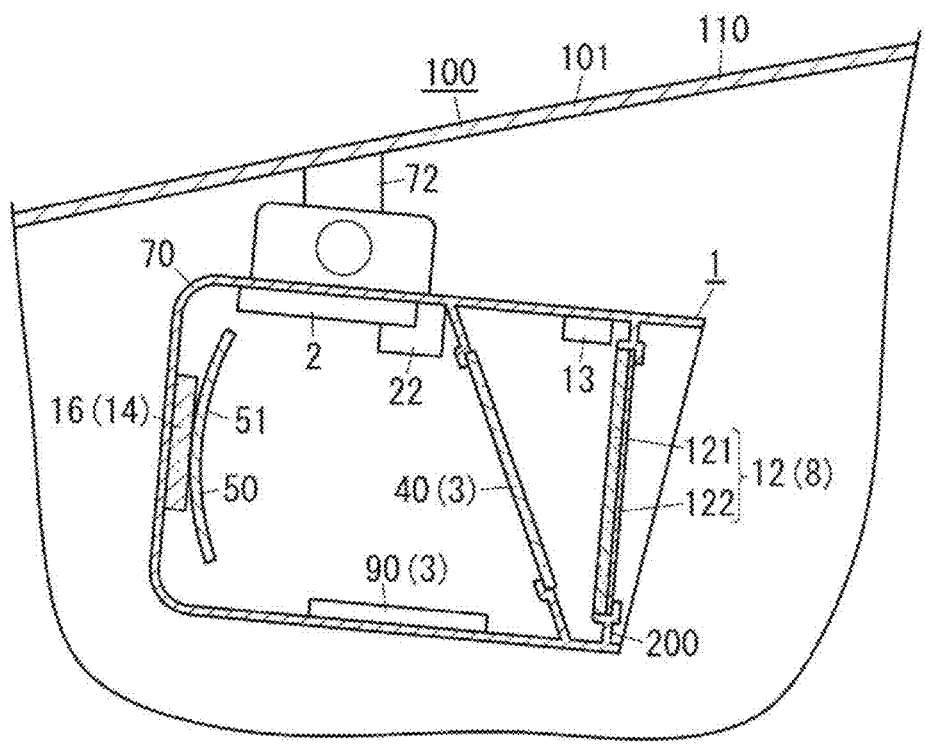
FIG. 69 is a general explanatory diagram of a display system according to Variation 3 on Embodiment 9.

As illustrated in FIG. 69, display system 1 according to the present variation differs from the foregoing Embodiment 6 in that light sensor 16 is disposed in front of final reflective member 50. Note that aside from the location of light sensor 16, the configuration is the same as in the foregoing embodiment. Like constituent elements will therefore be given like reference signs, and will not be described.

Light sensor 16 is disposed on the side of final reflective member 50 opposite from the side on which half mirror 40 is located.

In final reflective member 50, part of incident light passes through final reflective member 50. The transmittance of final reflective member 50 with respect to visible light is, for example, approximately 10%. The visible light transmitted by final reflective member 50 reaches light sensor 16. Drive circuit 13 switches the state of liquid crystal mirror 12 from the inactive state to the blocking state when a light amount based on the output of light sensor 16 is greater than a predetermined value. Note that display system 1 may include an amplifying circuit that amplifies the output of light sensor 16.

Additionally, when a predetermined amount of time has passed after the state of liquid crystal mirror 12 has been switched from the inactive state to the blocking state, drive circuit 13 switches the state of liquid crystal mirror 12 from the blocking state to the inactive state. Drive circuit 13 can therefore determine whether or not the light amount detected by light sensor 16 has dropped.

In the present variation, light sensor 16 detects the light amount of light transmitted by final reflective member 50, and thus the accuracy with which the amount of light incident on final reflective member 50 is detected can be improved. Additionally, light sensor 16 is disposed outside the optical path of light from display device 2, and thus a space for installing light sensor 16 can be secured with ease.

Note that final reflective member 50 may be caused transmit light having a wavelength different from visible light. For example, final reflective member 50 may be caused to transmit infrared light. Furthermore, light sensor

16 may detect an infrared light amount. According to this configuration, infrared light contained in sunlight and the like passes through final reflective member 50, and the infrared light amount is detected by light sensor 16. When sunlight or the like is incident on final reflective member 50, and the infrared light amount detected by light sensor 16 is comparatively high, it can be assumed that the amount of visible light which reaches final reflective member 50 is also comparatively high. When the infrared light amount detected by light sensor 16 is at least a predetermined value, drive circuit 13 may switch the state of liquid crystal mirror 12 from the inactive state to the blocking state.

[Variation 4]

Figure 70:
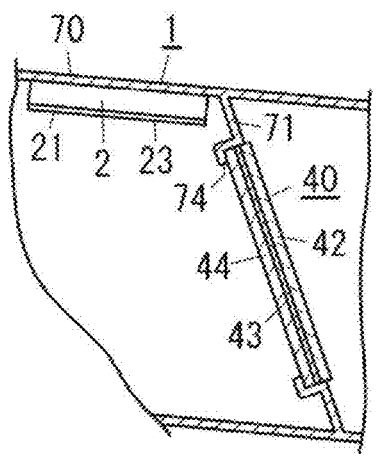
FIG. 70 is an enlarged view of primary elements of a display system according to Variation 4 on Embodiment 9.

In the present embodiment, half mirror 40 is a vapor-deposited type beam splitter, but half mirror 40 is not limited to a vapor-deposited type beam splitter. As illustrated in FIG. 70, display device 2 may be a liquid crystal panel with λ/4 phase difference film 23 disposed on display surface 21, and half mirror 40 may be configured by laminating reflective polarizing element 43, which is a wire grid or the like, and λ/4 phase difference film 44 upon flat glass 42. In other words, half mirror 40 illustrated in FIG. 70 has a layered structure in which a reflective polarizing film (reflective polarizing element 43) and λ/4 phase difference film 44 are layered. Reflective polarizing element 43 transmits light in a predetermined oscillation direction. λ/4 phase difference film 44 produces a quarter-wavelength phase difference between the light incident on and light emitted from half mirror 40, in an electrical field oscillation direction. Here, reflective polarizing element 43 constituting half mirror 40 is a polarizing element that reflects S-polarized light and transmits P-polarized light, for example. When such a configuration is employed, P-polarized light emitted from display surface 21 is converted to circular polarized light by λ/4 phase difference film 23 on display surface 21, and is then converted to S-polarized light by λ/4 phase difference film 44 on reflective polarizing element 43. Most of the S-polarized light beams are reflected by reflective polarizing element 43, and that reflected light is converted into circular polarized light by λ/4 phase difference film 44 on reflective polarizing element 43. The circular polarized light is reflected by final reflective member 50, and is then incident on λ/4 phase difference film 44 on reflective polarizing element 43 again, and is converted to P-polarized light as a result. Most of the P-polarized light beams are transmitted by reflective polarizing element 43, and the transmitted light reaches eye 401 of observer 400. According to this configuration, light from display device 2 can reach eye 401 of observer 400 more efficiently than when using a vapor-deposited type beam splitter.

Note that like in Embodiment 8 or 9, in the example illustrated in FIG. 70, when using a liquid crystal such as liquid crystal mirror 12 as light-blocking member 8, it is preferable that a configuration such as that described below be used. In other words, reflecting optical system B1 including λ/4 phase difference film 44 of half mirror 40 and λ/4 phase difference film 23 on display surface 21 is designed so that when the liquid crystal is in the inactive state, a polarization direction of the light reflected by final reflective member 50 follows the direction of the molecular orientation of the liquid crystal when the reflected light reaches the liquid crystal. Additionally, when the liquid crystal is in the blocking state, the polarization direction of the light reflected by final reflective member 50 intersects with the direction of the molecular orientation of the liquid crystal when the reflected light reaches the liquid crystal.

Note that the configuration of Variation 5 may be applied in the foregoing Embodiment 8, in which case the same effects as those of Variation 5 can be achieved.

Note that the configuration described in Embodiment 9 (including variations) can be applied in combination with the configuration described in Embodiment 5, 6, or 7 (including variations) as appropriate. In Embodiment 5, 6, or 7, control circuit 7 may control actuator 6, which is a drive circuit, based on a detection result from light sensor 16 and switch the state of light-blocking member 8 to one of the inactive state and the blocking state. Additionally, in Embodiment 5, 6, or 7, control circuit 7 may control actuator 6, which is a drive circuit, based on a detection result from object sensor 15 and a detection result from light sensor 16 and switch the state of light-blocking member 8 to one of the inactive state and the blocking state.

[Other Variations]

Examples of other variations on the embodiment will be described below. The variations described below can be applied in some or all of the foregoing Embodiments 1 to 9 (including the variations thereon), and may be implemented in combination with each other as appropriate.

Display system 1 is not limited to being applied in automobile 100, and can also be applied in moving bodies aside from automobile 100, such as motorcycles, bicycles, forklifts, trains, aircraft, construction equipment, ships, and the like, for example. Additionally, display system 1 is not limited to being applied in a moving body, and may also be applied in the display of an amusement device, for example.

When display system 1 is applied in automobile 100, display system 1 is not limited to being installed in a range which is visible to the driver. Display system 1 may be installed in a range which is visible to a person seated in a rear seat or a passenger seat, for example.

Figure 71:
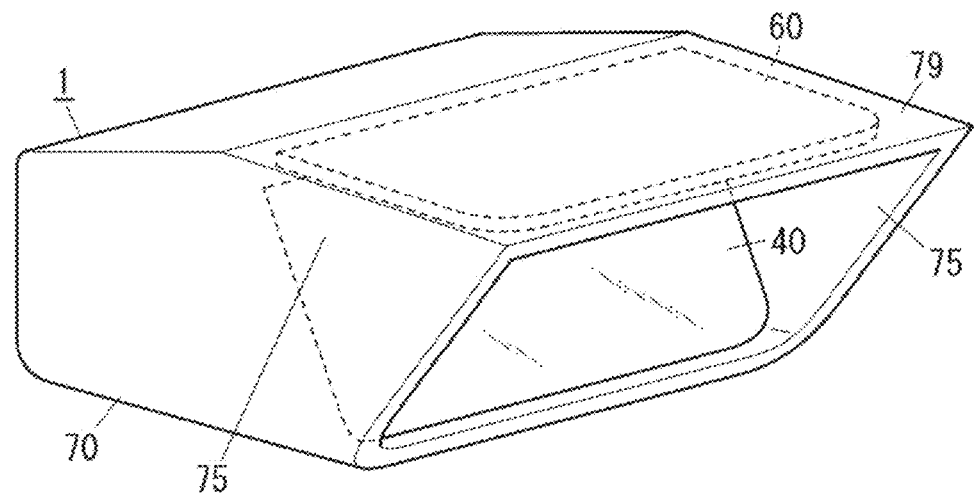
FIG. 71 is a general perspective view illustrating another form of a housing in the display systems according to Embodiments 5 to 9.

Although mirror member 60 is rectangular in the foregoing Embodiment 5, as illustrated in FIG. 71, two or four corners of mirror member 60 may have rounded shapes, and corners of housing 70 may be formed having rounded shapes corresponding to the rounded shapes in mirror member 60. Although FIG. 71 does not illustrate projections 64 and guide grooves 77, the positions and shapes of the projections and guide grooves can be changed as appropriate so that mirror member 60 can move between the first position and the second position. According to such a configuration, an oppressive feeling felt when viewing housing 70 from the passenger seat side can be reduced. Note that in the foregoing Embodiments 6 to 9 as well, two or four corners of mirror member 60 may have rounded shapes, and corners of housing 70 may be formed having rounded shapes corresponding to the rounded shapes in mirror member 60.

In the foregoing Embodiments 5 to 9, reflecting optical system B1 may be configured such that light reflected by final reflective member 50 enters eye 401 of observer 400 by being reflected by half mirror 40, instead of passing through half mirror 40. In other words, it is sufficient for the light reflected by final reflective member 50 to enter eye 401 of observer 400 via half mirror 40.

In the foregoing Embodiment 8 or 9, detection sensor 14 need not be included in the configuration of display system 1.

Detection sensor 14 is not limited to a sensor held in housing 70. For example, detection sensor 14 may be held by moving body main body 110 of automobile 100 (ceiling 101 or the like).

Detection sensor 14 may include imaging unit held by moving body main body 110 of automobile 100 (ceiling 101 or the like). The imaging unit is provided separate from imaging unit 4 that captures an image of outside of automobile 100 (see FIG. 39). The imaging unit is, for example, a two-dimensional image sensor such as a CCD image sensor or a CMOS image sensor. Drive circuit 13 may determine whether or not object O1 is present in detection area R1 based on an image captured by the imaging unit.

Object sensor 15 of detection sensor 14 may detect that object O1 when object O1 is moving in detection area R1. In other words, object sensor 15 may be configured to not detect object O1 which is at rest. This object sensor 15 can be realized by, for example, a Doppler sensor which uses the Doppler effect of electromagnetic waves such as microwaves.

Detection sensor 14 may include a plurality of sensors. Detection sensor 14 may include a plurality of light sensors 16 such as photodiodes arranged in a width direction of housing 70 (the left-right direction). This makes it possible to improve the detection accuracy of detection sensor 14.

Detection sensor 14 may be disposed within housing 70, along the upper surface or the lower surface of housing 70. For example, although object sensor 15 is disposed along the lower surface of housing 70 in FIG. 63, object sensor 15 may be disposed along the upper surface of housing 70. Additionally, although light sensor 16 is disposed within housing 70 and along the upper surface of housing 70 in FIG. 66, light sensor 16 may be disposed within housing 70 and along the lower surface of housing 70.

In the foregoing Embodiment 8 or 9, the drive circuit (e.g., drive circuit 13) may change the orientation of housing 70 in accordance with the output of detection sensor 14. Display system 1 may include an actuator that produces drive force for changing the orientation of housing 70, for example. Drive circuit 13 may change the orientation of housing 70 by controlling operation of the actuator when changing the state of liquid crystal mirror 12 in accordance with the output of detection sensor 14. The actuator changes the orientation of housing 70 by, for example, rotationally driving support member 72, which is a ball joint or the like, supporting housing 70. Drive circuit 13 may change the orientation of housing 70 to an orientation at which the driver can see housing 70 from a depth direction (the front-rear direction) when the state of liquid crystal mirror 12 has changed from the blocking state to the inactive state, for example. This enables the driver to see the image displayed in display system 1 from a direct light viewing angle. Additionally, drive circuit 13 may change the orientation of housing 70 to an orientation at which the driver can see housing 70 at an angle relative to the depth direction (the front-rear direction) when the state of liquid crystal mirror 12 has changed from the inactive state to the blocking state, for example. This makes it possible to show an image of the area behind automobile 100 in liquid crystal mirror 12, as seen from the driver.

Additionally, the drive circuit (e.g., drive circuit 13) may change the orientation of housing 70 to an orientation set for each individual driver, in accordance with the output of detection sensor 14. In other words, the height of the eye box is different for each driver, and thus the orientation of housing 70 may be set to an orientation suited to each driver. The drive circuit may, for example, read identification information from an electronic key of the automobile, which each individual driver possesses, and identify the driver based on the identification information of the electronic key. Display system 1 may be equipped with a setting activator for setting the orientation of housing 70 for each driver in advance.

Note that as the orientation of housing 70 changes, the orientation of detection sensor 14 attached to housing 70 also changes, and detection area R1 of detection sensor 14 can therefore change. Accordingly, detection sensor 14 may include a plurality of sensors. For example, detection sensor 14 may include two sensors. By using two different sensors depending on the orientation of housing 70, detection sensor 14 can detect the state in a constant detection area R1. In other words, one of the two sensors detects the state of detection area R1 when the state of liquid crystal mirror 12 is the blocking state and the orientation of housing 70 is a first orientation. The other of the two sensors detects the state of detection area R1 when the state of liquid crystal mirror 12 is the inactive state and the orientation of housing 70 is a second orientation.

In addition, when the orientation of housing 70 changes, the state in detection area R1 which is constant may be detected by detection sensor 14 having limited, using a limiting member, the detection range of detection sensor 14. For example, when detection sensor 14 includes light sensor 16, light sensor 16 is housed within a case having two openings (limiting means). Light sensor 16 detects the amount of light entering through one of the two openings when the state of liquid crystal mirror 12 is the blocking state and the orientation of housing 70 is the first orientation. Additionally, light sensor 16 detects the amount of light entering through the other of the two openings when the state of liquid crystal mirror 12 is the inactive state and the orientation of housing 70 is the second orientation. Note that a lens may be attached in each of the two openings. One of the two openings may be opened, and the other closed, in accordance with the orientation of housing 70.

Additionally, the drive circuit (e.g., drive circuit 13) may also change the orientation of light-blocking member 8 (e.g., liquid crystal mirror 12) instead of changing the orientation of housing 70.

When detection sensor 14 includes a PSD as object sensor 15, drive circuit 13 may switch the state of liquid crystal mirror 12 from the blocking state to the inactive state in accordance with the output of the PSD. The PSD includes two infrared light emitting diodes, for example. The PSD is basically used to detect the presence or absence of object O1 in detection area R1, as described hereinafter. That is, the PSD detects the position of object O1 based on a difference between the intensity of reflected waves of infrared light emitted from one of the infrared light emitting diodes and the intensity of reflected waves of infrared light emitted from the other of the infrared light emitting diodes. Here, drive circuit 13 may switch the state of liquid crystal mirror 12 from the blocking state to the inactive state according to the sum of the two intensities, calculated instead of the difference between the two intensities. Specifically, drive circuit 13 may switch the state of liquid crystal mirror 12 from the blocking state to the inactive state when the sum of the two intensities is no greater than a predetermined value.

The drive circuit (e.g., drive circuit 13) may cause the state of light-blocking member 8 (e.g., liquid crystal mirror 12) to be maintained for a predetermined amount of time after the switch, regardless of the output of detection sensor 14. This makes it possible to suppress situations where the state of light-blocking member 8 changes continuously over a short period of time.

In addition to the output of detection sensor 14, the drive circuit (e.g., drive circuit 13) may switch the state of light-blocking member 8 (e.g., liquid crystal mirror 12) based on a condition pertaining to time. For example, drive circuit 13 may switch the state of liquid crystal mirror 12 from the inactive state to the blocking state when the light amount detected by light sensor 16 serving as detection sensor 14 stays greater than a predetermined value for a predetermined amount of time.

The drive circuit (e.g., drive circuit 13) may set the state of light-blocking member 8 (e.g., liquid crystal mirror 12) to the inactive state during a specific time of day regardless of the output of detection sensor 14. The specific time of day is, for example, a time of day when the sun is unlikely to be shining (e.g., from 7:00 p.m. to 5:00 a.m.). Additionally, the drive circuit may set the state of light-blocking member 8 to the inactive state regardless of the output of detection sensor 14 when a brightness outside automobile 100 is at least a predetermined brightness. The brightness outside automobile 100 is detected, for example, by a light sensor mounted on automobile 100, separate from display system 1.

Display device 2 may adjust the brightness of display surface 21 according to the light amount detected by light sensor 16. For example, the appearance in liquid crystal mirror 12 or half mirror 40, from which the light from display surface 21 is emitted, may be reduced by increasing the brightness of display surface 21 as the light amount detected by light sensor 16 increases.

When liquid crystal mirror 12 is used as light-blocking member 8, display system 1 may include a state manipulator that accepts an operation for switching the state of liquid crystal mirror 12 between the blocking state and the inactive state. Drive circuit 13 switches the state of liquid crystal mirror 12 between the inactive state and the blocking state by changing a voltage applied to liquid crystal mirror 12 in accordance with an operation made in the state manipulator. According to this configuration, the state of liquid crystal mirror 12 can be switched not only automatically by drive circuit 13, but also through an operation made by a user (such as a driver).

In the foregoing Embodiment 8 or 9, a liquid crystal shutter may be used instead of liquid crystal mirror 12 as light-blocking member 8. The light transmittance of the liquid crystal shutter changes in accordance with an applied voltage. The liquid crystal shutter differs from liquid crystal mirror 12 in that when the liquid crystal shutter is in the blocking state, the surface on the observer 400 side (outer surface 1200) is not a mirror surface, and absorbs or scatters visible light.

In the foregoing Embodiment 8 or 9, a member that always absorbs or scatters light may be used as light-blocking member 8. For example, a black plate may be used as light-blocking member 8. Additionally, detection area R1 may be limited to a position where the image displayed by display system 1 is blocked by object O1 as viewed by observer 400 (the driver or the like). Then, the state of light-blocking member 8 may be switched from the inactive state to the blocking state when the presence of object O1 in detection area R1 is detected. In other words, the configuration may be such that the state of light-blocking member 8 can be switched to the blocking state only when the image displayed by display system 1 cannot be seen by observer 400, even if light-blocking member 8 is in the inactive state.

Figure 72:
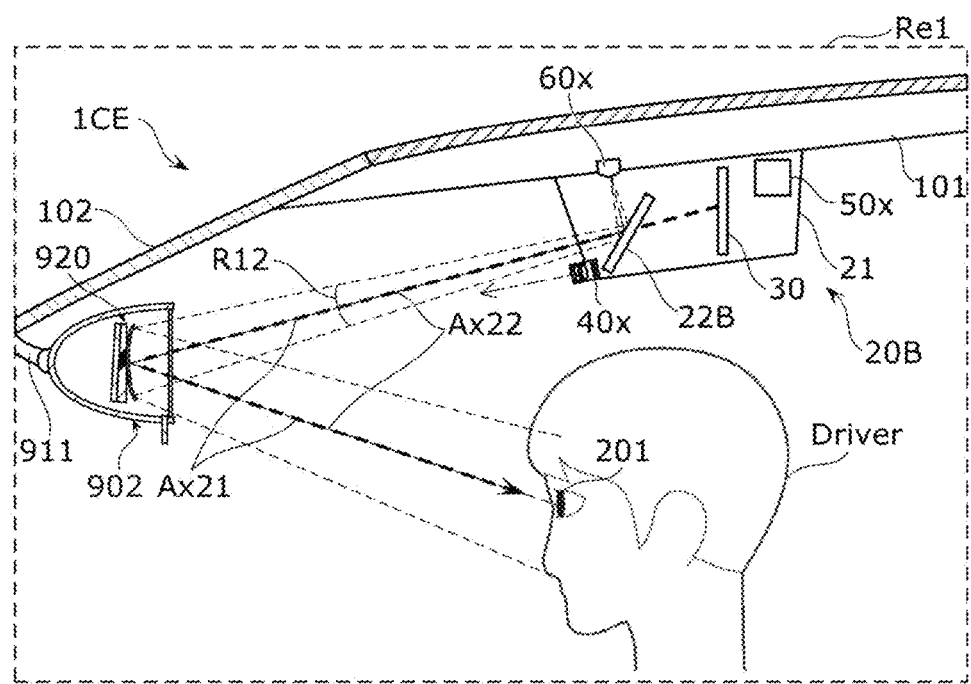
FIG. 72 is a general explanatory diagram of the display systems according to Embodiments 1 to 9.

Additionally, in the foregoing Embodiments 1 to 9, room mirror 902 illustrated in FIG. 32A may be applied, for example, instead of final reflective member 50 serving as the concave mirror in FIG. 29, as illustrated in FIG. 72. FIG. 72 is a general explanatory diagram of display system 10E according to Embodiments 1 to 9. This display system 10E further includes imaging unit 40x, which captures an image of a region where a picture is projected. Additionally, imaging unit 40x may be disposed on the optical filter 22B side, and may be configured so that a focal point of imaging unit 40x can be switched. The focal point may be changed based on the switching of the attitude of double-sided reflective optical member 920 between the first state and the second state. In this case, controller 50x may change the position of the focus of imaging unit 905 by obtaining, from double-sided reflective optical member 920, a signal indicating which of concave mirror 922 and flat mirror 923 of double-sided reflective optical member 920 is selected. For example, when a switch (not shown) outputs a switching signal to controller 50x due to the switch between the first state and the second state, controller 50x can recognize the switch between the first state and the second state by obtaining the switching signal, and controller 50x can determine whether the state is the first state or the second state. This makes it possible for controller 50x to switch the focal point of imaging unit 40x.

Accordingly, imaging unit 40x can switch the focal point in accordance with the switch between concave mirror 922 and flat mirror 923. In other words, the focal point of imaging unit 40x is switched in accordance with a change in the distance from imaging unit 40x to concave mirror surface 923b of concave mirror 922, and the distance from imaging unit 40x to flat mirror surface 923a of flat mirror 923. Accordingly, imaging unit 40x can capture an image of the driver in an in-focus state even when concave mirror 922 and flat mirror 923 are switched.

Figure 73:
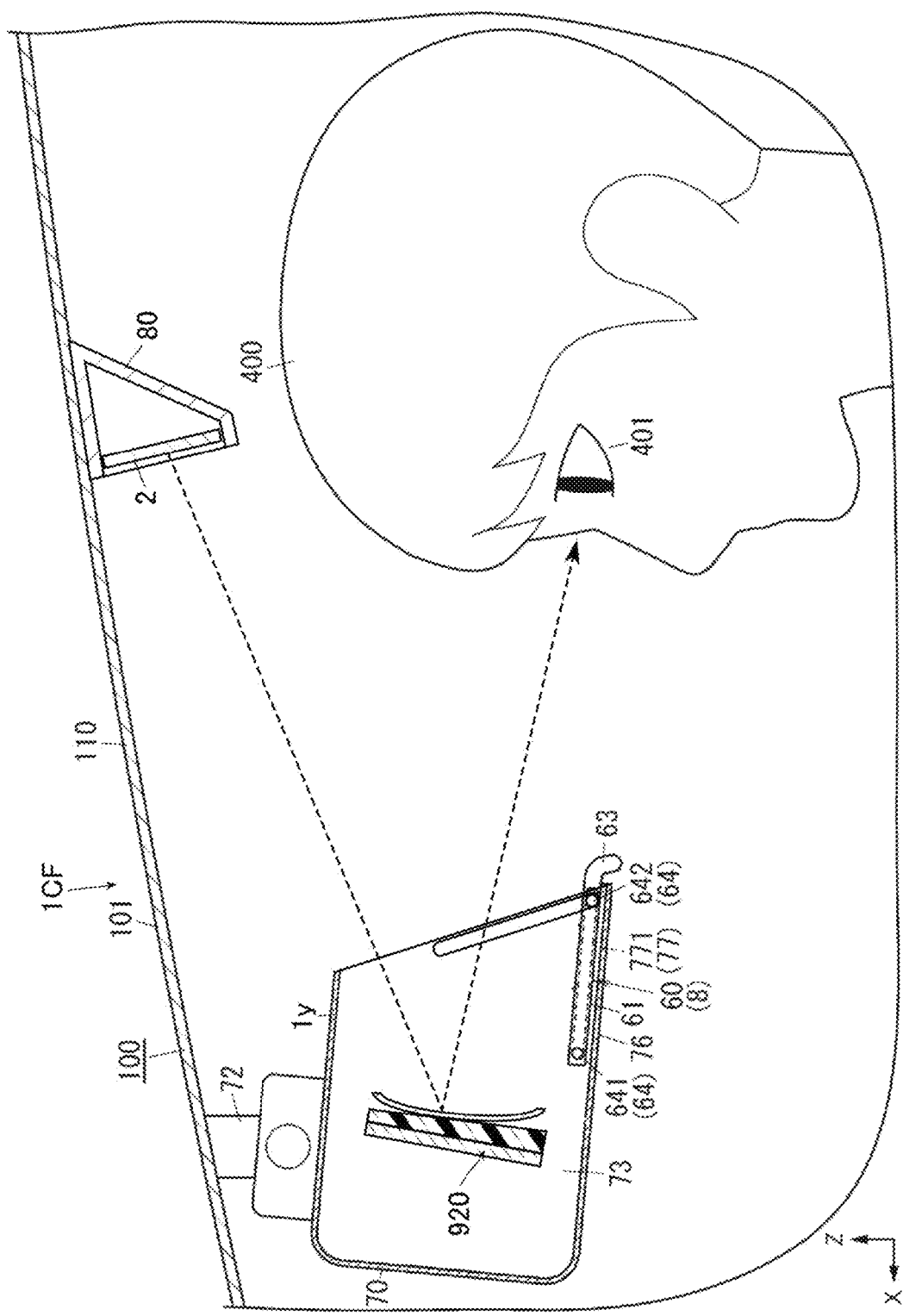
FIG. 73 is a general explanatory diagram of the display systems and display devices according to Embodiments 1 to 9.
Figure 74:
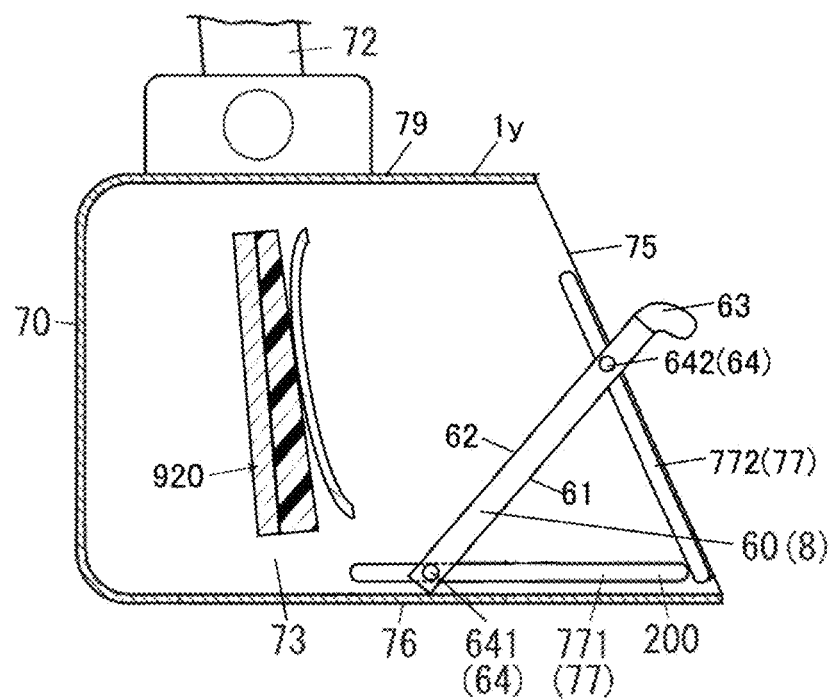
FIG. 74 is a general explanatory diagram illustrating sliding of a mirror member in a room mirror according to Embodiments 1 to 9.
Figure 75:
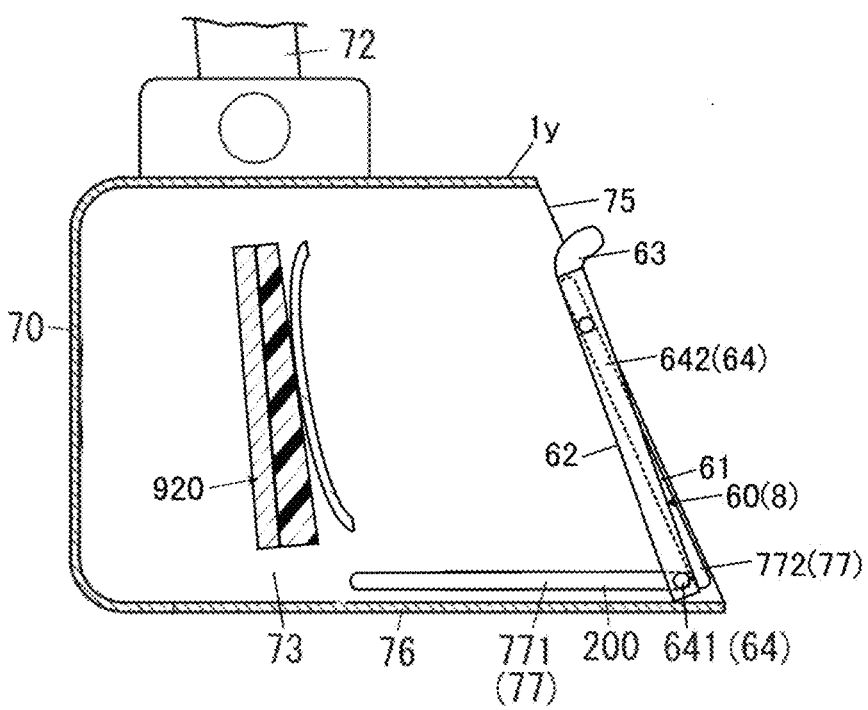
FIG. 75 is a general explanatory diagram illustrating a state in which a reflective surface of a mirror member of a room mirror according to Embodiments 1 to 9 is facing an observer, and illustrates the mirror member being disposed between a double-sided reflective optical member and the observer.

Additionally, in the foregoing Embodiments 1 to 9, the configuration of display system 1CF, which combines room mirror 1y having double-sided reflective optical member 920 with display device 2, may be employed, for example. FIG. 73 is a general explanatory diagram illustrating display system 1CF according to Embodiments 1 to 9. FIG. 74 is a general explanatory diagram illustrating sliding of mirror member 60 in room mirror 1y according to Embodiments 1 to 9. FIG. 75 is a general explanatory diagram illustrating a state in which reflective surface 61 of mirror member 60 in room mirror 1y according to Embodiments 1 to 9 is facing the observer, and illustrates mirror member 60 being disposed between double-sided reflective optical member 920 and the observer.

Figure 6:
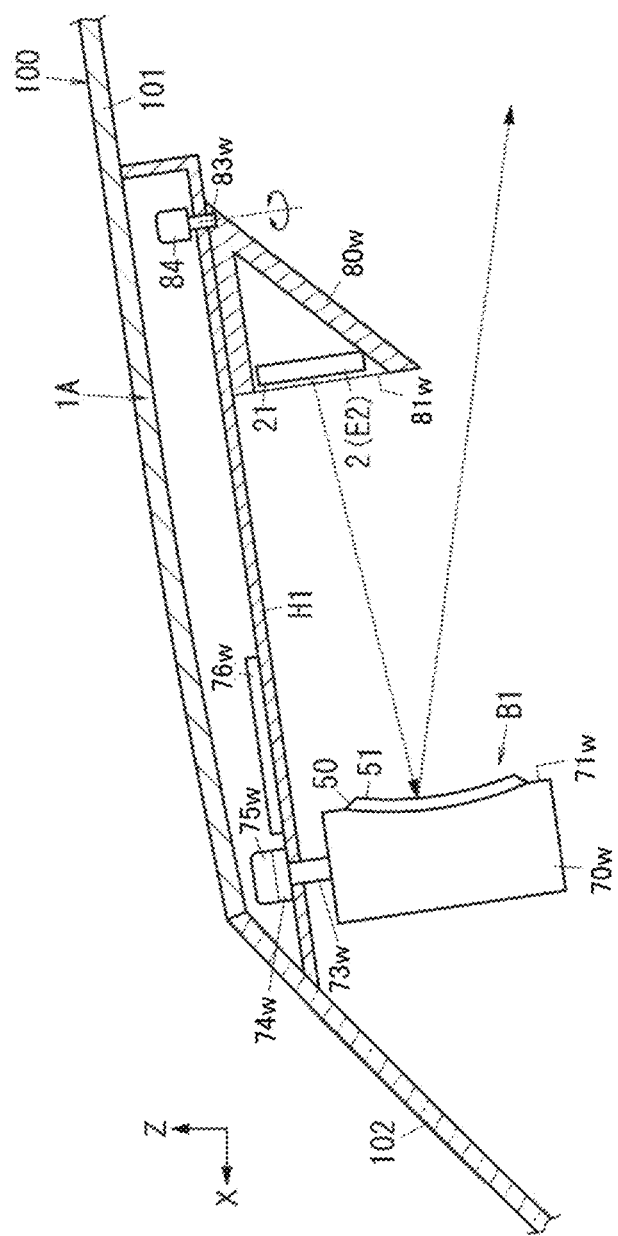
FIG. 6 is a cross-sectional side view of primary elements of an automobile including a display system according to Variation 2.

Although FIG. 73 and on use the same display device 2 as display device 2 illustrated in FIG. 6, the display device is not limited thereto, and any display device disclosed in the present specification may be used. As such, display device 2 illustrated in FIG. 73 and on is merely one example.

In FIG. 73, FIG. 74, and FIG. 75, room mirror 1y of display system 1CF corresponds to display system 1 illustrated in FIG. 38, and includes: double-sided reflective optical member 920, serving as a final reflective surface and provided instead of final reflective member 50; housing 70; and mirror member 60. In room mirror 1y illustrated in FIG. 73, display controller 22, display device 2, and half mirror 40 illustrated in FIG. 38 are not disposed within housing 70. Note, however, that display controller 22 may be disposed in display device 2, and the location is not particularly limited. Additionally, although FIG. 73 illustrates double-sided reflective optical member 920 as one example, another double-sided reflective optical member, final reflective member, or holding structure such as those described above may be used.

Housing 70 illustrated in FIG. 73 is configured such that upper hood 79, on the ceiling 101 side, has shorter dimensions than lower hood 76, so that light emitted from display device 2 enters housing 70 directly. In other words, the dimension of upper hood 79 in the front-rear direction is smaller than the dimension of lower hood 76 in the front-rear direction. Accordingly, an opening formed in housing 70 through which light emitted from display device 2 passes is tilted relative to the up-down direction so that the light emitted from display device 2, which is disposed at a location in housing 70 which is higher than double-sided reflective optical member 920, enters effectively. In other words, the opening in housing 70 is provided facing toward ceiling 101.

Additionally, display device 2 is fixed to ceiling 101 by state holding member 80, and is disposed in an attitude that causes light to be incident on double-sided reflective optical member 920 of room mirror 1y. Although FIG. 73 illustrates display device 2 as one example, the display device disclosed above may be used instead.

Additionally, in the configuration illustrated in FIG. 73, using mirror member 60 makes it possible to secure a rearward view even if a mechanism for rotating double-sided reflective optical member 920 has malfunctioned. This also applies to the configurations illustrated in FIG. 76 to FIG. 78, which will be described below.

Figure 76:
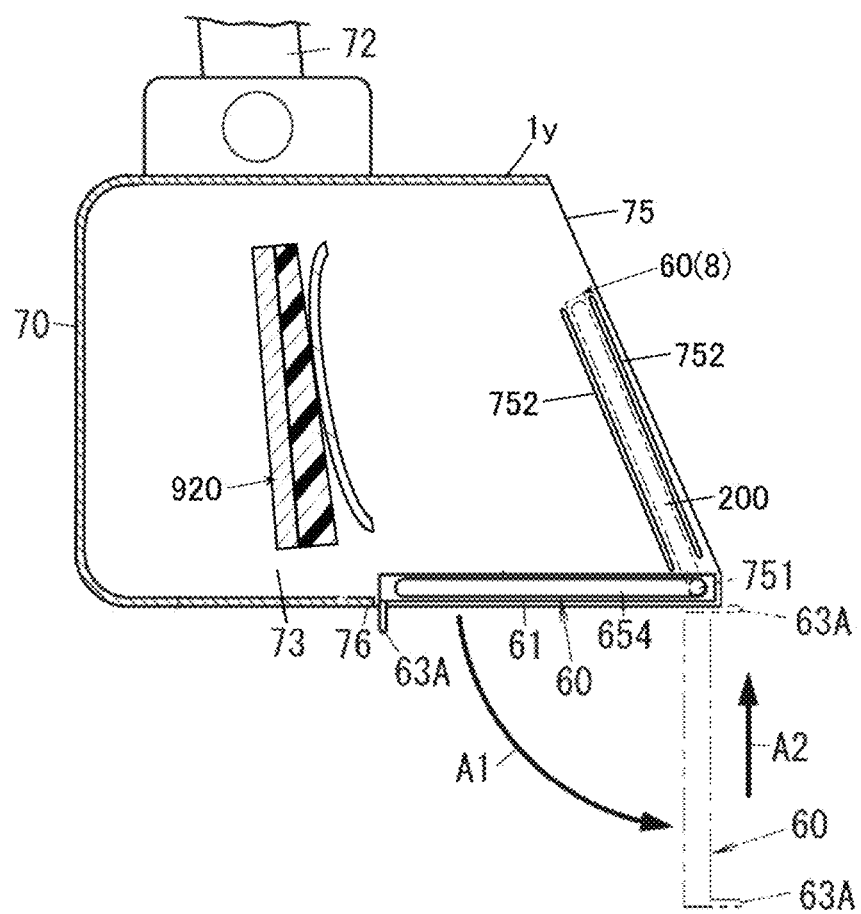
FIG. 76 is a general explanatory diagram in which a mirror member in the display systems according to Embodiments 1 to 9 has the same configuration as the mirror member illustrated in FIG. 48.

Additionally, in the foregoing Embodiments 1 to 9, mirror member 60 may have the same configuration as mirror member 60 illustrated in FIG. 48, as illustrated in FIG. 76; and other configurations aside from room mirror 1y may be the same as those illustrated in FIG. 73 to FIG. 75. Additionally, elements that are the same as guide projections 752 formed in housing 70 illustrated in FIG. 48 may be formed in housing 70 illustrated in FIG. 76. FIG. 76 is a general explanatory diagram in which mirror member 60 in display system 1CF according to Embodiments 1 to 9 has the same configuration as mirror member 60 illustrated in FIG. 48.

Figure 77:
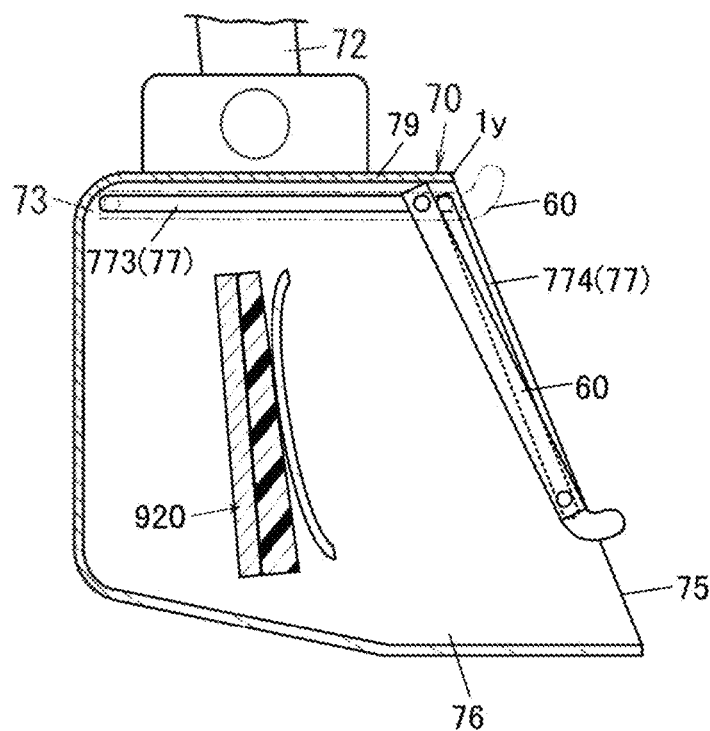
FIG. 77 is a general explanatory diagram illustrating a state in which a mirror member is disposed on an upper hood-side of a housing of the display systems according to Embodiments 1 to 9.
Figure 78:
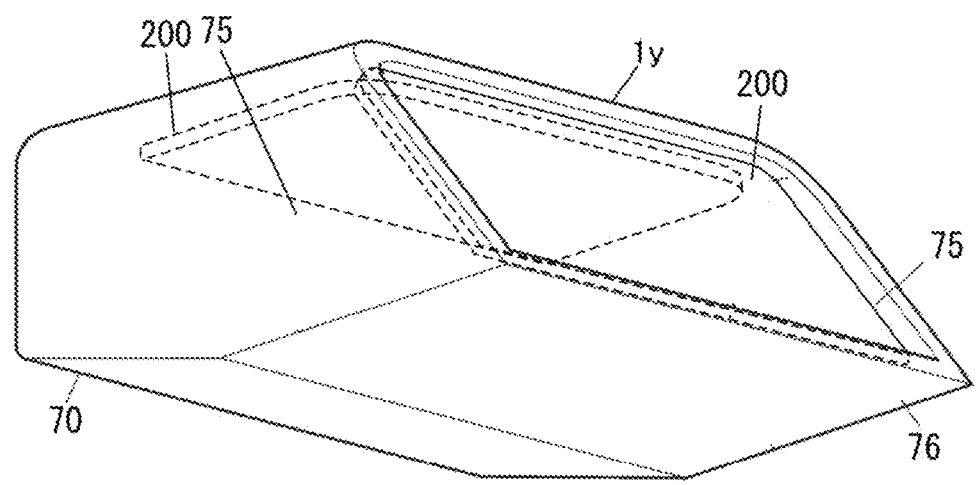
FIG. 78 is a general explanatory diagram illustrating a room mirror in the display systems according to Embodiments 1 to 9.

Additionally, in the foregoing Embodiments 1 to 9, mirror member 60 illustrated in FIG. 77 and FIG. 78 may have the same configuration as mirror member 60 illustrated in FIG. 51 to FIG. 54 and the like; and other configurations aside from room mirror 1y may be the same as those illustrated in FIG. 73 to FIG. 75 and the like. Note that in lower hood 76 of housing 70 illustrated in FIG. 77 and FIG. 78, a rearward side is inclined relative to a forward side, with respect to the front-rear direction. FIG. 77 is a general explanatory diagram illustrating a state in which mirror member 60 is disposed on an upper hood 79-side of housing 70 of the display systems according to Embodiments 1 to 9. FIG. 78 is a general explanatory diagram illustrating room mirror 1y in the display systems according to Embodiments 1 to 9.

Figure 56:
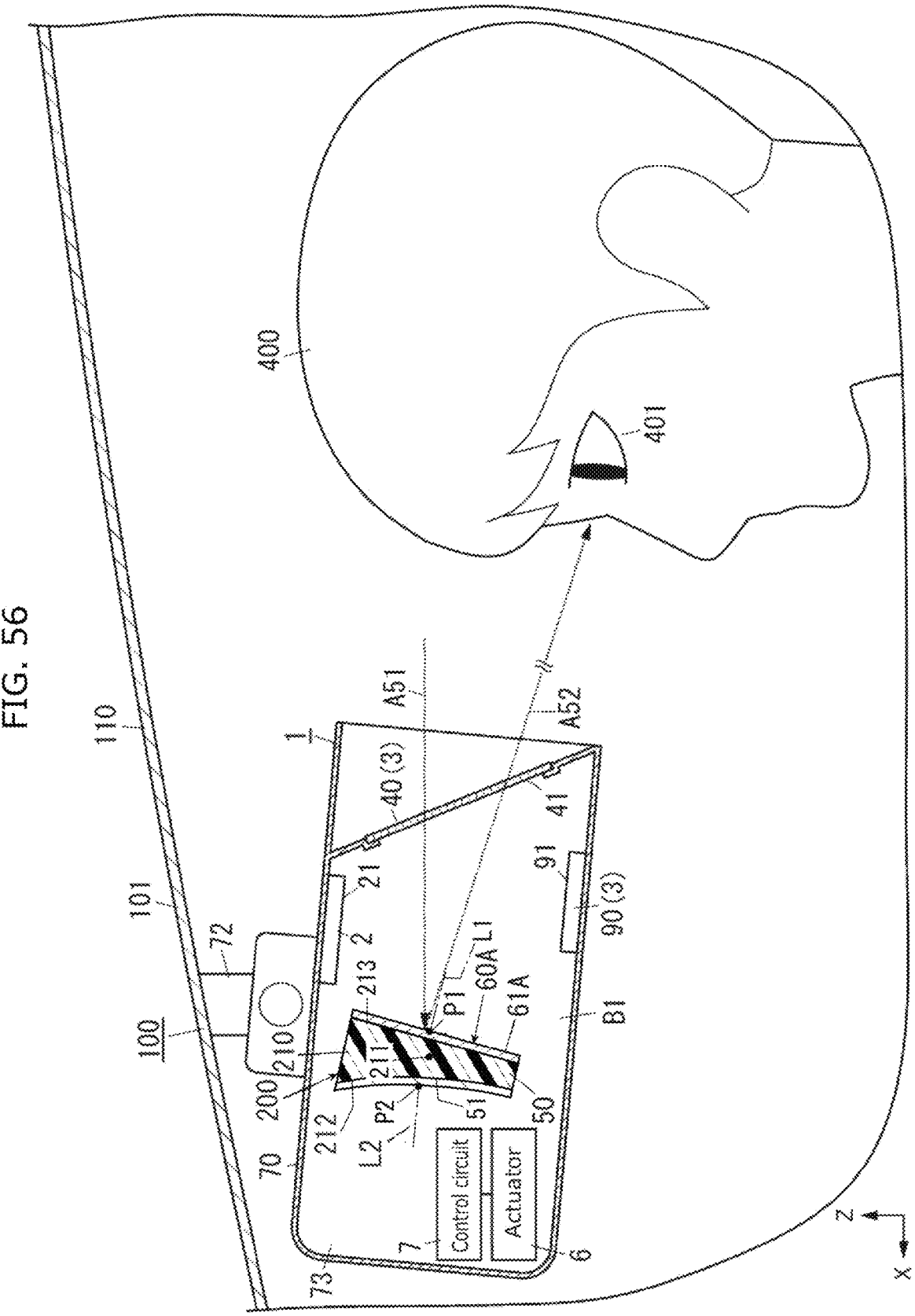
FIG. 56 is a general explanatory diagram illustrating the aforementioned display system, when the mirror member is in a blocking state.

Additionally, as illustrated in FIG. 79 and FIG. 80, in the foregoing Embodiments 1 to 9, the same holding structure 200 as that illustrated in FIG. 55 and FIG. 56, in which final reflective member 50, mirror member 60A, and rotating body 210 are configured as an integrated entity, may be used instead of double-sided reflective optical member 920 illustrated in FIG. 73, for example. Additionally, mirror member 60 illustrated in FIG. 73 to FIG. 75 need not be disposed in housing 70 illustrated in FIG. 79. As such, guide grooves need not be formed in housing 70. FIG. 79 is a general explanatory diagram illustrating a state in which final reflective member 50 of holding structure 200 in display system 1CG according to Embodiments 1 to 9 is facing observer 400. FIG. 80 is a general explanatory diagram illustrating a state in which mirror member 60A of holding structure 200 in display system 1CG according to Embodiments 1 to 9 is facing observer 400.

Additionally, as illustrated in FIG. 81, in the foregoing Embodiments 1 to 9, the same holding structure 200 as that illustrated in FIG. 57 may be used instead of holding structure 200 illustrated in FIG. 79 and FIG. 80, for example. The configuration of display system 1CG is the same configuration as the configuration of display system 1CG illustrated in FIG. 79 and FIG. 80. FIG. 81 is a general explanatory diagram illustrating a configuration in which holding structure 200 different from that illustrated in FIG. 79 and FIG. 80 is used in display system 1CG according to Embodiments 1 to 9.

Additionally, in the foregoing Embodiments 1 to 9, emitter E1 may include a plurality of intermediate reflective members 90. In this case, light emitted from display surface 21 reaches final reflective member 50 after being reflected by the plurality of intermediate reflective members 90.

Intermediate reflective member 90 is not limited to a flat mirror, and may be a concave mirror or a convex mirror, or may be constituted by a Fresnel mirror. Intermediate reflective member 90 may have intermediate reflective surface 91, which is a free-form surface.

The combination of final reflective surface 51 and intermediate reflective surface 91 may be the combination described hereinafter. That is, final reflective surface 51 may be plane-symmetrical, and intermediate reflective member 90 may have intermediate reflective surface 91, which is not plane-symmetrical and is a free-form surface.

Final reflective surface 51 is not limited to a plane-symmetrical shape, and may have an asymmetrical shape.

At least one optical component such as a lens or a prism may be disposed in the optical path between display surface 21 and observer 400.

In the embodiments, final reflective member 50 is suspended from ceiling 101 (overhead console H1), but final reflective member 50 may be suspended from windshield 102 instead.

Display device 2 and intermediate reflective member 90 may be distributed throughout a plurality of housings.

Display device 2, intermediate reflective member 90, and final reflective member 50 may be consolidated in a single housing. Alternatively, display system 1 may include a housing in which intermediate reflective member 90 and final reflective member 50 are consolidated, and a housing in which display device 2 is provided. Alternatively, display system 1 may include a housing in which display device 2 and final reflective member 50 are consolidated, and a housing in which intermediate reflective member 90 is provided.

At least one of display device 2, intermediate reflective member 90, and final reflective member 50 may be housed within overhead console H1.

Display system 1 may include an adjustment mechanism that automatically adjusts the orientation of final reflective surface 51. The adjustment mechanism includes, for example: an actuator that adjusts the orientation of final reflective surface 51 by rotating first support member 70w that supports final reflective member 50; and controller 76w that controls the actuator. The adjustment mechanism adjusts the orientation of final reflective surface 51 in accordance with at least one of the position of the driver's eye box and the orientation of emitter E1. The position of the driver's eye box may be detected based on an image captured by an image sensor, for example. The orientation of emitter E1 may be detected by, for example, an angle sensor such as a photoelectric rotary encoder or a magnetic rotary encoder.

It is not necessary for controller 76w to have a function for controlling drive circuit 84. Additionally, a controller having a function for controlling drive circuit 84 may be provided separate from controller 76w, which has a function of controlling the display state of the picture displayed by display device 2.

The locations of final reflective member 50 in the embodiments and the like are merely examples, and are not limited to those described here. When display system 1 is used as an inner mirror, final reflective member 50 may be disposed in a region which complies with standards pertaining to the placement of inner mirrors.

CONCLUSION

The following aspects are disclosed by the embodiments and the like described above.

A display system (1, 1A, 1B) according to a first aspect is installed in an automobile (100). The display system (1, 1A, 1B) includes an emitter (E1, E2) and a final reflective member (50). The emitter (E1, E2) includes a display device (2). The display device (2) includes a display surface (21), which displays a picture of an area behind the automobile (100). The emitter (E1, E2) emits the picture of the display surface (21) as light. The final reflective member (50) has a final reflective surface (51), which is a concave surface. Light emitted from the emitter (E1, E2) is directly or indirectly incident on the final reflective surface (51). The final reflective surface (51) reflects the incident light toward an eye (401) of an observer (400). A tangent line (T5), which will be described next, is, in top view, parallel to a straight line (SL2) extending in a width direction (first direction D1) of the display surface (21). The tangent line (T5) is present on a plane orthogonal to the up-down direction, and contacts a center (C5) of the final reflective surface (51). In top view, a straight line (SL12), which connects the center (C5) of the final reflective surface (51) with a center (C2) of the display surface (21), intersects with the tangent line (T5) of the final reflective surface (51) at an acute angle (θ5) of less than 90 degrees.

According to this configuration, error in the optical path lengths from respective positions on the display surface (21) to the final reflective surface (51), caused by differences in positions on the display surface (21) in the width direction, is reduced, as compared to a case where in top view, the tangent line (T5) of the final reflective surface (51) is not parallel to the straight line (SL2) extending in the width direction of the display surface (21). Reducing the error in the optical path lengths reduces distortion in the picture which can be seen by the observer (400). In other words, a difference between left and right magnification rates in the picture which can be seen by the observer (400) is reduced.

Additionally, according to a display system (1, 1A) of a second aspect, in the first aspect, the automobile (100) includes a windshield (102). In top view, the final reflective member (50) is disposed at least partially behind the windshield (102). In top view, a straight line (SL10) connecting the center (C5) of the final reflective surface (51) and a center (C10) of the windshield (102) is parallel to a straight line (SL11) extending in the front-rear direction.

According to this configuration, the final reflective member (50) is disposed in a position which is easily visible to the driver.

Additionally, according to a display system (1, 1A) of a third aspect, in the second aspect, in top view, the straight line (SL12) connecting the center (C5) of the final reflective surface (51) and the center (C2) of the display surface (21) is parallel to the straight line (SL11) extending in the front-rear direction.

According to this configuration, space can be secured on the left and right of the final reflective member (50) and the display device (2).

Additionally, according to a display system (1, 1B) of a fourth aspect, in any one of the first to third aspects, the emitter (E1) includes an intermediate reflective member (90). The intermediate reflective member (90) has an intermediate reflective surface (91). Light emitted from the display surface (21) is directly or indirectly incident on the intermediate reflective surface (91). The intermediate reflective surface (91) reflects the incident light toward the final reflective surface (51). In top view, a tangent line (T9), described below, is parallel to the straight line (SL2) extending in the width direction of the display surface (21). The tangent line (T9) is present on a plane orthogonal to the up-down direction, and contacts a center (C9) of the intermediate reflective surface (91).

According to this configuration, the level of freedom with which the final reflective member (50) and the display device (2) can be disposed is higher than when the intermediate reflective member (90) is not provided.

Additionally, according to a display system (1, 1B) of a fifth aspect, in the fourth aspect, the intermediate reflective member (90) and the display device (2) can change orientation with respect to the final reflective surface (51) while the tangent line (T9) of the intermediate reflective surface (91) and the straight line (SL2) extending in the width direction of the display surface (21) remain parallel.

According to this configuration, the appearance of the picture can be adjusted.

Additionally, according to a display system (1, 1A, 1B) of a sixth aspect, in any one of the first to fifth aspects, the system includes an angle sensor (75) and a drive circuit (84). The angle sensor (75) detects an orientation of the final reflective surface (51). The drive circuit (84) changes an orientation of the emitter (E1, E2) in accordance with the detection result of the angle sensor (75) to an orientation in which, in top view, the tangent line (T5) of the final reflective surface (51) is parallel with the straight line (SL2) extending in the width direction of the display surface (21).

According to this configuration, even if the orientation of the final reflective member (50) has shifted, the orientation of the final reflective member (50) is automatically corrected, and distortion in the picture visible to the observer (400) is reduced.

Additionally, according to a display system (1, 1A, 1B) of a seventh aspect, in any one of the first to sixth aspects, the system includes the angle sensor (75). The angle sensor (75) detects an orientation of the final reflective surface (51). The display device (2) causes the picture displayed in the display surface (21) to distort in accordance with a detection result of the angle sensor (75).

According to this configuration, by distorting the picture displayed in the display surface (21), distortion in the picture which is visible to the observer (400) can be reduced further.

Additionally, according to a display system (1, 1A, 1B) of an eighth aspect, in any one of the first to seventh aspects, the shape of the final reflective surface (51) is plane-symmetrical, with a plane (P5), described next, serving as a plane of symmetry. The plane (P5) is a plane that includes a normal line (N5) passing through the center (C5) of the final reflective surface (51) and that is parallel to the up-down direction.

According to this configuration, differences in the appearance of the left and right sides of the picture can be reduced.

Configurations aside from those of the first aspect are not necessary in the display system (1, 1A, 1B), and can be omitted as appropriate.

A display system (1) according to a ninth aspect includes: the display device (2), which has the display surface (21); a reflecting optical system (B1), which includes at least the final reflective member (50); a housing (70); and a light-blocking member (8). Light emitted from the display surface (21) of the display device (2) is directly or indirectly incident on the final reflective member (50), and the incident light is reflected toward the eye (401) of the observer (400). The housing (70) holds the display device (2) and the reflecting optical system (B1). The light-blocking member (8) is held by the housing (70) in either one of two states, namely a blocking state, in which at least part of the light incident on the final reflective member (50) or the light reflected by the final reflective member (50) is blocked, and an inactive state, in which the blocking is inactive. Additionally, in the blocking state, the light-blocking member (8) reflects outside light entering the housing (70) toward the eye (401) of the observer (400). The housing (70) includes a holding structure (200), which holds the light-blocking member (8) in either one of the blocking state and the inactive state.

According to this aspect, the display system (1), which can make an alternative display even when an abnormality has arisen in the display by the display device (2), and which can suppress a drop in forward visibility, can be provided.

According to a display system (1) of a tenth aspect, in the ninth aspect, the reflecting optical system (B1) further includes a half mirror (40). Light emitted from the display surface (21) of the display device (2) is incident on the final reflective member (50) via the half mirror (40), and the light reflected by the final reflective member (50) passes through the half mirror (40) and enters the eye (401) of the observer (400).

According to this aspect, by reflecting light at least twice, using the half mirror (40) and the final reflective member (50), the optical path length can be increased while at the same time making the device more compact.

According to a display system (1) of an eleventh aspect, in the ninth aspect, a mirror member (60), which has a plate shape and has a reflective surface (61) as one surface, is provided in the housing (70) as the light-blocking member (8). A state of the mirror member (60) can be switched to one of a third state and a fourth state by a sliding action and a rotation action of the mirror member (60). The third state is a state in which the mirror member (60) is disposed at a first position outside the optical path of the light entering the eye (401) of the observer (400) from the final reflective member (50). In the fourth state, the mirror member (60) is disposed in the second position between the final reflective member (50) and the observer (400), in a state in which the reflective surface (61) faces toward the observer (400). The fourth state is a state in which a reflected image produced by the reflective surface (61) reflecting light from outside the housing (70) is displayed to the eye (401) of the observer (400).

According to this aspect, the display system (1), which can make an alternative display even when an abnormality has arisen in the display by the display device (2), and which can suppress a drop in forward visibility, can be provided.

According to a display system (1) of a twelfth aspect, in the eleventh aspect, the reflecting optical system (B1) further includes the half mirror (40). Light emitted from the display surface (21) of the display device (2) is incident on the final reflective member (50) via the half mirror (40), and the light reflected by the final reflective member (50) passes through the half mirror (40) and enters the eye (401) of the observer (400).

According to this aspect, by reflecting light at least twice, using the half mirror (40) and the final reflective member (50), the optical path length can be increased while at the same time making the device more compact.

According to a display system (1) of a thirteenth aspect, in the twelfth aspect, a surface of the mirror member (60) on the side opposite from the reflective surface (61) is a light-blocking surface (62), which has a lower reflectance than the reflective surface (61) with respect to at least light in the visible light range. The third state is a state in which the light-blocking surface (62) of the mirror member (60) opposes the half mirror (40).

According to this aspect, in the ninth aspect, a situation in which light incident on the light-blocking surface (62) of the mirror member (60) from outside the housing (70) is reflected by the light-blocking surface (62) and the half mirror (40) and enters the eye (401) of the observer (400) can be suppressed.

According to a display system (1) of a fourteenth aspect, in the thirteenth aspect, the light-blocking surface (62) performs at least one of absorption and scattering of at least light in the visible light range.

According to this aspect, a situation in which, in the third state, light incident on the light-blocking surface (62) from outside the housing (70) is reflected by the light-blocking surface (62) and the half mirror (40) and enters the eye (401) of the observer (400) can be suppressed.

According to a display system (1) of a fifteenth aspect, in any one of the twelfth to fourteenth aspects, the reflecting optical system (B1) further includes the intermediate reflective member (90), which reflects light emitted from the display surface (21) of the display device (2) toward the half mirror (40).

According to this aspect, the display system (1), which can make an alternative display even when an abnormality has arisen in the display by the display device (2), and which can suppress a drop in forward visibility, can be provided.

According to a display system (1) of a sixteenth aspect, in any one of the eleventh to fifteenth aspects, the holding structure (200) includes projections (64, 751) and guide grooves (77, 65). The projections (64, 751) are provided in one of the housing (70) and the mirror member (60). The guide grooves (77, 65) are provided in the other of the housing (70) and the mirror member (60), and the projections (64, 751) are inserted into the guide grooves (77, 65). By changing the positions of the projections (64, 751) within the guide grooves (77, 65), the state of the mirror member (60) can be switched to one of the third state and the fourth state.

According to this aspect, the mirror member (60) can be moved between the first position and the second position by moving the projections (64, 751) along the guide grooves (77, 65).

According to a display system (1) of a seventeenth aspect, in the sixteenth aspect, the holding structure (200) further includes guide members (78) which are inserted into the guide grooves (77) and slide along the guide grooves (77), and the projections (64) are supported by the guide members (78) so as to be capable of rotating.

According to this aspect, the guide members (78) can be moved smoothly along the guide grooves (77).

According to a display system (1) of an eighteenth aspect, in any one of the eleventh to sixteenth aspects, the system further includes a state holding member (80) that holds the state of the mirror member (60) in each of the third state and the fourth state.

According to this aspect, looseness in the position of the mirror member (60) can be suppressed in both the third state and the fourth state.

According to a display system (1) of a nineteenth aspect, in the eighteenth aspect, the state holding member (80) includes magnets (81) provided in at least one of the mirror member (60) and the housing (70). The state of the mirror member (60) is held in each of the third state and the fourth state by magnetic force of the magnets (81).

According to this aspect, looseness in the position of the mirror member (60) can be suppressed in both the third state and the fourth state.

According to a display system (1) of a twentieth aspect, in the nineteenth aspect, the magnets (81) are electromagnets.

According to this aspect, looseness in the position of the mirror member (60) can be suppressed in both the third state and the fourth state.

According to a display system (1) of a twenty-first aspect, in the eighteenth aspect, the state holding member (80) includes ball plungers (83) provided in one of the housing (70) and the mirror member (60). Receiving holes (84) in which ball parts (831) of the ball plungers (83) are inserted are provided in the other of the housing (70) and the mirror member (60). The state of the mirror member (60) is held in each of the third state and the fourth state as a result of the ball parts (831) being inserted into the receiving holes (84).

According to this aspect, looseness in the position of the mirror member (60) can be suppressed in both the third state and the fourth state.

According to a display system (1) of a twenty-second aspect, in any one of the eleventh to twenty-first aspects, the system further includes an operating part (63) for manually switching the state of the mirror member (60) to either of the third state and the fourth state.

According to this aspect, the display system (1), which can make an alternative display even when an abnormality has arisen in the display by the display device (2), and which can suppress a drop in forward visibility, can be provided.

According to a display system (1) of a twenty-third aspect, in the twenty-second aspect, when the mirror member (60) is moved from the first position using the operating part (63), the state of the mirror member (60) switches from the third state to the fourth state under the weight of the mirror member (60).

According to this aspect, the display system (1), which can make an alternative display even when an abnormality has arisen in the display by the display device (2), and which can suppress a drop in forward visibility, can be provided.

According to a display system (1) of a twenty-fourth aspect, in any one of the eleventh to twenty-third aspects, the system further includes an actuator (6) that moves the mirror member (60) between the first position and the second position.

According to this aspect, the display system (1), which can make an alternative display even when an abnormality has arisen in the display by the display device (2), and which can suppress a drop in forward visibility, can be provided.

According to a display system (1) of a twenty-fifth aspect, in the twenty-fourth aspect, the actuator (6) includes a motor. When an abnormality signal indicating an abnormality in the display by the display device (2) is input, a control circuit (7), which controls the motor, drives the motor and moves the mirror member (60) from the first position to the second position.

According to this aspect, the display system (1), which can make an alternative display even when an abnormality has arisen in the display by the display device (2), and which can suppress a drop in forward visibility, can be provided.

According to a display system (1) of a twenty-sixth aspect, in the twenty-fourth or twenty-fifth aspect, the display system (1) is installed in the automobile (100). A drive circuit (a drive circuit (13) or the actuator (6)) puts the state of a light-blocking body (a liquid crystal mirror (12) or the mirror member (60)) into the blocking state when the automobile (100) is in a stopped state, in which a function related to travel is stopped.

According to this aspect, when the automobile (100) is in the stopped state, the likelihood that an object (O1) will be heated by light can be reduced.

According to a display system (1) of a twenty-seventh aspect, in the ninth aspect, a mirror member (60A), which has a plate shape and has a reflective surface as one surface, is provided in the housing (70) as the light-blocking member (8). The holding structure (200) further includes the final reflective member (50). The holding structure (200) holds the final reflective member (50) and the mirror member (60A) so as to be rotatable relative to the housing (70), in a state in which a reflective surface (61A) of the mirror member (60A) and the reflective surface (51) of the final reflective member (50) face in opposite directions. A normal line (L1) at a center point (P1) of the reflective surface (61A) of the mirror member (60A) and a normal line (L2) at a center point (P2) of the reflective surface (51) of the final reflective member (50) are nonparallel.

According to this aspect, the state can be switched between the inactive state and the blocking state by rotating the mirror member (60A) and the final reflective member (50) 180 degrees relative to the housing (70).

According to a display system (1) of a twenty-eighth aspect, in the twenty-seventh aspect, the holding structure (200) includes a rotating body (210) held so as to be capable of rotating relative to the housing (70). The final reflective member (50) and the mirror member (60A) are held by the rotating body (210). In the inactive state, the rotating body (210) rotates to a first rotation position in which the reflective surface (51) of the final reflective member (50) opposes the observer (400), and in the blocking state, the rotating body (210) rotates to a second rotation position in which the reflective surface (61A) of the mirror member (60A) opposes the observer (400).

According to this aspect, the state can be switched to the inactive state or the blocking state by rotating the rotating body (210) to the first rotation position or the second rotation position.

According to a display system (1) of a twenty-ninth aspect, in the twenty-eighth aspect, the rotating body (210) holds the mirror member (60A) and the final reflective member (50) so that the normal line (L1) at the center point (P1) of the reflective surface (61A) of the mirror member (60A) and the normal line (L2) at the center point (P2) of the reflective surface (51) of the final reflective member (50) are nonparallel.

According to this aspect, the state can be switched between the inactive state and the blocking state by rotating the rotating body (210) 180 degrees.

According to a display system (1) of a thirtieth aspect, in the ninth aspect, a mirror member (60A), which has a plate shape and has a reflective surface as one surface, is provided in the housing (70) as the light-blocking member (8). The holding structure (200) includes the rotating body (210) held so as to be rotatable relative to the housing (70). The rotating body (210) holds the mirror member (60A) and the final reflective member (50) so that the reflective surface (61A) of the mirror member (60A) and the reflective surface (51) of the final reflective member (50) face in opposite directions, and the normal line (L1) at the center point (P1) of the reflective surface (61A) of the mirror member (60A) and the normal line (L2) at the center point (P2) of the reflective surface (51) of the final reflective member (50) are parallel. In the inactive state, the rotating body (210) rotates to a first rotation position in which the reflective surface (51) of the final reflective member (50) opposes the observer (400), and in the blocking state, the rotating body (210) rotates to a second rotation position in which the reflective surface (61A) of the mirror member (60A) opposes the observer (400). An angle that the rotating body (210) rotates between the first rotation position and the second rotation position is a predetermined angle aside from 180 degrees.

According to this aspect, the state can be switched between the inactive state and the blocking state by rotating the rotating body (210) by a predetermined angle.

According to a display system (1) of a thirty-first aspect, in any one of the twenty-eighth to thirtieth aspects, the rotating body (210) further holds at least one other mirror member (320). A normal line (L3) at a center point (P3) of a reflective surface (321) of the other mirror member (320) is nonparallel with respect to both the normal line (L2) at the center point (P2) of the reflective surface (51) of the final reflective member (50) and the normal line (L1) at the center point (P1) of the reflective surface (61A) of the mirror member (60A).

According to this aspect, a reflected image from the other mirror member (320) can be displayed by rotating the rotating body (210) to a rotation position at which the other mirror member (320) opposes the observer (400).

According to a display system (1) of a thirty-second aspect, in any one of the twenty-eighth to thirtieth aspects, the rotating body (210) is a quadrangular prism in which a shape of a cross-section intersecting with an axial direction of an axis of rotation (211) is square. Two of the final reflective members (50) and two of the mirror members (60A) are disposed in an alternating manner on the four side surfaces of the rotating body (210) that are parallel to the axial direction of the axis of rotation (211).

According to this aspect, the rotation angle to rotate the rotating body (210) in order to switch to the blocking state and the inactive state can be made less than 180 degrees.

According to a display system (1) of a thirty-third aspect, in any one of the twenty-eighth to thirty-second aspects, the mirror member (60A) is a flat mirror, and an anti-glare mirror (322) is disposed on a side of the mirror member (60A) on which light is incident, the anti-glare mirror (322) being light-transmissive. The mirror member (60A) and the anti-glare mirror (322) are held by the rotating body (210) so that, as seen from the axial direction of the axis of rotation (211) of the rotating body (210), the normal line (L1) at the center point (P1) of the reflective surface (61A) of the mirror member (60A) and the normal line (L3) at the center point (P3) of a reflective surface (323) of the anti-glare mirror (322) are nonparallel.

According to this aspect, a reflected image from the anti-glare mirror (322) can be displayed by rotating the rotating body (210) to a rotation position at which light is reflected by the anti-glare mirror (322) in the direction of the observer (400).

According to a display system (1) of a thirty-fourth aspect, in any one of the twenty-eighth to thirty-third aspects, the system further includes an actuator (6) that moves the rotating body (210) between the first rotation position and the second rotation position.

According to this aspect, the rotating body (210) can be moved between the first rotation position and the second rotation position using the actuator (6).

According to a display system (1) of a thirty-fifth aspect, in any one of the twenty-eighth to thirty-fourth aspects, the reflecting optical system (B1) further includes the half mirror (40). A picture is displayed by light emitted from the display surface (21) of the display device (2) being incident on the final reflective member (50) via the half mirror (40), and the light reflected by the final reflective member (50) passing through the half mirror (40) and entering the eye (401) of the observer (400). The half mirror (40) has a layered structure including: a reflective polarizing film (43), through which light of a predetermined oscillation direction passes; and first $\lambda/4$ phase difference film (44), which produces a quarter-wavelength phase difference between the light incident on and light emitted from the half mirror (40), in an electrical field oscillation direction. The mirror member (60A), which has a plate shape and has the reflective surface (61A) as one surface, is provided in the housing (70) as the light-blocking member (8). In the inactive state, the mirror member (60A) is disposed at a first position outside the optical path of the light entering the eye (401) of the observer (400) from the final reflective member (50). In the blocking state, the mirror member (60A) is disposed between the final reflective member (50) and the observer (400), in a state in which the reflective surface faces toward the observer (400). A second $\lambda/4$ phase difference film (66), which produces a quarter-wavelength phase difference between the light incident on and light emitted from the mirror member (60A), in an electrical field oscillation direction, is provided on a surface of the mirror member (60A).

According to this aspect, light from the display device (2) can be made to reach the eye (401) of the observer (400) efficiently.

According to a display system (1) of a thirty-sixth aspect, in the ninth aspect, the system further includes a drive circuit (the drive circuit (13) or the actuator (6)) that switches the state of the light-blocking member (8) from the inactive state to the blocking state in accordance with an output of a detection sensor (14).

According to this aspect, the drive circuit (the drive circuit (13) or the actuator (6)) switches the state of the light-blocking member (8) from the inactive state to the blocking state in accordance with a state in a detection area (R1). In this case, the likelihood of an object (O1) present in the detection area (R1) being heated by the light can be reduced.

According to a display system (1) of a thirty-seventh aspect, in the thirty-sixth aspect, an optical path of light reflected by the final reflective member (50) passes through the detection area (R1), and the detection sensor (14) includes an object sensor (15) that detects whether or not the object (O1) is present in the detection area (R1). The drive circuit (the drive circuit (13) or the actuator (6)) switches the state of the light-blocking member (8) from the inactive state to the blocking state when the object sensor (15) detects that the object (O1) is present in the detection area (R1).

According to this aspect, the drive circuit (the drive circuit (13) or the actuator (6)) switches the state of the light-blocking member (8) from the inactive state to the blocking state in accordance with a state in a detection area (R1). In this case, the likelihood of an object (O1) present in the detection area (R1) being heated by the light can be reduced.

According to a display system (1) of a thirty-eighth aspect, in the thirty-seventh aspect, the object sensor (15) is held by the housing (70).

According to this aspect, the display device (2) and the like which constitute the display system (1), and the object sensor (15), can be consolidated in the housing (70).

According to a display system (1) of a thirty-ninth aspect, in the thirty-seventh or thirty-eighth aspect, the object sensor (15) detects the presence of the object (O1) when the object (O1) is moving in the detection area (R1).

According to this aspect, the likelihood that the presence or absence of the object (O1) is erroneously detected by the object sensor (15) can be reduced.

According to a display system (1) of a fortieth aspect, in any one of the thirty-sixth to thirty-ninth aspects, the reflecting optical system (B1) further includes the half mirror (40). A picture is displayed by light emitted from the display surface (21) of the display device (2) being incident on the final reflective member (50) via the half mirror (40), and the light reflected by the final reflective member (50) passing through the half mirror (40) and entering the eye (401) of the observer (400).

According to this aspect, by reflecting light at least twice, using the half mirror (40) and the final reflective member (50), the optical path length can be increased while at the same time making the device more compact.

According to a display system (1) of a forty-first aspect, in the fortieth aspect, when the light-blocking member (8) is in the blocking state, the light-blocking member (8) is disposed so that the half mirror (40) is located between the light-blocking member (8) and the final reflective member (50).

According to this aspect, a space between the light-blocking member (8) and the final reflective member (50) can be effectively used as a space for disposing the half mirror (40).

According to a display system (1) of a forty-second aspect, in the fortieth or forty-first aspects, the half mirror (40) has a layered structure including the reflective polarizing film (43) and a λ/4 phase difference film (44). The reflective polarizing film (43) transmits light in a predetermined oscillation direction. The λ/4 phase difference film (44) produces a quarter-wavelength phase difference between the light incident on and light emitted from the half mirror (40), in an electrical field oscillation direction.

According to this aspect, light from the display device (2) can reach the eye (401) of the observer (400) more efficiently than when using a vapor-deposited type beam splitter as the half mirror (40).

According to a display system (1) of a forty-third aspect, in any one of the thirty-sixth to forty-second aspects, the light-blocking member (8) is an optical mirror (mirror member 60) having the reflective surface (61). The reflective surface (61) reflects light in a reflection direction of light reflected by the final reflective member (50) when the light-blocking member (8) is in the blocking state.

According to this aspect, when the light-blocking member (8) is in the blocking state, an image appearing in the reflective surface (61) can be seen by the observer (400).

According to a display system (1) of a forty-fourth aspect, in any one of the thirty-sixth to forty-third aspects, the detection sensor (14) includes a light sensor (16). The light sensor (16) detects the amount of at least part of the light entering from the detection area (R1) side.

According to this aspect, the drive circuit (the drive circuit (13) or the actuator (6)) can switch the state of the light-blocking member (8) from the inactive state to the blocking state in accordance with the light amount detected by the light sensor (16). Accordingly, the likelihood of the object (O1) present in the detection area (R1) being heated by the light can be further reduced.

According to a display system (1) of a forty-fifth aspect, in the forty-fourth aspect, the system further includes a lens (18). The lens (18) focuses light onto the light sensor (16).

According to this aspect, the light amount can be detected accurately even when the amount of light incident on the light sensor (16) is comparative low.

According to a display system (1) of a forty-sixth aspect, in the forty-fourth or forty-fifth aspect, the light sensor (16) is disposed within the housing (70), along a lower surface or an upper surface of the housing (70).

According to this aspect, space for disposing the light sensor (16) can be secured with ease.

According to a display system (1) of a forty-seventh aspect, in the forty-fourth or forty-fifth aspect, the system further includes a box-shaped part (17). The box-shaped part (17) is disposed next to the housing (70). The box-shaped part (17) has an opening (170) in one end, on a detection area (R1) side. The light sensor (16) is housed within the box-shaped part (17).

According to this aspect, space for disposing the light sensor (16) can be secured with ease.

According to a display system (1) of a forty-eighth aspect, in the forty-fourth or forty-fifth aspect, the light sensor (16) is disposed on a surface of the light-blocking member (8).

According to this aspect, space for disposing the light sensor (16) can be secured with ease.

According to a display system (1) of a forty-ninth aspect, in any one of the thirty-sixth to forty-eighth aspects, a light-blocking member (the liquid crystal mirror (12)) is disposed in the optical path of light reflected by final reflective member (50). The light transmittance of the light-blocking member (the liquid crystal mirror (12)) changes in accordance with an applied voltage.

According to this configuration, the state of the light-blocking body can be easily switched between the inactive state and the blocking state by changing the voltage applied to the light-blocking body (the liquid crystal mirror (12)).

According to a display system (1) of a fiftieth aspect, in any one of the thirty-sixth to forty-ninth aspects, the drive circuit (the drive circuit (13) or the actuator (6)) changes the orientation of the housing (70) in accordance with an output of the detection sensor (14).

According to this aspect, the orientation of the housing (70) is changed to an orientation which provides better usability to a user (the observer (400)), between when the state of the light-blocking member (8) is in the inactive state and the blocking state. For example, when the state of the light-blocking body is the inactive state, the orientation of the housing (70) can be set to an orientation in which the user (the observer (400)) can easily see the picture.

Configurations aside from those of the ninth aspect are not necessary in the display system (1), and can be omitted as appropriate.

An electronic mirror system (5) according to a fifty-first aspect includes the display system (1) according to any one of the first to fiftieth aspects, and an imaging unit (4). The display device (2) displays an image captured by the imaging unit (4) on the display surface (21).

According to this aspect, the electronic mirror system (5) including the display system (1), which can make an alternative display even when an abnormality has arisen in the display by the display device (2), and which can suppress a drop in forward visibility, can be provided.

A moving body (an automobile (100)) according to a fifty-second aspect includes the electronic mirror system (5) according to the fifty-first aspect, as well as a moving body main body (110) in which the electronic mirror system (5) is installed.

According to this aspect, a moving body including the display system (1), which can make an alternative display even when an abnormality has arisen in the display by the display device (2), and which can suppress a drop in forward visibility, can be provided.

In the foregoing embodiment, the constituent elements of controller 50x are constituted by dedicated hardware. However, the constituent elements may be realized by executing software programs corresponding to those constituent elements. Each constituent element may be realized by a program executing unit such as a CPU or a processor reading out and executing a software program recorded into a recording medium such as a hard disk or semiconductor memory.

A display system according to one or more aspects of the present invention have been described based on embodiments, but the present invention is not limited to these embodiments. Variations on the present invention conceived by one skilled in the art, embodiments implemented by combining constituent elements from different other embodiments, and the like may be included in the scope of one or more aspects of the present invention as well, as long as they do not depart from the essential spirit of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2019-234945 filed on Dec. 25, 2019, Japanese Patent Application No. 2019-238333 filed on Dec. 27, 2019, Japanese Patent Application No. 2019-238653 filed on Dec. 27, 2019, and Japanese Patent Application No. 2020-113109 filed on Jun. 30, 2020.

INDUSTRIAL APPLICABILITY

The present invention is useful as a display system that can perform display control accurately in accordance with the position of a person's face.

The invention claimed is:
1. A display system installed in an automobile, the display system comprising:
an emitter including a display, the display having a display surface that displays a picture of an area behind the automobile, the emitter emitting the picture as light; and
a concave mirror having a final reflective surface that is concave and having an attitude that is freely changeable,
wherein the light emitted from the emitter is directly or indirectly incident on the final reflective surface, and the final reflective surface reflects the light which is incident toward an eye of an observer,
a tangent line extending along a plane orthogonal to an up-down direction of the automobile and contacting a center of the final reflective surface is, in a top view, parallel to a straight line extending in a width direction of the display surface within a range in which the attitude is changeable, and
in the top view, of an angle formed by a straight line connecting the center of the final reflective surface with a center of the display surface and the tangent line of the final reflective surface, a supplementary angle which is supplementary to an angle that is on a rear side with respect to the automobile and that is on a side where the observer is present is an acute angle of less than 90 degrees,
wherein the top view is in an up-to-down direction of the automobile.
2. The display system according to claim 1,
wherein the automobile includes a windshield, and
in the top view, the concave mirror is disposed rearward from at least part of the windshield, and a straight line connecting the center of the final reflective surface with a center of the windshield is parallel to a straight line extending in a front-rear direction of the automobile.
3. The display system according to claim 2,
wherein in the top view, the straight line connecting the center of the final reflective surface with the center of the display surface is parallel to the straight line extending in the front-rear direction.
4. The display system according to claim 2,
wherein in the top view, a straight line extending in the front-rear direction of the automobile and passing through the center of the display surface is closer to the observer than a straight line extending in the front-rear direction of the automobile and passing through the center of the final reflective surface.
5. The display system according to claim 1,
wherein the emitter includes an intermediate reflective member having an intermediate reflective surface on which the light emitted from the display surface is directly or indirectly incident, the intermediate reflective surface reflecting the light which is incident toward the final reflective surface, and
a tangent line extending along a plane orthogonal to the up-down direction and contacting a center of the intermediate reflective surface is, in the top view, parallel to the straight line extending in the width direction of the display surface.
6. The display system according to claim 1, comprising:
an angle sensor that detects an orientation of the final reflective surface; and
a drive circuit that, in accordance with a detection result of the angle sensor, changes an orientation of the emitter to an orientation in which, in the top view, the tangent line of the final reflective surface is parallel to the straight line extending in the width direction of the display surface.
7. The display system according to claim 1, comprising:
an angle sensor that detects an orientation of the final reflective surface,
wherein the display distorts the picture displayed on the display surface in accordance with a detection result of the angle sensor.
8. The display system according to claim 1, further comprising:
an imaging unit that captures an image of a region in which the picture is projected; and a controller that performs display control for causing the picture of the area behind to be displayed in the display in accordance with the image captured by the imaging unit, wherein the imaging unit is disposed in an attitude in which an optical axis of the imaging unit is parallel to at least part of an optical path of the picture projected by the display.

9. The display system according to claim 8,
wherein the imaging unit is disposed further rearward than the concave mirror, and captures an image of a region including the concave mirror.

10. The display system according to claim 8, further comprising:
an optical filter that transmits one, and reflects the other, of visible light and infrared light,
wherein the display projects a picture including visible light onto the concave mirror, the picture having been transmitted or reflected by the optical filter, and
the imaging unit is an infrared camera that captures the infrared light reflected or transmitted by the optical filter.

11. The display system according to claim 8,
wherein the concave mirror reflects only a partial region of the picture projected by the display.

12. The display system according to claim 8,
wherein the controller:
causes the display to display a partial picture of a partial region of the picture of the area behind;
specifies a position of a face of a person in a cabin of the automobile based on an image captured by the imaging unit; and
when the position of the face which has been specified has moved in a first direction orthogonal to a front-rear direction of the automobile, causes the display to display a partial picture, of the picture of the area behind, that is a partial region shifted in a second direction from the partial picture displayed in the display before the position of the face moved, the second direction being a direction opposite from the first direction.

13. The display system according to claim 12,
wherein the controller:
causes the display to display a partial picture of a partial region of the picture of the area behind; and
causes the display to display a warning upon determining that the position of the face which has been specified is outside a predetermined eye box.

14. The display system according to claim 8,
wherein the controller:
causes the display to display a partial picture of a partial region of the picture of the area behind;
specifies a gaze direction of a person in the cabin of the automobile based on an image captured by the imaging unit; and
when a target of the gaze direction which has been specified has moved in a first direction orthogonal to a front-rear direction of the automobile, causes the display to display a partial picture, of the picture of the area behind, that is a partial region shifted in a second direction from the partial picture displayed in the display before the gaze direction moved, the second direction being a direction opposite from the first direction.

15. The display system according to claim 8,
wherein the controller:
causes the display to display a partial picture of a partial region of the picture of the area behind;
specifies a position of a face of a person in the cabin of the automobile based on an image captured by the imaging unit; and
causes the display to display the partial picture at a larger size as the position of the face which has been specified moves further toward the front of the automobile.

16. The display system according to claim 1, further comprising:
a double-sided reflective optical member including the concave mirror and a flat mirror, the concave mirror being formed having a concave mirror surface serving as the final reflective surface, and the flat mirror being formed having a flat mirror surface and disposed overlapping the concave mirror; and
a second housing that holds the double-sided reflective optical member in a rotatable state,
wherein an attitude of the double-sided reflective optical member is switched between a first state and a second state by rotating the double-sided reflective optical member,
in the first state, image light emitted from the display surface is directly or indirectly incident on the concave mirror surface, and the image light incident on the concave mirror surface is reflected toward the eye of the observer,
in the second state, light from outside the display system is incident on the flat mirror surface, and the flat mirror surface reflects the light incident on the flat mirror surface toward the eye of the observer, and
the double-sided reflective optical member is provided in the second housing so that an angle between a normal direction of a center of the concave mirror surface and a horizontal direction in the first state is different from an angle between a normal direction of the flat mirror surface and the horizontal direction in the second state.

17. The display system according to claim 16,
wherein the double-sided reflective optical member further includes a support body, the support body having one surface and another surface that is a surface on the side opposite from the one surface, the concave mirror being fixed to the one surface and the flat mirror being fixed to the other surface so that the flat mirror surface is tilted relative to a plane orthogonal to the normal direction of the center of the concave mirror surface.

18. The display system according to claim 16, comprising:
an anti-glare mirror disposed in the second housing closer to a side of the second housing on which light is incident than the double-sided reflective optical member, the anti-glare mirror being light-transmissive; and
an adjuster that adjusts an angle of the anti-glare mirror relative to a vertical direction of the automobile.

19. The display system according to claim 16, comprising:
a photosensor;
a drive circuit that switches the double-sided reflective optical member to the first state and to the second state; and
a controller that controls the drive circuit,
wherein when a light amount of the light detected by the photosensor is less than a prescribed light amount, the controller causes the drive circuit to put the double-sided reflective optical member in the first state.

20. The display system according to claim 16, comprising:
 a sensor that detects a nearby object;
 a drive circuit that switches the double-sided reflective optical member to the first state and to the second state; and
 a controller that controls the drive circuit,
 wherein when the sensor detects an object within a detection area from the sensor, the controller causes the drive circuit to put the double-sided reflective optical member in the second state.

\* \* \* \* \*